United States Patent [19]

Sakiyama

[11] Patent Number: 5,532,986
[45] Date of Patent: *Jul. 2, 1996

[54] AUTOMATIC DISK PLAYING APPARATUS

[75] Inventor: Kazuhiro Sakiyama, Irumi, Japan

[73] Assignee: Nakamichi Corporation, Tokyo, Japan

[ * ] Notice: The term of this patent shall not extend beyond the expiration date of Pat. No. 5,239,527.

[21] Appl. No.: 418,604

[22] Filed: Apr. 7, 1995

Related U.S. Application Data

[63] Continuation of Ser. No. 198,099, Feb. 17, 1994, Pat. No. 5,438,534, which is a continuation of Ser. No. 58,545, May 5, 1993, Pat. No. 5,299,182, which is a continuation of Ser. No. 707,920, May 30, 1991, Pat. No. 5,216,645.

[30] Foreign Application Priority Data

May 31, 1990 [JP] Japan ..................................... 2-143226

[51] Int. Cl.$^6$ .................................................. G11B 17/22
[52] U.S. Cl. ................... 369/36; 369/34; 369/38
[58] Field of Search ................... 369/36, 33, 34, 369/39, 32, 38, 178, 201, 202

[56] References Cited

U.S. PATENT DOCUMENTS 4,797,865  1/1989  Imai et al. ................. 369/39
4,893,293  1/1990  Endo et al. ................. 369/33
5,239,527  8/1993  Sakigama ................... 369/36
5,299,182  3/1994  Sakiyama ................... 369/36

Primary Examiner—David C. Nelms
Assistant Examiner—Tan T. Nguyen
Attorney, Agent, or Firm—Mark A. Catan; Thomas R. Morrison; Morrison Law Firm

[57] ABSTRACT

A changer-equipped player uses an n number of carriages which can hold up to an n number of discs in storage positions in a stocker. These carriages carry discs between the stocker and a movable tray for play and for loading and unloading. One of the n number of carriages, carriage S, is usable in a single-play mode, allowing the player to be used as a tray equipped single-play device. Carriage S may be selected for single-play regardless of the number of discs stored in the remaining n−1 number of carriages. The remaining n−1 number of carriages are usable only in changer-play operation. Loading discs into the device is accomplished by placing discs into empty carriages as each is held in the tray in an eject position. The stocker is not removed for loading discs or for removing or replacing the discs stored within it. During changer-playback operation, the device selects and plays all stored discs in a predetermined sequence. During single-play operation the device plays only the disc in carriage S.

36 Claims, 113 Drawing Sheets

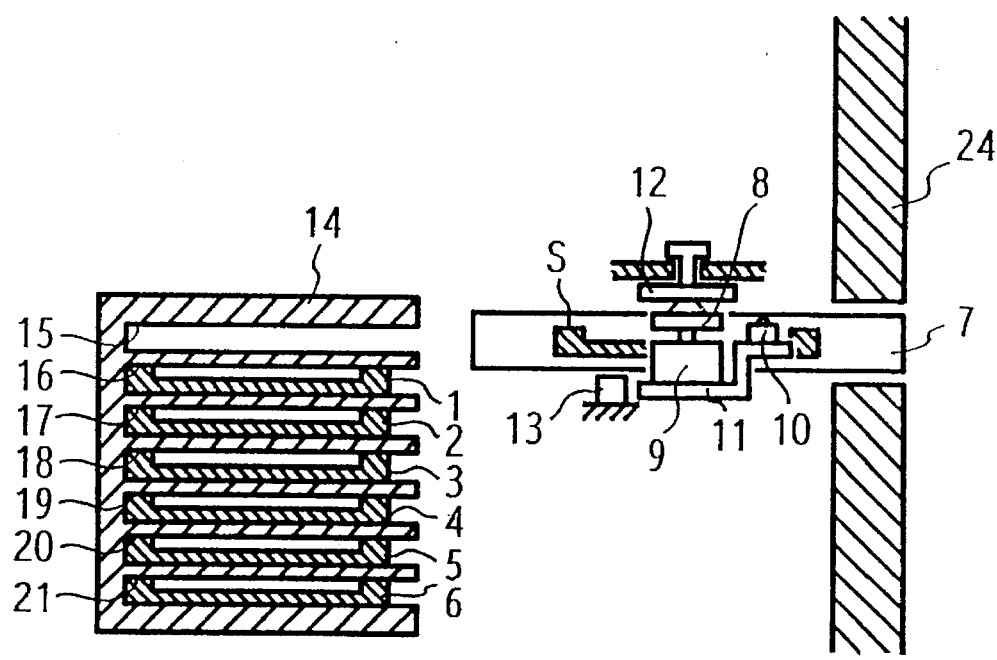
Fig. 23A  (STOCK)
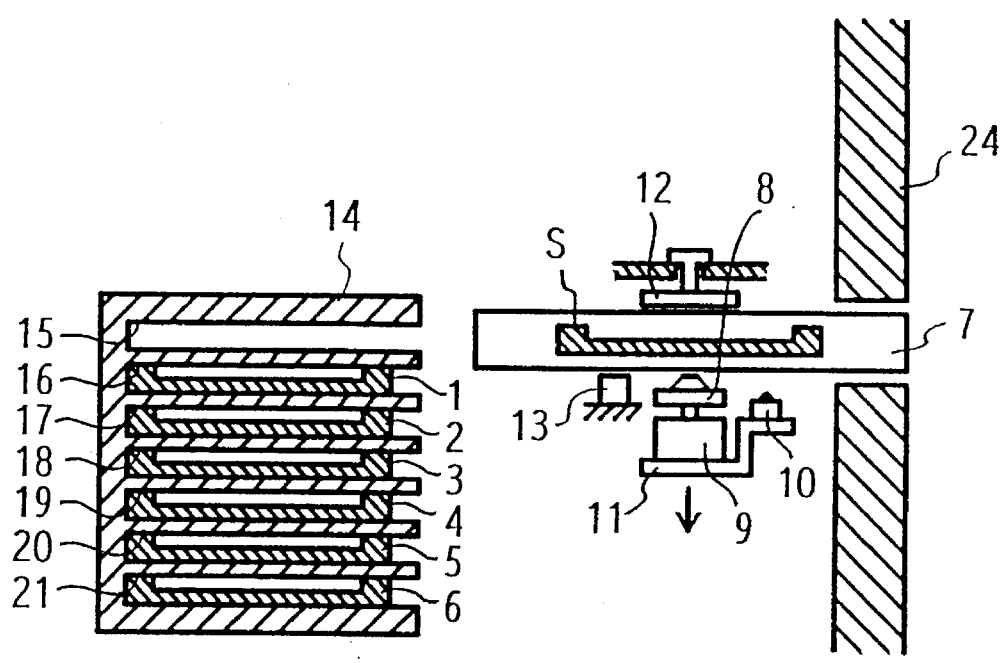
Fig. 23B

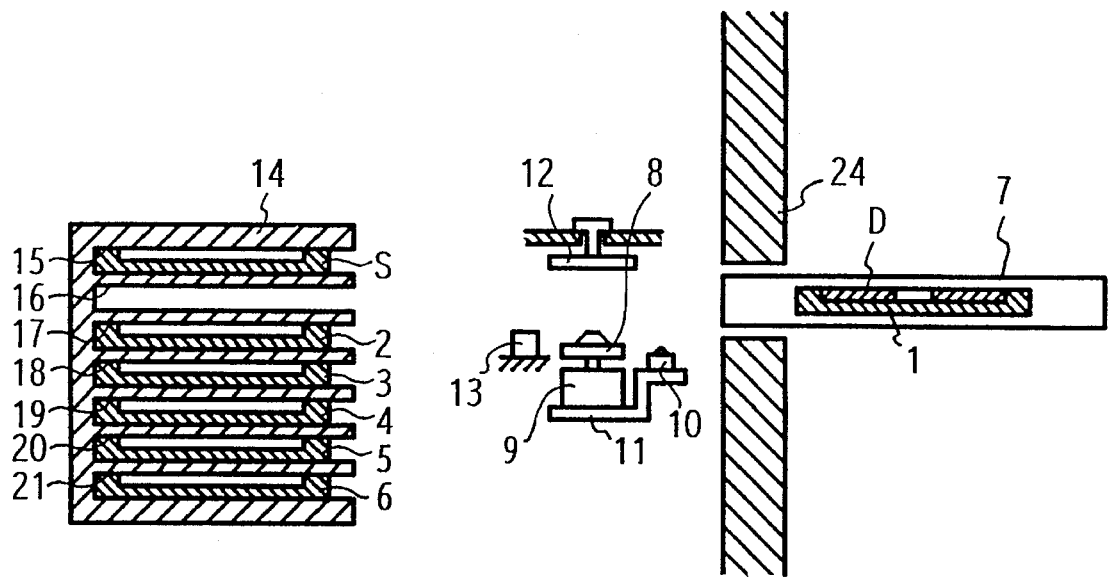
Fig. 23G (STOCK)
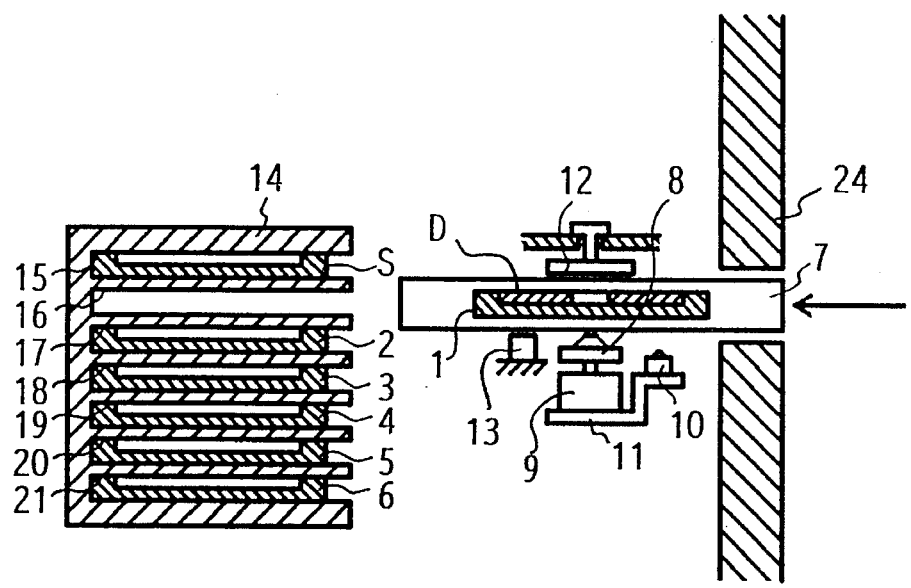
Fig. 23H (STOCK)

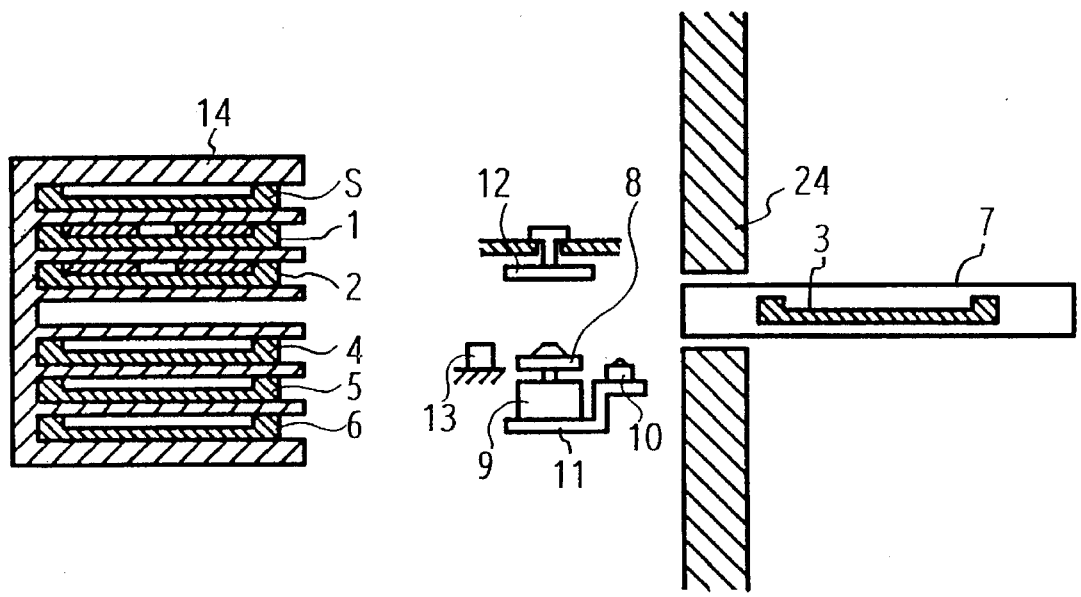
Fig. 24A  (STOCK)
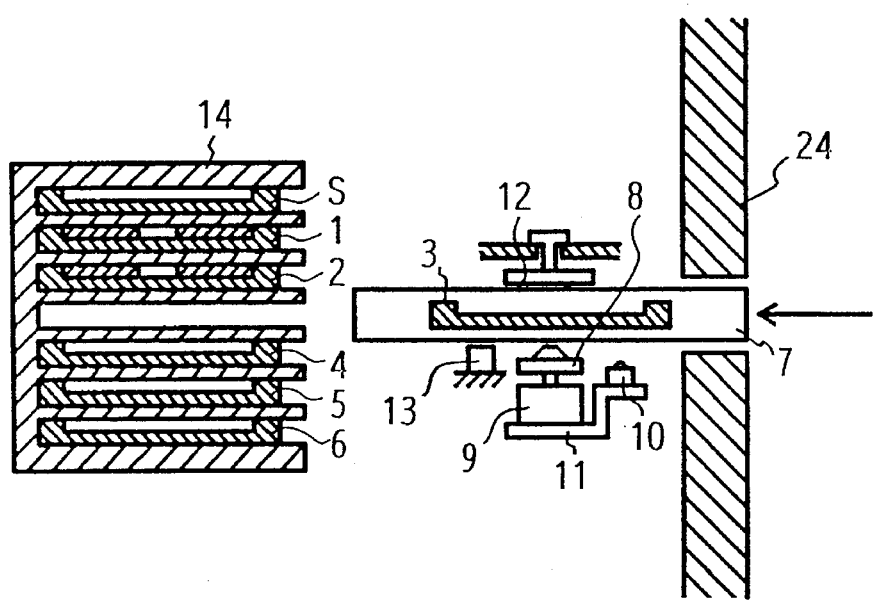
Fig. 24B

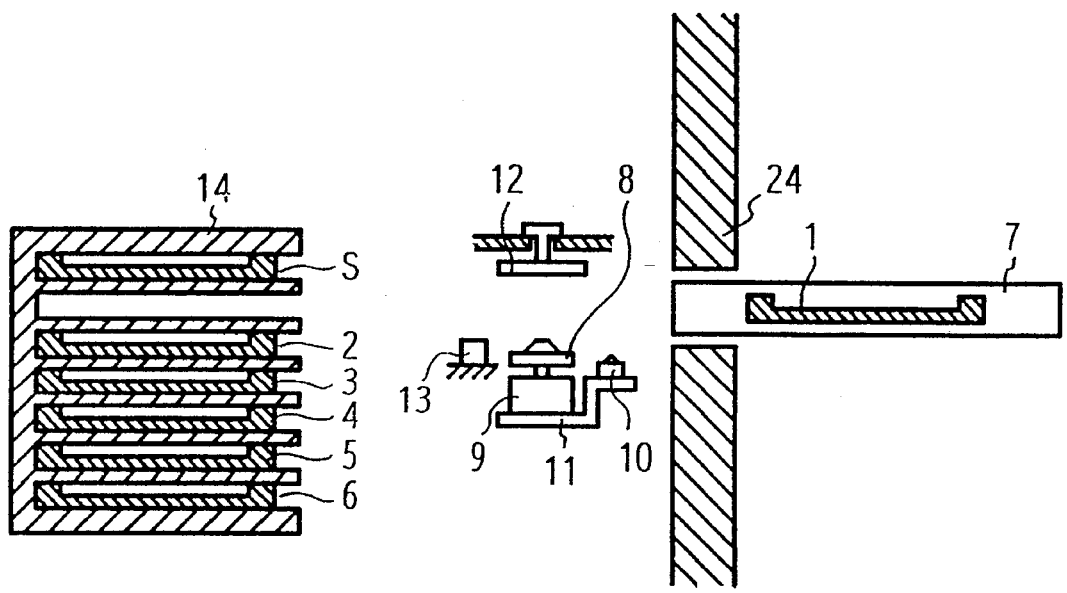
Fig. 25A  (STOCK)
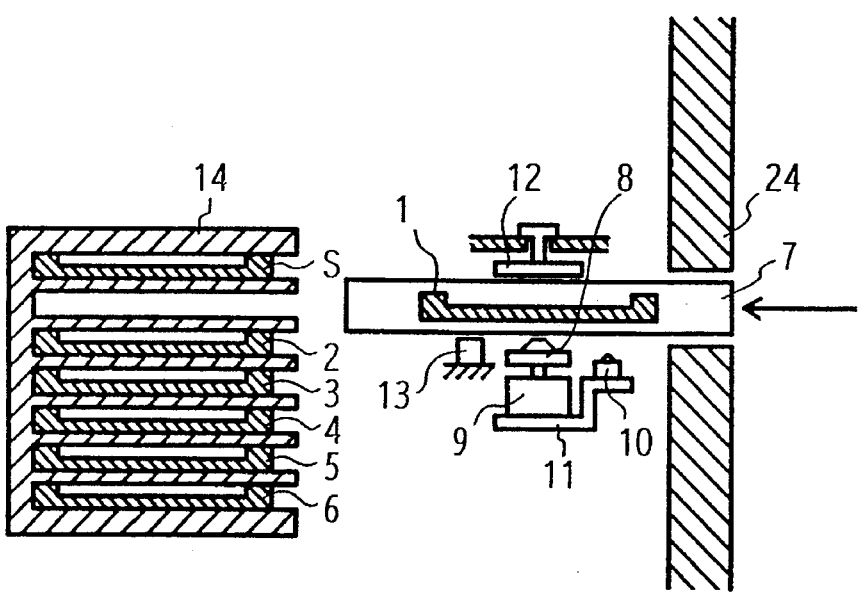
Fig. 25B

STOCK

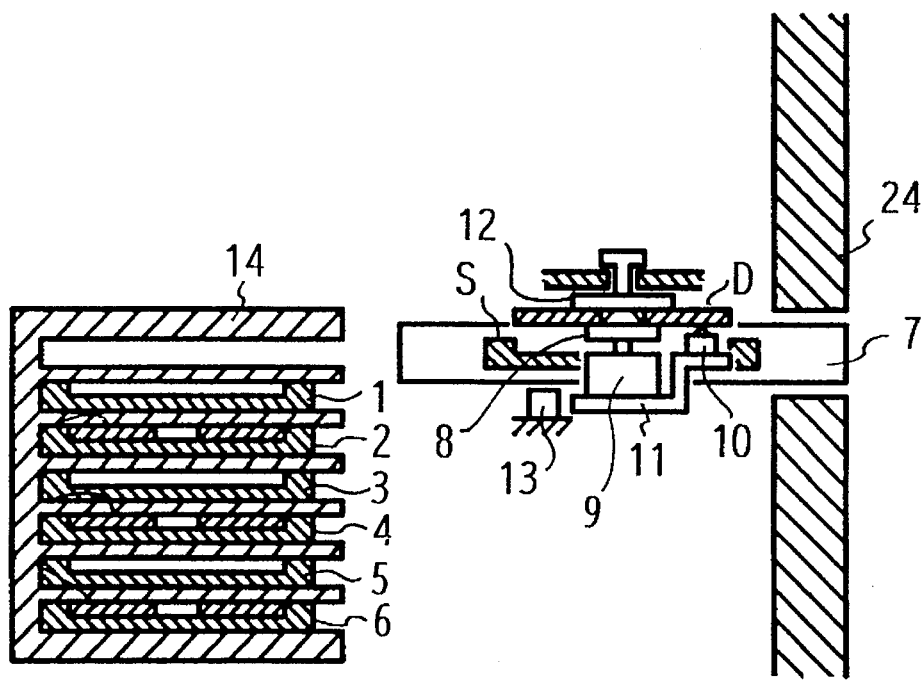
Fig. 30A   (PLAY)
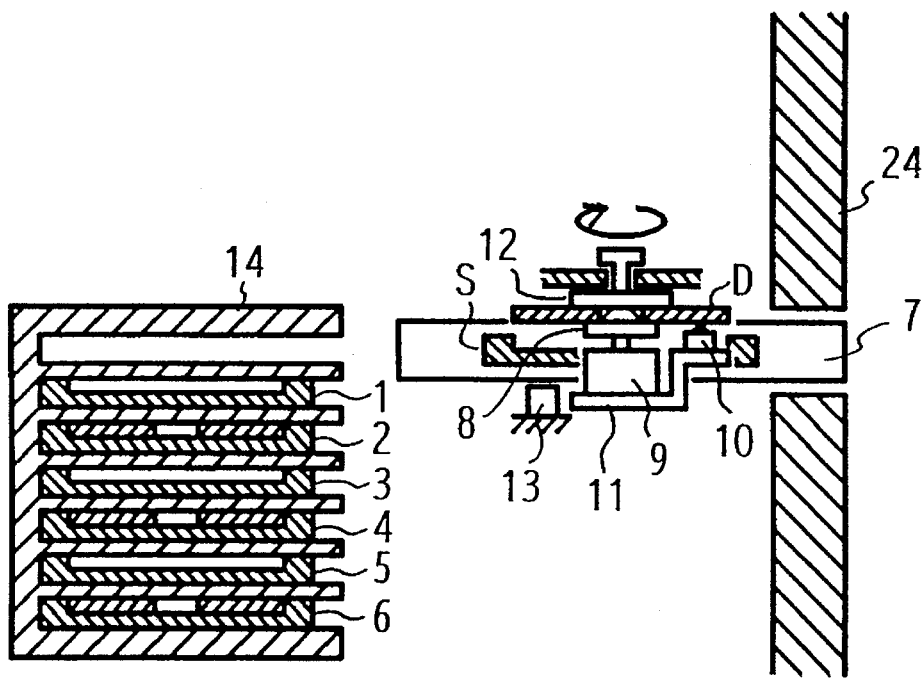
Fig. 30B

PLAY

PLAY

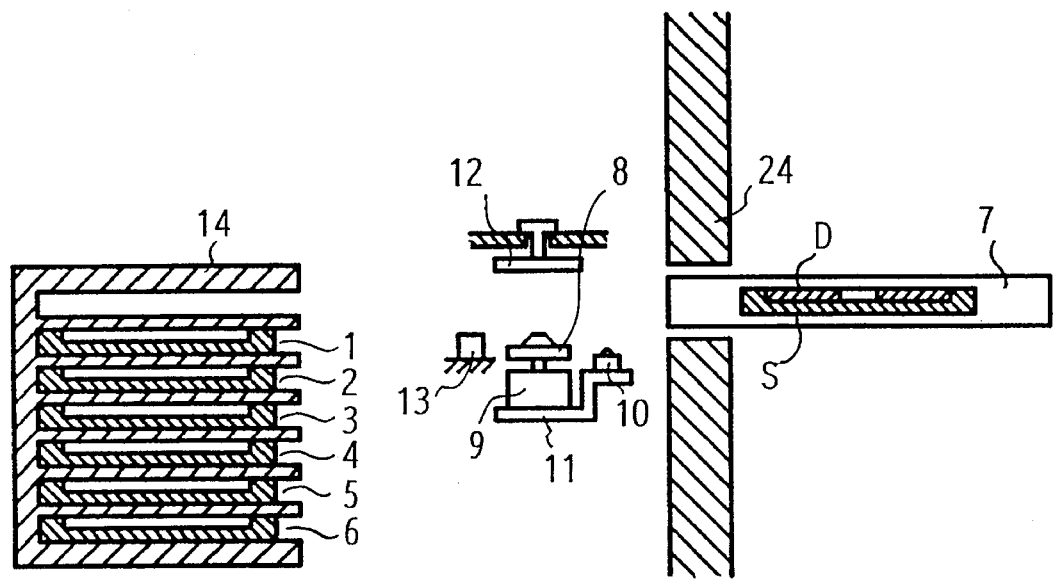
Fig. 34A  (PLAY)
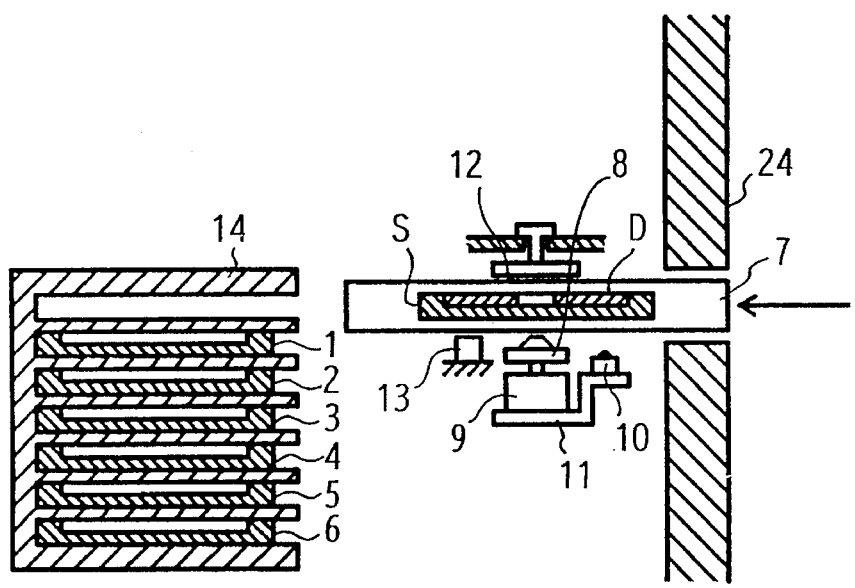
Fig. 34B

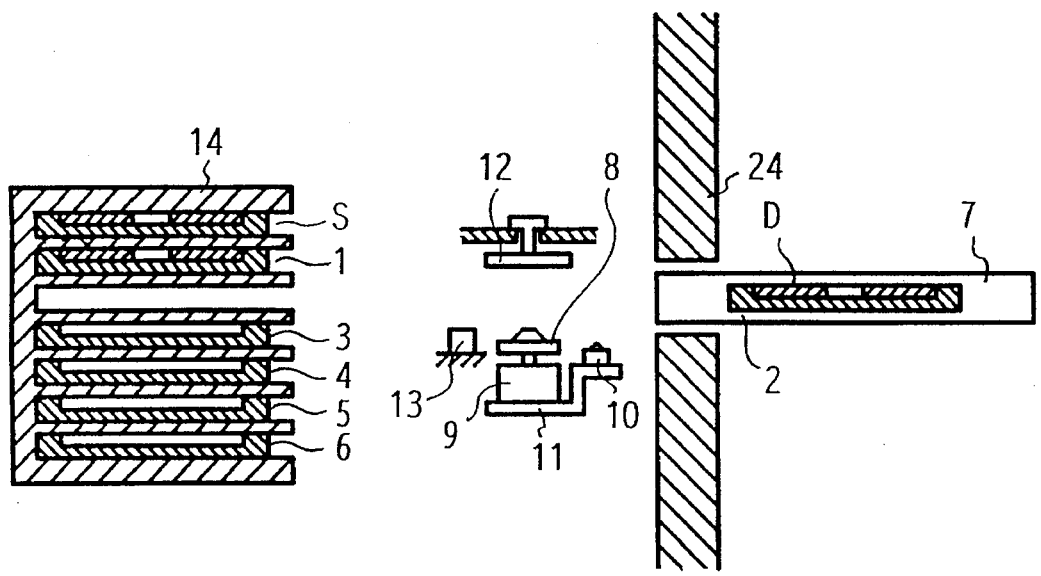
Fig. 35A  (PLAY)
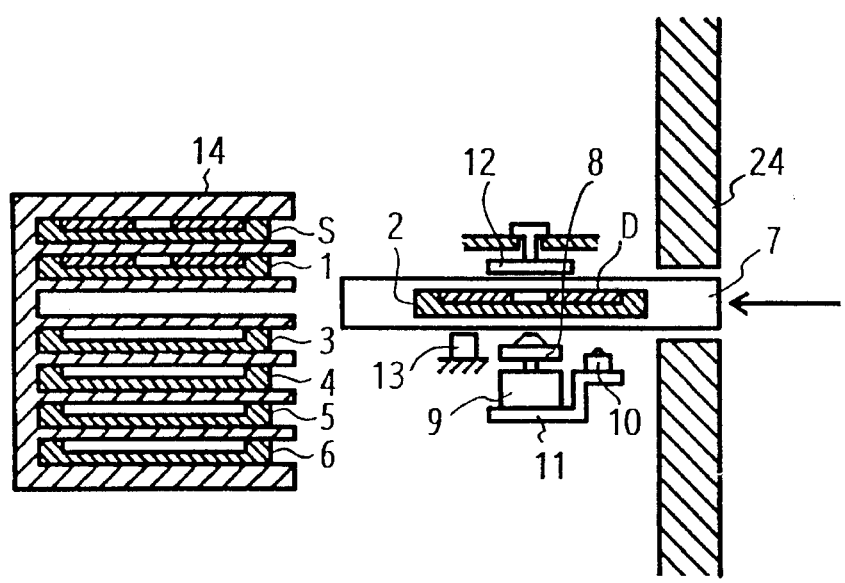
Fig. 35B

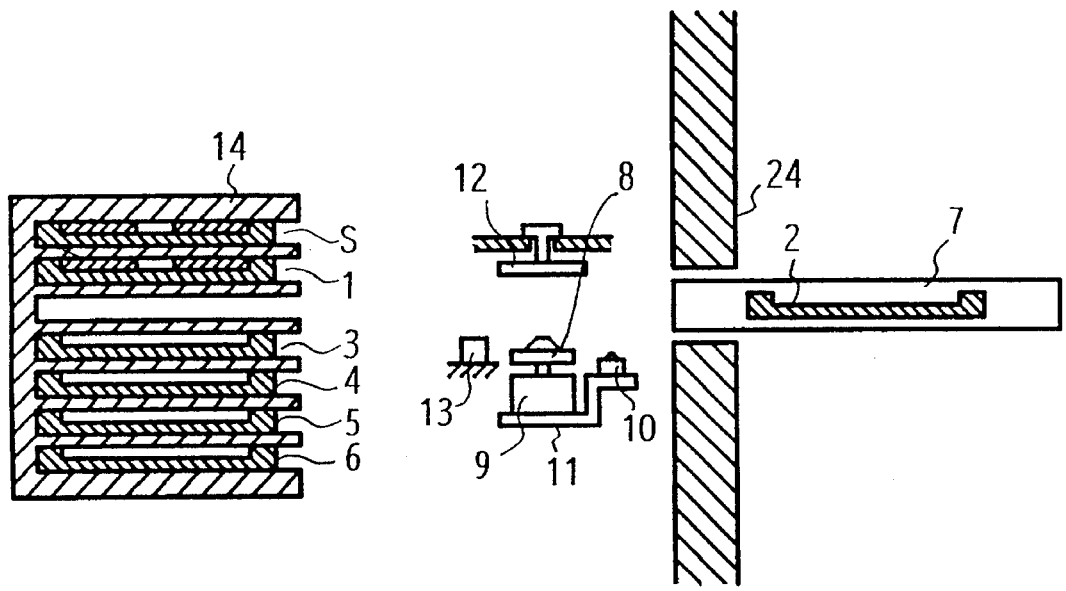
Fig. 37A  (PLAY)
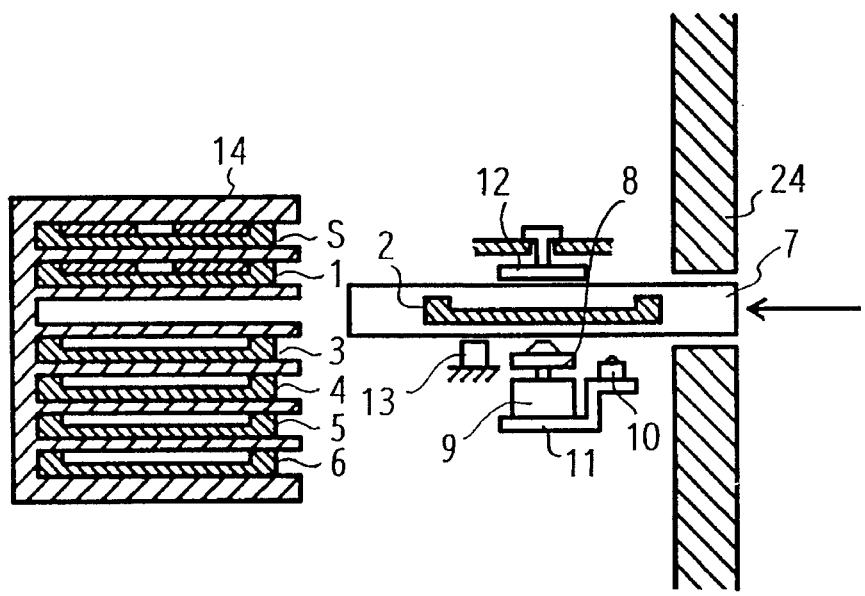
Fig. 37B

AUTOMATIC DISK PLAYING APPARATUS

This application is a continuation of application Ser. No. 08/198,099, Feb. 17, 1994, now U.S. Pat. No. 5,438,534 which is a continuation of application Ser. No. 08/058,545, filed May 5, 1993, now U.S. Pat. No. 5,297,182, which is a continuation of application Ser. No. 07/707,920, filed May 30, 1991 now U.S. Pat. No. 5,216,645.

BACKGROUND OF THE INVENTION

The present invention relates to a disc changer. More particularly, the present invention relates to a disc changer equipped with disc carrier trays.

Disc players having changer devices equipped with a magazine wherein a plurality of carriages store and deliver discs selectively for playback are generally known. Many manufacturers of disc changers have marketed such devices. However, in these devices, playback of a single disc, not previously stored in an incorporated magazine, is difficult. A further disadvantage of these disc changers is that the changer magazine must be removed for a new disc to be installed or for discs to be changed.

A disc changer device with a tray similar to that of a single play disc player and having the added capability of single disc playback is proposed in Japanese Laid Open Utility Model Publication No. 62-195257. Such a device, Disc Changer XL-M701, has been marked in the U.S. by the Japan Victor Corporation (JVC). This disc changer plays a disc placed on a carriage inside a tray when a play switch is selected. This disc changer can also perform a changer-play operation by playing in sequence discs previously stored in up to six carriages in the changer magazine. However, with this disc changer, it is difficult to remove or change discs in the magazine. In addition, because discs are manually installed in the magazine of this changer, they are subject to surface damage.

A disc changer, as disclosed in Japanese Patent Publication Nos. 1-219071, 2 and 3, is proposed that is equipped with a vertically mobile stocker, which is an equivalent of the conventional magazine. In this disc changer, discs are not subjected to destructive handling during the loading of the stocker. This is because the stocker stores carriages that are loaded with discs from a position external to the player. These protected discs are then mechanically moved to storage positions within the stocker.

However, in this disc changer, when discs are stored in the stocker, even if playback is initiated for a disc in a single play carriage, all of the discs in the changer are played back. This prevents it from operated as a single-play disc player.

OBJECTS AND SUMMARY OF THE INVENTION

Accordingly, It is an object of the invention to provide a disc changer which overcomes the drawbacks of the prior art.

It is a further object of the present invention to provide a change equipped disc player (player) that performs a single-play operation on a specially provided single play carriage when a single play control is operated.

It is still further object of the present invention to provide a player, that in addition to single-play operation, is capable of playing a plurality of discs consecutively.

It is a still further object of the present invention to provide a player that is capable of single play operation. In this operation, the player plays back a single disc and stops.

It is a still further object of the present invention to provide changer-play operation. In this operation, when playback of the disc in the first carriage in the play position is completed, the player then plays back, in sequence, the discs in carriages stored in a stocking device.

It is a further object of the present invention, to provide a disc changer that, even though equipped with changer capability, is capable of performing single-play operation wherein only the disc on a single-play carriage is played even with other discs stored in a stocker. Thus, the present invention can be played as a tray equipped, single-play disc player without removing previously stored discs.

It is a still further object of the invention that when a stocker control is operated, a carriage currently stored in a load/eject tray is moved to a storage position in a stocker. An empty carriage disposed in the stocker is then moved to the tray and the tray, with the empty carriage, is moved to an eject position where the carriage can be loaded with a disc.

It is a still further object of the invention that when the stocker control is operated, the carriage currently stored in the load/eject tray is moved to a storage position in the stocker. Then, any empty carriage of a first to an $n-1^{th}$ carriage, where n is any non-zero integer. within the stocker is moved into the tray and the tray is moved to the eject position, where the carriage can be loaded with a disc.

This system is convenient for storing a number of discs in the stocker. In addition, because it is unnecessary to display the number of each empty carriage, the possibility of display malfunctions is eliminated and good operability is assured.

It is a still further object of the invention that when a load/eject control is operated a load eject tray is moved between an eject position and a load position. However, if the eject/load control is operated with the tray in the eject position and the carriage within the tray is empty, the tray is moved to the load position and the carriage within the tray is moved to a storage position in the stocker. Then, a carriage within the stocker that is supporting a disc is moved to the tray. The disc supported in the carriage is then affixed to a disc play-back means.

It is a still further object of the invention that when the eject load control is operated, the tray is moved between the eject position and the load position. However, when the eject load control is operated with the tray in the eject position and an empty carriage in the tray is one of a first to $n-1^{th}$ carriages, the tray is moved to the load position and the carriage within the tray is moved to a storage position in the stocker. Then, a carriage from among the first to $n-1^{th}$ carriages that is supporting a disc is moved to the tray. The disc being supported by that carriage is then affixed to a disc playback means.

When the eject/load control is operated, a carriage in the tray is moved to a storage position in the stocker and a next in sequence carriage that is supporting a disc is moved to the tray. The tray is then moved to the eject position, where the disc can be removed from the carriage. By repeating this procedure, all of the discs stored in carriages in the stocker scan be removed conveniently. Because carriages supporting discs are automatically selected for unloading, there is no need for a display to indicate loaded carriages. This simple procedure also reduces operator error and generally simplifies the operating of the player.

A still further object of the present invention is to hold a single play carriage, carriage S, regardless of the presence of a disc, in a tray at a load position, and to hold one of a first to n–1$^{th}$ carriages in the tray at the load position only when that carriage is supporting a disc.

Briefly stated, the present invention provides a changer-equipped disc player that uses a number n of carriages to hold up to a number n of discs in storage positions in a stocker. These carriages carry discs between the stocker and a movable tray for play and for loading and unloading. One of the n number of carriages, carriage S, is usable in a single-play mode, allowing the player to be used as a tray equipped single-play device. Carriage S may be selected for single play regardless of the number of discs stored in the remaining n–1 number of carriages. The remaining n–1 number of carriages are usable only in changer-play operation. Loading discs into the device is accomplished by playing discs into empty carriages as each is held in the tray in an eject position. The stocker is not removed for loading discs or for removing or replacing the discs stored within it. During changer-playback operation, the device selects and plays all stored discs in a predetermined sequence. During single-play operation, the device plays only the disc in carriage S.

According to an embodiment of the invention, there is provided a changer-type disc player comprising: an n number of carriages, a tray capable of receiving one of the n numbers of carriages thereto and ejecting it therefrom, each of the carriages for supporting a disc thereon, means for moving the tray with one of the carriages therein between a first and a second position, the first position being an eject position extending external to the changer-type disc player, the second position being a load position within the changer-type disc player, a stocker disposed in the changer-type disc player, the stocker having therewithin an n number of slots, each of the n number of slots for storing therein and dispensing therefrom a corresponding one of the n numbers of carriages, means for moving the stocker among an n number of positions so that each of the slots is levelable with the tray in the load position, means for moving one of the n number of carriages between the tray in the load position and a corresponding one of the slots in the stocker brought level with the tray, a disc playing means for playing the disc in the tray in the load position, means for affixing the disc in the tray to the disc playing means, means, to be operated manually, for operating the stocker, means for controlling, responsive to the means for operating the stocker, controlling the means for moving one of n number of the carriages in the tray to the corresponding one of the slots in the stocker, means for controlling, responsive to the means for operating the stocker, moving a selected one of the n number of carriages not supporting a disc in the stocker to the tray in the load position, and means for controlling, responsive to the means for operating the stocker, moving the tray to the eject position according to the means for operating the stocker.

According to a feature of the invention, there is provided a changer-type disc player comprising: an n number of carriages including a carriage S for a single-play mode and a first to n–1$^{th}$ carriages for a changer-play mode, a tray capable of receiving one of the n number of carriages thereto and ejecting it therefrom, each of the n number of carriages for supporting a disc thereon, means for moving the tray with one of the n number of carriages therein between a first and a second position, the first position being an eject position extending external to the changer-type disc player, the second position being a load position within the changer-type disc player, a stocker disposed in the changer-type disc player, the stocker having therewithin an n number of slots, each of the n number of slots for storing therein and dispensing therefrom a corresponding one of the n number of carriages, means for moving the stocker among an n number of positions so that each of the slots is levelable with the tray in the load position, means for moving one of the n number of carriages between the tray in the load position and a corresponding one of the slots in the stocker brought level with the tray, a disc playing means for playing the disc in the tray in the load position, means for affixing the disc in the tray to the disc playing means, means, operable manually, for operating the stocker, means for controlling, responsive to the means for operating the stocker, moving one of the n number of carriages in the tray to the corresponding one of the slots in the stocker, means for controlling, responsive to the means for operating the stocker, moving a selected one of the first to n–1th carriages, not supporting the disc, into the slot in the tray, and means for controlling, responsive to the means for operating the stocker, moving the tray to the eject position.

According to a feature of the invention, there is provided a changer-type disc player comprising: an n number of carriages, a tray capable of receiving one of the n numbers of carriages thereto and ejecting it therefrom, each of the n number of carriages for supporting a disc thereon, means for moving the tray with one of the n number of carriages therein between a first and a second position, the first position being an eject position extending external to the changer-type disc player, the second position being a load position within the changer-type disc player, a stocker disposed in the changer-type disc player, the stocker having therewithin an n number of slots, each of the n number of slots being available for storing therein and dispensing therefrom a corresponding one of the n number of carriages therein, means for moving the stocker among an n number of positions so that each of the slots is levelable with the tray in the load position, means for moving one of the n number of carriages between the tray in the load position and a corresponding one of the slots brought level with the tray, a disc playing means for playing the disc supported in one of the n number of carriages received in the tray in the load position means for attaching the disc in the tray at the load position to the disc playing means, a manually operated eject/load control, means, responsive to operation of the eject/load control, for controlling the means for moving the tray between the eject position and the load position, the means for controlling being responsive to operation of the eject/load control with one the n number carriages in the tray at the eject position empty, being operative to perform the following functions: moving the tray to the load position, moving one of the n number of carriages in the tray into the stocker, moving a carriage whereon a disc is supported from the stocker the tray, and attaching the disc in the tray to the disc playing means.

According to a further feature of the invention, there is provided a changer-type disc player comprising: an n number of carriages, including a single-play mode carriage S and changer-play mode first to n–1$^{th}$ carriages, a tray capable of receiving one of the carriages thereto and ejecting it therefrom, each of the n number of carriages including means for supporting a disc thereon, means for moving the tray with one of the n number of carriages therein between a first and a second position, the first position being an eject position external to the changer-type disc player, the second position being a load position within the changer-type disc player, a stocker disposed in the changer-type disc player, the stocker having therewithin an n numbers of slots, each of the slots being available for storing therein and dispensing therefrom a corresponding one of the n number of carriages, means for moving the stocker among an n numbers of positions at which each of the slots is levelable with the tray in the load position, means for moving one of the n number of carriages between the tray in the load position and a corresponding one of the slots brought level with the tray, disc playing means for playing the disc supported in one of the n number of carriages received in the tray in the load position, means for attaching the disc in the tray at the load position to the disc playing means, a manually operated eject/load control, and means, responsive to operation of the eject/load control, for controlling the means for moving the tray between the eject position and the load position when the eject/load control is operated with one of the first to n–1$^{th}$ carriages in the tray at the eject position being empty, the means for controlling being effective for controlling the following functions:

moving the tray from the eject position to the load position, moving the one of the first to n–1$^{th}$ carriages from the tray in the load position to a corresponding slot in the stocker, moving one of the first to n–1$^{th}$ carriages whereon a disc is supported from the stocker to the tray, and affixing the disc supported on the one of the first to n–1$^{th}$ carriages in the tray to the disc playing means.

According to a still further feature of the invention, there is provided a changer-type disc player comprising: an n number of carriages including a carriage S for a single-play mode and a first to n–1 carriages for a changer-play mode, a tray capable of receiving one of the carriage S and first to n–1$^{th}$ carriages therein and ejecting it therefrom, each of the carriage S and first to n–1$^{th}$ carriages including means for supporting a disc thereon, means for moving the tray with one of the carriages S and first to n–1$^{th}$ carriages therein between a first and a second position, the first position being an eject position extending external to the changer-type disc player, the second position being a load position within the changer-type disc player, a stocker disposed in the changer-type disc player, the stocker having therewithin an n numbers of slots, each of the slots being available for storing therein and dispensing therefrom a corresponding one of the carriage S and first to n–1$^{th}$ carriages, means for moving the stocker among an n numbers of positions so that each of the slots is levelable with the tray in the load position, means for moving one of the carriage S and first to n–1$^{th}$ carriages between the tray in the load position and a corresponding one of the slots brought level with the tray, disc playing means for playing the disc supported in the tray in the load position, means for affixing the disc in the tray to the disc playing means, means for controlling the means for moving the tray and the means for moving one of the carriage S and first to n–1$^{th}$ carriage to retain the carriage S in the tray at the load position regardless of the presence of the disc on the carriage S, and means for controlling the means for moving the tray and the means for moving one of the carriage S and first to n–1$^{th}$ carriage to retain one of the first to n–1$^{th}$ carriages in the tray at the load position only when a disc is present on at least one of the first to n–1$^{th}$ carriages.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

In the description which follows, a signal name having a bar over it represents the inverse, or absence of the named signal. For example, the signal $\overline{STOCK}$ represents the inverse or absence of the signal STOCK.

Figure 1:
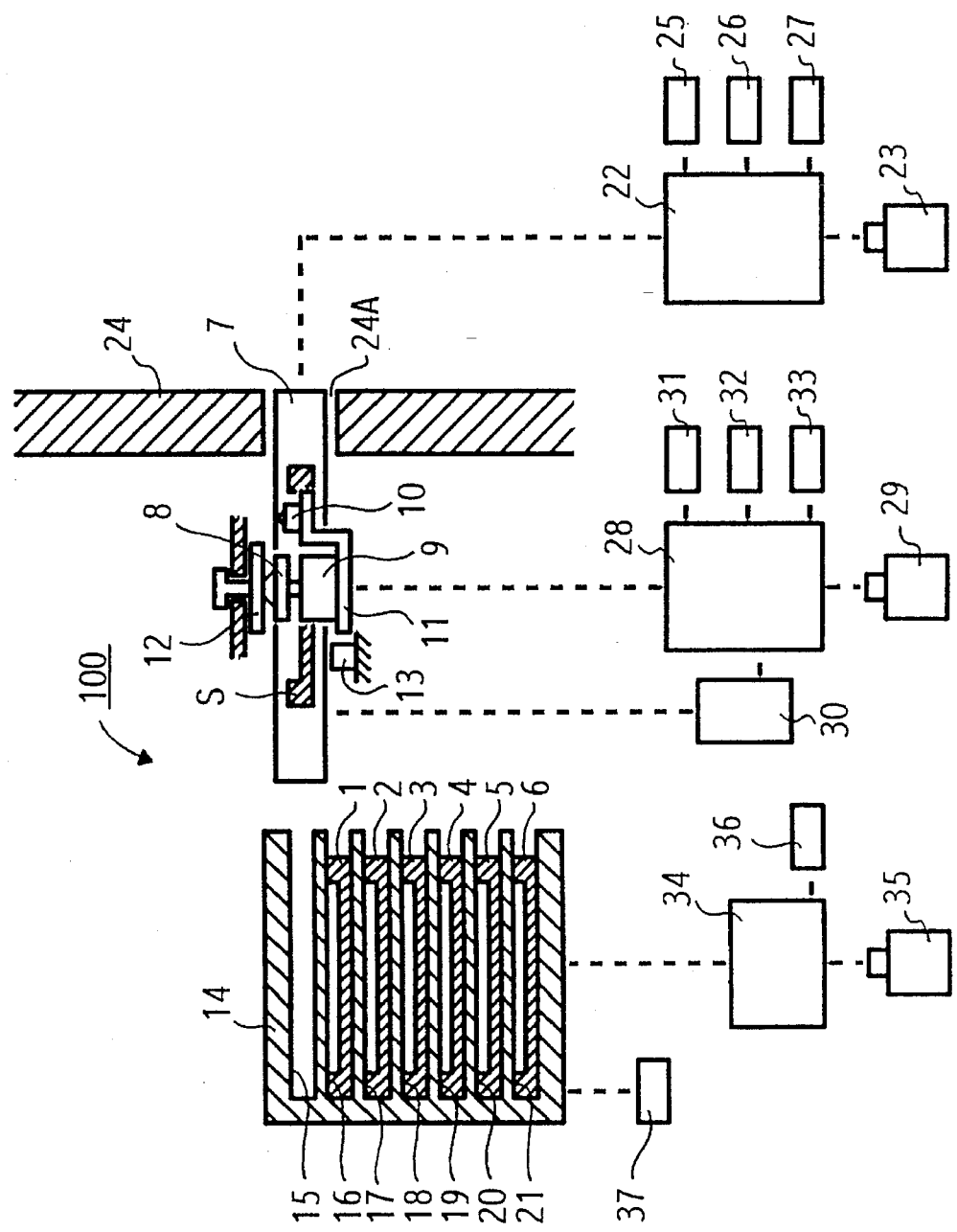
FIG. 1 is a schematic diagram, partly in cross section, of the present invention.

Referring to FIG. 1, a tray 7 of a player 100 holds a single play carriage S. A carriage is insertable in a slot (not shown) on a left side of tray 7. The tray 7 is movable between a store position and a load position for moving carriages between tray 7 and a stocker 14 for storage of discs and carriages in player 100.

A spindle motor 9 with a disc mounting 8 attached and a radially-mobile optical head 10 are located on a optical head base 11 for reading recorded information from a disc. Optical head base 11 is shown in an up position to clamp the disc (not shown) in a play position against a magnet clamp 12.

A disc sensor 13 mounted beneath tray 7 detects the presence of the disc on single play carriage S through apertures (not shown) formed through tray 7 and single play carriage S. Similar apertures are formed in all of the carriages of player 100, including carriages 1 through 6. These carriages are shown stored in stocker 14.

Stocker 14, which performs the function of a conventional magazine, is supported within player 100 on a vertically mobile mount. In the figure, stocker 14 is positioned so that a topmost slot, slot 15 of stocker 14, is aligned with tray 7 so that single play carriage S can be inserted and ejected from a right side of slot 15. Carriages 1 through 6 are inserted in slots 16 through 21 of stocker 14, respectively.

Figure 2A:
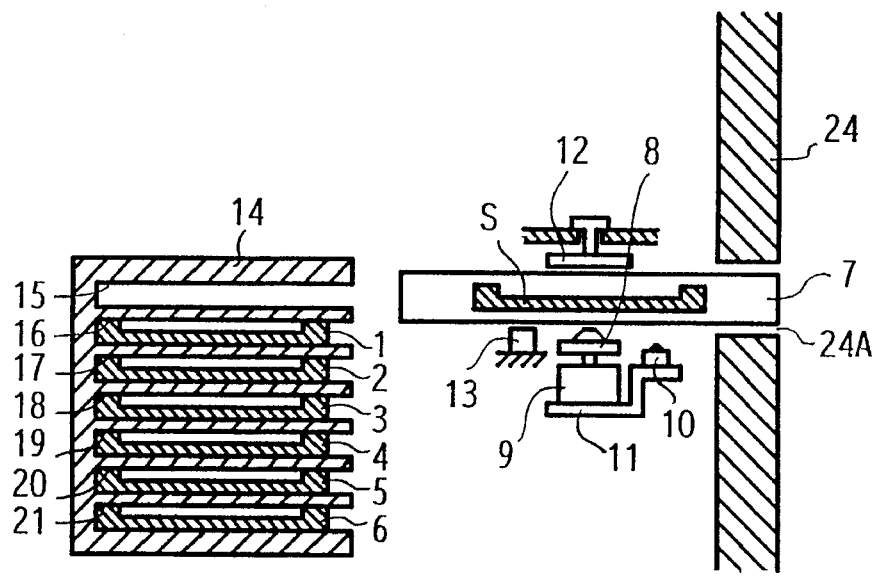
FIGS. 2A through 2C are operational diagrams of the operating positions of a tray and a carriage of FIG. 1.
Figure 2B:
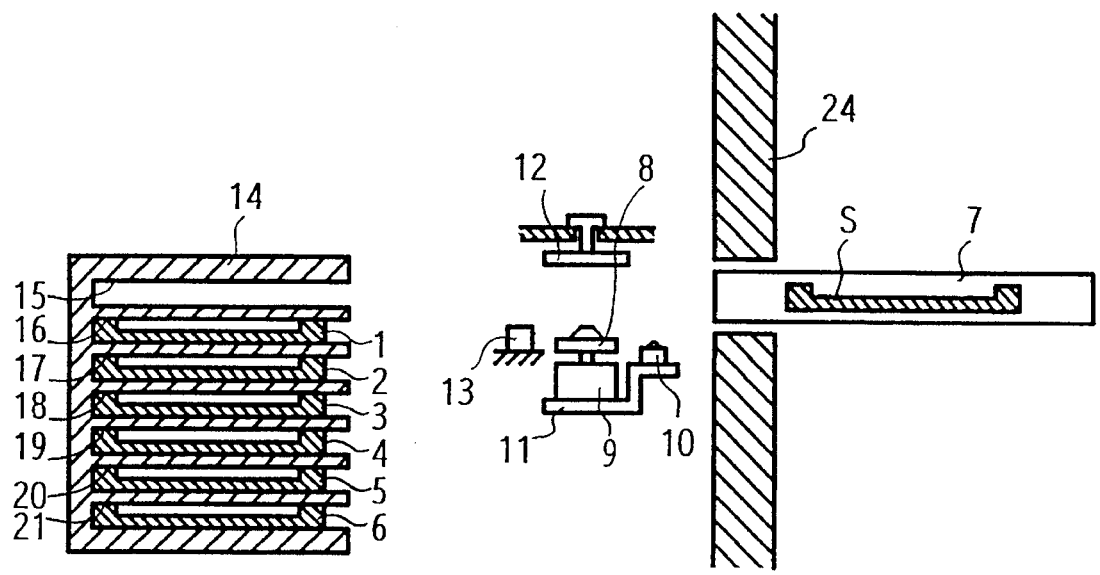

A tray motor 23 drives a tray/carriage driver 22 to transport tray 7 with a carriage (S, or 1 through 6) installed, between one of two operating positions. FIG. 2A shows tray 7 in a load position, where tray 7 is positioned within player 100. In this position, tray 7 is aligned above the components of optical head base 11. FIG. 2B shows tray 7 moved through an opening 24A in a front panel 24 to a position external to player 100. In this position, the disc may be installed or removed from whichever carriage, S or 1 through 6, is in tray 7.

Figure 2C:
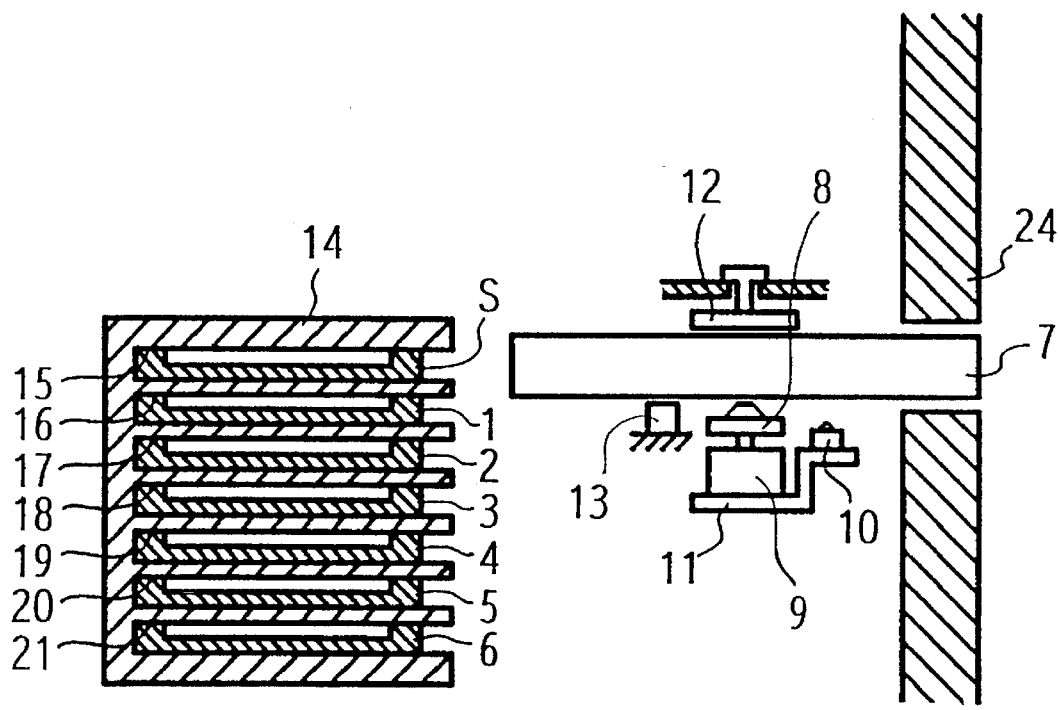

Referring to FIG. 2C, when tray 7 is in the load position, tray/carriage driver 22 can remove the carriage, S or 1 through 6, installed in tray 7 from tray 7, and transport it to its appropriate slot 15 through slot 21 in stocker 14 for storage. In a reverse operation, tray/carriage driver 22 transports a selected carriage to tray 7 for playback of its contained disc or for further transport to the external position for unloading or loading a disc.

Referring again to FIG 1, an eject position detector switch 25 and a store position detector switch 27 detect whether tray 7 is in either the eject or store positions, respectively, by mechanically detecting the operational position of tray/carriage driver 22. A load position detector 26 detects when tray 7 is either in the load position, or is entering a deceleration area (to be described later) approaching the load position. Load position detector 26 determines these conditions by optically detecting the operational position of tray/carriage driver 22.

Figure 3A:
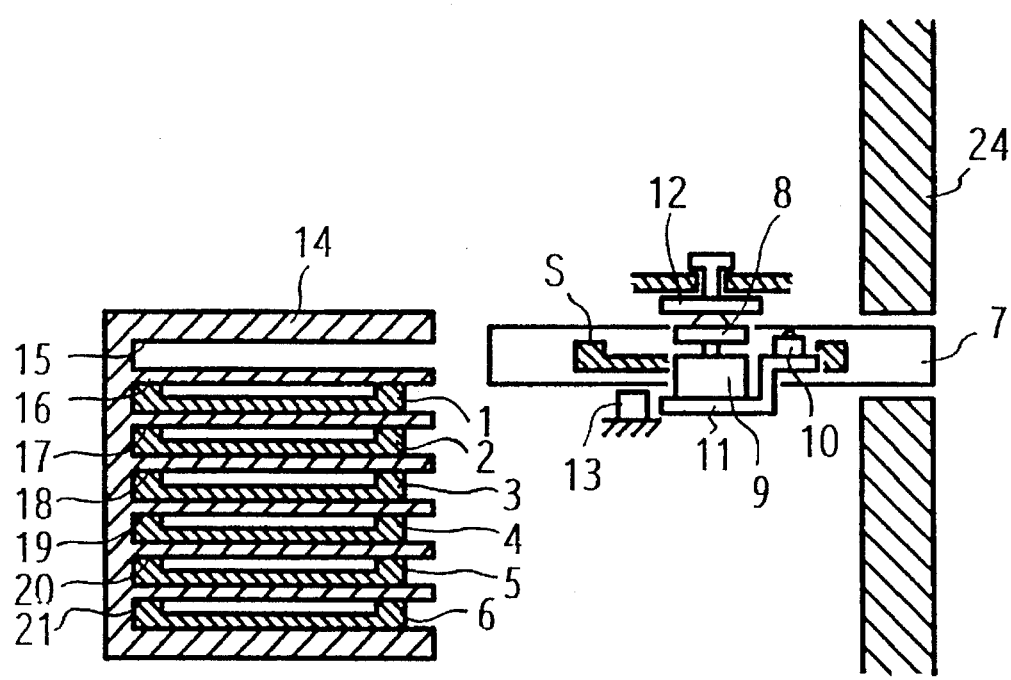
FIGS. 3A and B are operational diagrams of the operating positions of an optical head base of FIG. 1.
Figure 3B:
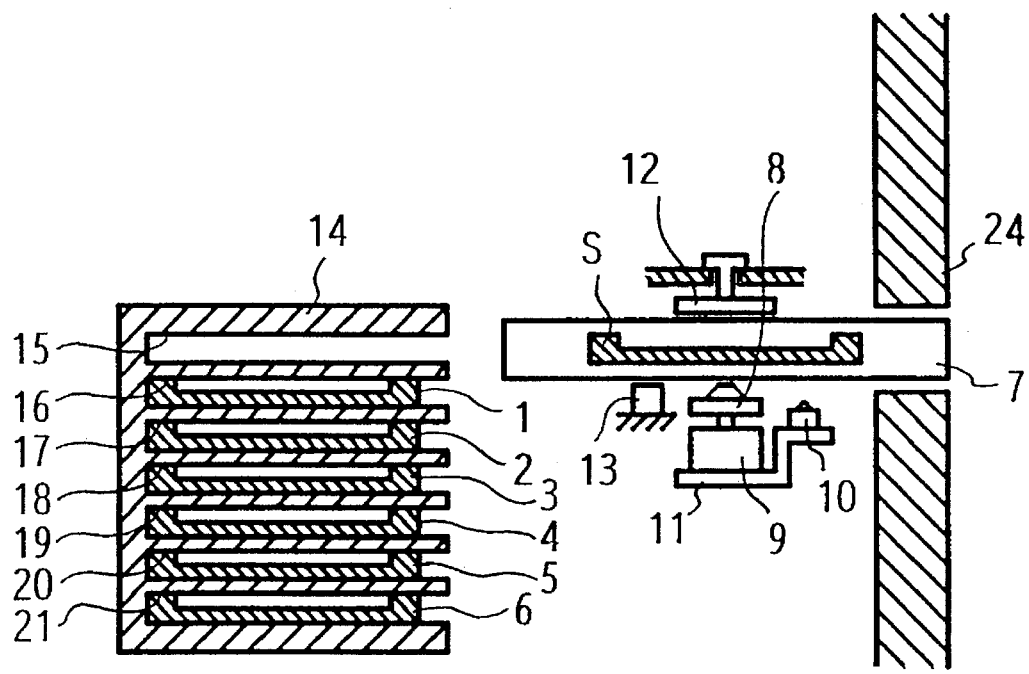

A clamp motor 29 drives an optical head base driver 28 to transport optical head base 11 between two operating positions; an up position (shown in FIG. 3A) for play and a down position (shown in FIG. 3B) for permitting transport of tray 7 as previously described.

When the tray 7 is moved to the load position from the eject position, a tray locking mechanism 30 engages tray 7, locking it in position for disc playback.

Optical head base driver 28 consists of a slide plate (not shown) arranged shiftably with respect to a main chassis (not shown). Optical head base driver 28 transports optical head base 11 between the up and down positions, and disengages the tray locking mechanism 30 while maintaining optical head base 11 in the down position by sliding the slide plate.

An up position detector switch 31, and a down position detector switch 32 mechanically detects the up and down positions, respectively of optical head base 11. A unlock detector switch 33 mechanically detects whether or not tray locking mechanism 30 is engaged. These detectors operate by sensing the position of the slide plate of optical head base driver 28.

Figure 4A:
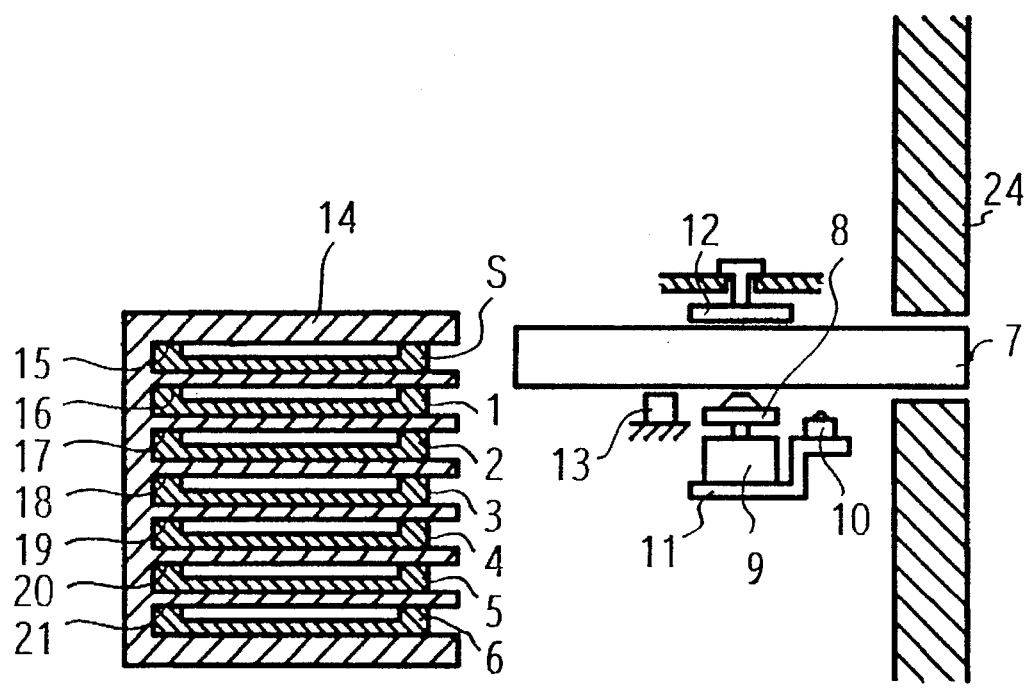
FIGS. 4A through 4G are an operational diagrams of the operating positions of a stocker of FIG. 1.
Figure 4B:
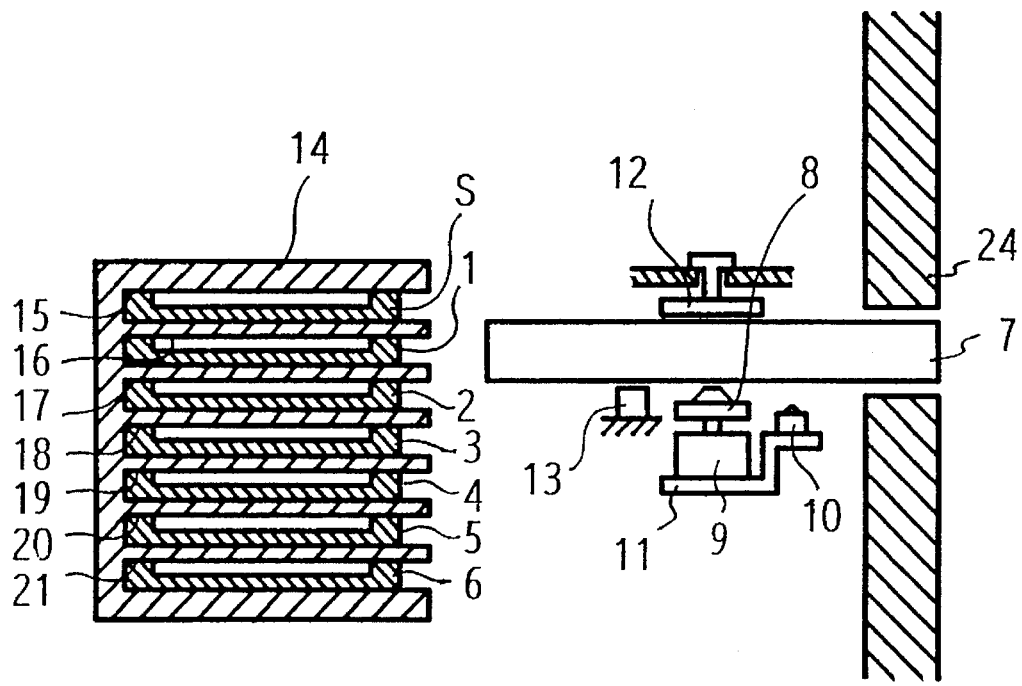
Figure 4C:
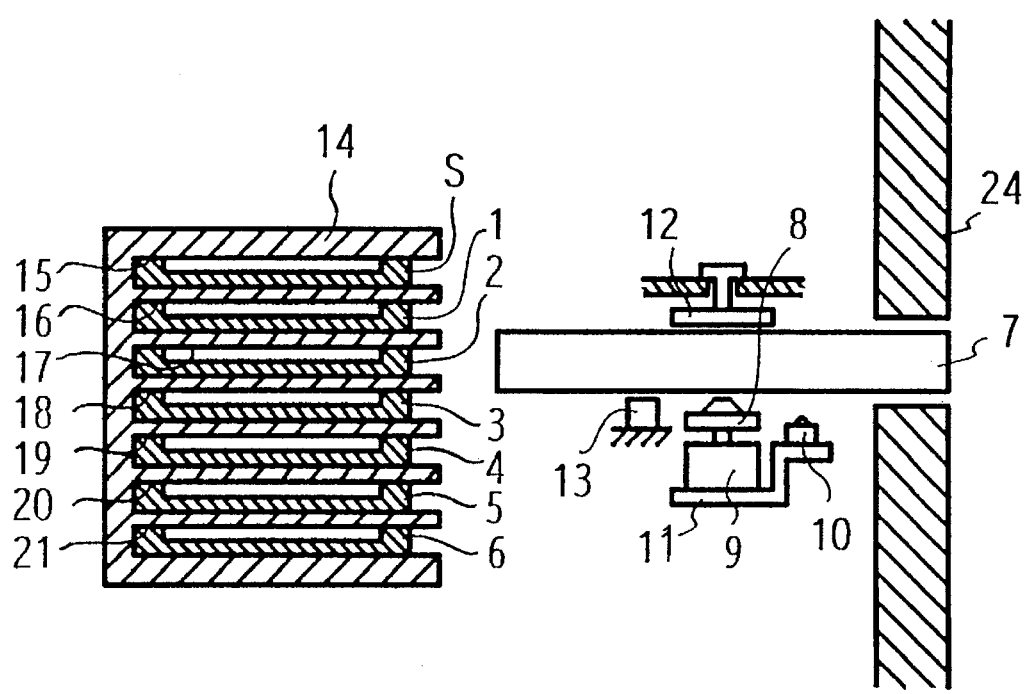
Figure 4D:
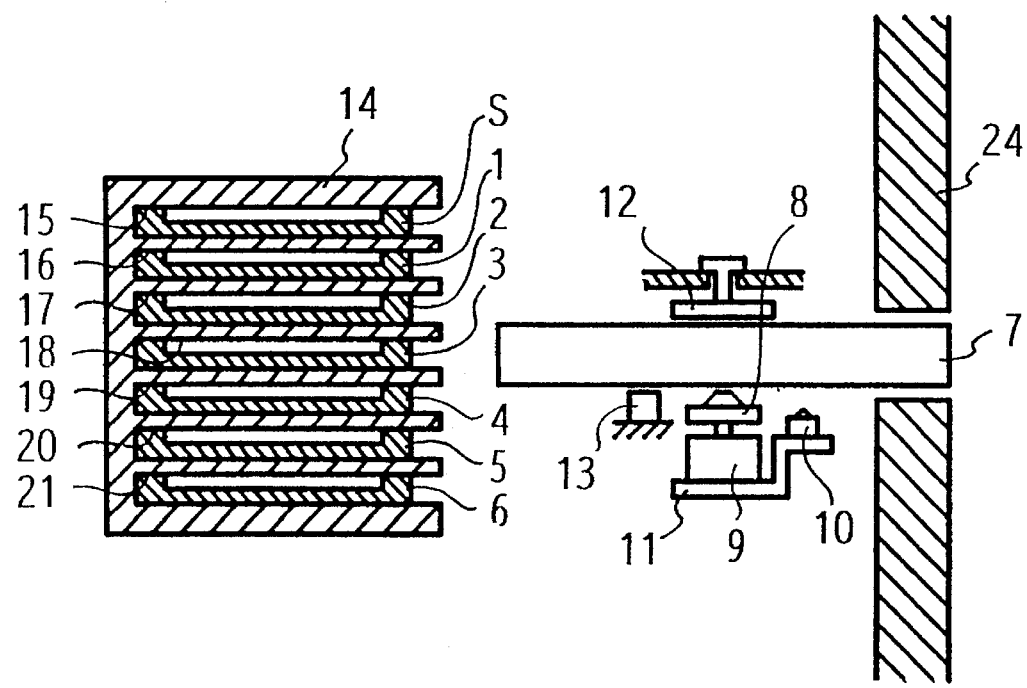
Figure 4E:
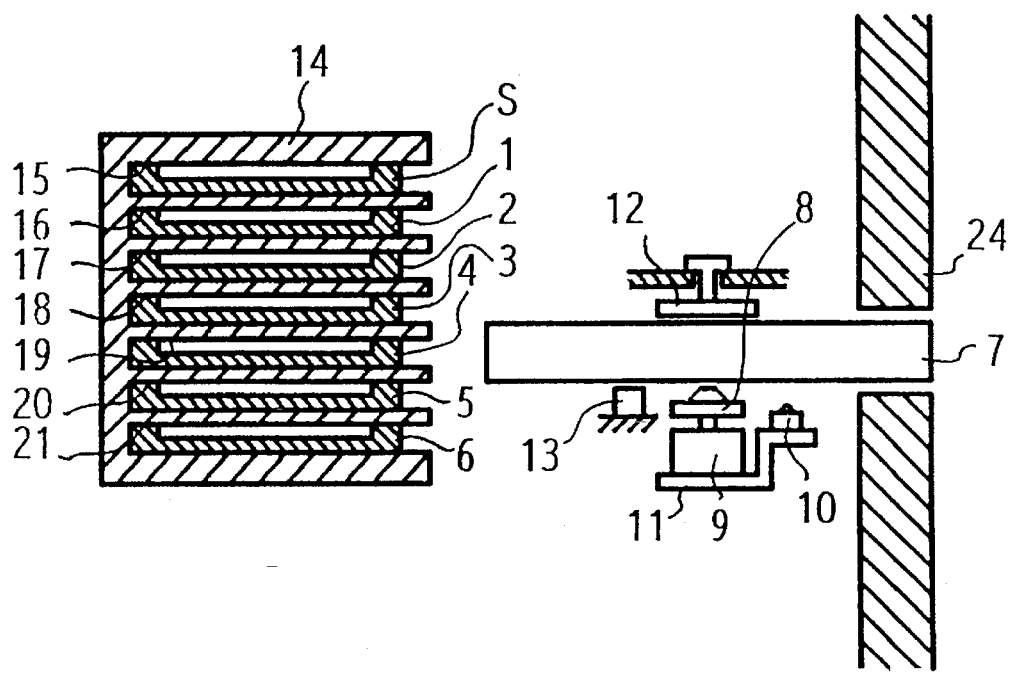
Figure 4F:
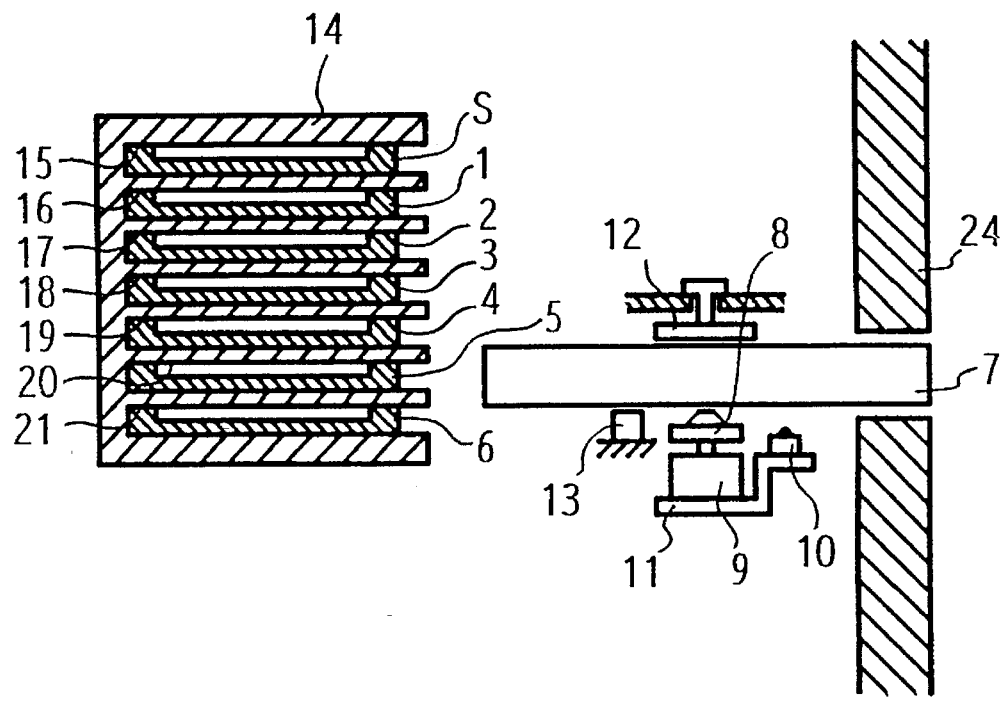
Figure 4G:
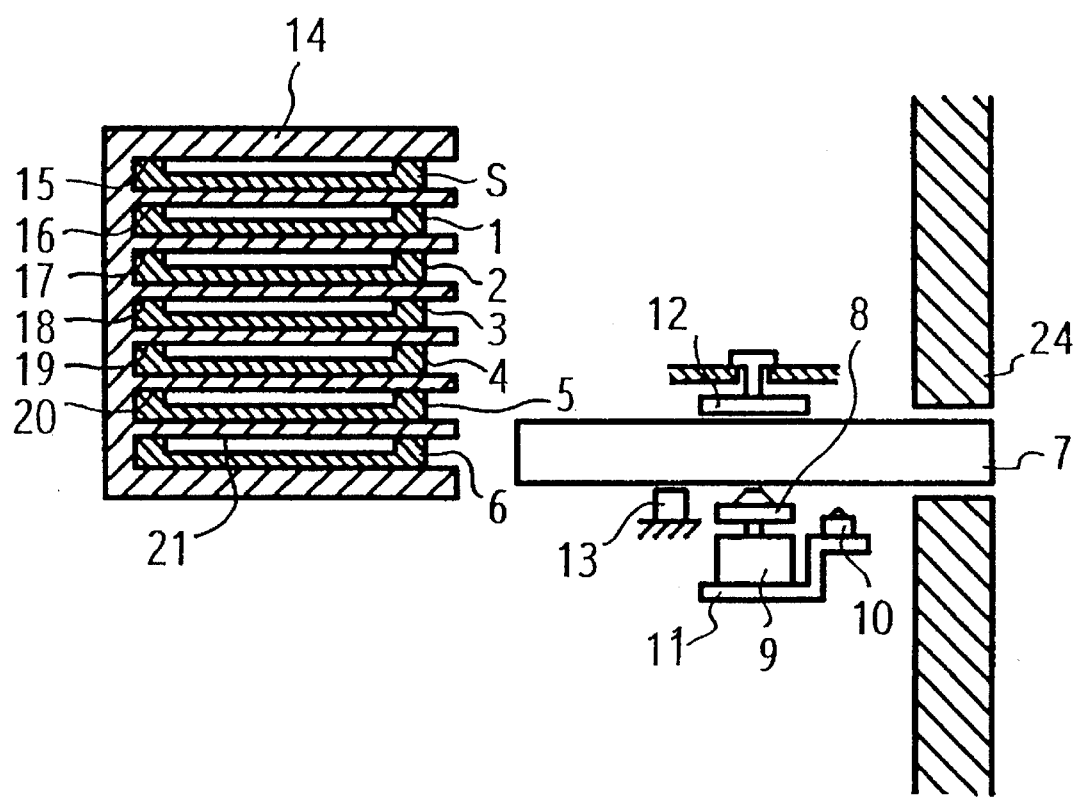

A stocker motor 35 is coupled to a stocker driver 34 to transport stocker 14 through seven positions. These positions are illustrated in FIGS. 4A though 4G. FIG. 4A shows stocker 14 in a position S, where slot 15 is aligned with tray 7. In this position, single play carriage S can be removed from or inserted into its position in stocker 14. FIG. 4B shows a position to which stocker driver 34 transports stocker 14 for the removal and replacement of carriage 1 from stocker 14. FIGS. 4C through 4G show positions of stocker 14 for the removal of carriages 2 through 6, respectively.

A stocker position sensor 36 determines the position of stocker 14 (S or 1 through 6) by optically determining a current position of stocker driver 34. A regular position detector switch 37 detects that stocker 14 is positioned so that a point below a position midway between slot 15 and slot 16 is aligned with tray 7 by contact with a lower surface of stocker 14.

Figure 5:
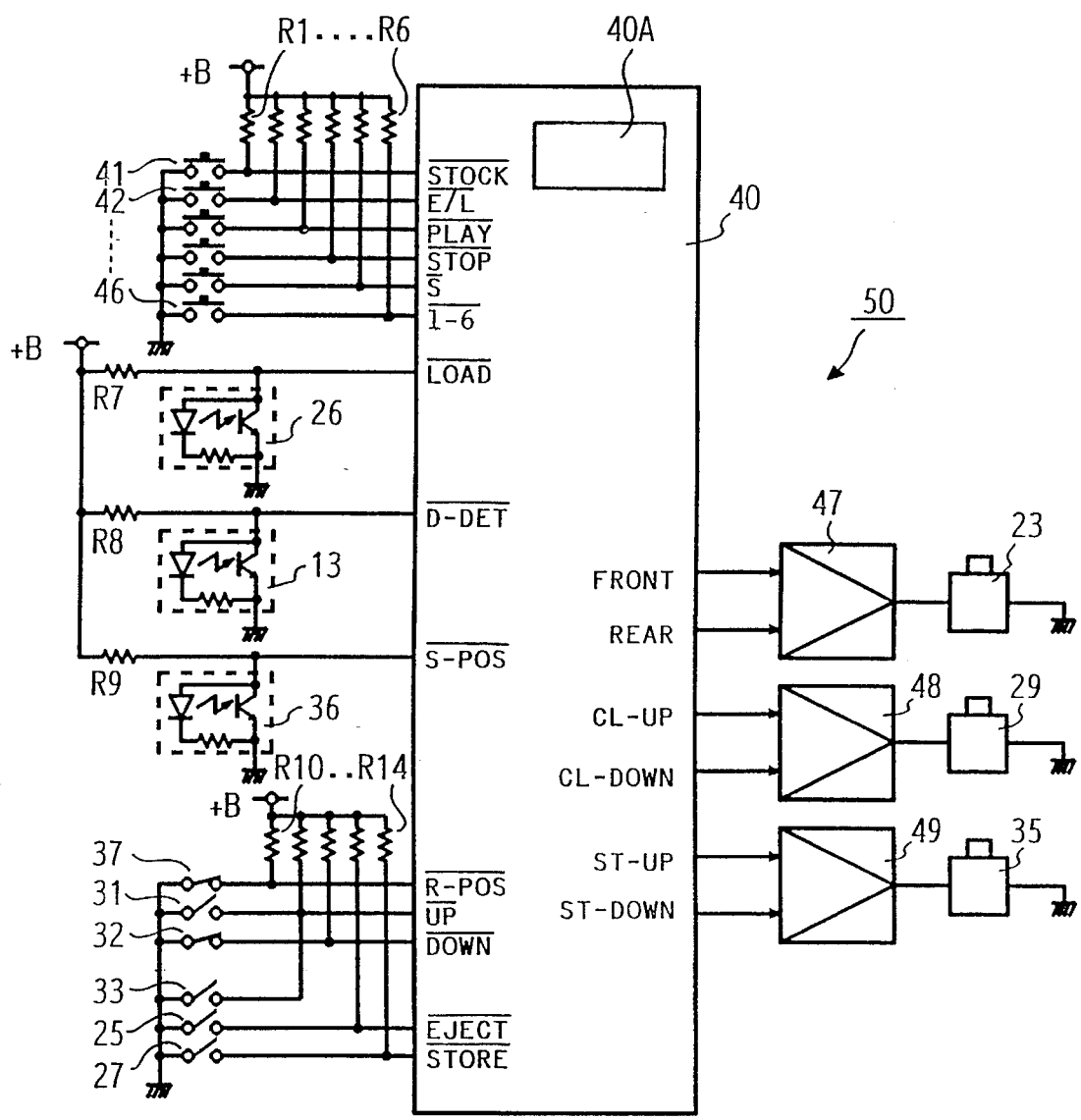
FIG. 5 is a block diagram of the control circuit of the present invention.

Referring to FIG. 5, in a control circuit 50, first ends of a group of mode switches, including a stock switch 41, an eject/load switch 42, a play switch 43, a stop switch 44, a carriage S selection switch 45 and a carriages 1–6 selection switch 46 are grounded.

A second end of stock switch 41 is connected to a junction of a first end of resistor R1 and a $\overline{STOCK}$ input of a microcomputer 40. When pressed, stock switch 41 connects a stock mode signal to microcomputer 40.

A second end of eject/load switch 42 is connected to a junction of a first end of resistor R2 and an $\overline{E/I}$ input of microcomputer 40. When pressed, eject/load switch 42 connects an eject/load mode signal to microcomputer 40.

A second end of play switch 43 is connected to a first end of a resistor R3 and a $\overline{PLAY}$ input of microcomputer 40. When pressed, play switch 43 sends a play mode signal to microcomputer 40.

A second end of stop switch 44 is connected to a junction of a first end of a resistor R4 and a $\overline{STOP}$ input of microcomputer 40. When pressed, stop switch 44 connects a stop mode signal to microcomputer 40.

A second end of carriage S selection switch 45 is connected to a junction of a first end of a resistor R5 and an $\overline{S}$ input of microcomputer 40. When pressed, carriage S selection switch 45 connects a single play carriage S select mode signal to microcomputer 40.

A second end of carriages 1–6 selection switch 46 is connected to a junction of a first end of a resistor R6 and 1–6 input of microcomputer 40. When pressed, carriages 1–6 selection switch 46 sends a carriage 1–6 select mode signal to microcomputer 40.

Second ends of resistors R1 through R6 are connected to B+.

First ends of load position detector 26, disc sensor 13 and stocker position sensor 36 are all grounded. A second end of load position detector 26 is connected to a junction of a first end of a resistor R7 and a $\overline{LOAD}$ input of microcomputer 40. Load position detector 26 connects a signal to microcomputer 40 when tray 7 (FIG. 1) is in the load position or a deceleration area. A second end of disc sensor 13 is connected to a junction of a first end of a resistor R8 and a $\overline{D\text{-}DET}$ input of microcomputer 40. Disc sensor 13 connects a disc present signal to microcomputer 40 when there is a disc in tray 7. A second end of stocker position sensor 36 is connected to a junction of a first end of resistor R9 and $\overline{S\text{-}POS}$ input of microcomputer 40. Stocker position sensor 36 connects a stocker position signal to microcomputer 40. Second ends of resistors R7, R8 and R9 are connected to B+.

First ends of regular position detector switch 37, down position detector switch 32, eject position detector switch 25 and store position detector switch 27 are all grounded. The second ends of these switches are connected to first ends of resistors R10, R12 through 14, respectively. The second ends of resistors R10, R12 through 14 are connected to B+. When closed, regular position detector switch 37 indicates to microcomputer 40 that stocker 14 is in a regular position, where a position midway between slot 15 and slot 16 in the stocker is aligned with tray 7. When closed, down position detector switch 32 indicates to microcomputer 40 that optical head base 11 (FIG. 1) is in the down position. When closed, eject position detector switch 25 indicates to microcomputer 40 that tray 7 is in the eject position. When closed store position detector switch 27 indicates to microcomputer 40 that tray 7 is in the store position.

First ends of up position detector switch 31 and unlock detector switch 33 are both grounded, while both of their second ends are connected to B+ though resistor R11. When closed, up position detector switch 31 indicates to microcomputer 40 that optical head base 11 is in the up position, while unlock detector switch 33 indicates that tray 7 are locked.

Figure 6:
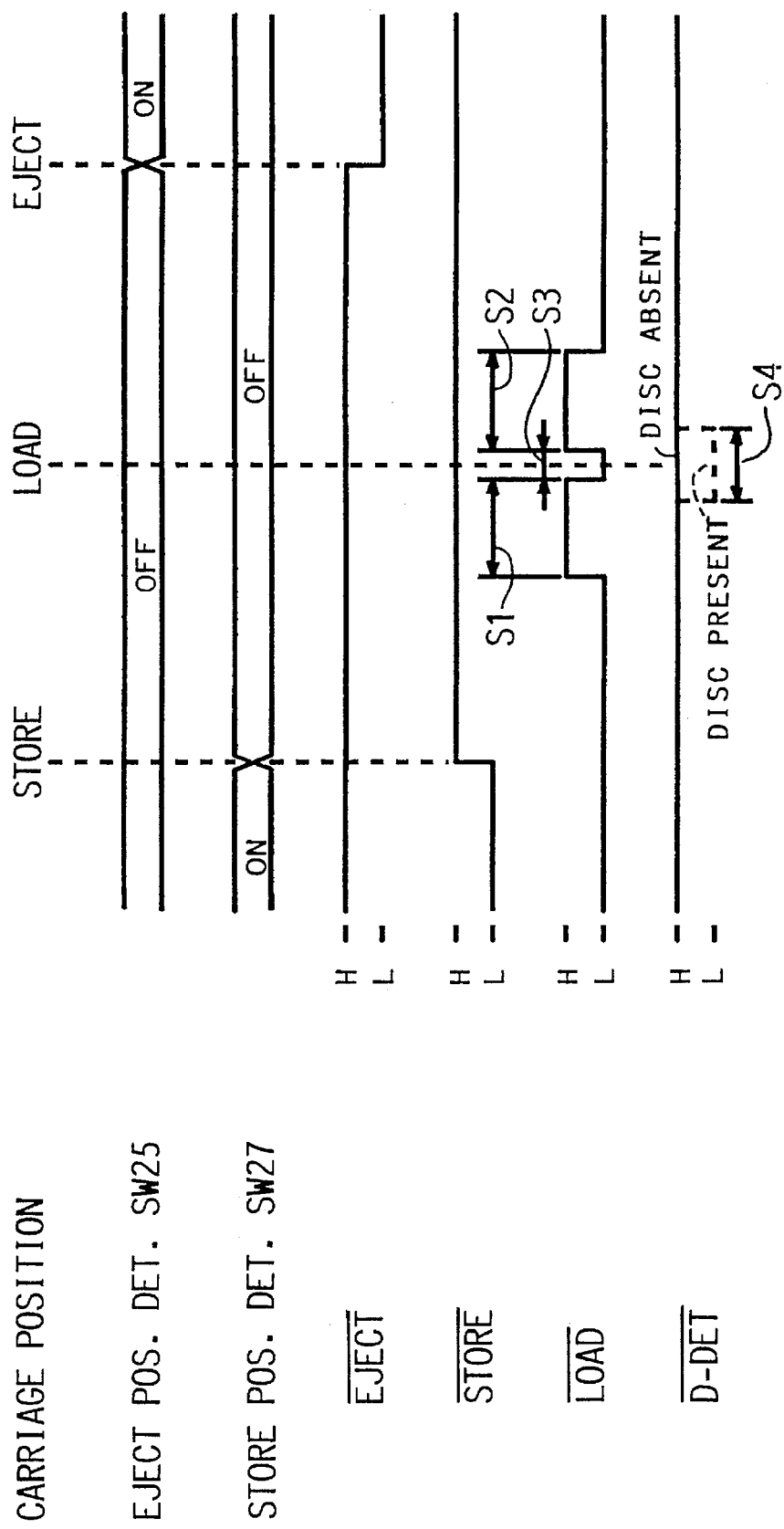
FIG. 6 is a timing chart showing the relationship between detector switch and a detector signal for the movement of a carriage.

Referring to FIGS. 5 and 6, when tray 7 is in the eject position, the $\overline{\text{EJECT}}$ signal goes from H to L. This is because eject position detector switch 25 closes, connecting the $\overline{\text{EJECT}}$ input of microcomputer 40 to ground. When tray 7 is in the store position, the $\overline{\text{STORE}}$ signal goes from H to L, because store position detector switch 27 closes, connecting the STORE input of microcomputer 40 to ground. When tray 7 enters a deceleration area approaching the load position, the $\overline{\text{LOAD}}$ signal goes from L to H because of the operation of load position detector 26. The deceleration areas are shown as S1 and S2 on FIG. 6. When tray 7 is in the load position, S3 on the figure, load position detector 26 returns the $\overline{\text{LOAD}}$ signal to L.

With tray 7 in the load position, disc sensor 13 can detect the presence of a disc in the carriage in tray 7 when tray 7 is in area S4 on the figure. Area S4 extends somewhat into the deceleration areas on both sides of the load position. When a disc is present, a $\overline{\text{D-DET}}$ signal goes from H to L as a result of the action of disc sensor 13.

Figure 7:
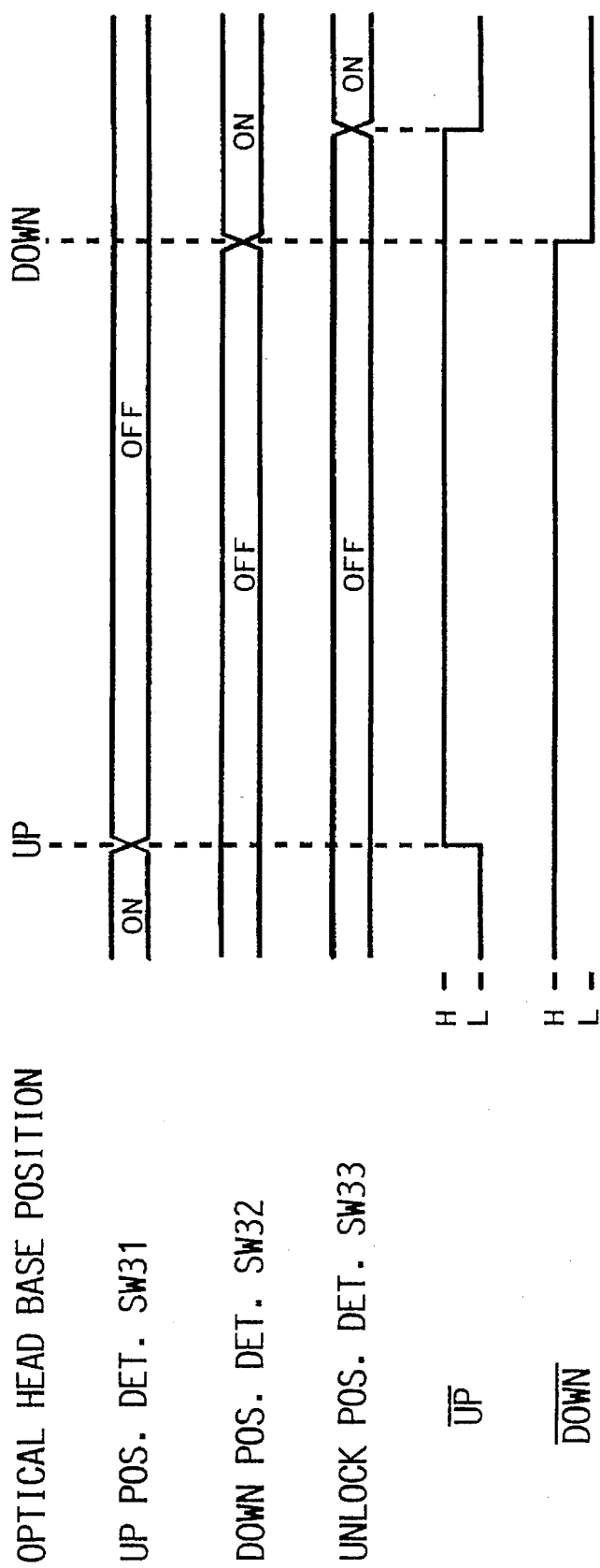
FIG. 7 is a timing chart showing the relationship between a detector switch and a detector signal for the movement of an optical head base.

Referring to FIGS. 5 and 7, when optical head base 11 is in the up position, the $\overline{\text{UP}}$ signal goes from H to L, because up position detector switch 31 closes, connecting the $\overline{\text{UP}}$ input of microcomputer 40 to ground. The $\overline{\text{UP}}$ signal also goes from H to L when tray locking mechanism 30 is disengaged, because unlock detector switch 33 closes connecting the $\overline{\text{UP}}$ input of microcomputer 40 to ground. When optical head base 11 is in the down position, the $\overline{\text{DOWN}}$ signal goes from H to L because down position detector switch 32 closes, connecting the $\overline{\text{DOWN}}$ input of microcomputer 40 to ground.

Figure 8:
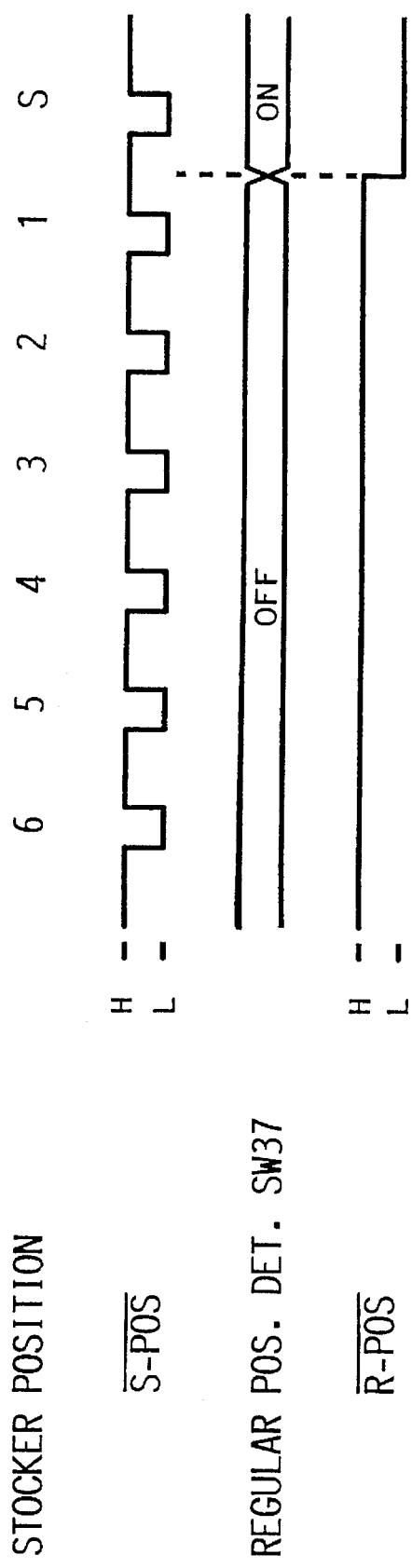
FIG. 8 is a timing chart showing the relationship between a detector switch and a detector signal for the movement of a stocker.

Referring to FIGS. 5 and 8, the stocker position signal $\overline{\text{S-POS}}$ goes from H to L whenever stocker 14 is in a position where a slot, 15 through 21, position S, 1–6 is aligned with tray 7. This is the result of the action of stocker position sensor 36, as it senses the presence of an aligned slot. When stocker 14 is positioned so that an area halfway between position S and position 1 is aligned with tray 7.

Microcomputer 40 responds to the detector inputs and command switches described above in accordance with programmed routines shown in the flow charts of FIGS. 9 through 21 and described later.

As illustrated in FIG. 5, microcomputer 40 outputs the following signals as required: a front signal, FRONT, and a rear signal, REAR, to a tray motor drive circuit 47 for driving tray motor 23; a clamp up signal, CL-UP, and a clamp down signal, CL-DOWN, to a clamp motor drive circuit 48 for driving clamp motor 29; and a stocker up signal, ST-UP, and a stocker down signal, ST-DOWN, to a stocker motor drive circuit 49 for driving stocker motor 35.

When the FRONT signal goes to H, tray motor drive circuit 47 delivers a voltage for driving tray motor 23 in a direction to move tray 7 to the eject position. When the front signal REAR goes to H, tray motor drive circuit 47 drives tray motor 23 in a direction to move tray 7 to the load position.

When the CL-UP signal goes to H, clamp motor drive circuit 48 delivers a voltage for driving clamp motor 29 in a direction to move optical head base 11 to the up position. When the CL-DOWN signal goes to H, clamp motor drive circuit 48 delivers a voltage for driving clamp motor 29 in a direction to move optical head base 11 to the down position.

When the ST-UP signal goes to H, stocker motor drive circuit 49 delivers a voltage for driving stocker motor 35 in a direction to move stocker 14 toward position S. When the ST-DOWN signal goes to H, stocker motor drive circuit 49 delivers a voltage for driving stocker motor 35 in a direction to move stocker 14 toward position 6.

FLOW CHARTS

The following paragraphs describe the program routines of player 100 with reference to individual figures that illustrate the various routines and subroutines of the program. To be fully understood, these descriptions must also be read with reference to FIGS. 1 through 6.

In the discussion of the flow charts that follows, D(0) through D(6) represent discs residing in carriages S and 1 through 6, respectively. (For example, D(3)=1 represents the presence of a disc in carriage 3).

A lower case m represents carriage S and 1 through 6 presently being used and the present position of the stocker. (For example, m=0 indicates that carriage S is in use and that stocker 14 is at position S, m=1 indicates that carriage 1 is in use and that stocker 14 is at position 1 and m=6 indicates that carriage 6 is in use and stocker 14 is at position 6.

A memory device (not illustrated) for storing the current status of D(0) through D(6) and m is backed up by a lithium battery to prevent the stored information from being destroyed when the power source of player 100 is turned off.

OPERATION IN THE STOP MODE

Referring to FIGS. 1, 5, and 9A through 9D, when the power source of player is turned on, player 100 performs routine steps S1 through S5 to detect an eject/load signal $\overline{\text{E/I}}$ a play mode signal $\overline{\text{PLAY}}$ a carriage S selection signal S or a carriages 1–6 selection signal 1–6.

When stock switch 41 is manipulated, the $\overline{\text{STOCK}}$ goes from H to L and step S1 becomes YES, an n becomes 1 in a step S6, and disc numbers D(1) through D(6) are searched sequentially to determine the presence of discs in carriages 1 through 6. If any carriage is empty, step S7 becomes YES and optical head base 11 is moved from the up position to the down position in a subroutine L1.

Figure 10:
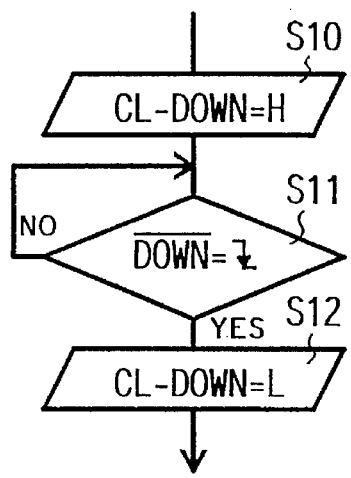

Referring to FIG. 1, 5, and 10, when subroutine L1 is initiated, CL-DOWN signal goes from L to H and optical head base 11 is lowered in a step S10. When optical head base 11 reaches the down position, a not $\overline{\text{DOWN}}$ signal goes to L causing step S11 to be YES. The CL-DOWN signal goes from H to L in step S12, and optical head base 11 is stopped in the down position.

Figure 9A:
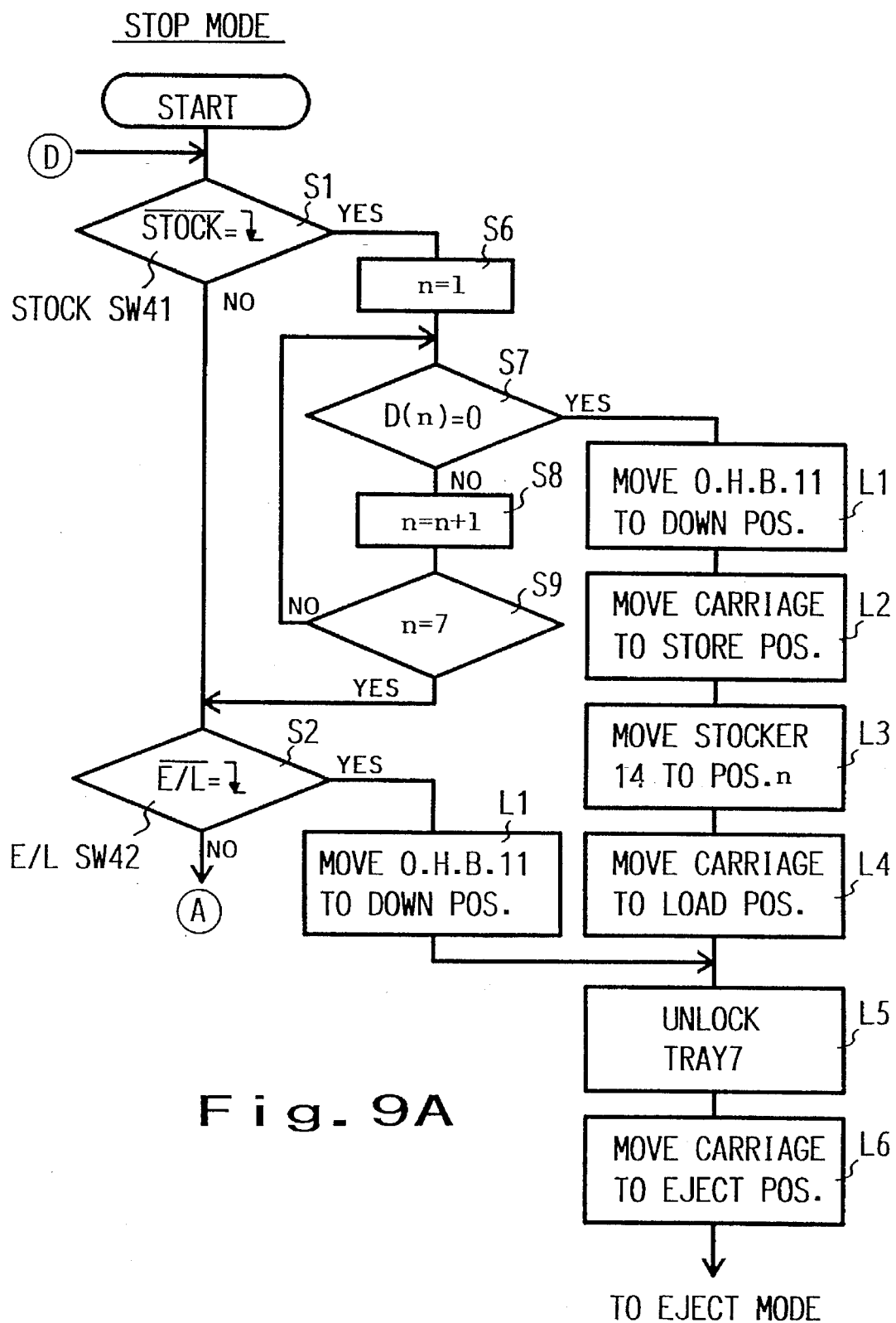
FIGS. 9A through 21D are flow charts of the programs performed by a microcomputer.

Referring to FIG. 9A, at the completion of subroutine L1 an optical head base 11 down position is sensed. A subroutine L2 is initiated at that time to move carriage S or 1 through 6 that may be in the load position in tray 7 to its respective store position in stocker 14.

Figure 11:
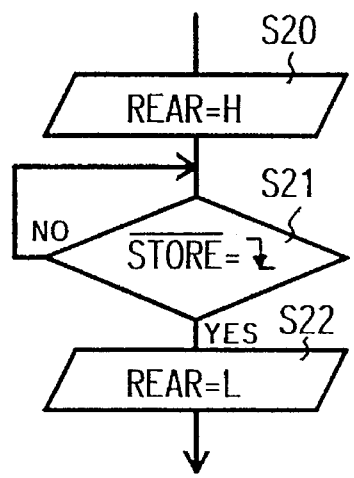

Referring to FIGS. 1, 5 and 11, when subroutine L2 is initiated, a REAR signal goes to H and the carriage in tray 7 moves to its store position in a step S20. When the carriage reaches its store position, the $\overline{\text{STORE}}$ signal goes to L and a step S21 becomes YES. The REAR signal goes from H to L, stopping the carriage in a step S22.

Referring again to FIG. 9A, when subroutine L2 is completed, a subroutine L3 moves stocker 14 to a carriage storage position n selected in step S6 or S8 (the storage position of the first empty carriage detected).

Figure 12:
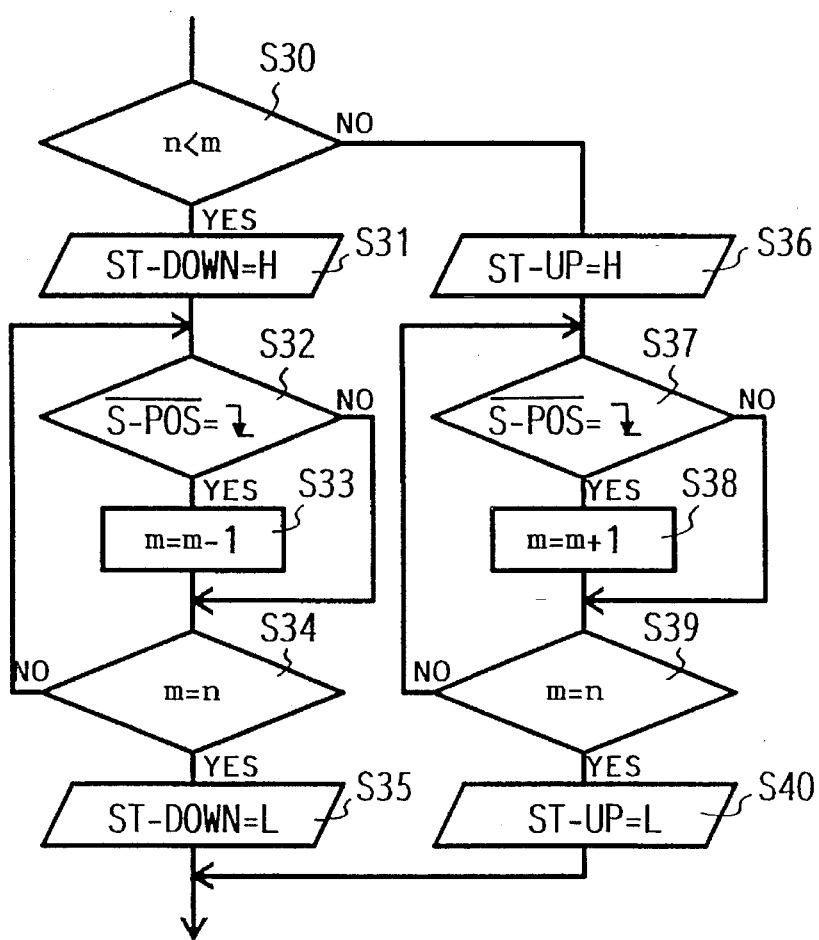

Referring to FIGS. 1, 5, and 12, when subroutine L3 is initiated, if the storage position in stocker 14 of the empty carriage to be loaded is a lower number n than its present position number m, a step S30 becomes YES. The ST-DOWN signal goes from L to H in a step S31 and stocker 14 is lowered. The number m is decreased by 1 every time the loop of steps S32 through S34 detect that the $\overline{\text{S-POS}}$ is turned off. (The $\overline{\text{S-POS}}$ signal appears whenever a stocker storage position is aligned with tray 7.) When it is detected that m equals n (stocker 14 is at destination position n), a step S34 becomes YES, and the ST-DOWN goes from H to L in a step S35 and stocker 14 stops.

If stocker 14 storage position number n of the carriage to be loaded is greater than present position m, step S30 becomes NO, and the ST-UP signal goes from L to H and stocker 14 is raised in a step S36. The value of m is increased by 1 each time the loop of steps S37 through S39 detects that $\overline{\text{S-POS}}$ is turned off. When m equals n, a step S39 becomes YES, and the ST-UP signal goes from H to L in a step S40, stopping stocker 14.

Referring again to FIG. 9A, when subroutine L3 is complete, the empty carriage is moved from its store position inside stocker 14 in a subroutine L4.

Figure 13:
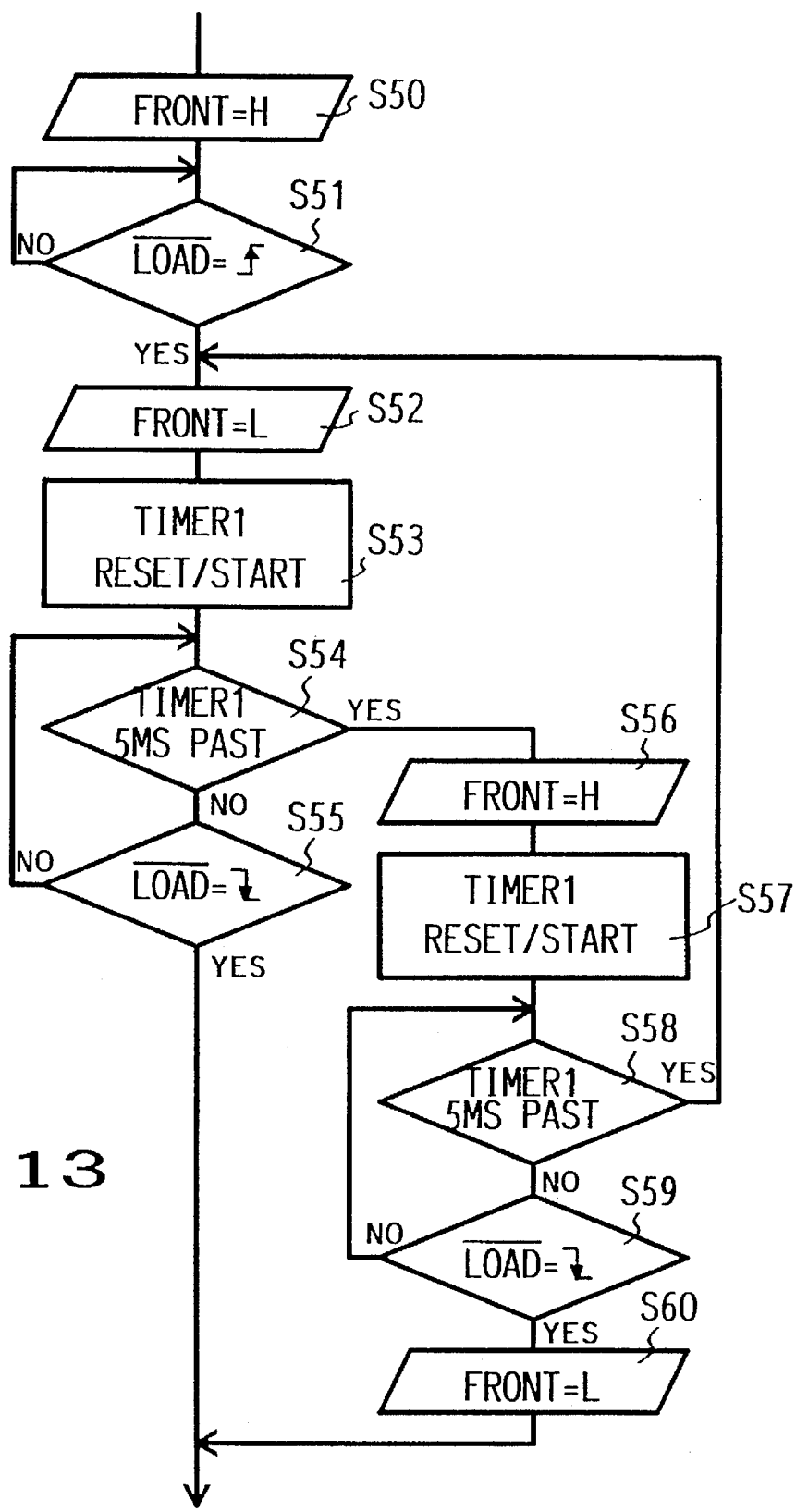
Figure 22A:
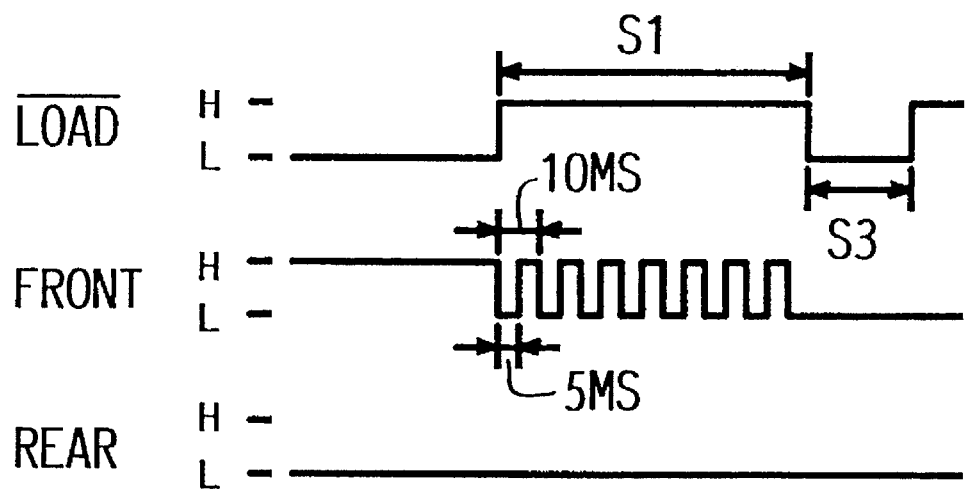
FIGS. 22A and 22B are timing charts of the relationship between a front signal FRONT, a rear signal REAR and a load position detector signal LOAD.

Referring to FIGS. 1, 5, and 13 when subroutine L4 is initiated, the FRONT signal goes from L to H and a carriage is moved toward the load position in a step S50. When the carriage enters the deceleration area (S1 of FIG. 6) $\overline{\text{LOAD}}$ signal goes from L to H causing a step 51 to become YES. The motion of the carriage is slowed as steps S52 through S54 change the FRONT signal to a 10 ms-period 50%-duty cycle pulse output (FIG. 22A). When the carriage enters the load position (S3 on FIG. 6) the LOAD signal goes to L. This is detected and the carriage is stopped smoothly at the load position in steps S52 through S60.

Referring to FIGS. 1 and 9A, when subroutine L4 is completed, tray locking mechanism 30 is disengaged by optical head base driver 28 in a subroutine L5.

Figure 14:
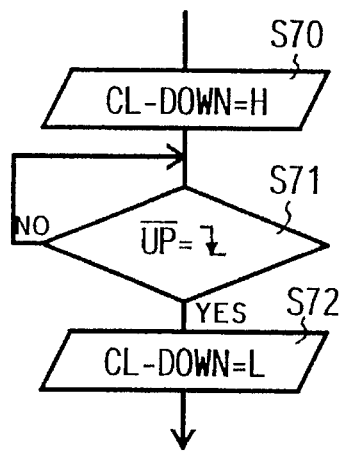

Referring to FIGS. 1, 5 and 14, when subroutine L5 is initiated, the CL-DOWN goes from L to H and in a step S70, optical head base driver 28 lowers optical head base 11. Step 71 detects when optical head base 11 reaches down position and the $\overline{\text{UP}}$ signal goes to L. Tray locking mechanism 30 is unlocked and unlock detector switch 33 is closed. Step S71 becomes YES, and the CL-DOWN signal goes to L in step S72 and optical head base driver 28 is stopped.

Referring to FIGS. 1 and 9A, when subroutine L5 is completed, tray 7, wherein the carriage is inserted, is moved to the eject position in a subroutine L6.

Figure 15:
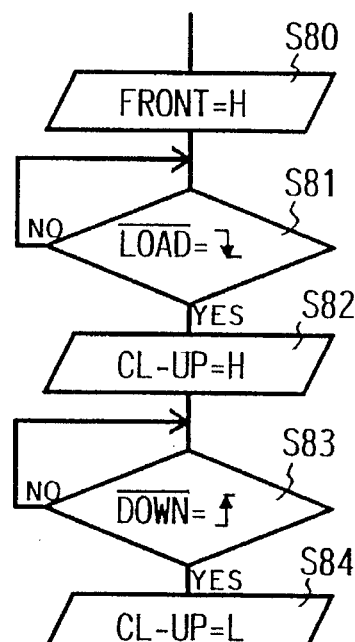

Referring to FIGS. 1, 5 and 15, when subroutine L6 is initiated, the FRONT signal goes from L to H in a step S80 and tray 7 moves to the eject position (shown in FIG. 2B). As tray 7 moves past the deceleration area (S2 on FIG. 6) step S81 becomes YES when the $\overline{\text{LOAD}}$ signal goes from H to L. The CL-UP signal goes to H and optical head base driver 28 is driven in a direction necessary to raise optical head base 11 in a step S82. The turning on of the $\overline{\text{DOWN}}$ signal is then detected in the loop of a step S83.

When down position detector switch 32 is opened and optical head base driver 28 is returned to the position where tray locking mechanism 30 can be engaged again, step S83 becomes YES, and the CL-UP signal goes from H to L stopping optical head base driver 28 in a step S84 and the $\overline{\text{EJECT}}$ signal goes from H to L in a step S85. When tray 7 is in the eject position (step S86), the FRONT signal goes from H to L tray 7 is stopped.

Referring to again to FIG. 9A, when subroutine L6 is completed, the program proceeds to an eject mode, to be described later.

If discs are found in all of carriages 1 through 6, in the loop of steps S7 through S9 during the search for empty carriages, step S9 becomes YES, the manipulation of a stock switch 41 is ignored and the program proceeds to a step S2.

If eject/load switch 42 is operated, step S2 becomes YES and optical head base 11 is moved from the up position to the down position using subroutine L1 (FIG. 10). Tray locking mechanism 30 is unlocked by optical head base driver 28 using subroutine L5 (FIG. 14), then tray 7 is moved to the eject position using subroutine L6. The program then proceeds to the eject mode, to be described later.

Figure 9B:
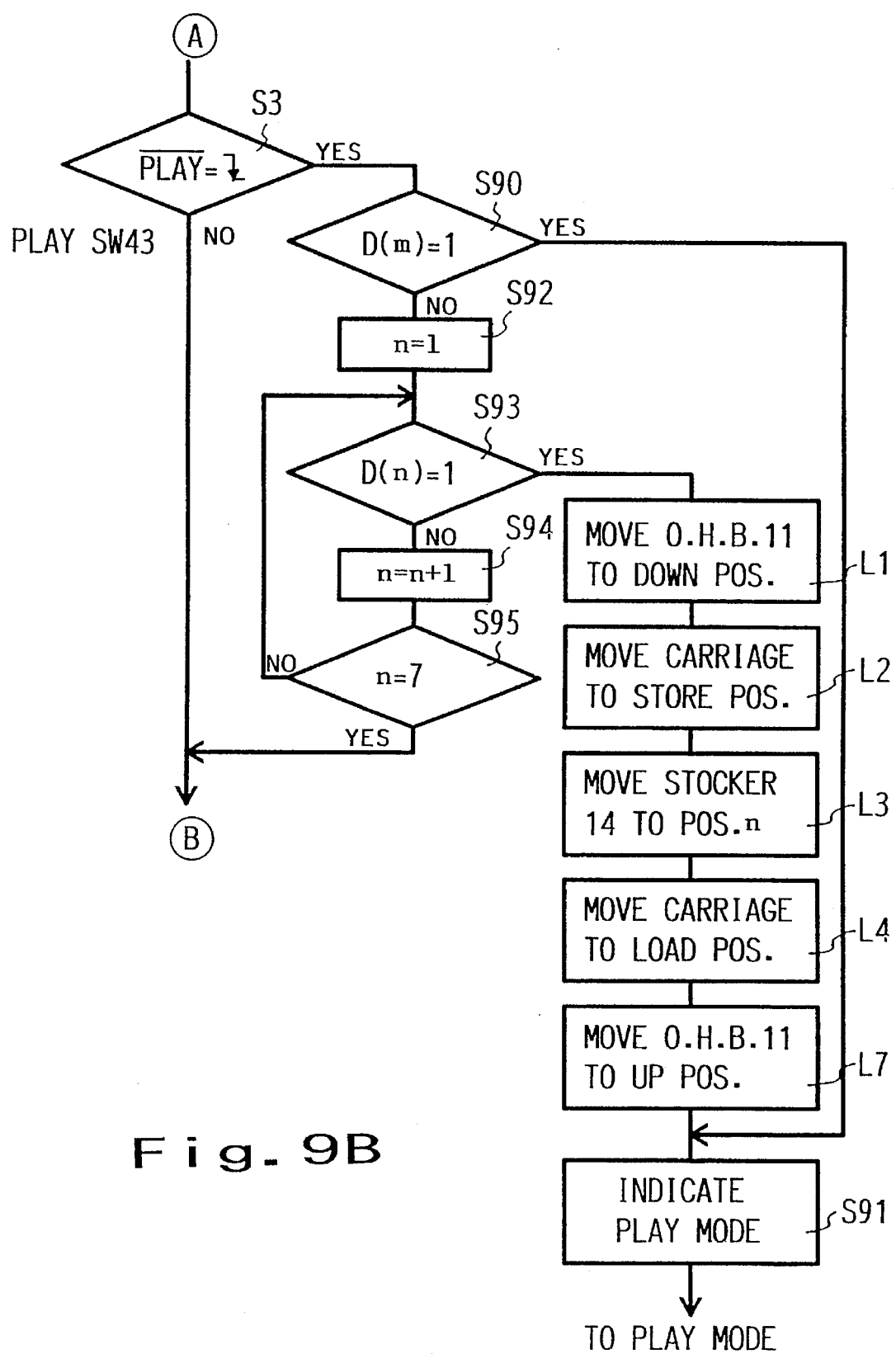

Referring to FIGS. 1, 5, and 9B, when as play switch 43 is operated, step S3 becomes YES. If it is determined in a step 90 that there is a disc in the carriage in the load position that corresponds to a disc number selected for play, D(m), step S91 initiates a play mode. The program proceeds as shown in the flow chart of the play mode (FIG. 21) described later.

If step S90 becomes NO, n is initially set to 1, in a step S92 and disc numbers D(1) through D(6) are checked in sequence by the loop of steps S93 through S95. When the number of the disc presently in the load position is determined, step S93 becomes YES. Subroutines L1 through L4 (previously described with reference to FIGS. 10 through 13) are performed in sequence to move optical head base 11 to the down position, move the carriage in tray 7 to its store position in stocker 14 and move carriage n, with the desired disc, to the load position. At the completion of subroutine L4, a subroutine L7 is initiated to move optical head base 11 to the up position for disc playback.

Figure 16:
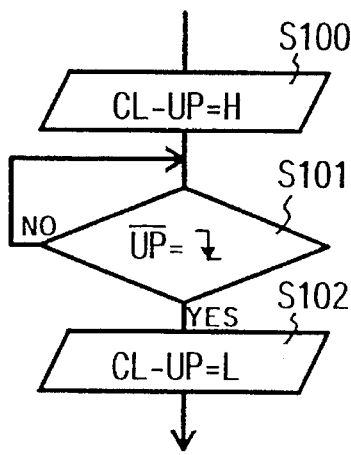

Referring to FIG. 16, when subroutine L7 is initiated, the CL-UP signal goes from L to H in a step 100, driving optical head base 11 to the up position. When optical head base 11 reaches the up position, a $\overline{\text{UP}}$ signal goes to L in a step S101 (YES) causing the CL-UP signal to go from H to L in step S102, stopping optical head base 11 in the up position.

Referring again to FIG. 9B, when subroutine L7 is completed, step S91 initiates a play mode and the program proceeds with the play mode (FIG. 21) described later.

If during the performance of the loop of program steps S93 through S95 no discs are found in carriages 1 through 6, step S95 becomes YES. The manipulation of play switch 43 is ignored and the program proceeds to a step S4.

Figure 9C:
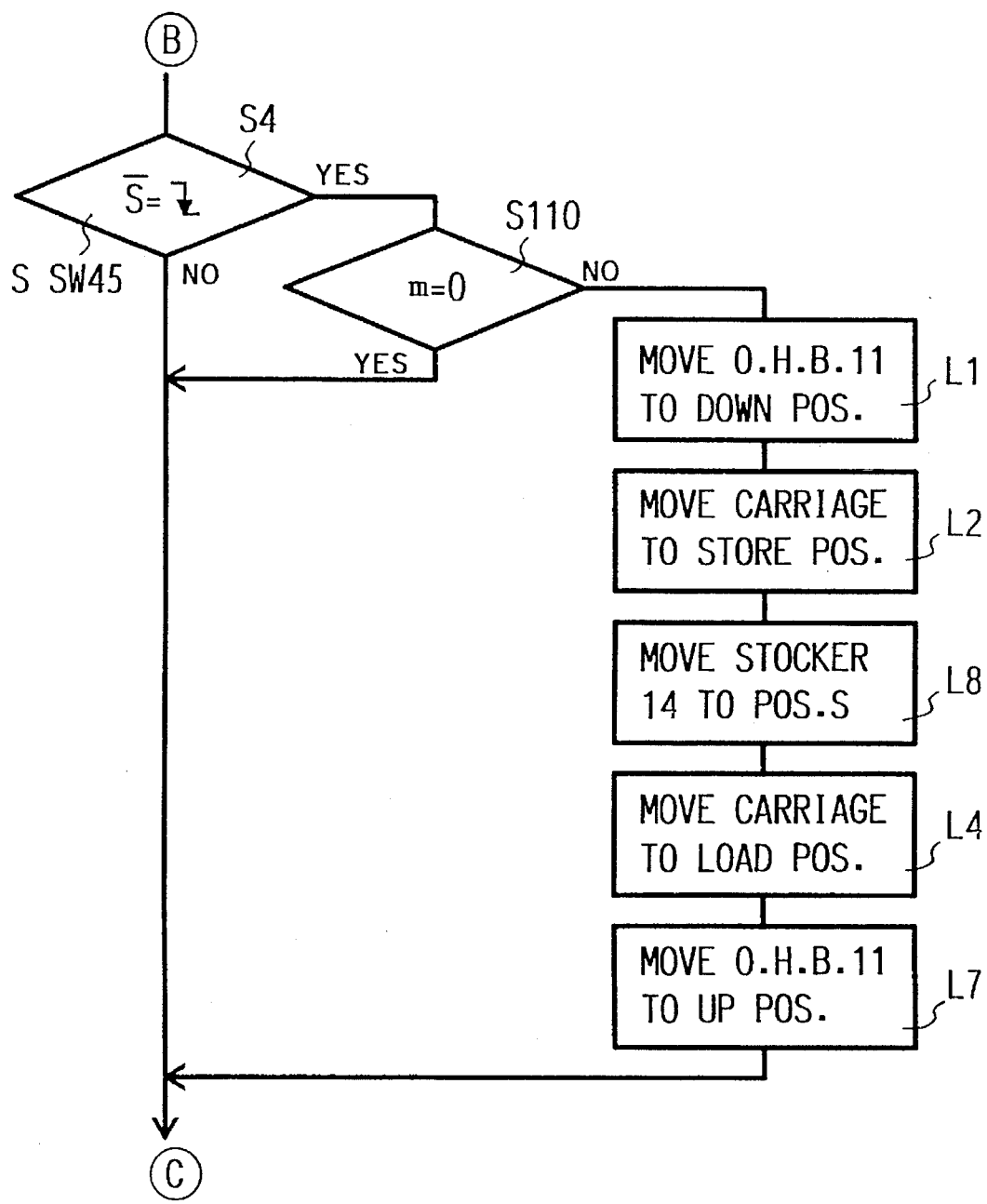

Referring now to FIGS. 1, 5, and 9C when carriage S selection switch 45 is operated, a step S4 becomes YES and a step S110 determines if the carriage currently in the load position is single play carriage S. If yes, the manipulation of carriage S selection switch 45 is practically ignored because there is no need to replace carriages. The program proceeds to a step S5.

If step S110 is NO, subroutines L1 and L2 (previously described with reference to FIGS. 10 and 11) are performed in sequence to lower optical head base 11 to the down position and move the carriage currently in the load position to its store position is stocker 14. At the completion of subroutine L2, subroutine L8 is initiated to move single play carriage S to the load position.

Figure 17:
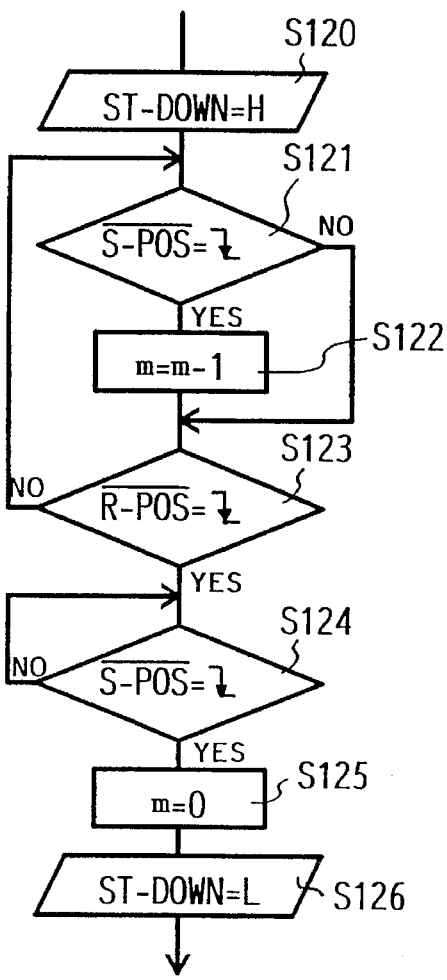

Referring to FIG. 17, when performing subroutine L8, the ST-DOWN signal goes from L to H in step S120 and stocker 14 is lowered. A step S121 detects the turn off of the $\overline{\text{S-POS}}$ signal each time a stocker 14 store position is passed. Each detected turn off causes step S122 to subtract 1 from the position number, m, of stocker 14 as it is lowered from its position at the start of subroutine L8. When m=1 in step S122, and the turn off of the $\overline{\text{R-POS}}$ signal is detected in a step S123, the next turn off of the $\overline{\text{S-POS}}$ signal in a step S124 indicates that stocker 14, is in the S position (m=0) in step S125. The ST-DOWN signal goes from H to L in step S126, and stocker 14 is stopped in the S position.

Accordingly, subroutine L8 resets the value of m to 0 when stocker 14 is in the S position at the turning off of an S-POS signal after an R-POS signal goes to L. Thus, any error between the count of m in the program and the actual position of stocker 14 that may have resulted from a counting error is corrected by moving stocker 14 to the S position. Steps S121 and S122 correspond to the interrupt handling and are included to assure that each position count, m, indicates each position of stocker 14, even as it moves.

Referring again to FIG. 9C, at the completion of subroutine L8, single play carriage S is moved from stocker 14 to the load position in subroutine L4 (previously described with reference to FIG. 13) and optical head base 11 is moved to the up position in subroutine L7 (previously described with reference to FIG. 16), and the program proceeds to a step S5.

Figure 9D:
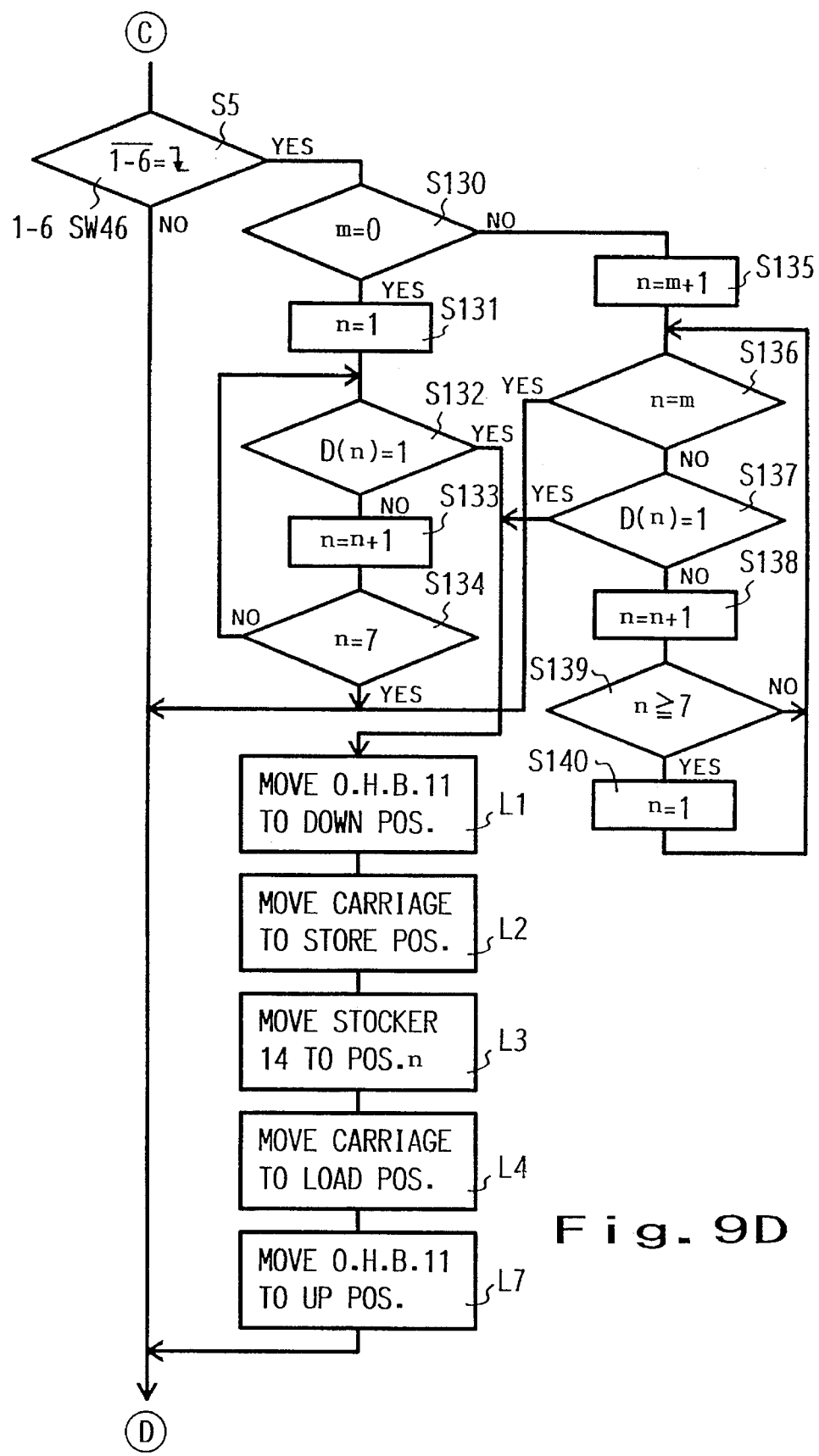

Referring to FIGS. 1, 5, and 9D, when carriages 1–6 selection switch 46 is operated, a step S5 becomes YES and the current position number, m, of stocker 14 is determined in step S130. If m equals 0 step S130 becomes Yes, the value of n is initially set to 1 in a step S131, and D(1) through D(6) are checked in the loop of steps S132 through 134 to determine if there is a disc in any of carriages 1 through 6.

If the presence of a disc is detected, step S132 becomes YES, and subroutines L1 through L4 and L7 (previously described with respect to FIGS. 10 through 13 and 16, respectively) are performed as follows: optical head base 11 is moved from the up position to the down position in subroutine L1; single play carriage S, at the load position, is moved to its store position in stocker 14 in subroutine L2; stocker 14 is moved to the position n, determined in either step S131 or S133, in subroutine L3; the selected carriage holding a disc in its store position in stocker 14 is moved to the load position in a subroutine L4; and optical head base 11 is moved from the down position to the up position in a subroutine L7. At the completion of subroutine L7, the program returns to step S1.

If no disc is detected in any of carriages 1 through 6, step S134 becomes YES. The operation of carriage 1–6 selection switch 46 is effectively ignored and the program returns to step S1.

If step S130 becomes NO, the value of n is set to the number of the carriage currently in the load position, m, +1 in step S135 and carriages holding a disc are searched sequentially from carriages m+1 in carriages 1 through 6 in the loop of steps S136 through S140. For example, when m is 2, carriage 2 is in the load position, carriages are searched for a disc in carriages 3, 4, 5, 6 and 1 in steps S136 through S140.

If a carriage holding a disc is located, step S137 becomes YES and subroutines L1 through L4 and L7 (FIGS. 10 through 13 and 16) are performed in sequence as previously described to move the disc holding carriage to the load position and raise optical head base 11 to the up position, subroutine L7 (FIG. 16). The program then returns to step S1 (FIG. 9A).

If there is no disc in carriages 1 through 6 other than the disc in the carriage presently in the load position, step S136 becomes YES. The the operation of carriages 1–6 selection switch 46 is effectively ignored and the program returns to step S1 (FIG. 9A).

OPERATION IN THE EJECT MODE

Figure 18A:
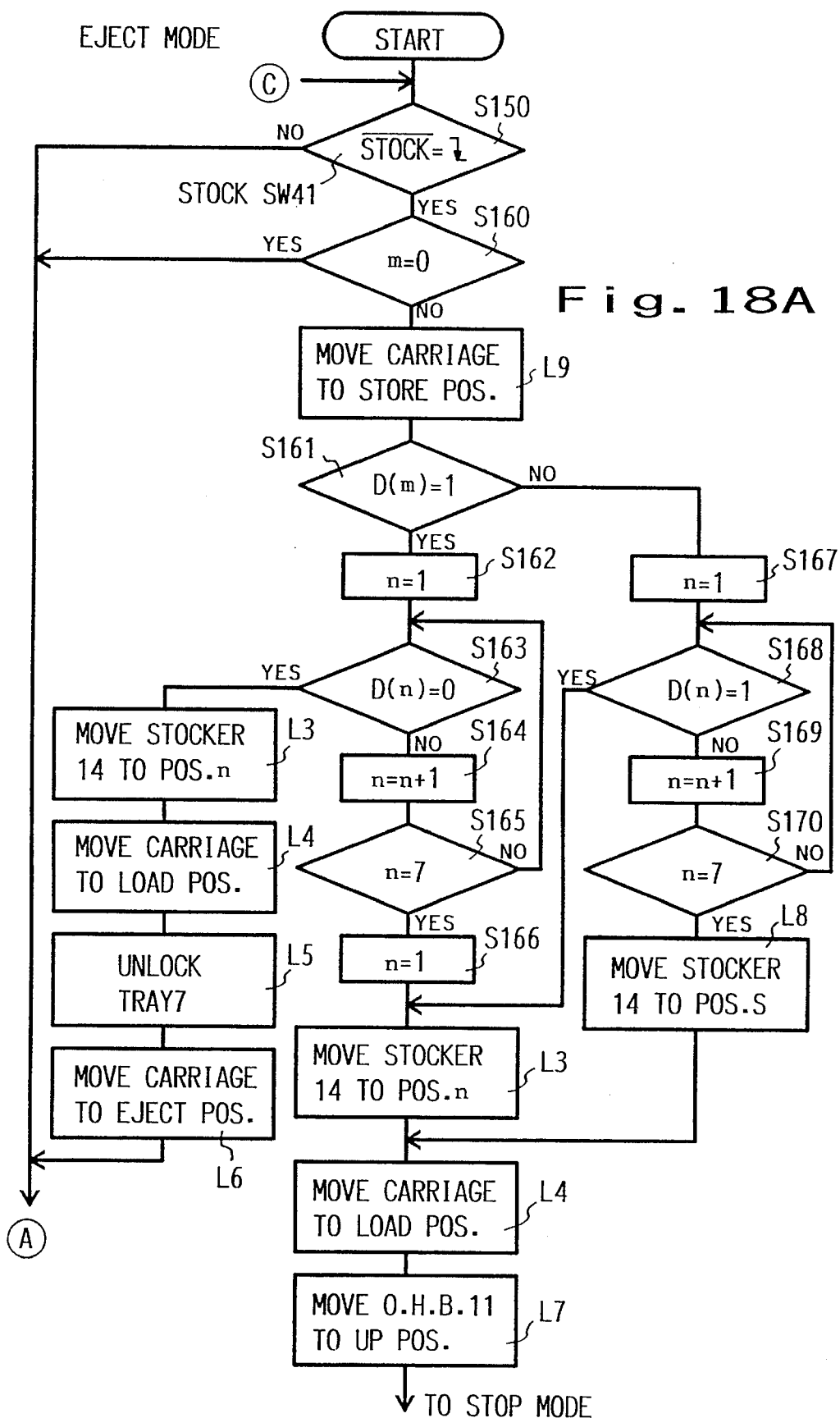
Figure 18B:
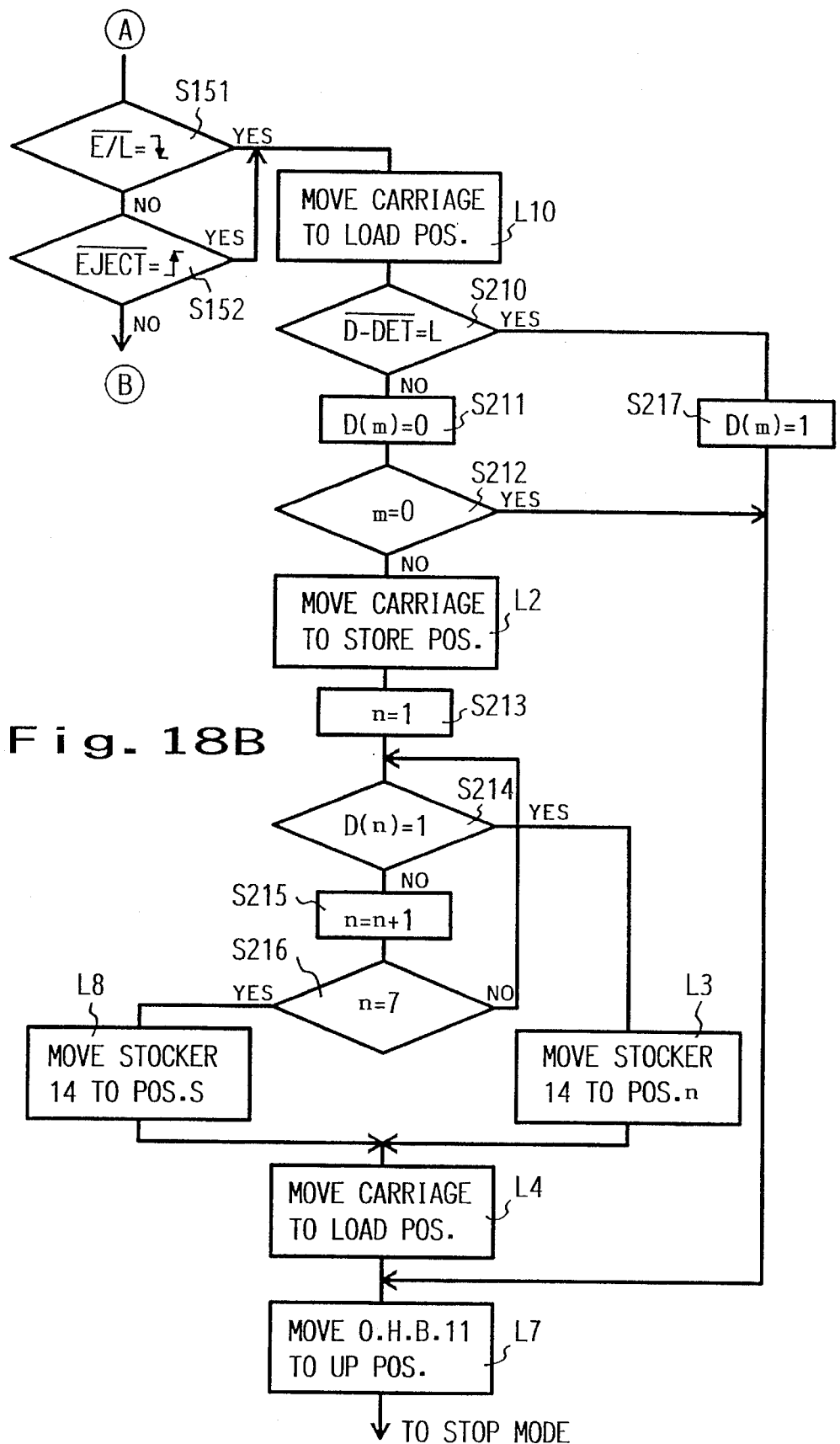
Figure 18C:
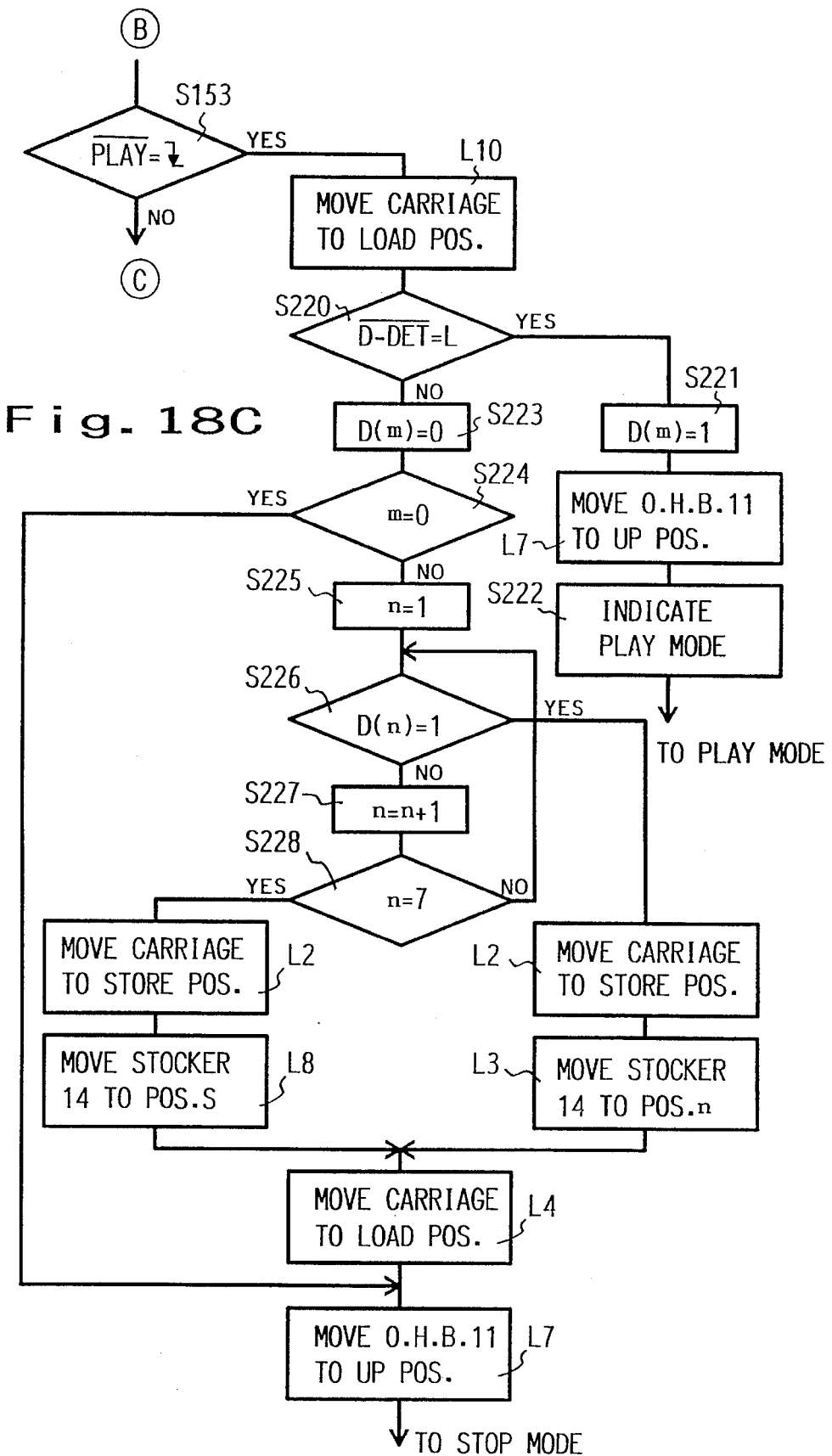

Referring to FIGS. 18A through 18C, the loop of steps S150 through 160 detect that the $\overline{STOCK}$ signal, the $\overline{E/L}$ signal and the $\overline{PLAY}$ signal go from H to L, and that the $\overline{EJECT}$ signal goes from L to H.

Referring to FIGS. 1, 5, and 18A, when stock switch 41 is manipulated, step S150 becomes YES and the value of m is determined. If m is 0 in step S160 the program precedes with step S151 (FIG. 18B) to be discussed later. Step S160 prevents single play carriage S from moving directly to the store position from the eject position as do changer-play operation carriages 1 through 6 because single play carriage S is for single-play operation.

Thus, when step S160 is YES, the operation of stock switch 41 is practically ignored and the program proceeds to step S151. When the carriage inserted in tray 7 is not S, step S160 is NO. Tray 7 is moved to the load position and the carriage inserted in tray 7 is moved to the store position in a subroutine L9.

Figure 19:
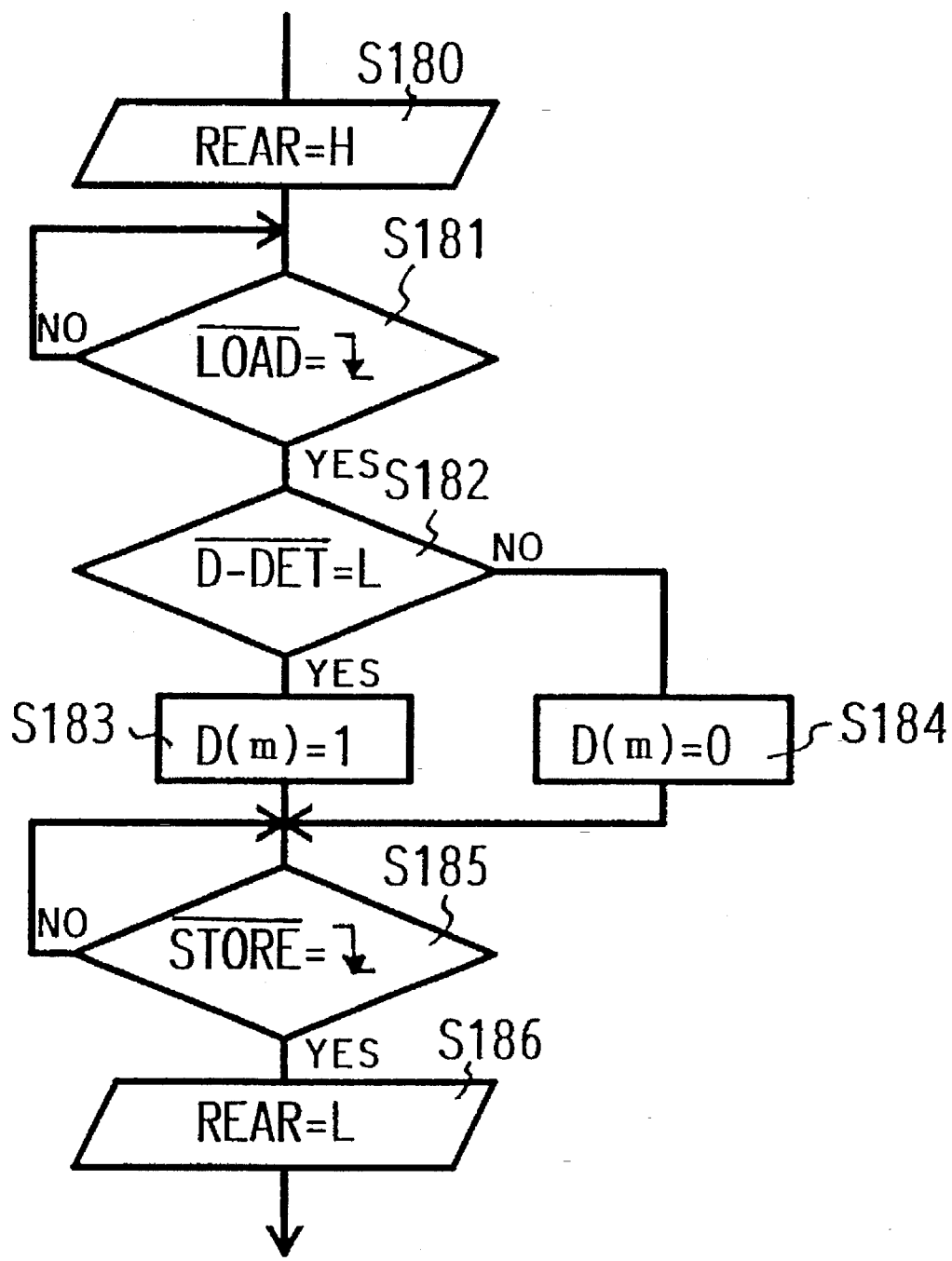

Referring now to FIG. 19, when subroutine L9 is initiated, a REAR signal goes from L to H in step S180 and tray 7 is moved to the load position and a step S181 detects that the $\overline{LOAD}$ signal goes from H to L.

When tray 7 is in the load position space S3 (see FIG. 6), a step S181 becomes YES and a step S182 looks for the $\overline{D\text{-}DET}$ signal to be L. If step S182 is YES, D(m) is set to 1 in a step S183, if NO, D(m) is set to 0 in a step S184 and a loop of a step S185 detects that the $\overline{STORE}$ signal goes to L.

When the carriage is moved to the store position, step S185 becomes YES, the REAR signal goes to L and the carriage is stopped in a step S186.

Referring again to FIGS. 1, 5, and 18A at the completion of subroutine L9, a step S161 checks that D(m) is 1. If S161 is YES, the number, n, is set to 1 in a step S162. Disc numbers D(1) through D(6) are checked in sequence to determine if any carriage is not holding a disc, D(n)=0 in a loop of steps S163 through S165.

If there is a carriage without a disc and step S163 becomes YES, operation in subroutines L3 through L6 (described previously with reference to FIGS. 12 through 15) is carried out in sequence, as follows: in subroutine L3, stocker 14 is moved to the position, n, of the empty carriage, as determined in either step S162 or S164; the selected carriage (1 through 6) is moved from the store position to the load position in subroutine L4; tray locking mechanism 30 is unlocked by optical head base driver 28 in subroutine L5; and tray 7 is moved to the eject position in subroutine L6. The program then proceeds to a step S151 (FIG. 18B).

If there are discs in all of carriages 1 through 6, searched in the loop of steps S163 through S165, step S165 becomes YES. The number n is set to 1 in a step S166, initiating the sequential performance of subroutines L3, L4 and L7 (described previously with reference to FIGS. 12, 13 and 16) as follows: stocker 14 is moved to the store position of carriage 1; carriage 1 is moved from the store position in stocker 14 to the load position in subroutine L4; and optical head base 11 is moved from the down position to the up position in subroutine L7. The program then proceeds to the stop mode (FIGS. 9A through 9D).

If step S161 becomes NO, the number n is set to 1 in a step S167 and disc numbers D(1) through D(6) are checked to determined if a disc is present in any of carriages 1 through 6 in a loop of steps S168 through S170.

If a carriage is holding a disc, step S168 is YES and subroutines L3, L4 and L7 (FIGS. 12, 13 and 16) are performed in sequence and the program then proceeds to the stop mode (FIGS. 9A through 9D) as previously described.

If no disc is found in carriages 1 through 6, searched in the loop of steps S168 through S170, step S170 becomes YES.

Subroutines L8, L4 and L5 (previously described with reference to FIGS. 17, 13 and 16, respectively) are performed in the sequence given, as follows: stocker 14 is moved to position S in subroutine L8; the carriage is moved from the store position in stocker 14 to the load position in subroutine L4; and optical head base 11 is moved from the down position to the up position in subroutine L7. The program then proceeds to the stop mode (FIGS. 9A through 9D).

Referring to FIG. 18B, when eject/load switch 42 is operated or eject position detector switch 25 is turned off, tray 7, at the eject position, is pushed toward the load position. One of steps S151 or S152 becomes YES and tray 7 is moved from the eject position to the load position in a subroutine L10.

Figure 20:
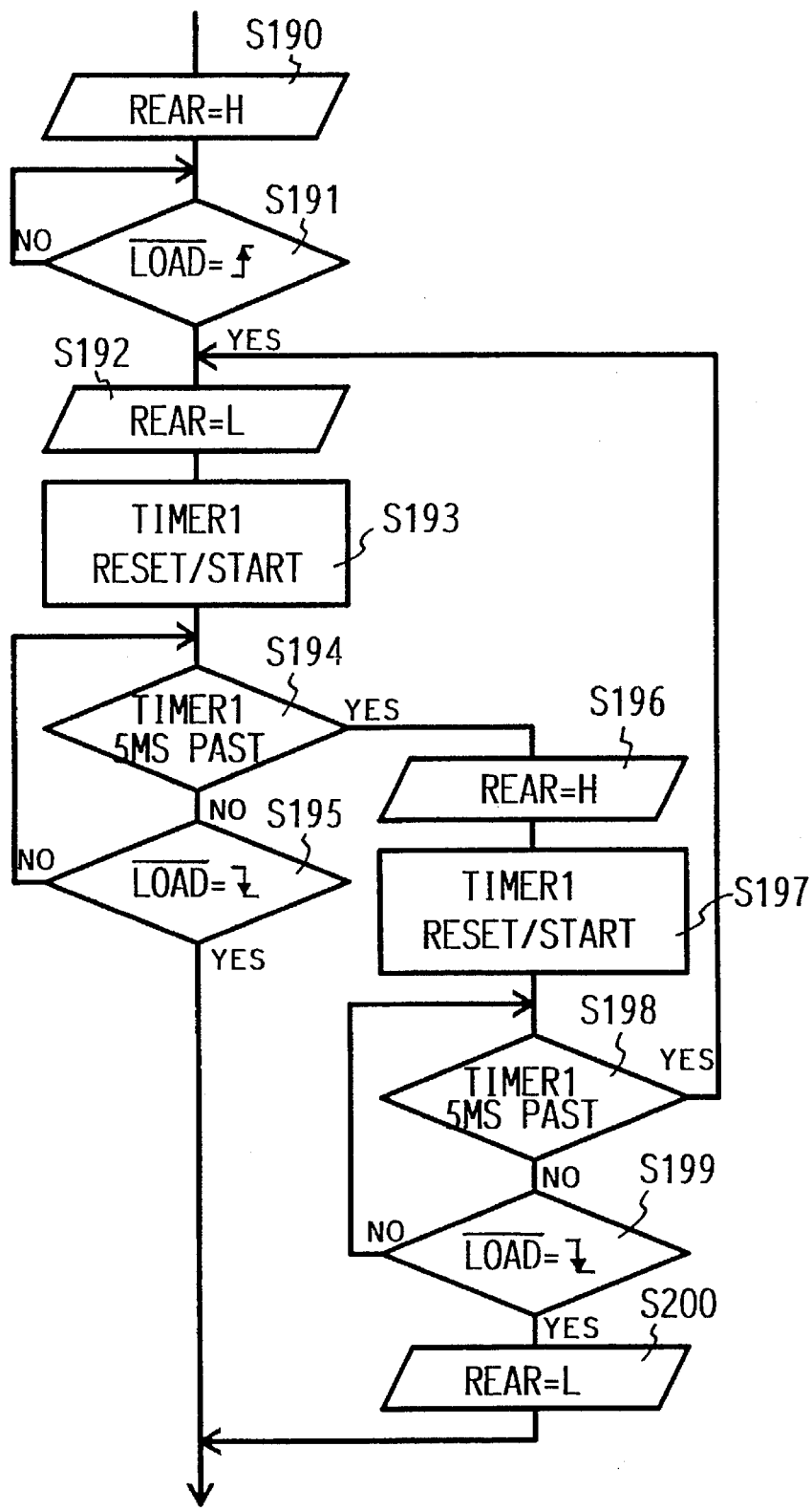

Referring to FIG. 20 when subroutine L10 is initiated, the REAR signal goes from L to H in a step S190 moving tray 7 toward the store position and a loop of a step S191 detects that the $\overline{LOAD}$ goes from L to H.

Figure 22B:
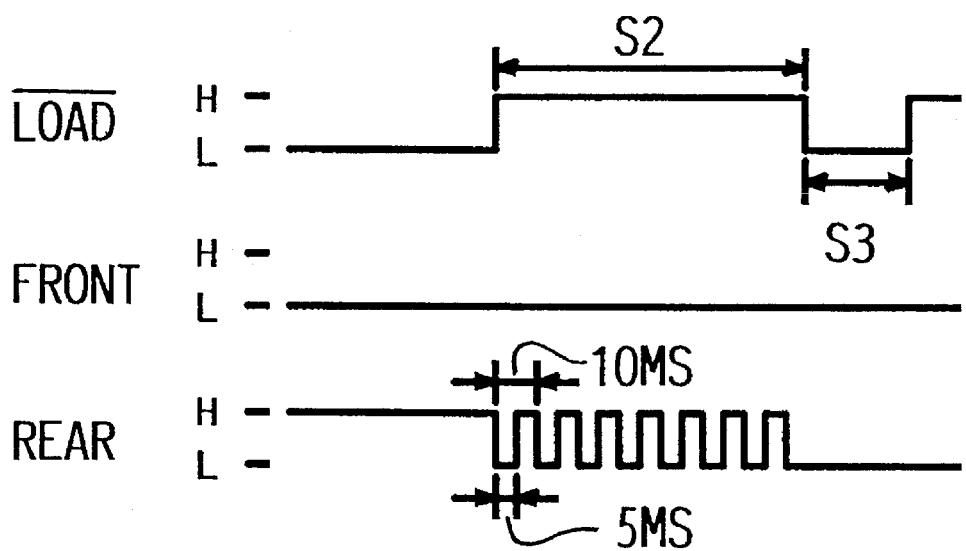

When tray 7 enters the deceleration area, S2 on FIG. 22B, and a step S191 becomes YES. The movement of tray 7 is decelerated as the rear signal is switched to a 10 ms period, 50% duty rate pulse output (FIG. 22B) and the $\overline{LOAD}$ signal is detected in steps S192 through S200.

When tray 7 enters the load position, space S3 in FIG. 22B, step S195 or S199 becomes YES and tray 7 is stopped.

Referring again to FIGS. 1, 5 and 18B, at the completion of subroutine L10, a step 210 checks that the $\overline{D\text{-}DET}$ signal is L. If a disc is present in the carriage in use, and step S210 is YES D(m)=1 in a step S217. Optical head base 11 is moved from down position to the up position and the disc on the carriage is clamped in subroutine L7 (previously described with reference to FIG. 16). The program then proceeds to the stop mode (FIG. 9).

If no disc is found on the carriage and step S210 is NO, D(m)=0 in a step S211, a step S212 checks the carriage currently in tray 7. If the carriage number, m, is 0, the carriage in tray 7 is single play carriage S.

If the carriage in tray 7 is single play carriage S, step S212 becomes YES. Optical head base 11 moves from the down position to the up position and the program proceeds to the stop mode (FIG. 9).

If the presently used carriage is not S, step S212 is NO, and the carriage at the load position is moved to the store position in a subroutine L2 (previously described with reference to FIG. 11). The disc number, n, is set to 1 in a step S213 and disc numbers D(1)–D(6) are checked in sequence in steps S214 through S216 for the presence of a disc.

If a carriage with a disc is identified, step S214 is YES, subroutine L3 (previously described with reference to FIG. 12) is initiated. This moves stocker 14 to the position of the carriage, n, identified in a step S213 or S215. At the completion of subroutine L3, subroutines L4 and L7 (previously described with reference to FIGS. 13 and 16) are performed in sequence as follows: the identified carriage is moved to the load position in subroutine L4 and optical head base 11 is moved from the down position to the up position in subroutine L7. The program then proceeds to the stop mode (FIG. 9).

If no disc is identified on any of carriages 1 through 6, searched in the loop of steps S214 through S216, step S216 becomes YES. This initiates subroutine L8 (previously described with reference to FIG. 17), which moves stocker 14 to the position of single play carriage S. At the completion of subroutine L8, subroutines L4 and L7 (previously described with reference to FIGS. 13 and 16) are performed in sequence as follows: single play carriage S to the load position in subroutine L4 and optical head base 11 is moved from the down position to the up position in subroutine L7. The program then proceeds to the stop mode (FIG. 9).

Referring to FIGS. 1, 5 and 18C, when play switch 43 is operated, the $\overline{PLAY}$ signal goes from H to L and a step S153 becomes YES. This initiates subroutine L10 (previously described with reference to FIG. 20), moving tray 7 from the eject position to the load position. At the completion of subroutine L10, the $\overline{D\text{-}DET}$ signal is checked in a step S220 to determine if it is at the L or H level.

If there is a disc in the carriage in tray 7, the $\overline{D\text{-}DET}$ signal is L and S220 is YES. The disc number, D(m), is set to 1 (D(m)=1) in a step S221. This initiates subroutine L7 (previously described with reference to FIG. 16), moving optical head base 11 from the down position to the up position. A step S222 then indicates a play mode and the program proceeds to the play mode to be described later.

If there is no disc on the carriage in tray 7, step S220 is NO. D(m)=0 in steps S223 and S224 determines if the carriage in tray 7 is 0. If single play carriage S is in tray 7, a step S224 is YES. This initiates subroutine L7 (previously described with reference to FIG. 16), moving optical head base 11 to the up position. The program then proceeds to the stop mode (FIGS. 9A through 9D).

If the carriage in tray 7 is not single play carriage S, step 224 is NO. The number, n, is set to 1 in step S225 and carriages 1 through 6 are checked in a loop of steps S226 through S228 to determine the presence of a disc, D(1) through D(6), in a carriage, n=1 through n=6.

If a disc is detected in a carriage, step S226 is YES, the carriage at the load position is moved to the store position in subroutine L2 (previously described with reference to FIG. 11). At the completion of subroutine L2, subroutines L3, L4 and L7 (previously described with reference to FIG. 12, 13 and 16) are performed in sequence as follows: subroutine L3 moves stocker 14 to the position of the carriage holding the first detected disc, n; the selected carriage is moved from the store position to the load position in subroutine L4: and optical head base 11 is moved from the down position to the up position in subroutine L7. The program then proceeds to the stop mode (FIGS. 9A through 9D).

If no disc is detected on any of carriages 1–6 searched in the loop of steps S226 through S228, as step S228 becomes YES, subroutine L2, L8, L4, and L7 (previously described with reference to FIG. 11, 17, 13 and 16, respectively) are performed in the sequence given, as follows: subroutine L2 moves the carriage currently in the load position to its respective store position in stocker 14; subroutine L8 is then moves stocker 14 to the position of single play carriage S; single play carriage S is moved from the store position to the load position in subroutine L4; and optical head base 11 is moved from the down position to the up position in subroutine L7. The program then proceeds to the stop mode (FIGS. 9A through 9D).

OPERATION IN THE PLAY MODE

Figure 21A:
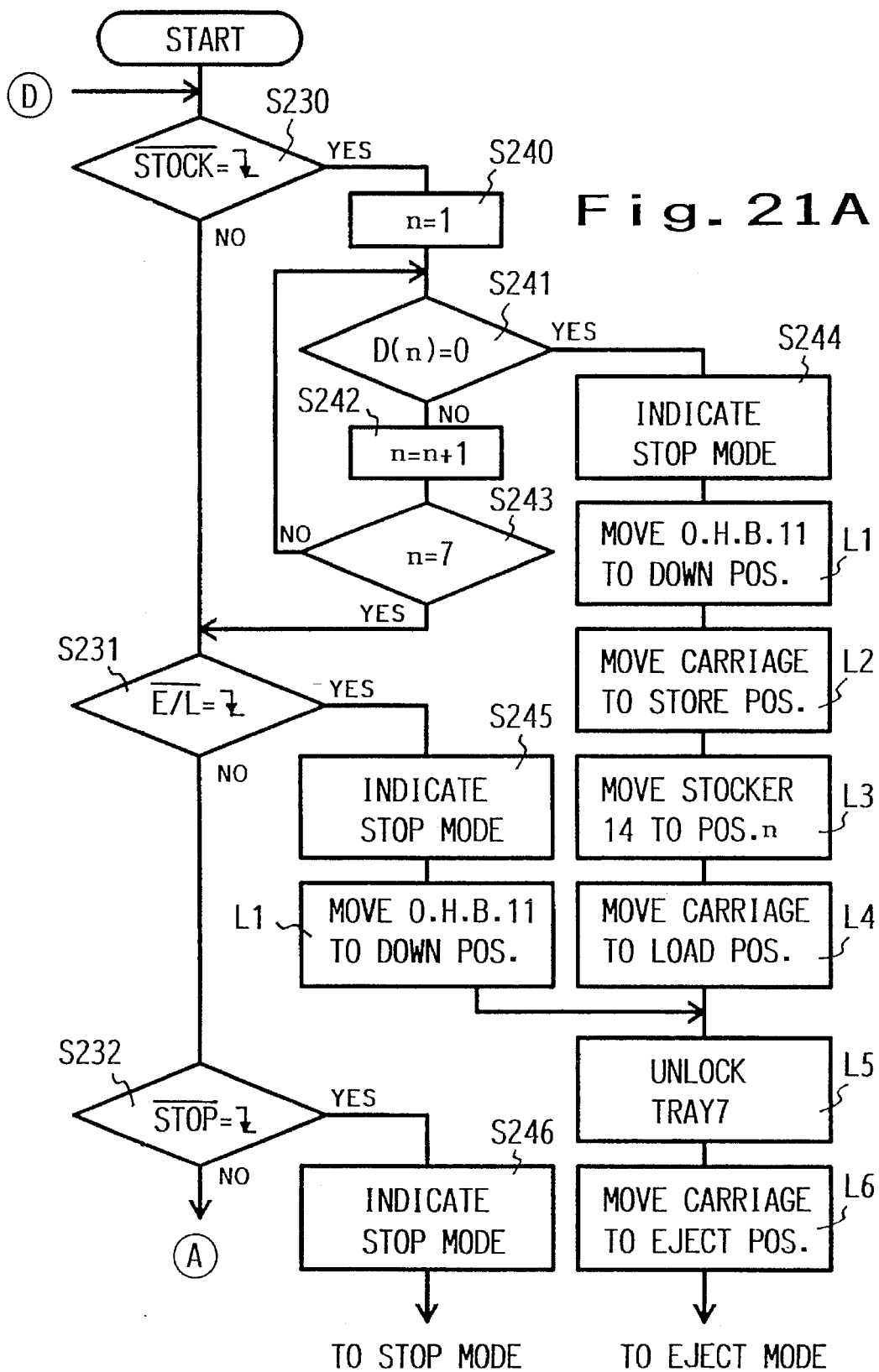

Referring to FIG. 21A, when stock switch 41 is operated, a step S230 becomes YES. The value n is set to 1 in a step S240 and steps S241 through S243 determine the presence of a disc numbers D(1) through D(6) in any of carriages 1 through 6.

If any carriage is not holding a disc and step S241 becomes YES, the stop mode is indicated in a step S244, and subroutines L1 through L6 (previously described with reference to FIGS. 10 through 15) are performed in sequence as follows: optical head base 11 is moved from the up position to the down position in subroutine L1; the carriage at the load position is moved to the store position in subroutine L2; stocker 14 is moved to position n, established in either step S240 or S242, in subroutine L3; the carriage is moved from the store position to the load position in subroutine L4; tray locking mechanism 30 is unlocked by optical head base driver 28 in subroutine L5; and tray 7 is moved to the eject position in subroutine L6. The program then proceeds to the eject mode (FIGS. 18A through 18D).

If all of carriages 1 through 6, searched in the loop of steps S241 through S243, are loaded with discs, a step S243 becomes YES. The operation of stock switch 41 is effectively ignored and the program proceeds to a step S231.

When eject/load switch 42 is operated, step S231 becomes YES. A stop mode is indicated in a step S245 and subroutines L1, L5 and L6 (previously described with reference to FIGS. 10, 14 and 15) are performed in the sequence given as follows: optical head base 11 is moved from the up position to the down position in subroutine L1; tray locking mechanism 30 is unlocked by optical head base driver 28 in subroutine L5; tray 7 is moved to the eject position in subroutine L6. The program then proceeds to the eject mode (FIGS 18A through 18C).

When stop switch 44 is operated, a step S232 becomes YES, and the stop mode is indicated in a step S246. The program then proceeds to the stop mode (FIGS. 9A through 9D).

Figure 21B:
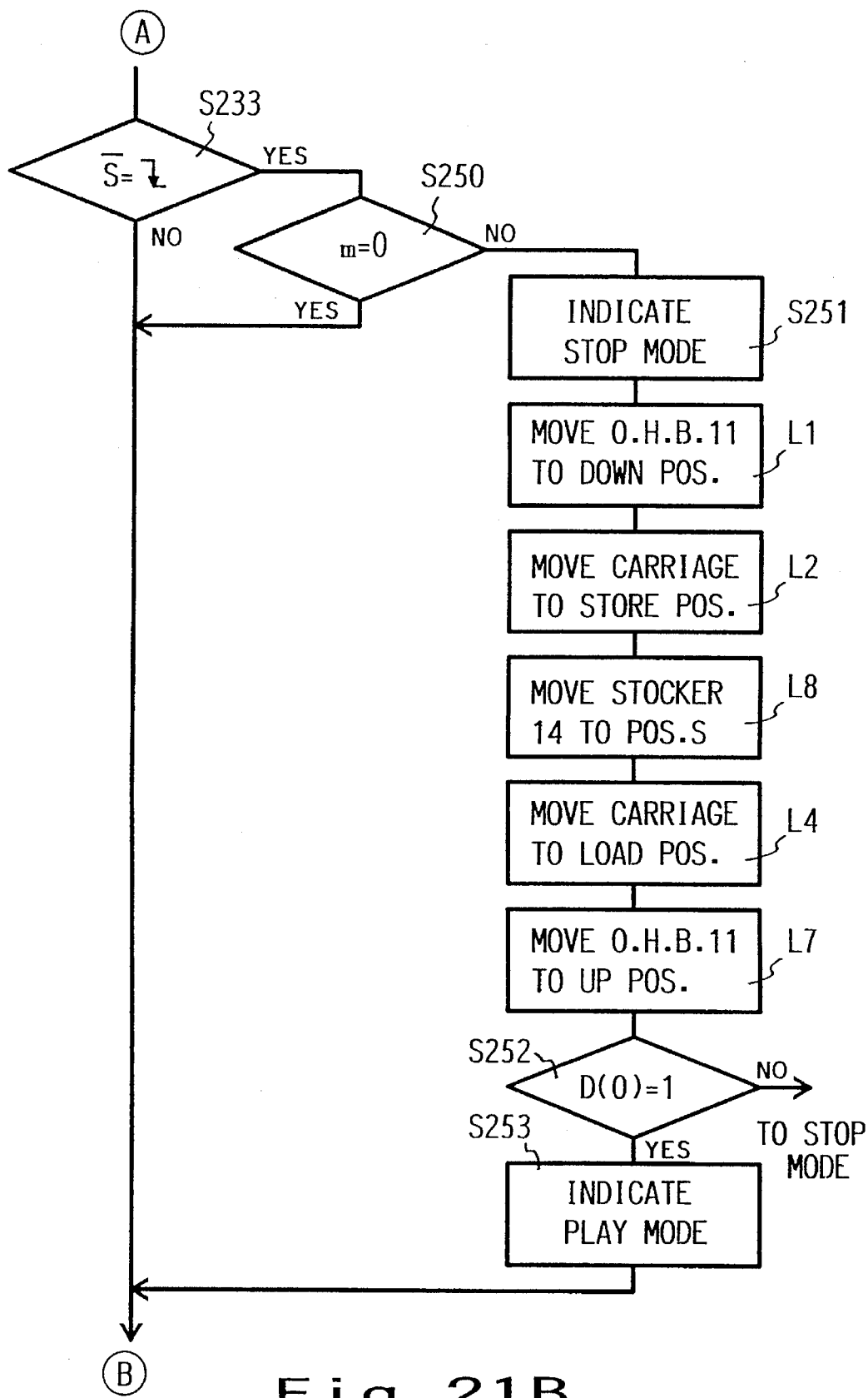

Referring now to FIGS. 1, 5 and 21B, when carriage S selection switch 45 is manipulated, a step S233 becomes YES, and a step S250 determines if the number m is 0. When step S250 is YES, single play carriage S is already inside the tray so the operation of carriage S selection switch 45 is effectively ignored and the program proceeds to a step S234 (to be described later).

If a step S250 becomes NO, player 100 is set to the stop mode in a step S251. Subroutines L1, L2, L8, L4, and L7 (previously described with respect to FIGS. 10, 11, 17, 13 and 16, respectively) are performed in the order given, as follows: optical head base 11 is moved from the up position to the down position in subroutine L1; the carriage currently at the load position is moved to the store position in subroutine L2; stocker 14 is moved to the position of single play carriage S in subroutine L8; single play carriage S is moved from the store position to the load position in subroutine L4; and optical head base 11 is moved from the down position to the up position in subroutine L7. It is then determined if there is a disc in single play carriage S, D(0)=1 in a step S252.

Figure 21C:
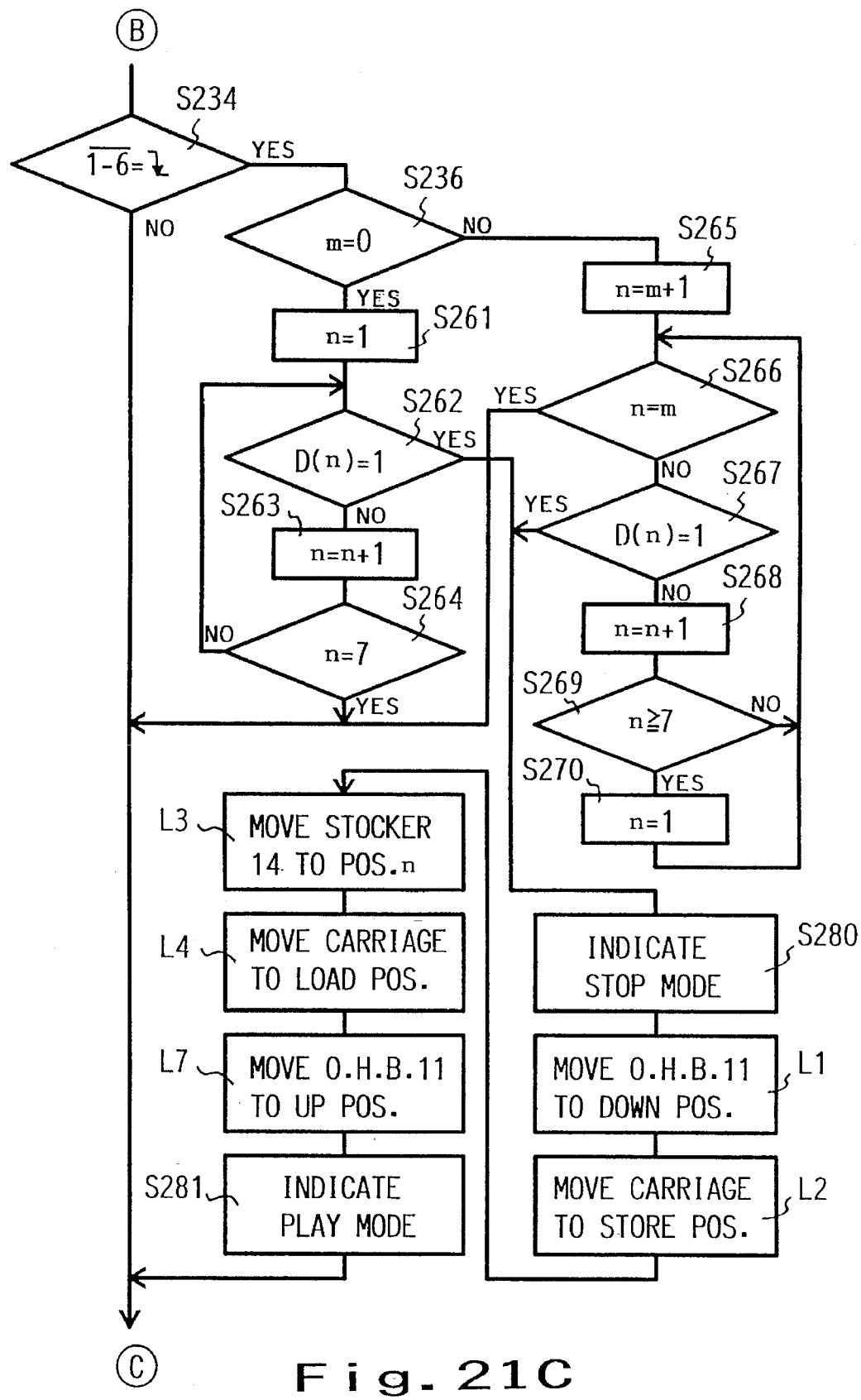

If there is a disc in single play carriage S, step S252 is YES, and player 100 is set to the play mode in a step S253 and the program proceeds to a step S234 (FIG. 21C). If there is no disc in single play carriage S, step 252 is NO, and the program proceeds the stop mode (FIG. 9A through 9D).

Referring to FIGS. 1, 5, and 21C, when a carriages 1–6 selection switch 46 is operated, a step S234 becomes YES as the $\overline{1-6}$ signal goes to L. In step S236 it is determined if the number m is 0. If step S236 is YES, the number, n is set to 1 in a step S261 and carriages 1 through 6 are checked in sequence to determine if any of them is holding a disc, D(1)=1 through D(6)=1 in a of steps S262 through S264.

When a disc is identified in a carriage, step S262 becomes YES, and the stop mode is indicated in a step S280. Subroutines L1 through L4 and L7 (previously described with reference to FIGS. 10 through 13 and 16) are performed in sequence, as follows: optical head base 11 is moved from the up position to the down position in subroutine L1; single play carriage S is moved from the load position to the store position in subroutine L2; stocker 14 is moved to the position, n, of the carriage identified as holding a disc in steps S261 or S263 in subroutine L3; carriage n is moved from the store position to the load position in subroutine L4; and optical head base 11 is moved from the down position to the up position in subroutine L7. The play mode is indicated in a step S281 and the program proceeds to a step S235 (FIG. 21D)

Figure 21D:
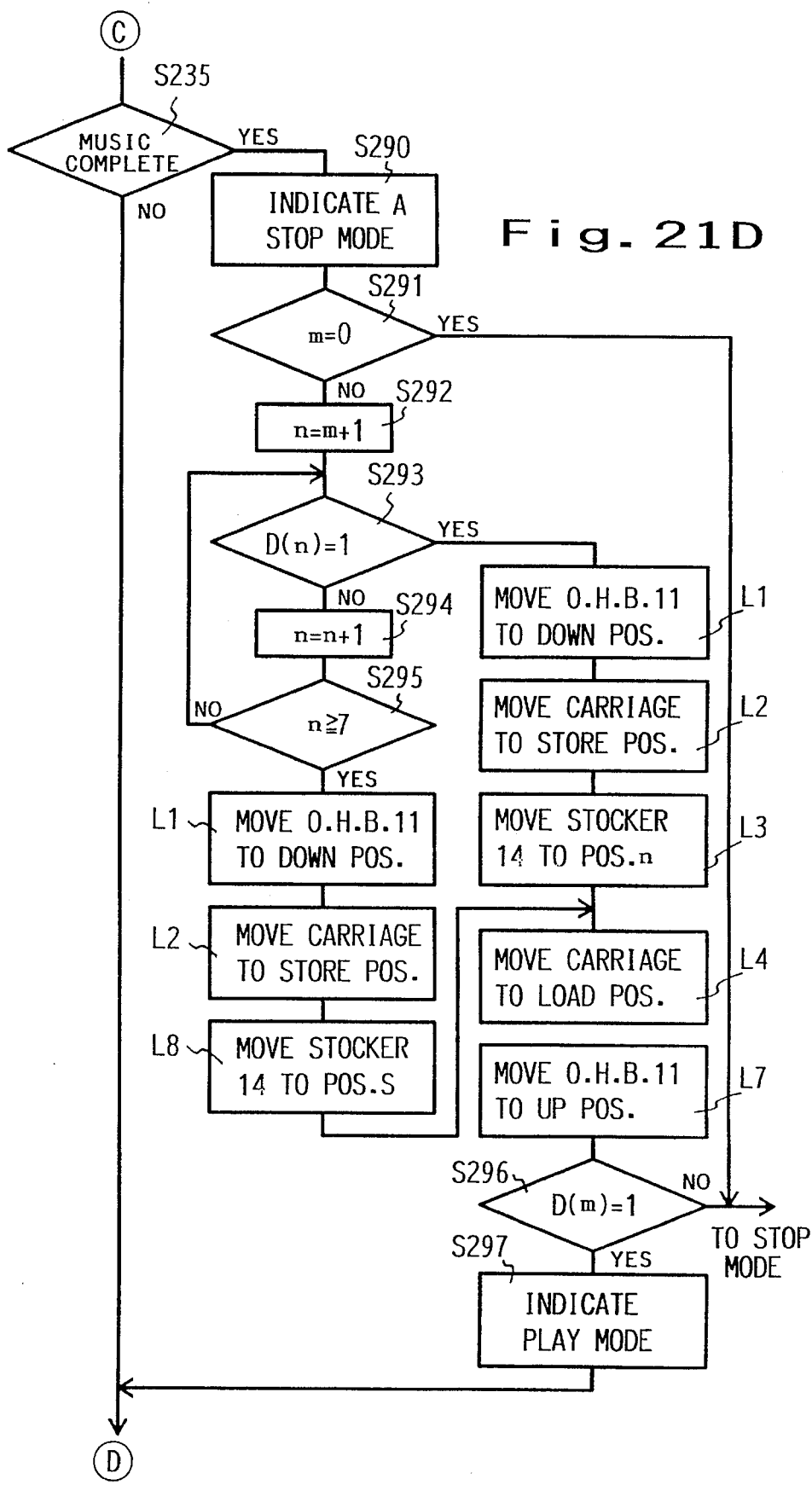

If no disc is found on any of carriages 1 through 6, a step S264 is YES, the operation of carriage S selection switch 45 is effectively ignored and the program proceeds to a step S235 (FIG. 21D).

If the carriage currently in the load position is not single play carriage S, the step 236 is NO, the value n is set to m+1 in a step S265. Discs are searched for in carriages from (m+1) to (m−1) in sequence a loop of steps S266 through S270.

When a disc is identified in a carriage, step S267 becomes YES, and the stop mode is indicated in a step S280. Subroutines L1 through L4 and L7 (previously described with reference to FIGS. 10 through 13 and 16) are performed in sequence, as follow: optical head base 11 is moved from the up position to the down position in subroutine L1; single play carriage S is moved from the load position to the store position in subroutine L2; stocker 14 is moved to the position, n, of the carriage identified as holding a disc in steps S261 or S263 in subroutine L3; carriage n is moved from the store position to the load position in subroutine L4; and optical head base 11 is moved from the down position to the up position in subroutine L7. The play mode is indicated in a step S281 and the program proceeds to a step S235 (FIG. 21D).

If there is no disc other than on the carriage, m, currently in the load position, a step S266 is YES, the operation carriage S selection switch 45 is effectively ignored and the program proceeds to a step S235 (FIG. 21D).

Referring to FIGS. 1, 5, and 21D, when the playing of the last music on a disc is completed, a signal from a signal processor circuit (not illustrated) is detected in step 235. Player 100 is set to the stop mode in a step S290. A step 291 determines if the carriage in the load position is single play carriage S, m=0.

If single play carriage S is in the load position, step S291 is YES, and the program proceeds to the stop mode (FIGS. 9A through 9D) and the single-play operation is completed.

If the carriage in the load position is not single play carriage S, step S291 is NO, the carriage number, n is set to m+1 in a step S292 and carriages (m+1) through 6 searched in sequence in the loop of steps S293 through S295.

When a disc is identified in a carriage, a step S293 becomes YES. Subroutines L1 through L4 and L7 (previously described with reference to FIGS. 10 through 13 and 16) are performed in sequence, as follows: optical head base 11 is moved from the up position to the down position in subroutine L1; single play carriage S is moved from the load position to the store position in subroutine L2; stocker 14 is moved to the position, n, of the carriage identified as holding a disc in steps S292 or S294 in subroutine L3; carriage n is moved from the store position to the load position in subroutine L4; and optical head base 11 is moved from the down position to the up position in subroutine L7. It is then determined in a step S296 whether the carriage in the load position is holding a disc, D(m)=1.

When steps S293 and S296 are both YES a step S297 initiates the play mode, and the program returns to a step S230 (FIG. 21A).

If there is no disc on any of carriages (m+1) through 6 as determined in a loop of steps S293 through S295, step S295 is YES. Subroutines L1, L2, L8, L4, and L7 (previously described with respect to FIGS. 10, 11, 17, 13 and 16, respectively) are performed in the order given, as follows: optical head base 11 is moved from the up position to the down position in subroutine L1; the carriage currently at the load position is moved to the store position in subroutine L2; stocker 14 is moved to the position of single play carriage S in subroutine L8; single play carriage S is moved from the store position to the load position in subroutine L4; and optical head base 11 is moved from the down position to the up position in subroutine L7. It is then determined in a step S296 whether the carriage in the load position is holding a disc, D(m)=1.

If there is a disc on the carriage in the load position, step S296 becomes YES, the play mode is initiated in step S297 and the program returns to a step S230 (FIG. 21A).

If there is no disc on the carriage in the load position, step S296 becomes NO and the program proceeds to the stop mode (FIGS. 9A through 9D).

OPERATING EXAMPLE 1

Operating example 1 is described with reference to FIGS. 1, 5, 9A through 9D, 18A through 18C, 21A through 21D and 23A through 23T.

Initially, stock switch 41 is operated to store six discs inside player 100. As shown in FIG. 23A, tray 7, with single play carriage S installed, is in the load position. All carriages, 1 through 6 and S are empty.

When stock switch 41 is operated, microcomputer 40 performs program steps S1, S6, S7 and subroutine L1 of the stop mode (FIG. 9A). Optical head base 11 is moved to the down position shown in FIG. 23B. Single play carriage S is then moved to the store position by subroutine L2, shown in FIG. 23C.

Figure 23C:
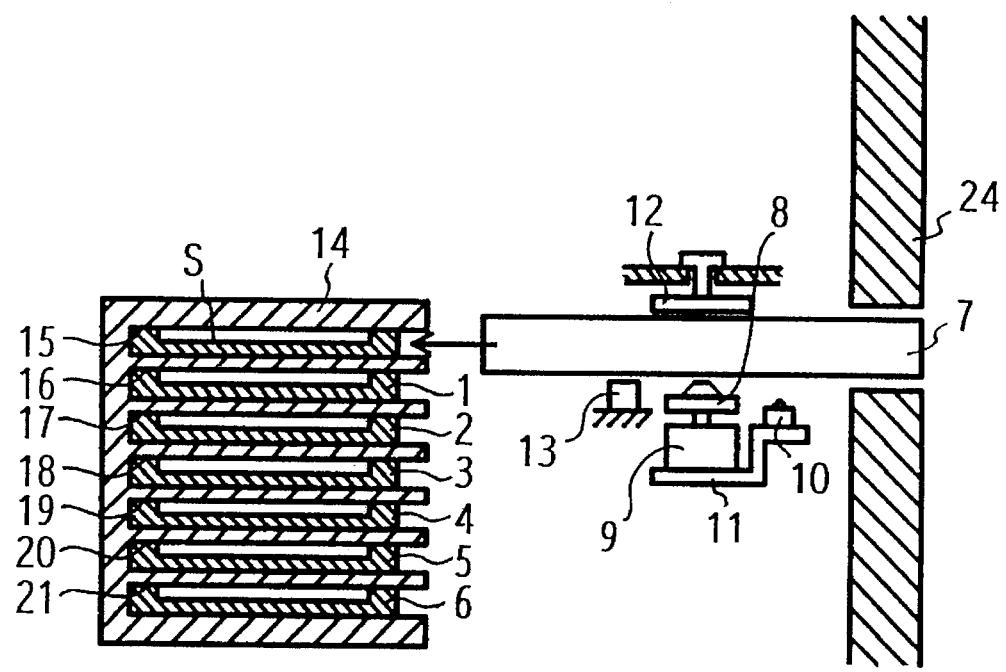
FIGS. 23A through 40P are diagrams of the operation of the present invention.
Figure 23D:
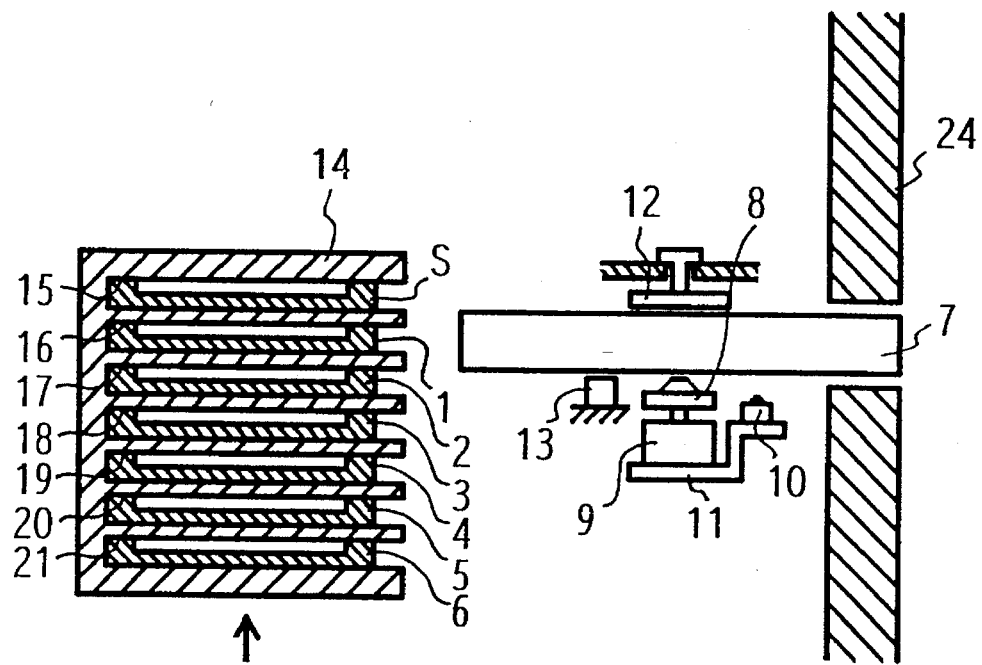
Figure 23E:
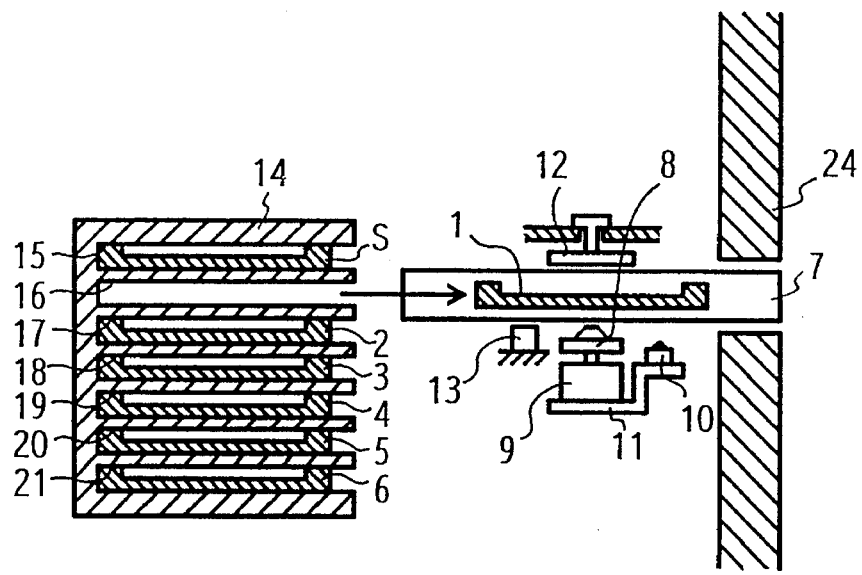
Figure 23F:
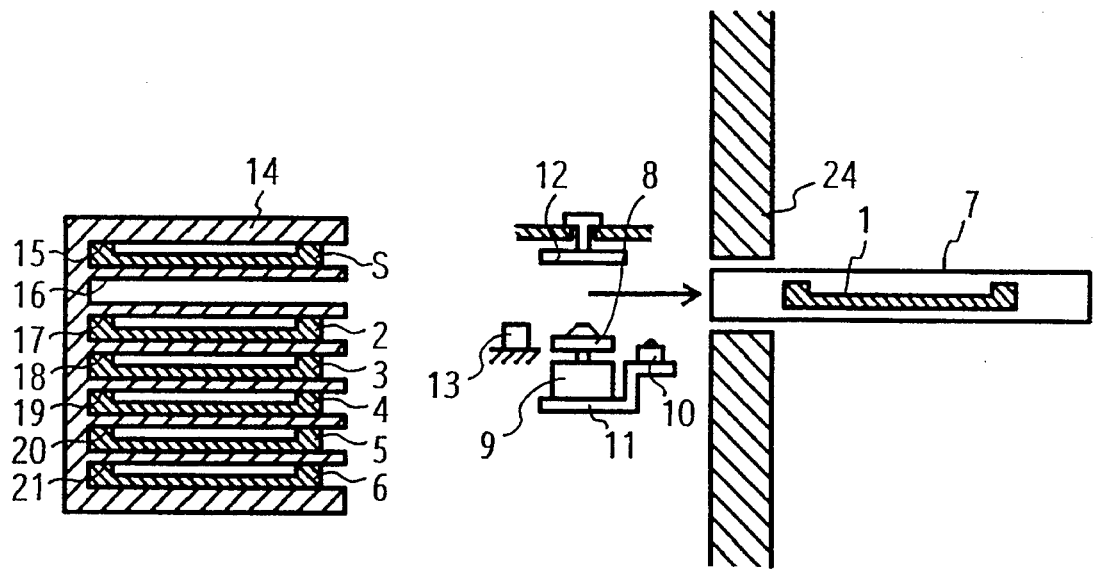

When microcomputer 40 performs subroutine L3, stocker 14 is moved to position 1 shown in FIG. 23D, and carriage 1 is moved to the load position by subroutine L4, as shown in FIG. 23E. Tray 7 is unlocked by subroutine L5, and tray 7 with carriage 1 inserted is moved to eject position by subroutine L6, shown in FIG. 23F.

Figure 23I:
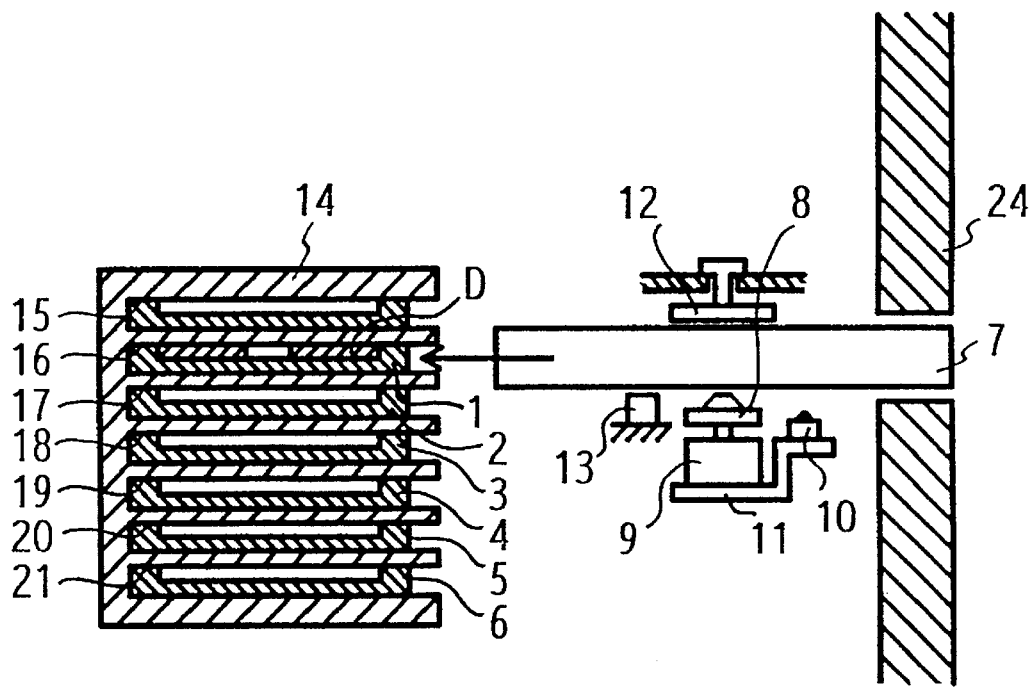

Disc D is placed in carriage 1 by an operator, shown in FIG. 23G. When stock switch 41 is again operated, microcomputer 40 reaches steps S150, S160 and subroutine L9 of the eject mode (FIG. 18A) and tray 7 with carriage 1 installed is moved to the load position as shown in FIG. 23H. Then, carriage 1 is moved from tray 7 in the load position to the store position as shown in FIG. 23I.

In subroutine L9, when microcomputer 40 detects that tray 7 has moved to the load position, the presence of a disc on carriage 1 is detected and it is stored as D(1)=1, thereby the presence of disc on carriage is stored.

Figure 23J:
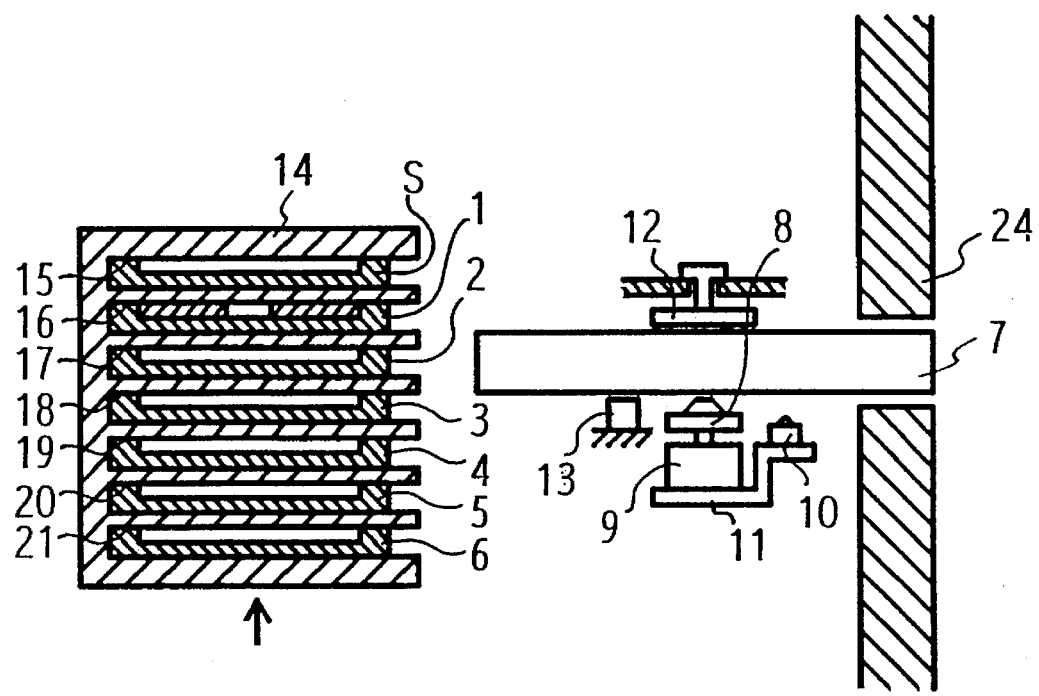
Figure 23K:
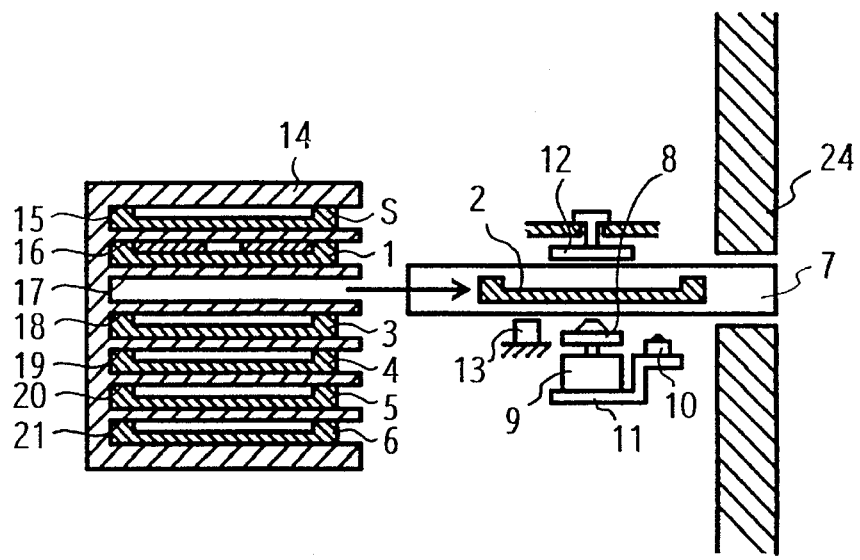

When microcomputer 40 enters the loop of steps S163 to S165 through the performance of steps S161 and S162 (FIG. 18A), n becomes 2 and step S163 becomes YES, and stocker 14 is moved to the position 2 by subroutine L3, shown in FIG. 23J. Carriage 2 is moved to the load position by subroutine L4 as shown in FIG. 23K.

Figure 23L:
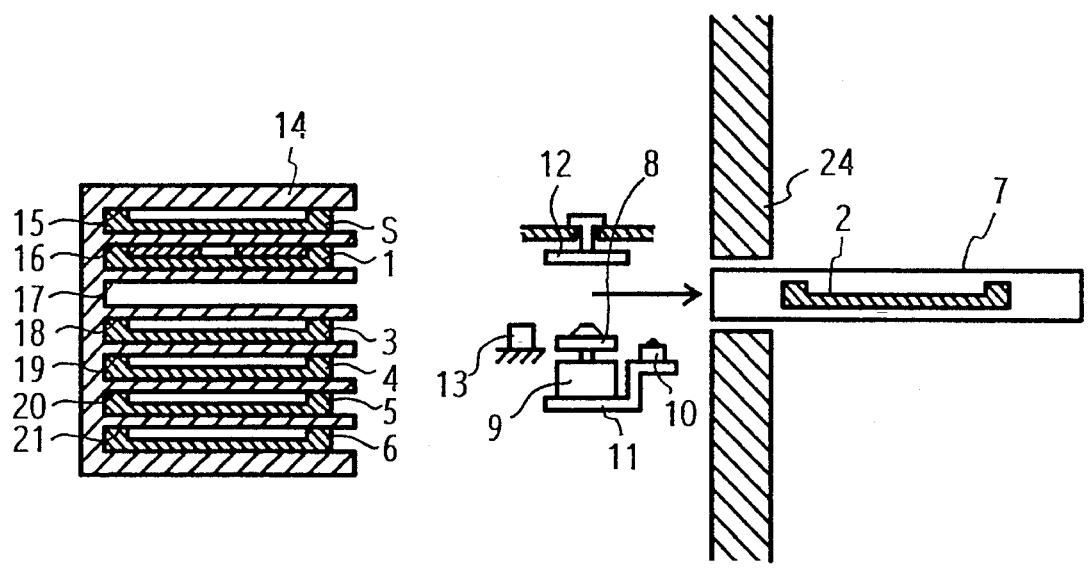

Subroutine L5 is performed, unlocking tray 7, and tray 7 with carriage 2 installed is moved to the eject position shown in FIG. 23L.

Figure 23M:
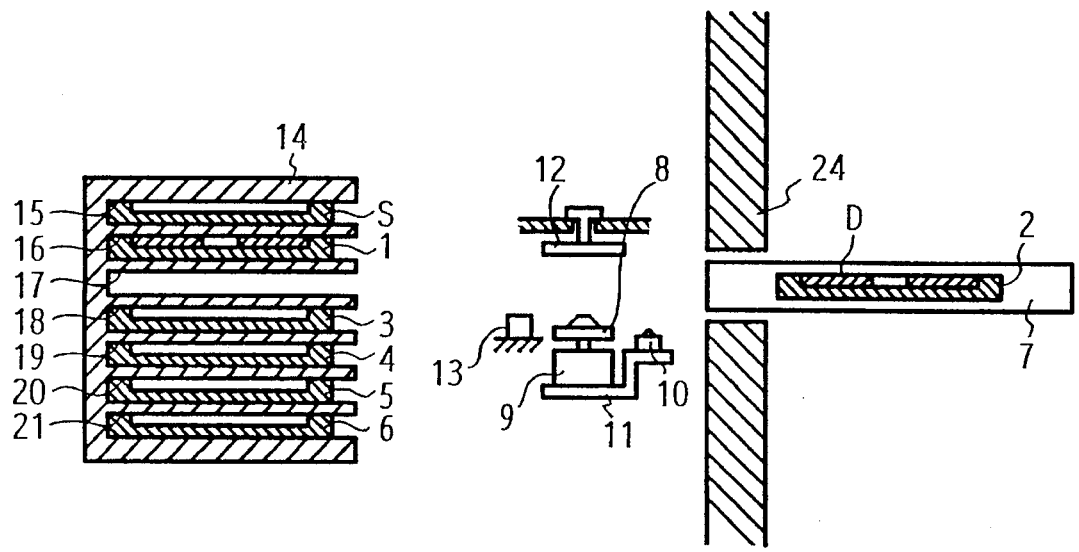

After disc D is placed in carriage 2 by an operator, as shown in FIG. 23M, when stock switch 41 is operated again, microcomputer 40 repeats the previous program sequence, tray 7 with carriage 2 holding a disc, is moved to the load position, and carriage 2 is moved from the load position in tray 7 to the store position in stocker 14.

This sequence is repeated to load discs into carriages 3, 4, and 5, and store the loaded carriages in their respective positions in stocker 14.

Figure 23N:
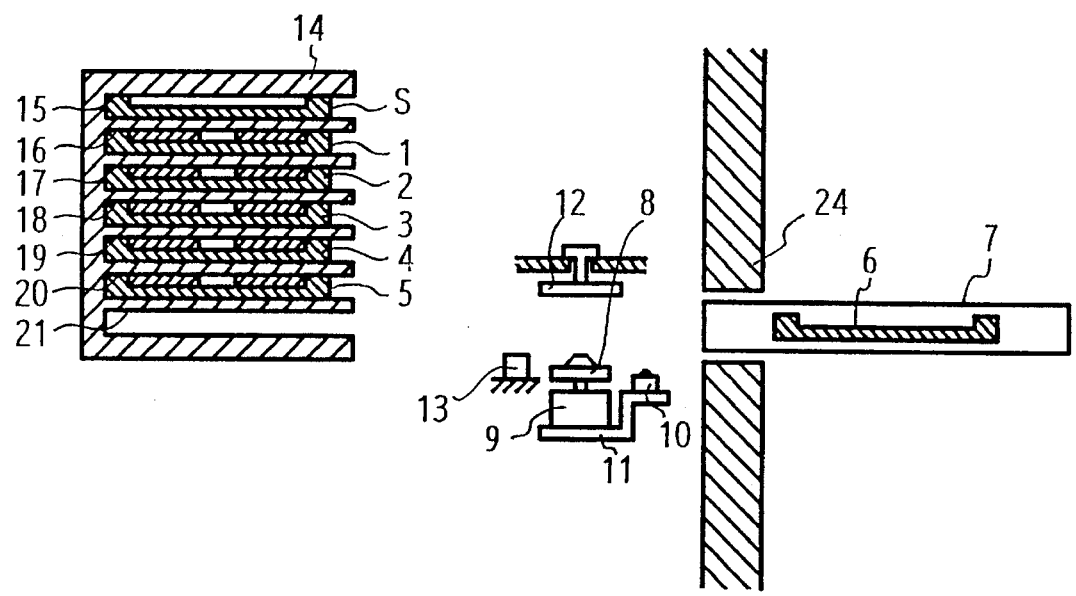

The next operation of stock switch 41 causes stocker 14 to move to position 6 and carriage 6 to move to the load position in tray 7. Tray 7, with carriage 6 installed is moved to the eject position shown in FIG. 23N.

Figure 23O:
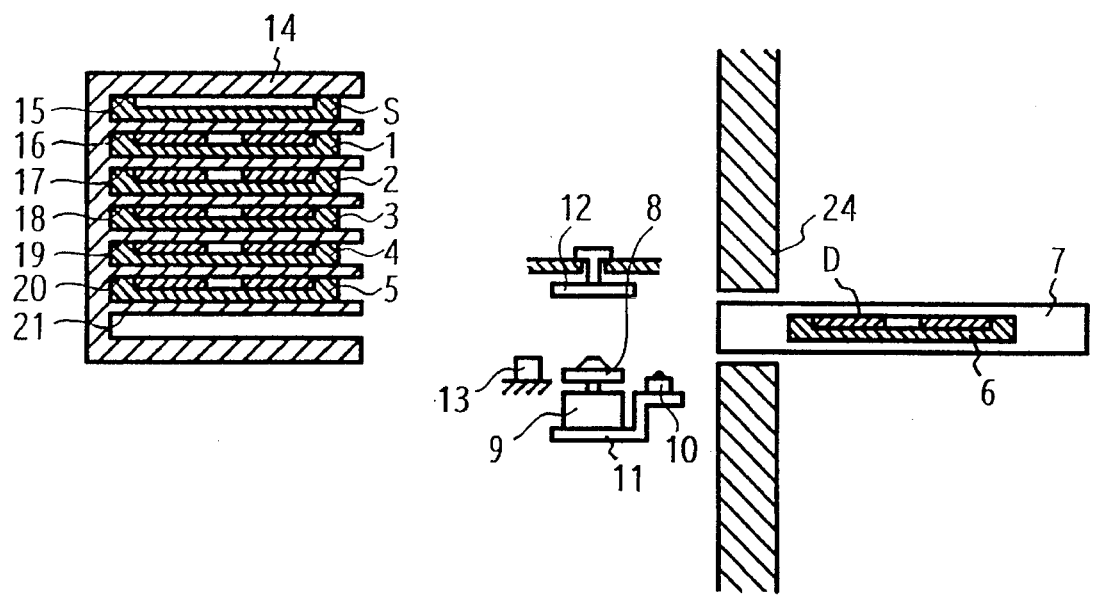
Figure 23P:
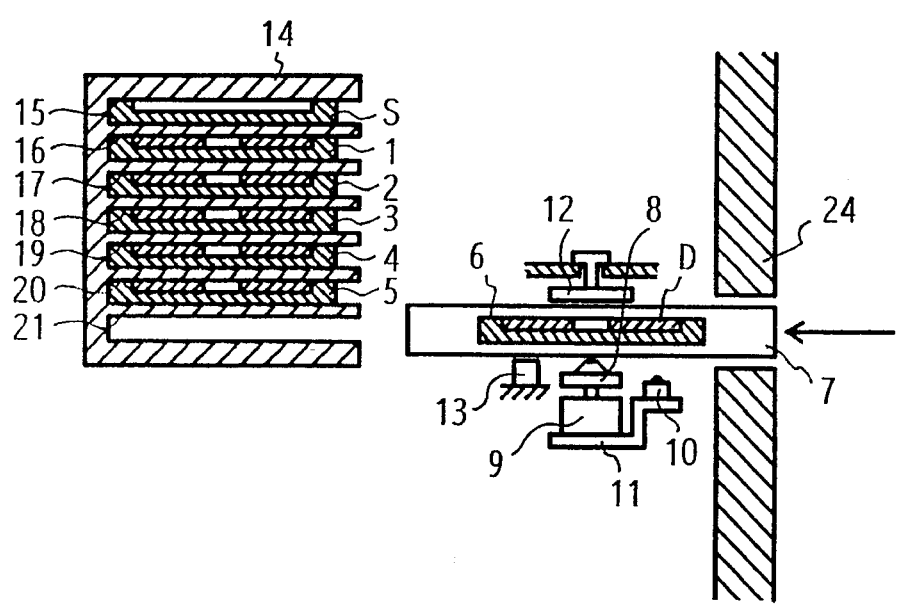
Figure 23Q:
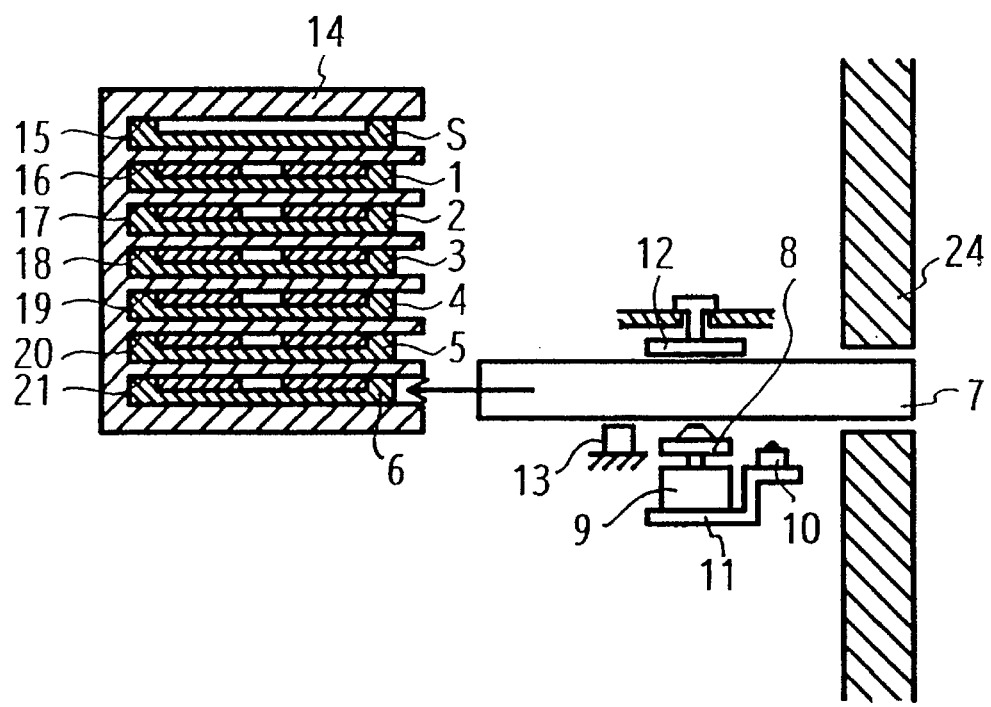

A disc D is placed in carriage 6 by an operator, as shown in FIG. 23O and, when stock switch 41 is operated, microcomputer 40 performs the program steps necessary to move tray 7, with disc D bearing carriage 6, to the load position by subroutine L9 as shown in FIG. 23P. Carriage 6 is then moved from the load position in tray 7 to the store position in stocker 14, shown in FIG. 23Q.

As previously discussed, once microcomputer 40 detects that tray 7 has been moved to the load position the presence of a disc on the carriage is determined and, when a disc is present, the information is stored. As a result, the data regarding discs D(1) through D(6) at this time are 1, confirming that a disc is present in all carriages 1 to 6.

Figure 23R:
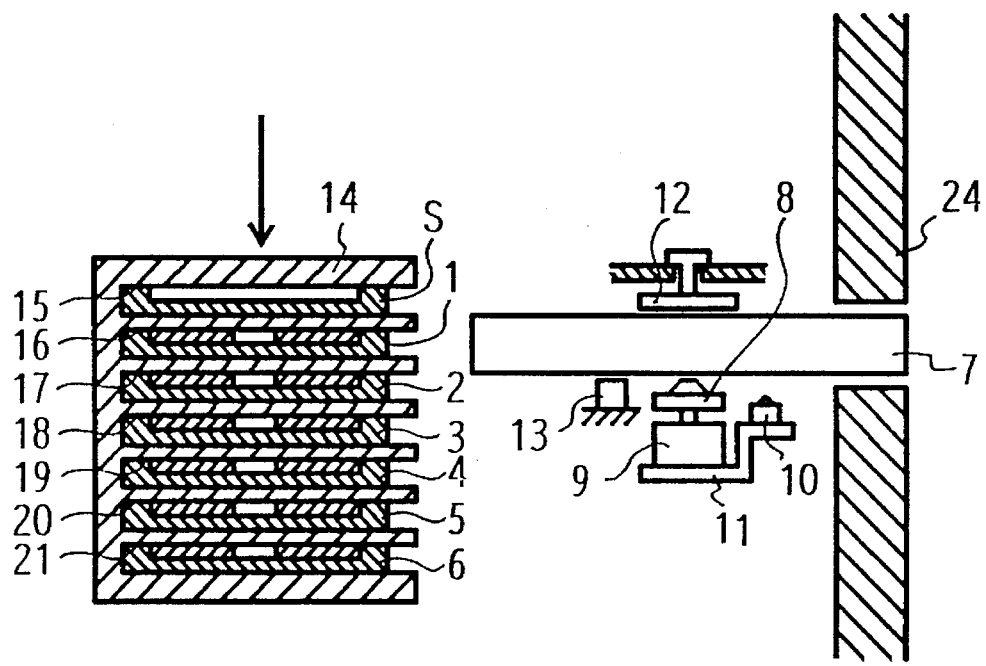
Figure 23S:
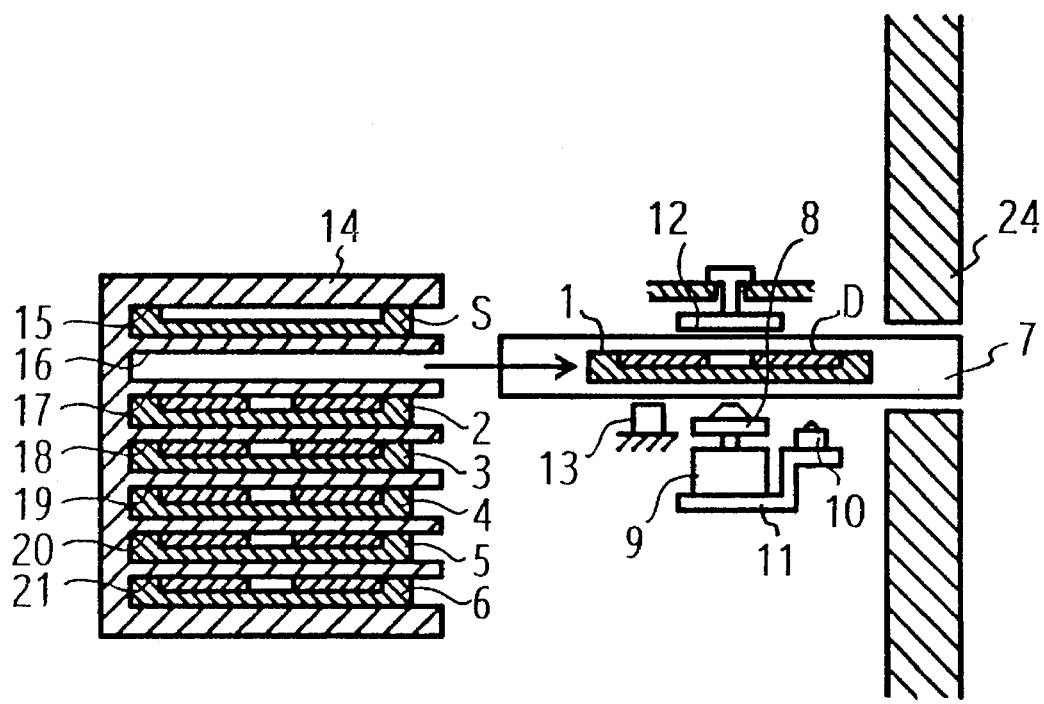

Following this, when microcomputer 40 enters a loop of program steps S163 to S165, by way of steps S161 and S162, n becomes 7 and step S165 becomes YES (FIG. 18A). Microcomputer 40 reaches subroutine L3 through step S166, moving stocker 14 to position 1, as shown in FIG. 23R. Subroutine L4 then moves carriage 11 to the load position, as shown in FIG. 23S.

Figure 23T:
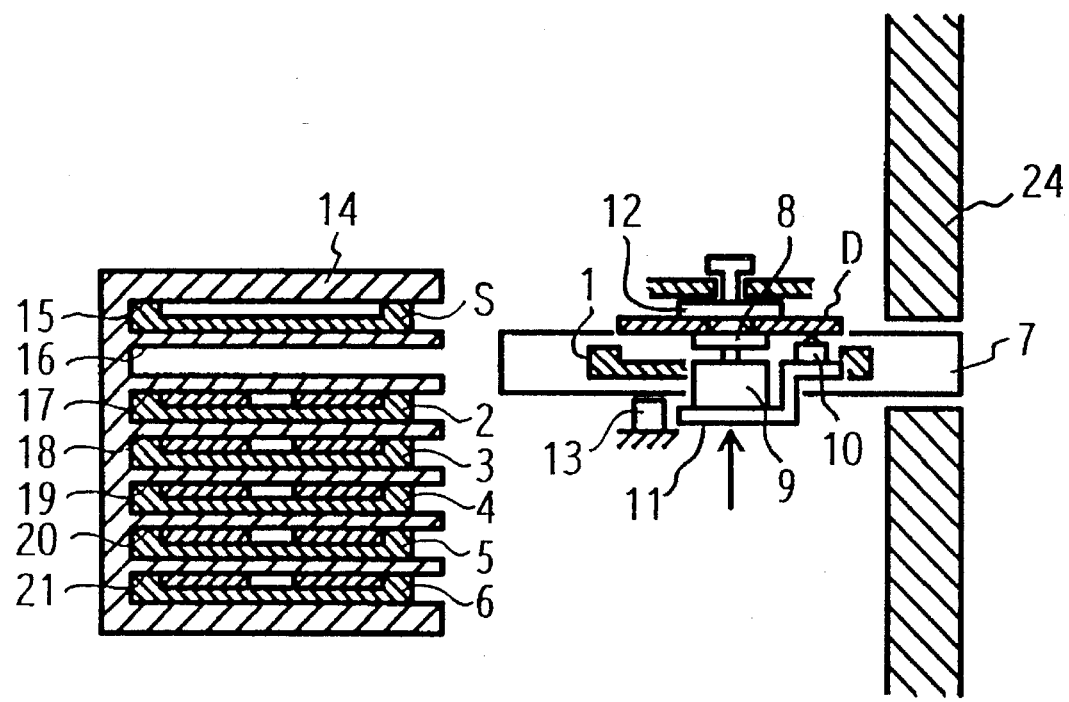

Subsequently, when microcomputer 40 reaches subroutine L7, optical head base 11 is moved to the up position as shown in FIG. 23T to detect a mode switch operation.

OPERATING EXAMPLE 2

Operating example 2 is described with reference to FIGS. 1, 5, 18A and 24A through 24F.

Figure 24C:
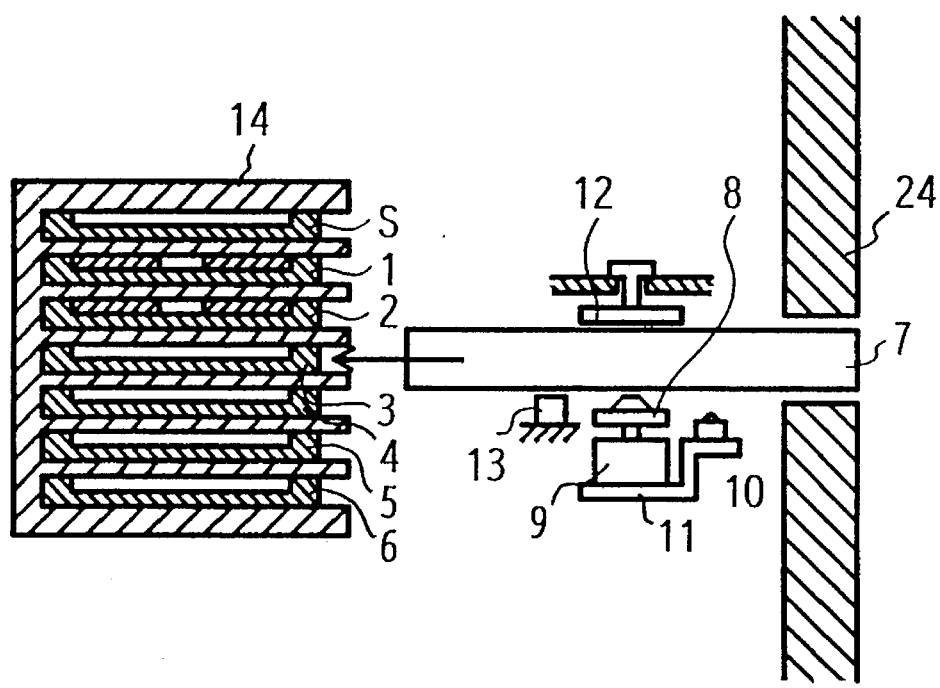
Figure 24D:
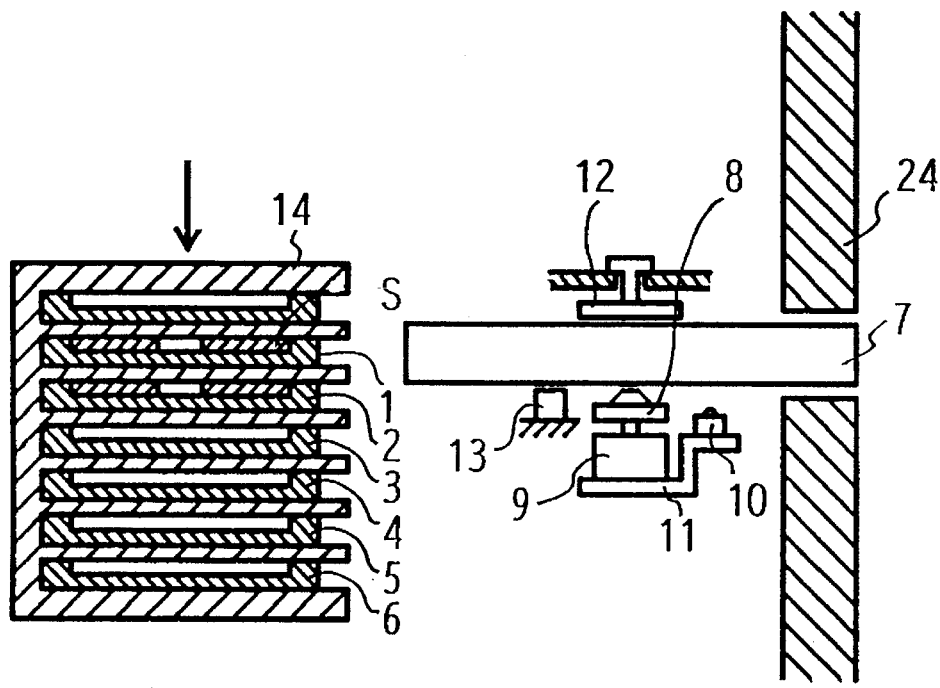

When stock switch 41 is operated and tray 7 with carriage 3 is in the eject position, and discs are stored only in carriages 1 and 2 in stocker 14, as shown in FIG. 24A, microcomputer 40 reaches program steps S150, S160 and subroutine L9 in the eject mode (FIG. 18A). Tray 7 is moved to the load position shown in FIG. 24B. Carriage 3 is then moved from the load position in tray 7 to the store position in stocker 14 shown in FIG. 24C.

Once microcomputer 40 detects, in subroutine L9, that tray 7 is in the load position, carriage 1 is searched for the presence of a disc. Because there is disc in carriage 1 already, and this information is stored as D(1) is 1, microcomputer 40 performs steps S161, S167, S168 and subroutine L3, moving stocker 14 to position 1 as, shown in FIG. 24D.

Figure 24E:
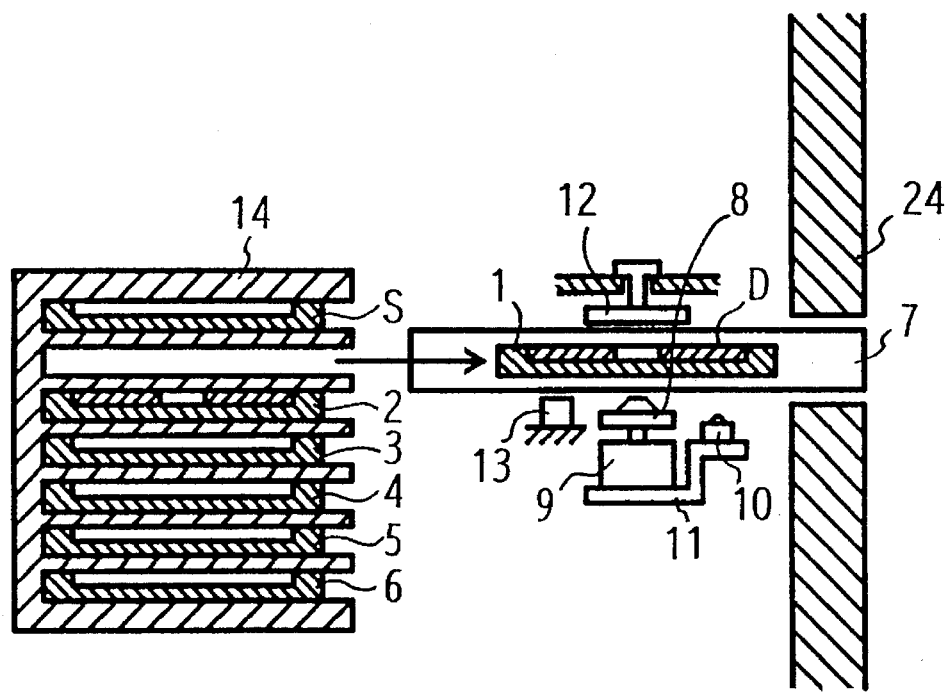
Figure 24F:
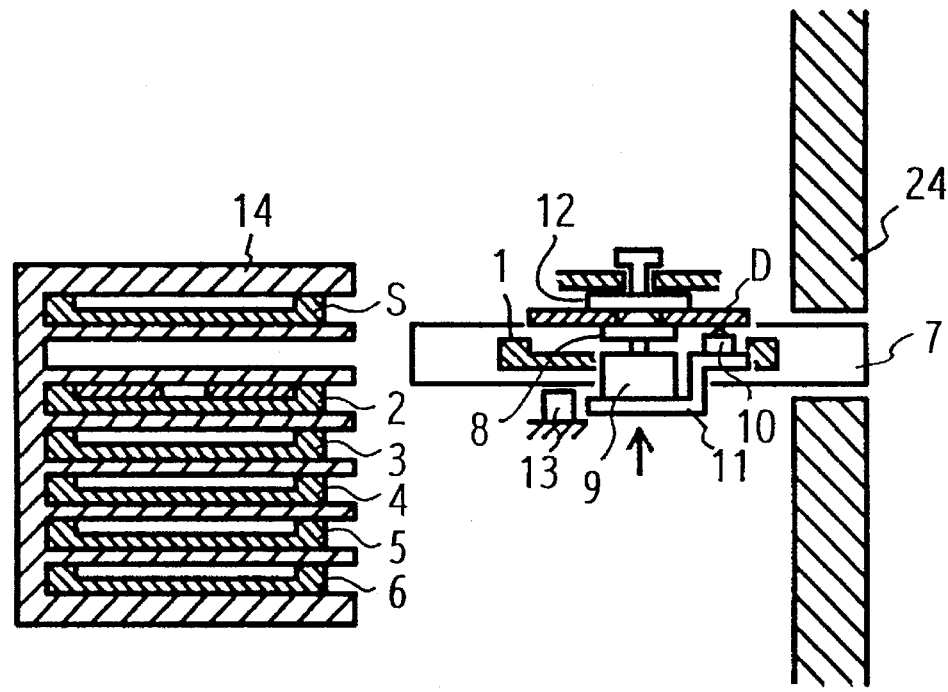

When microcomputer 40 is at subroutine L4, carriage 1 is moved to the load position shown in FIG. 24E, and optical head base 11 is moved to the up position as shown in FIG. 24F. Then, microcomputer 40 enters the stop mode (FIGS. 9A through 9D) to monitor the operation of stock switch 41, eject/load switch 42, play switch 43, carriage S selection switch 45, and carriages 1–6 selection switch 46.

OPERATING EXAMPLE 3

Operating example 3 is described with reference to FIGS. 1, 5, 18A and 25A through 25F.

Figure 25C:
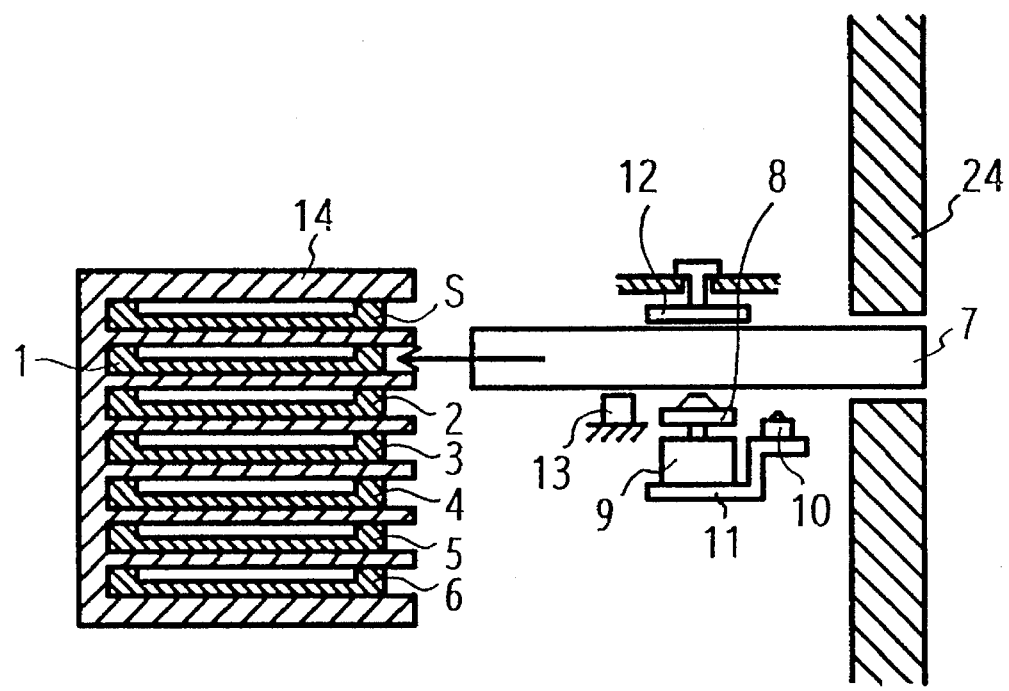

FIG. 25A shows tray 7 with carriage 1 installed in the eject position. As shown in the figure, there are no discs stored in carriages S, or 1 through 6. When stock switch 41 is operated, microcomputer 40 performs steps S150, S160 and subroutine L9 of the eject mode (FIG. 18A), moving tray 7 to the load position (FIG. 25B), and carriage 1 to the store position (FIG. 25C).

Figure 25D:
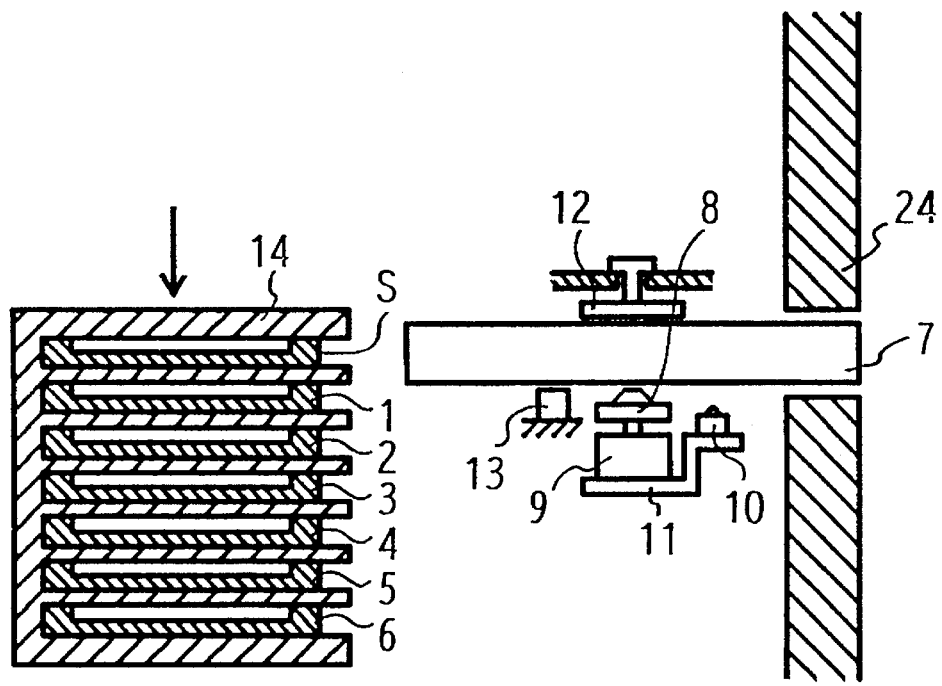

When microcomputer 40 detects in subroutine L9 that tray 7 is in the load position, the absence of a disc in carriage 1 is detected. With no disc on the carriage D(1)=0 is stored by microcomputer 40. Microcomputer 40 then performs steps S161, S167 through S170 and subroutine L8, and stocker 14 is moved to position S as shown in FIG. 25D.

Figure 25E:
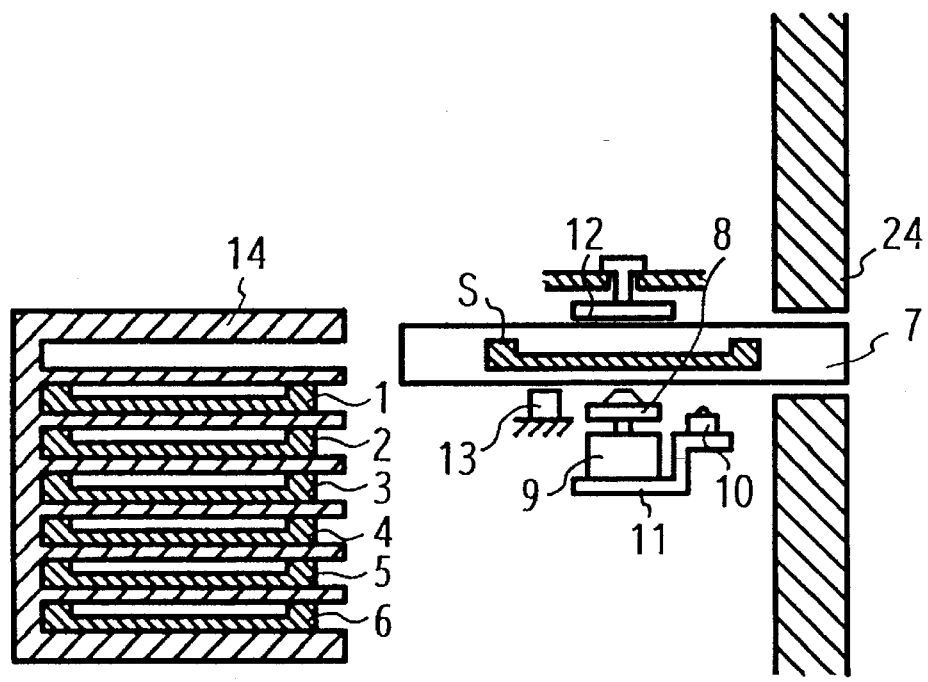
Figure 25F:
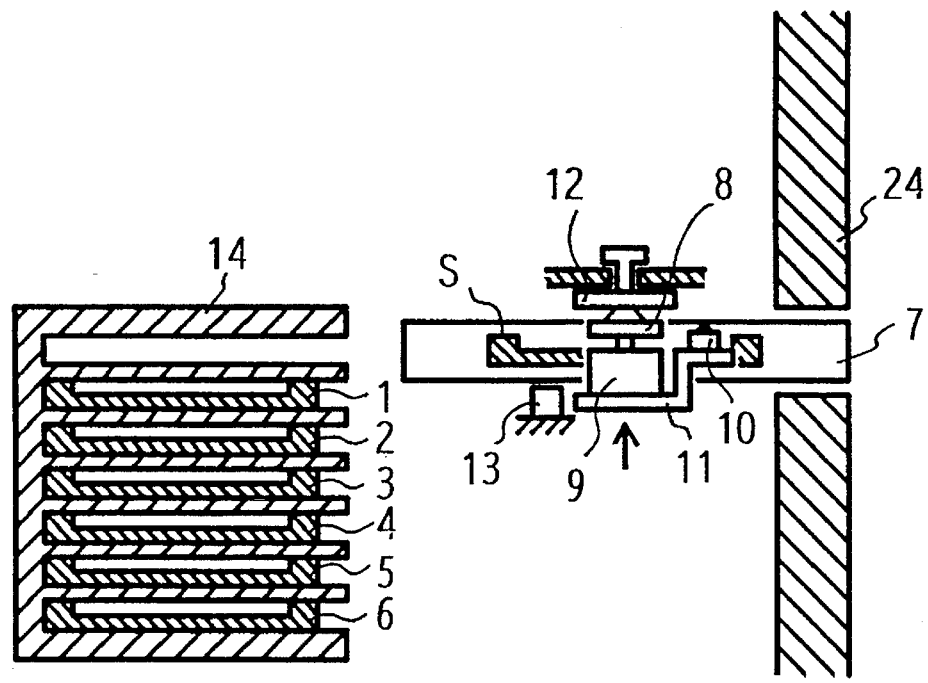

Microcomputer 40 then performs subroutine L4, moving single play carriage S to the load position (FIG. 25E). Optical head base 11 is moved to the up position (FIG. 25F) by subroutine L7. With optical head base 11 in the up position, microcomputer 40 enters the stop mode (FIGS. 9A through 9D) to detect the operation of stock switch 41, eject/load switch 42, play switch 43, carriage S selection switch 45, and carriages 1–6 selection switch 46.

OPERATING EXAMPLE 4

Operating example 4 is described with reference to FIGS. 1, 5, 21A and 26A through 26G.

Figure 26A:
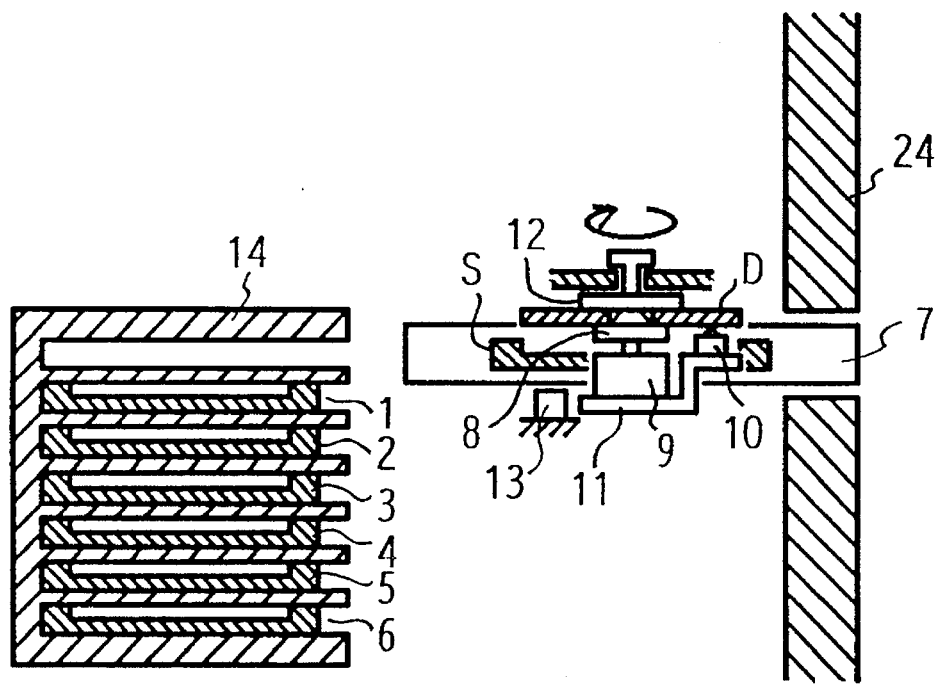
Figure 26B:
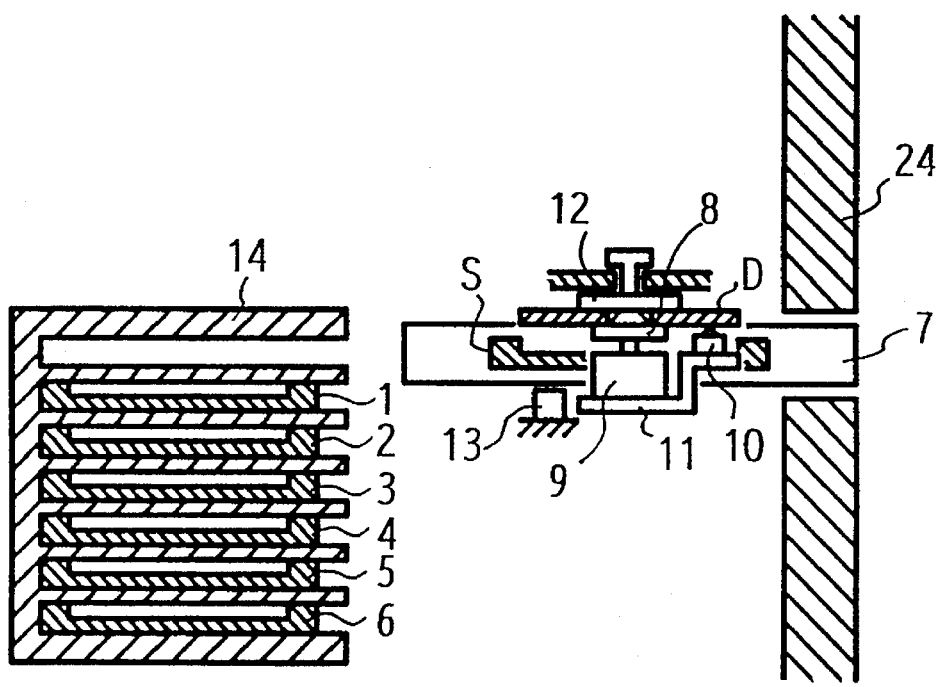
Figure 26C:
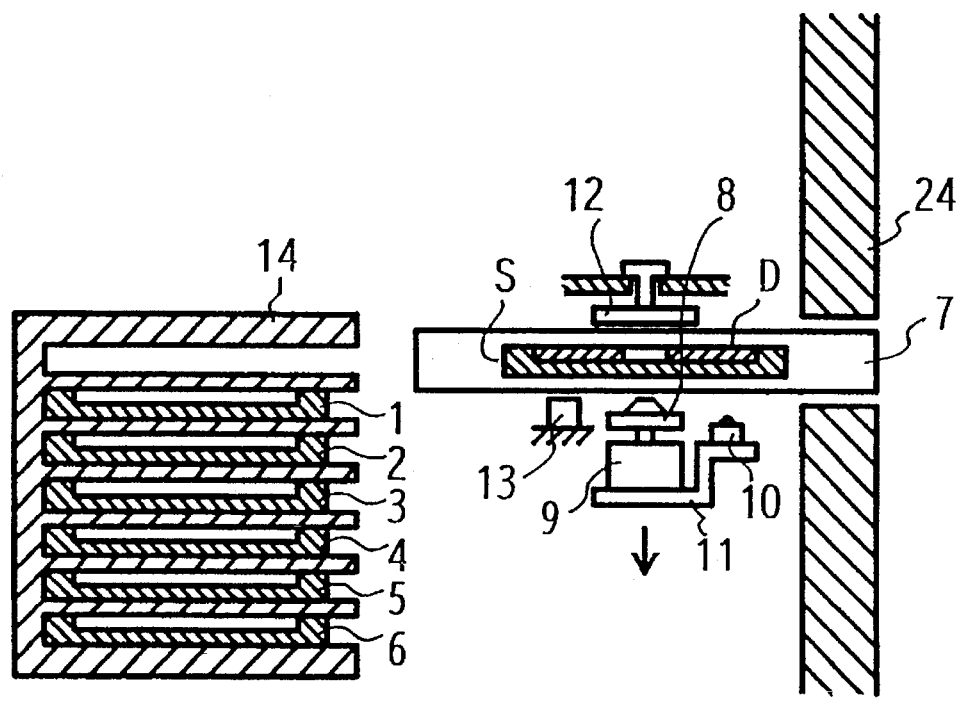
Figure 26D:
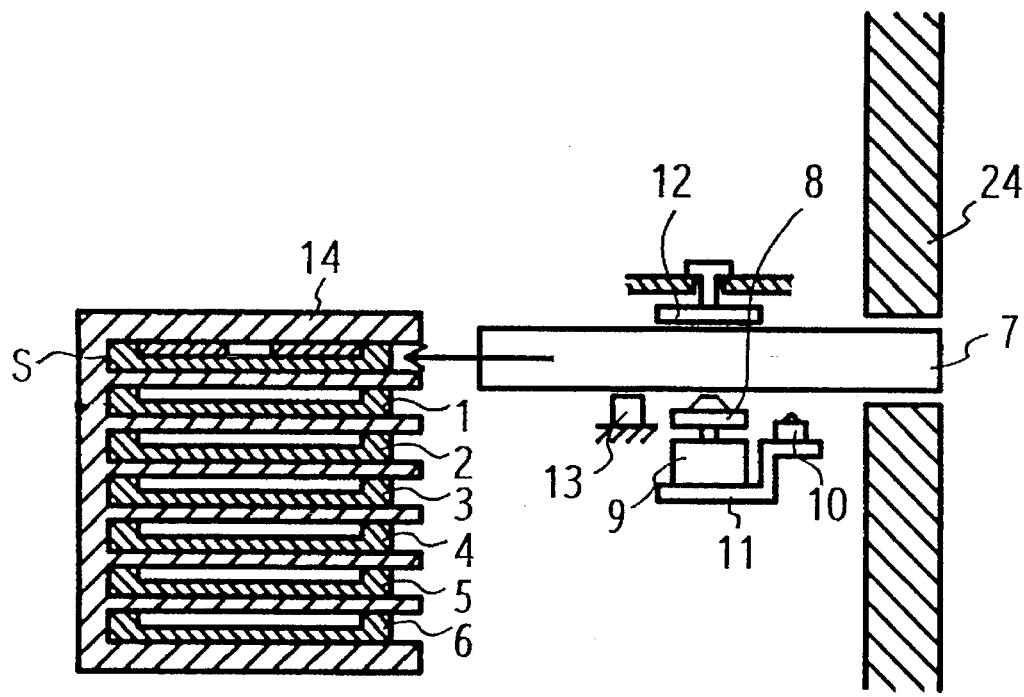

When there are no discs mounted in carriages 1 through 6, and a disc in single play carriage S is being played back, as shown in FIG. 26A, operating stock switch 41 causes microcomputer 40 to perform steps S230, S240, S241, and S244 of the play mode (FIG. 21A). This stops the playback of the disc as shown in FIG. 26B. Microcomputer 40 then performs subroutine L1 to move optical head base 11 to the down position shown in FIG. 21C. Then, single play carriage S is moved from the load position in tray 7 to the store position in stocker 14, as shown in FIG. 26D.

Figure 26E:
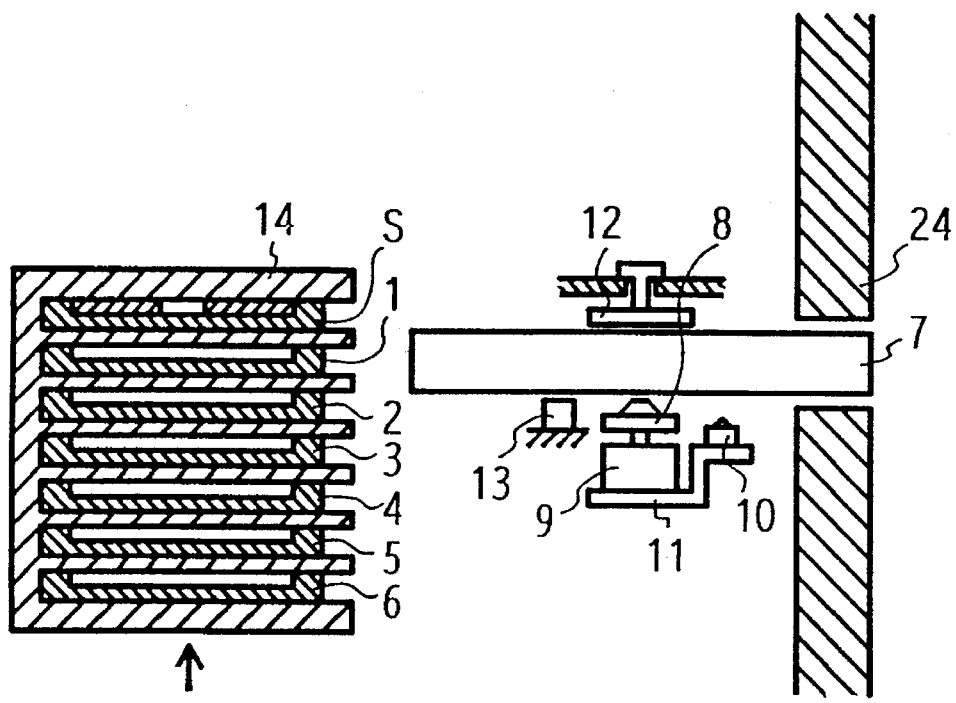
Figure 26F:
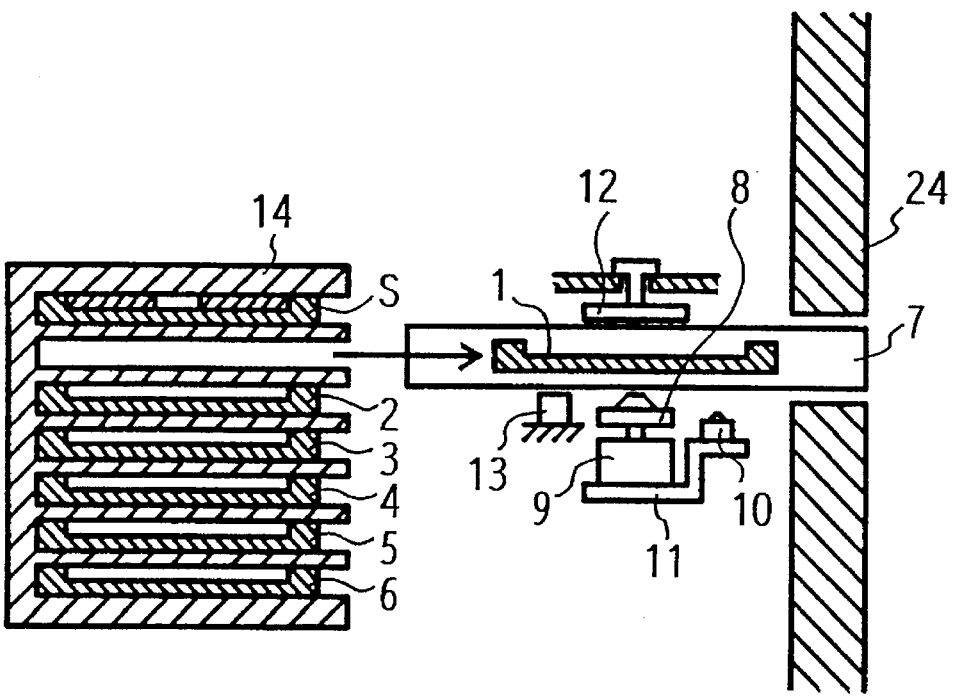
Figure 26G:
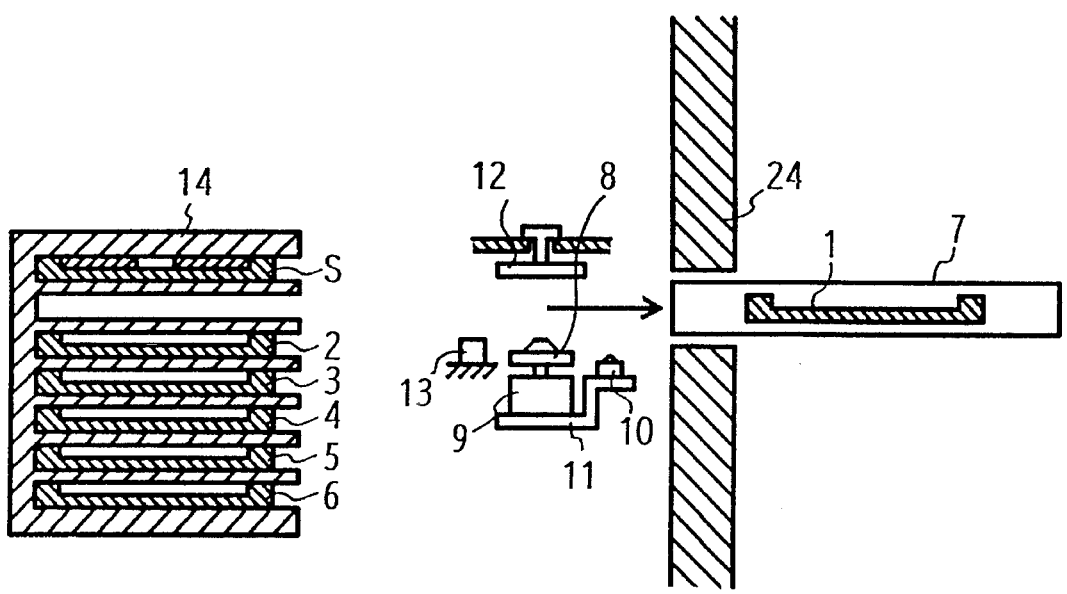

When microcomputer 40 performs subroutine L3, stocker 14 is moved to position 1, as shown in FIG. 26E, and carriage 1 is moved to the load position by subroutine L4 as shown in FIG. 26F. Microcomputer 40 then performs subroutine L5, unlocking tray 7. Tray 7 with carriage 1 installed, is then moved to the eject position by subroutine L6 as shown in FIG. 26G. At the completion of subroutine L6, microcomputer 40 proceeds with the eject mode (FIGS. 18A through 18C).

As will be understood from examples 1 through 4, microcomputer 40 causes tray 7 to move to the load position in response to the operation of stock switch 41. Once microcomputer 40 detects that a disc has been placed in the carriage in tray 7, the carriage is moved to its storage position by microcomputer 40. Then, the empty carriage having the next lowest sequence number, 1 through 6, is moved from stocker 14 to tray 7. Tray 7 is then moved to the eject position to allow the installed carriage to be loaded with a disc.

When there is a disc in all of carriages 1 to 6 in stocker 14 for changer-play operation, carriage 1 is inserted in tray 7, and optical head base 11 is moved to the up position for disc playback.

If microcomputer 40 detects that tray 7 is in the load position in response to the operation of stock switch 41, but there is no disc in the carriage installed in tray 7, the empty carriage is moved to its store position in stocker 14, and the lowest numbered carriage 1 through 6 holding a disc is moved to tray 7. Then, optical head base 11 is moved to the up position for disc playback.

If none of carriages 1 through 6 is holding a disc, single play carriage S is moved to the load position in tray 7, and optical head base 11 is moved to the up position.

OPERATING EXAMPLE 5

Operating example 5 is described with reference to FIGS. 1, 5, 6, 9A, 18B and 27A through 27F.

Figure 27A:
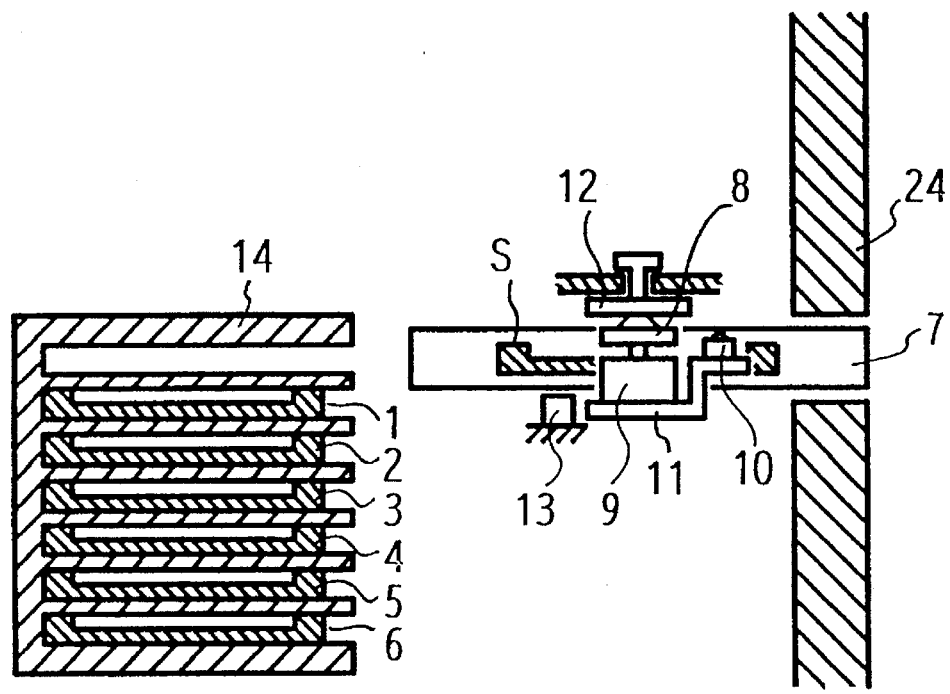
Figure 27B:
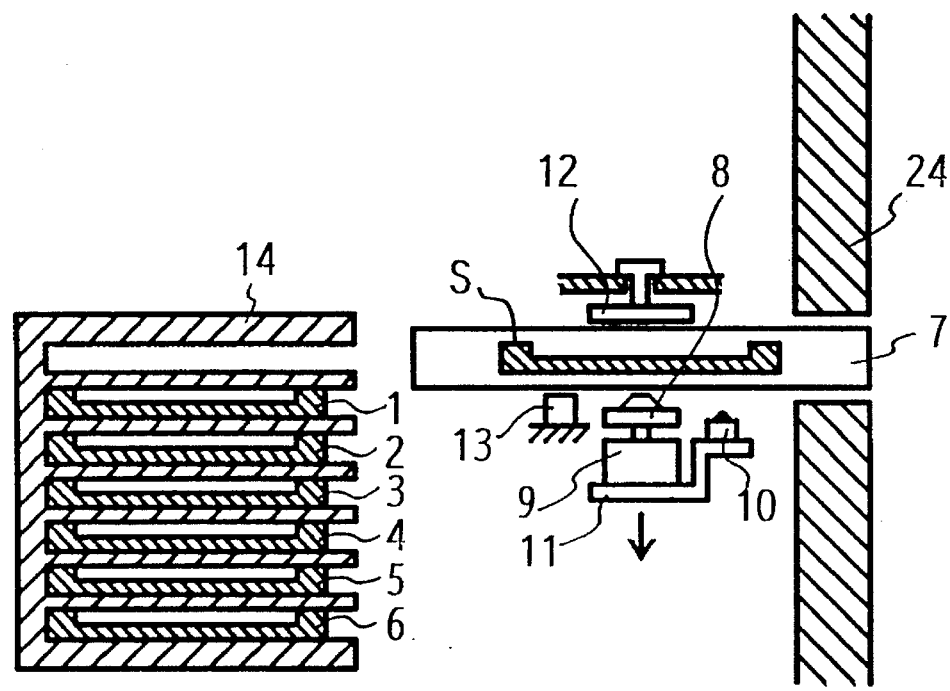
Figure 27C:
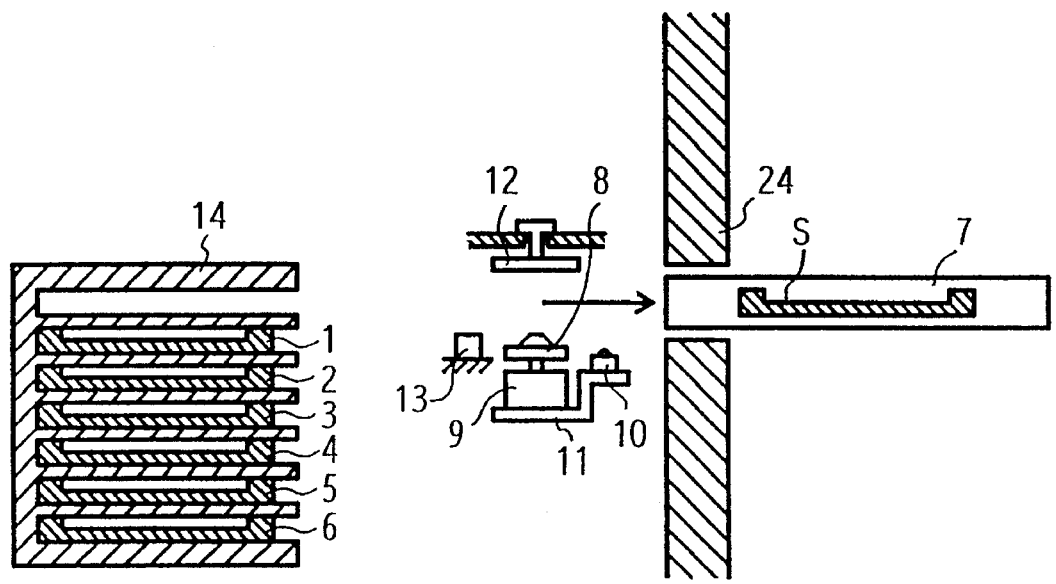

With single play carriage S installed in tray 7 in the load position and all carriages, S and 1 through 6, are empty, as shown in FIG. 27A, operating eject/load switch 42 causes microcomputer 40 to perform steps S2 and subroutine L1 of the stop mode (FIG. 9A). This causes optical head base 11 to move to the down position, as shown in FIG. 27B. Tray 7 is then unlocked by subroutine L5, and tray 7 with single play carriage S, is moved to the eject position by subroutine L6, as shown in FIG. 27C.

Figure 27D:
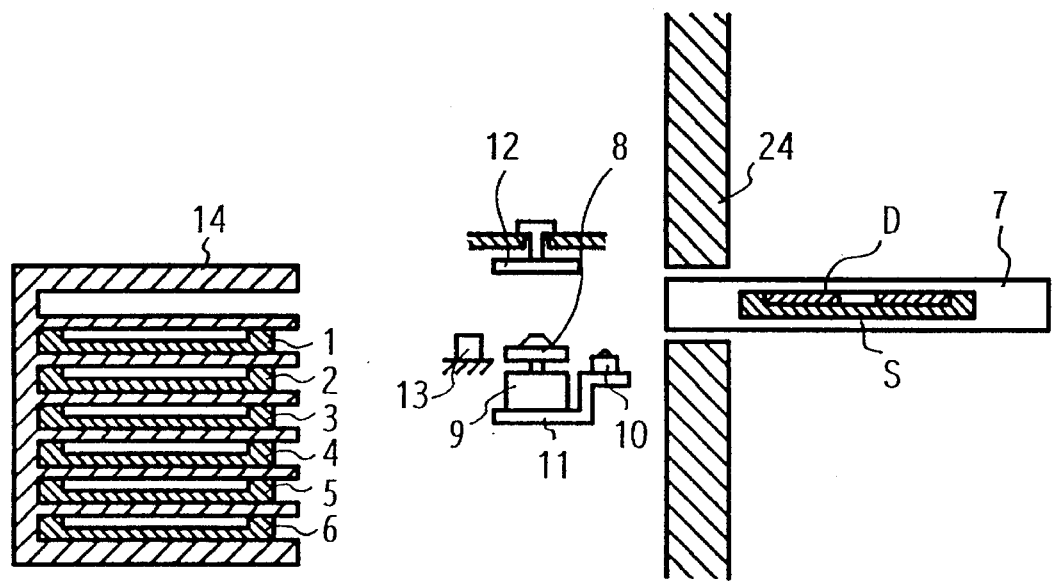
Figure 27E:
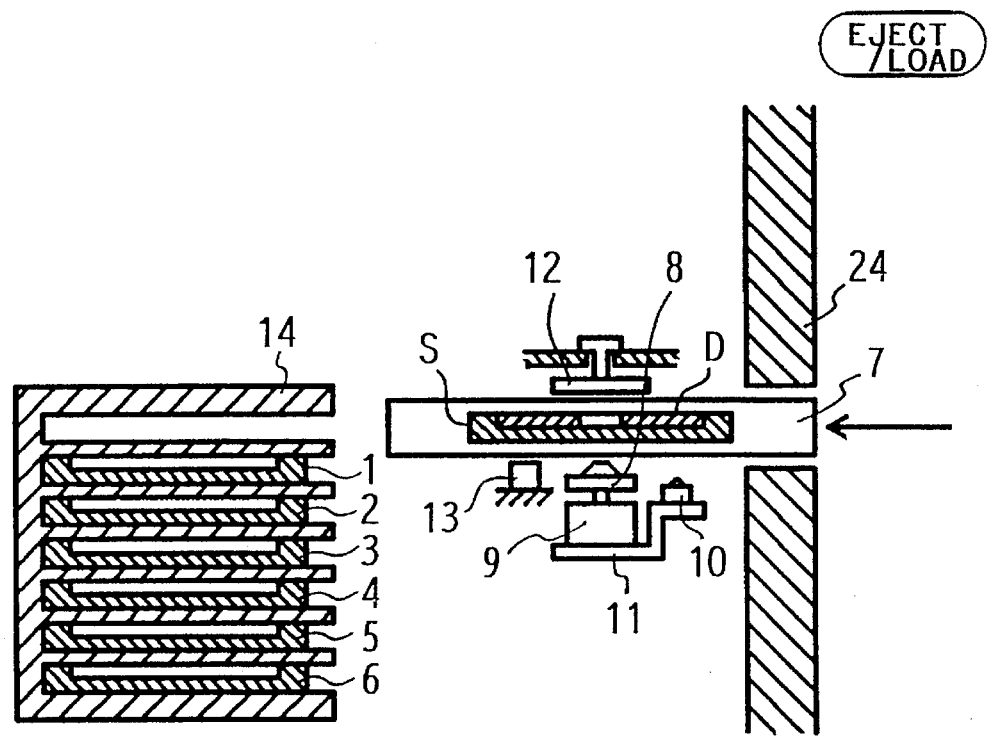

When disc D is placed in single play carriage S by an operator, as shown in FIG. 27D, and eject/load switch 42 is again operated, microcomputer 40 performs step S151 and subroutine L10 of the eject mode (FIG. 18B). Tray 7 is decelerated as it moves through area S2 (FIG. 6) to the load position as shown in FIG. 27E.

When microcomputer 40 detects that tray 7 has been moved to the load position, the presence of disc D on single play carriage S is detected in step S210. Microcomputer 40 stores this data as D(0)=1 is step 217.

Figure 27F:
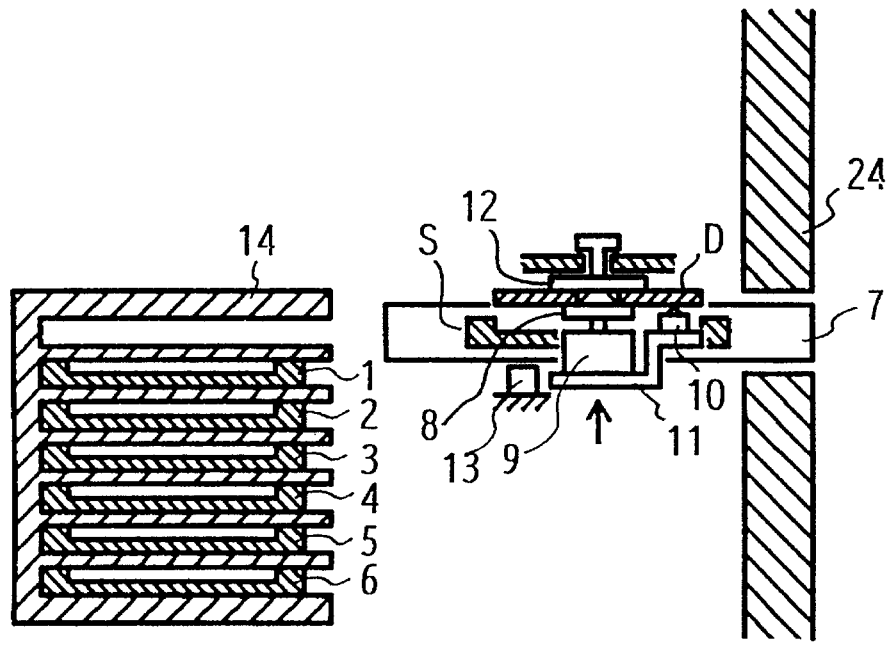

When microcomputer 40 performs subroutine L7, optical head base 11 is moved to the up position to lock disc D in a play position, as shown in FIG. 27(F). Then, microcomputer 40 moves to the stop mode (FIGS. 9A through 9D) to monitor the operation of stock switch 41, eject/load switch 42, play switch 43, carriage S selection switch 45, and carriages 1–6 selection switch 46.

OPERATING EXAMPLE 6

Operating example 5 is described with reference to FIGS. 1, 5, 18B and 28A through 28C.

Figure 28A:
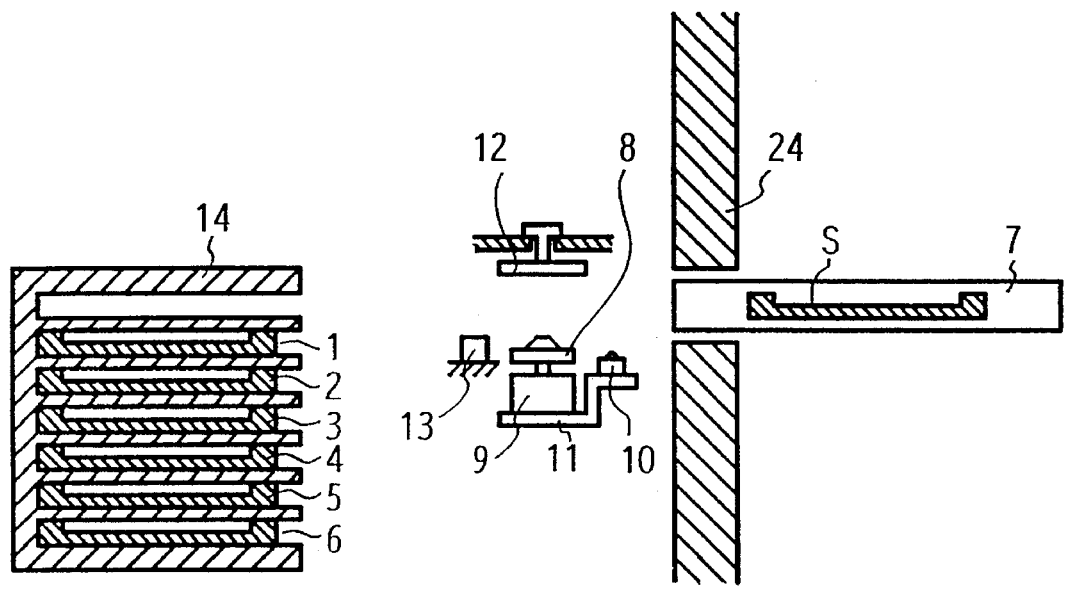
Figure 28B:
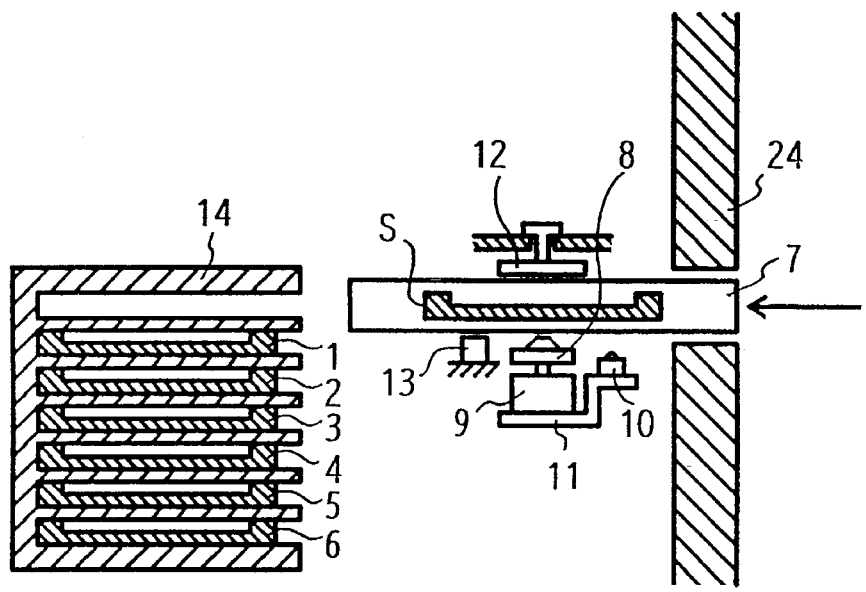

When all carriages S and 1 through 6 are empty and tray 7 with single play carriage S installed is in the eject position, as shown in FIG. 28A, the operation of eject/load switch 42 causes microcomputer 40 to perform step S151 and subroutine L10 in the eject mode (FIG. 18B). Tray 7 is decelerated as it move through area S2 (FIG. 6) to the load position, as shown in FIG. 28B.

When microcomputer 40 detects that tray 7 is in the load position, step S210 determines whether or not there is a disc in single play carriage S. If single play carriage S is empty, the data is stored as D(0)=0.

Figure 28C:
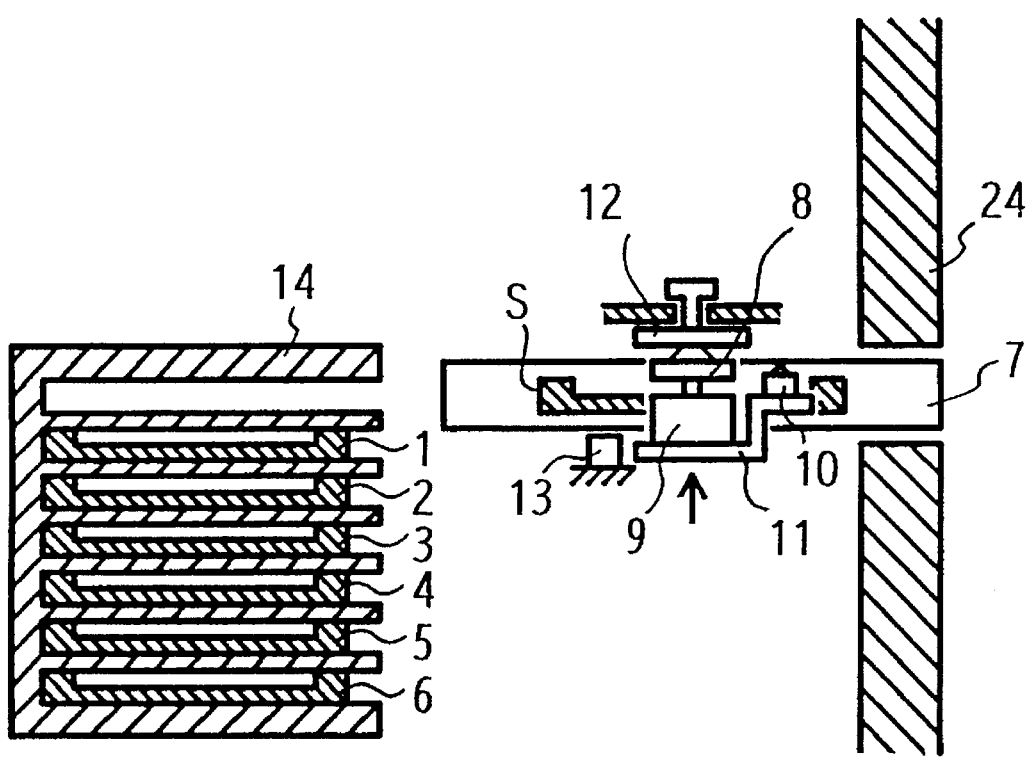

When microcomputer 40 performs subroutine L7, optical head base 11 is moved to the up position, as shown in FIG. 28C. Microcomputer 40 then moves to the stop mode (FIG. 9A through 9D) to monitor the operation of stock switch 41, eject/load switch 42, play switch 43, carriage S selection switch 45, and carriages 1–6 selection switch 46.

OPERATING EXAMPLE 7

Operating example 7 is described with reference to FIGS. 1, 5, 9A and 29A through 29R.

Figure 29A:
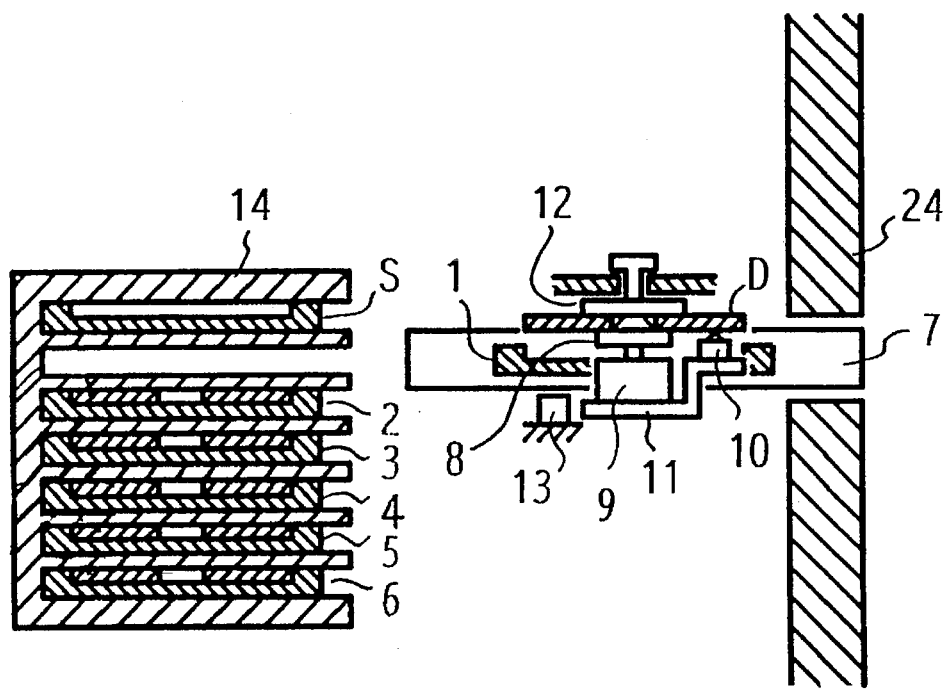

In this example, discs D are held in carriages, 1 through 6, tray 7 with carriage 1 installed, is in the load position, and optical head base 11 is in the up position as shown in FIG. 29A.

Figure 29B:
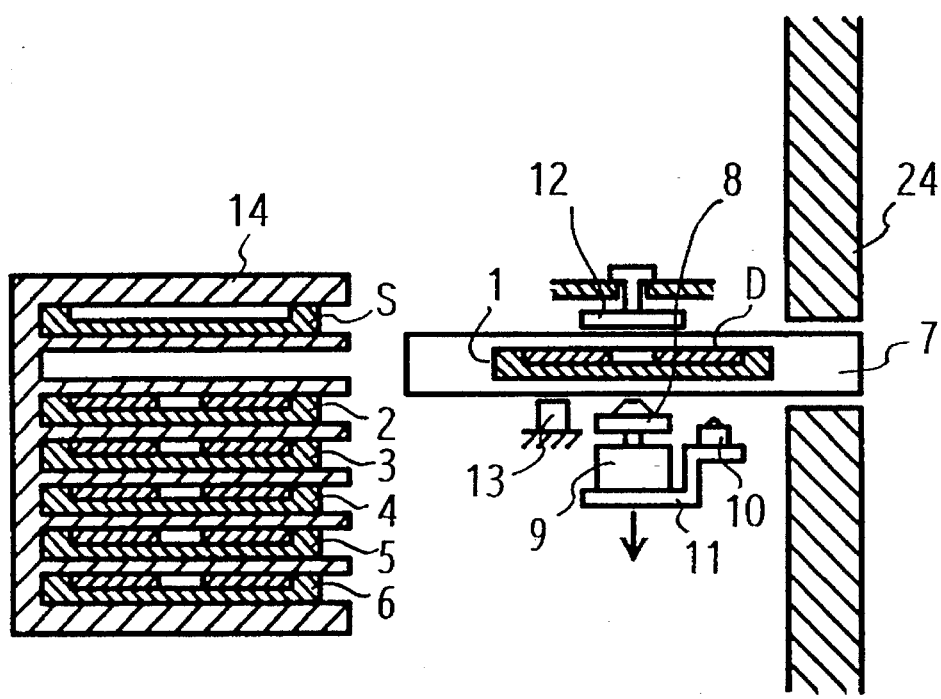
Figure 29C:
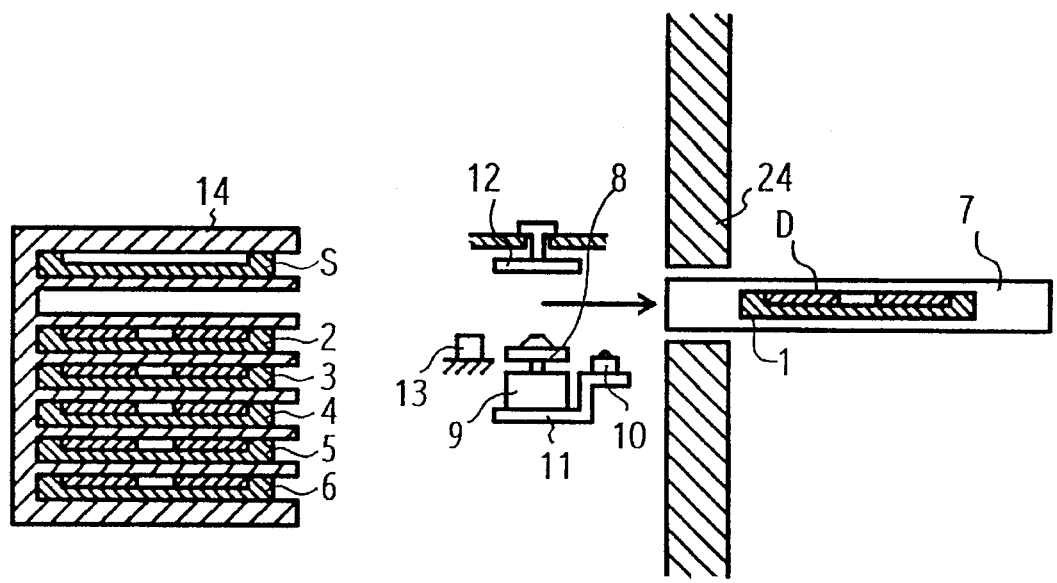

When eject/load switch 42 is operated, microcomputer 40 performs step S2 and subroutine L1 of the stop mode (FIG. 9A), moving optical head base 11 to the down position, as shown in FIG. 29B. Subroutine L5 unlocks tray 7 and subroutine L6 then moves tray 7, with carriage 1 installed, to the eject position, as shown in FIG. 29C.

Figure 29D:
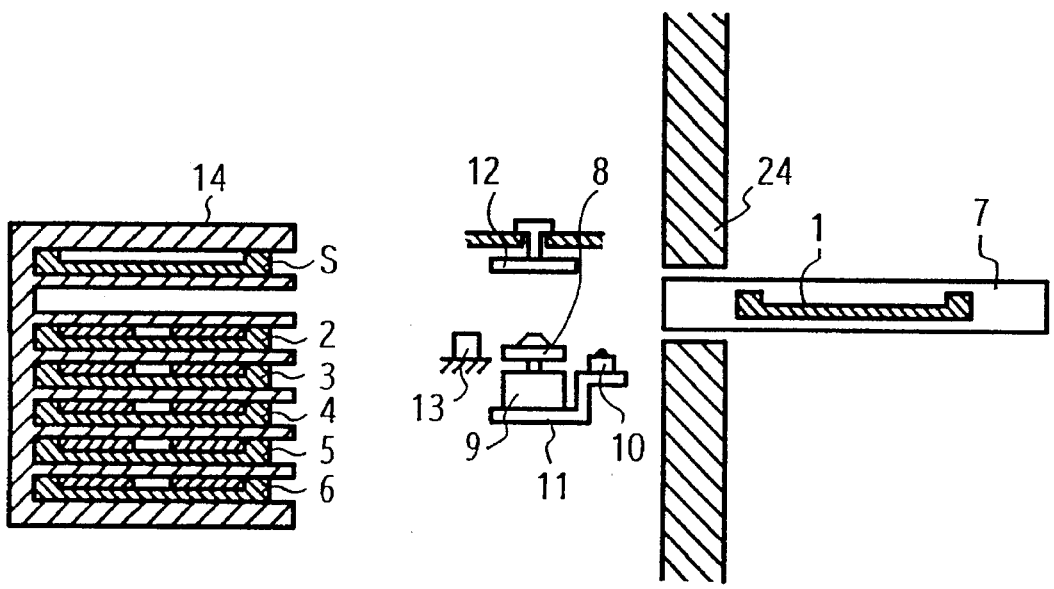
Figure 29E:
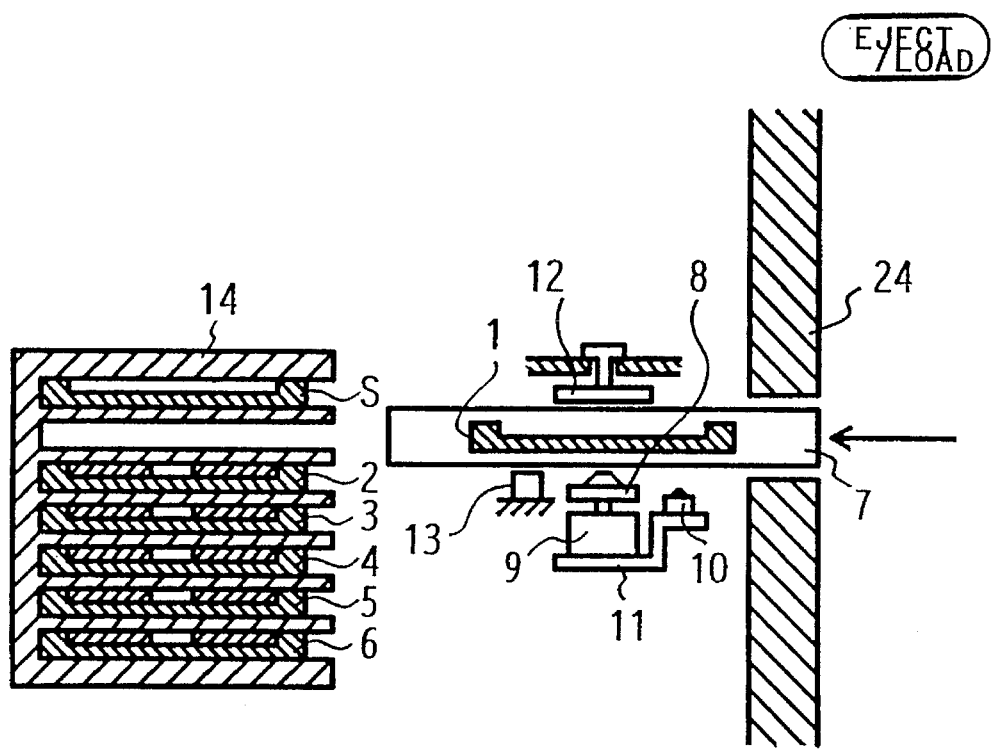

Disc D is removed from carriage 1 as shown in FIG. 29D. When eject/load switch 42 is again operated, microcomputer 40 performs step S151 and subroutine L10 of the eject mode (FIG. 18B). Tray 7 is decelerated in area S2 (FIG. 6), as it is moved to the load position, as shown in FIG. 29E.

When microcomputer 40 detects that tray 7 is in the load position, step S210 determines whether or not there is a disc in carriage 1. If carriage 1 is empty, the data is stored as D(1)=0 in step S211.

Figure 29F:
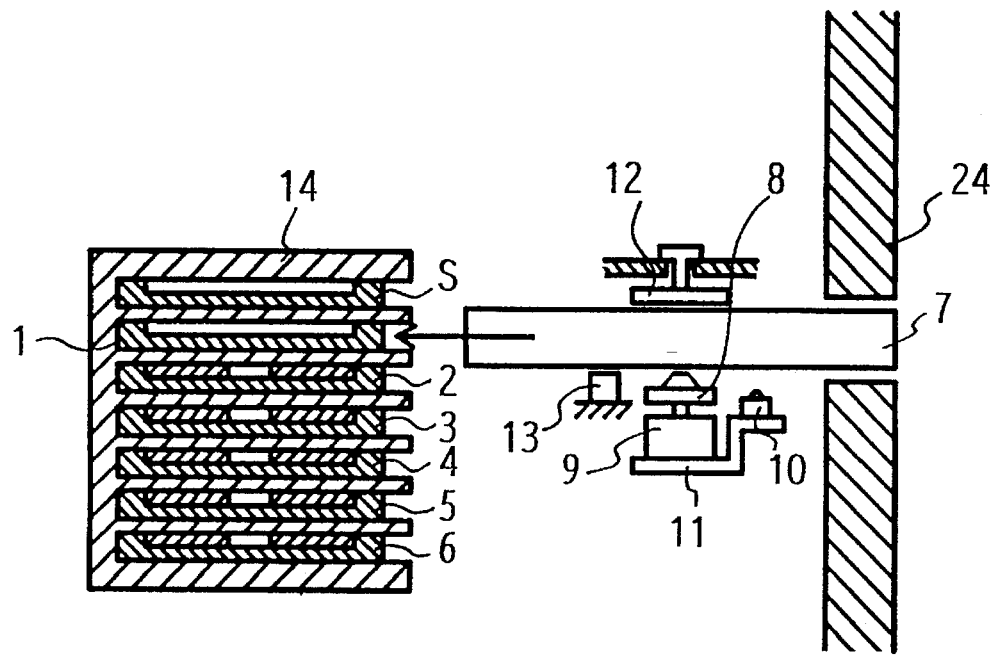

Microcomputer 40 then performs step S212 and subroutine L2, and carriage 1 is moved from the load position in tray 7 to its store position in stocker 14, as shown in FIG. 29F.

Figure 29G:
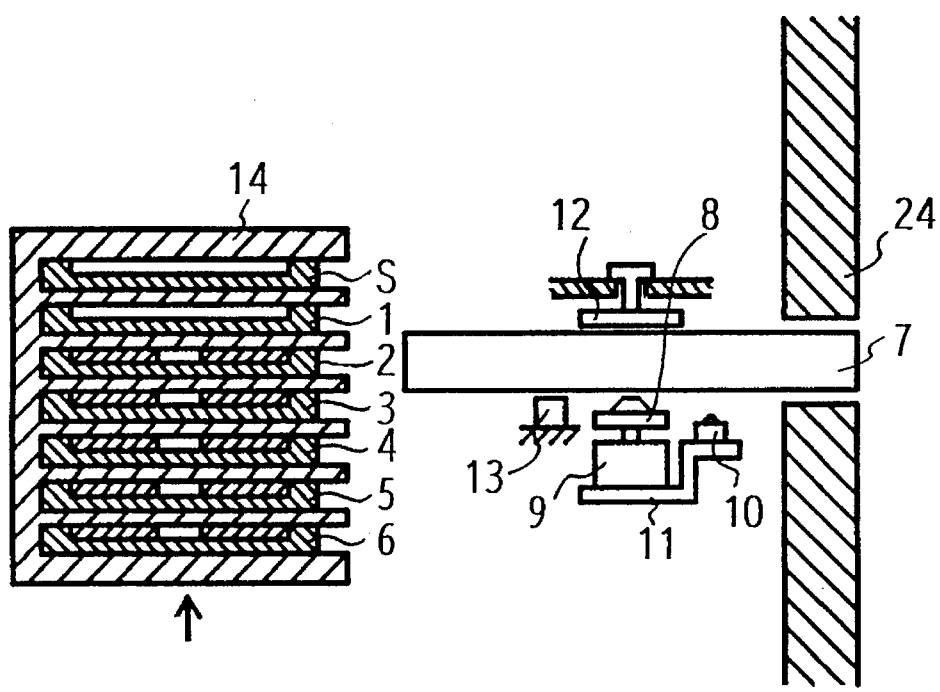
Figure 29H:
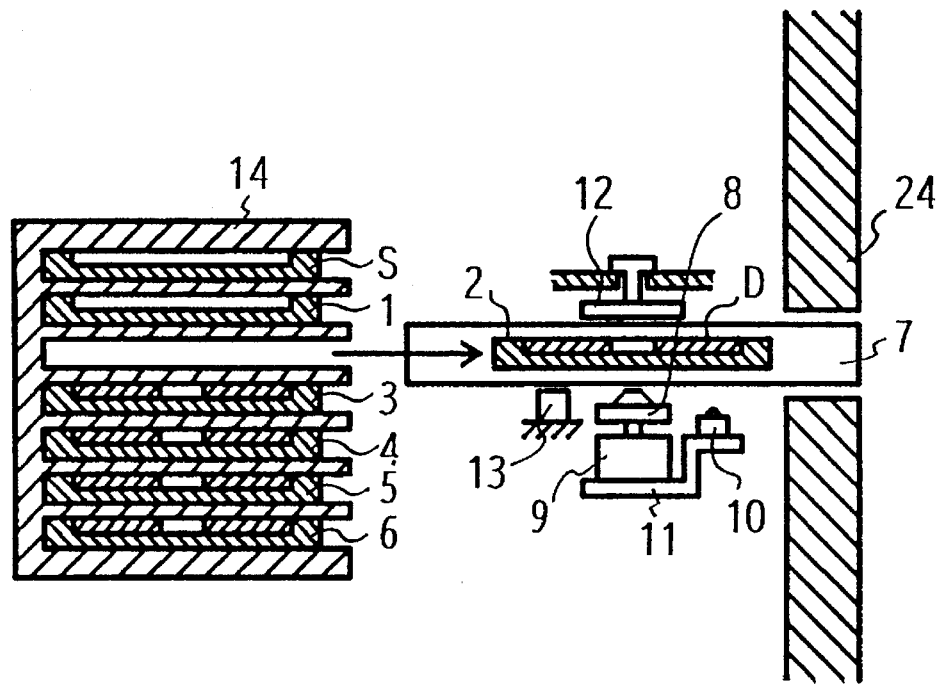
Figure 29I:
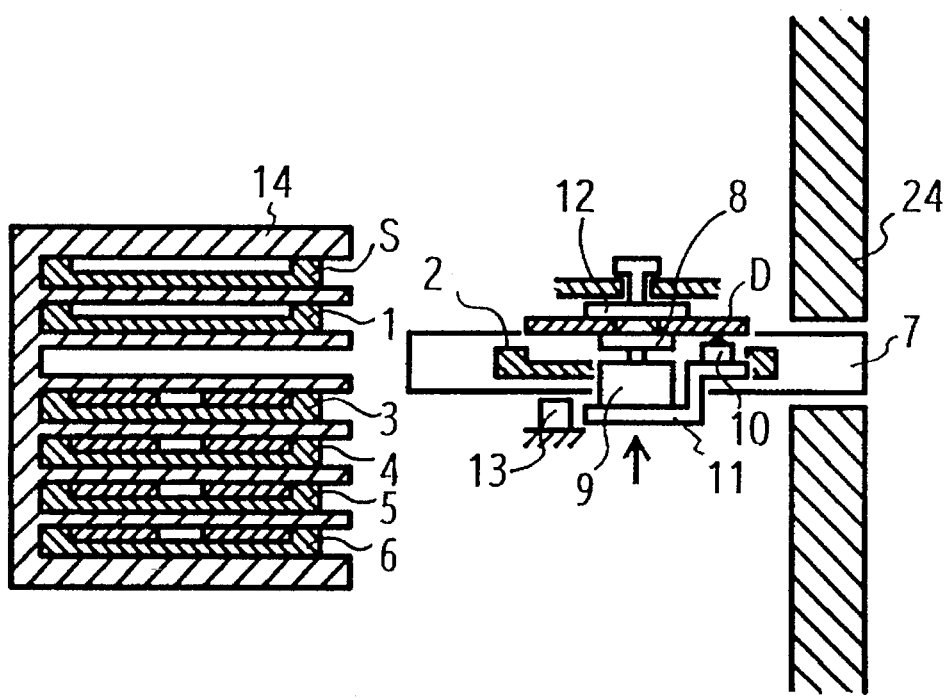

Subsequently, when microcomputer 40 enters the loop of steps S214 to S216 after performing S213, n is set to 2 and step S214 becomes YES. Stocker 14 is then moved to position 2 by subroutine L3 as shown in FIG. 29G. Subroutine L4 then moves carriage 2 to the load position, as shown in FIG. 29H, and optical head base 11 is moved to the up position by subroutine L7 to lift disc D as shown in FIG. 29I.

Figure 29J:
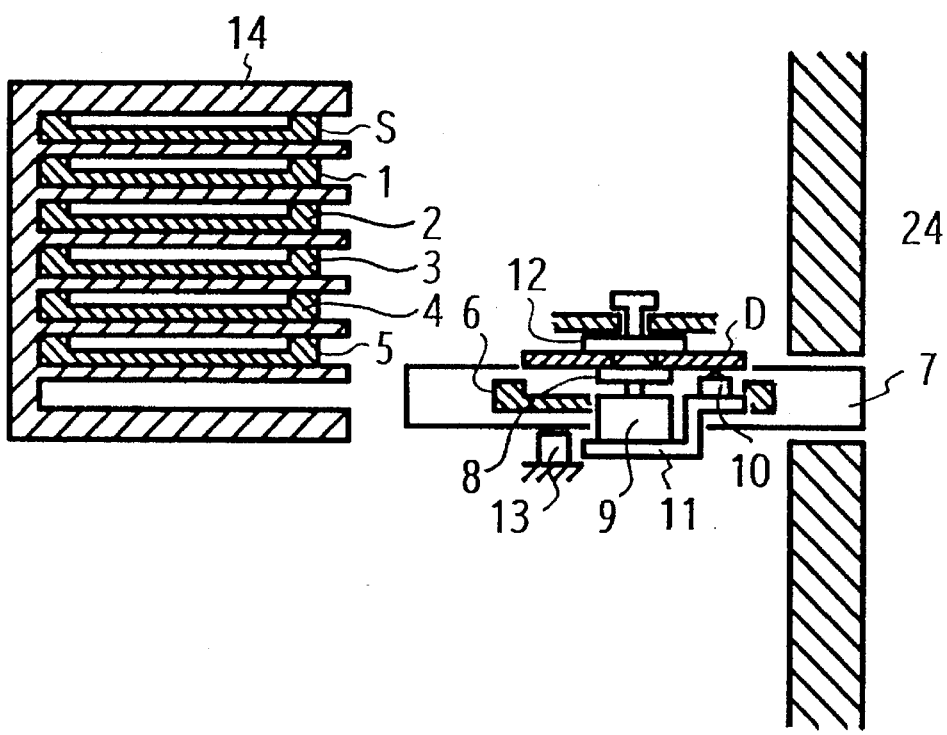

The routine described above is repeated until discs D have been removed from carriages 1 through 5, and carriage 6 is in tray 7 in the load position with optical head base 11 in its up position as shown in FIG. 29J.

Figure 29K:
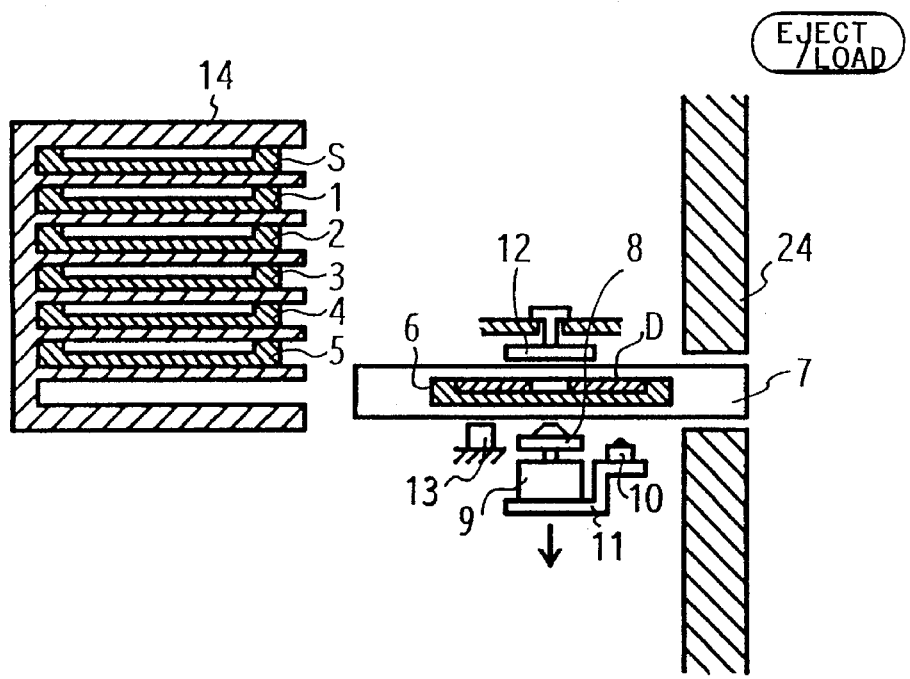

When eject/load switch 42 is again operated, microcomputer 40 performs step S2 and subroutine L1 of the stop mode in FIG. 9A, and optical head base 11 is moved to the down position as shown in FIG. 29K.

Figure 29L:
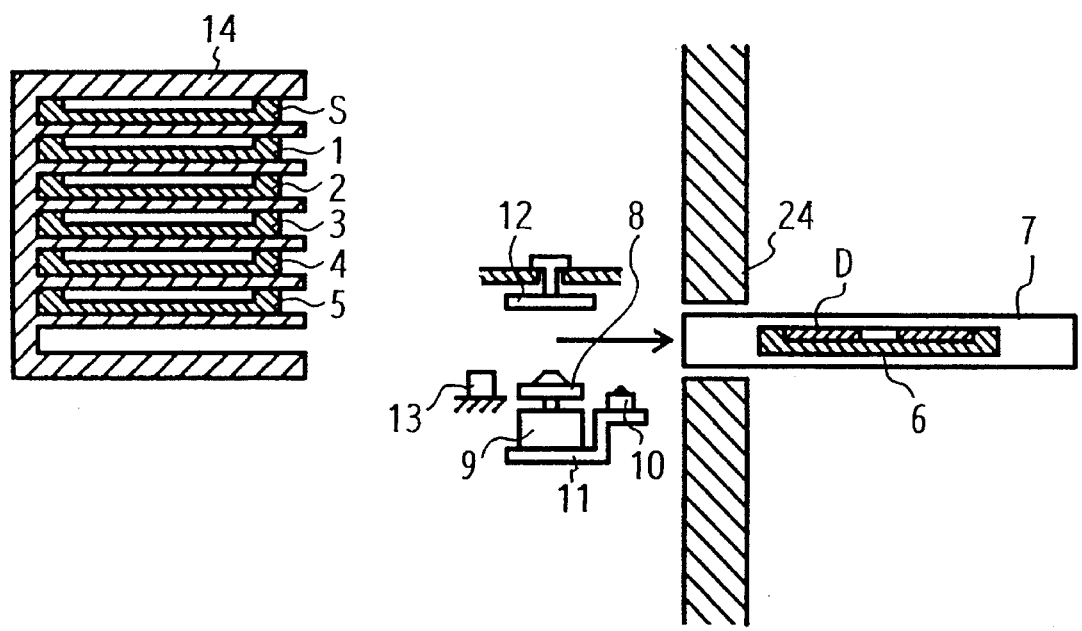
Figure 29M:
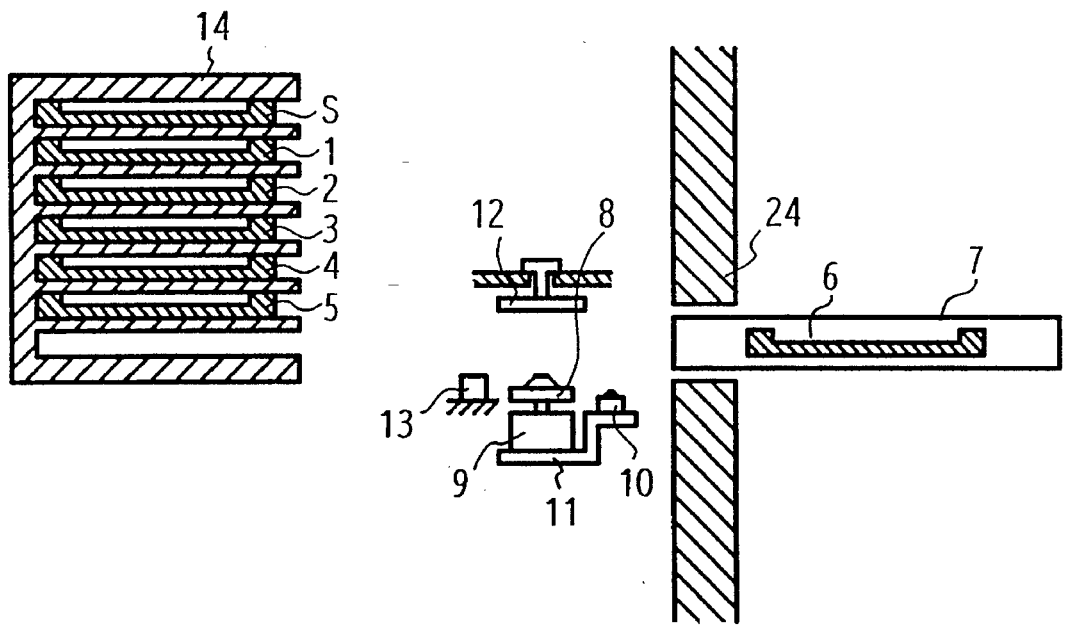

Tray 7 is then unlocked by subroutine L5, and is moved to the eject position by subroutine L2, as shown in FIG. 29L. Disc D is removed from carriage 6 by an operator as shown in FIG. 29M.

Figure 29N:
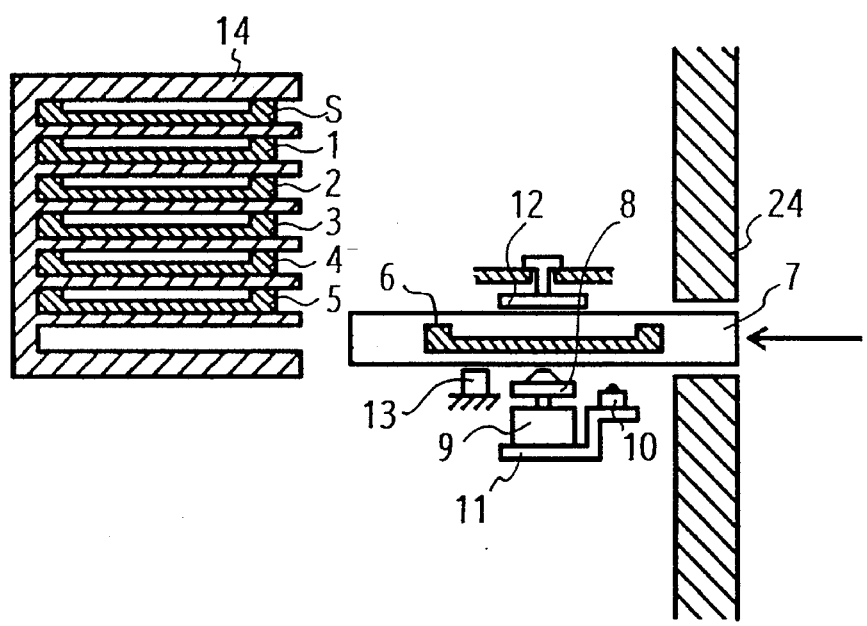

When eject/load switch 42 is again operated, microcomputer 40 performs step S151 and subroutine L10 of the eject mode (FIG. 18B). Tray 7 is decelerated in area S2 (FIG. 6), as it is moved to the load position, as shown in FIG. 29N.

Figure 29O:
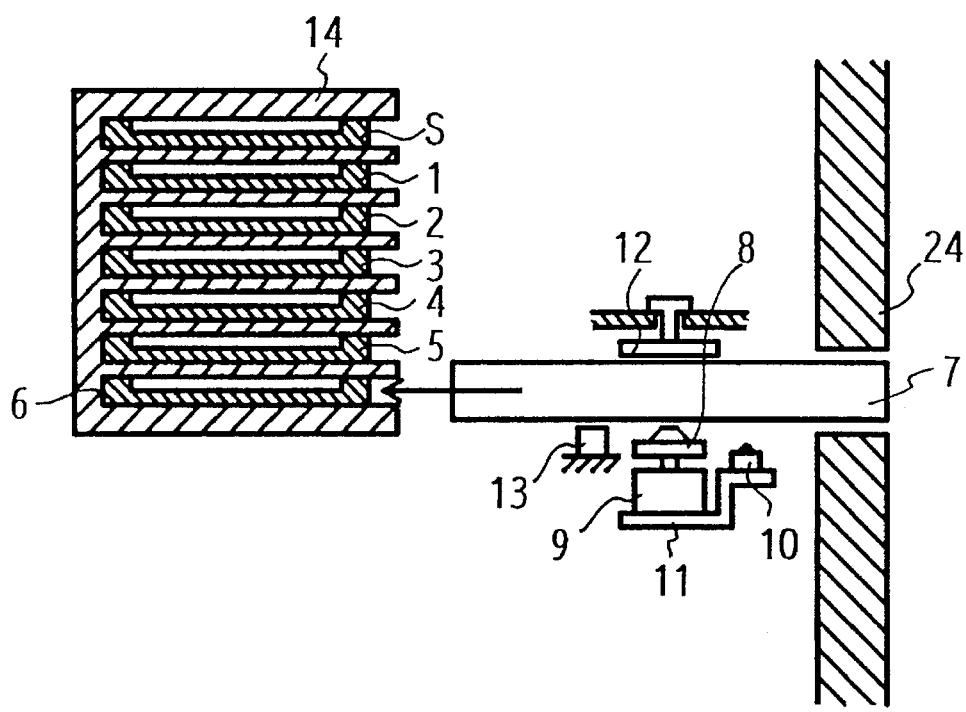

When microcomputer 40 detects that tray 7 is in the load position, step S211 determines whether or not there is a disc in carriage 6. If carriage 6 is empty, the data is stored as D(6)=0. Then, microcomputer 40 performs step S212 and subroutine L2, moving carriage 6 from the load position in tray 7 to its store position, as shown in FIG. 29O.

Figure 29P:
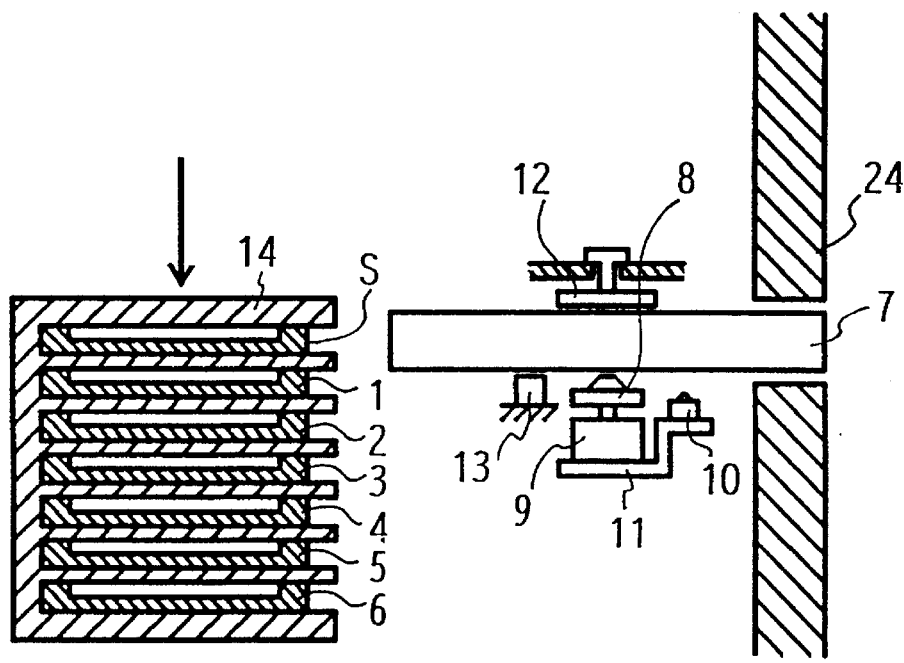
Figure 29Q:
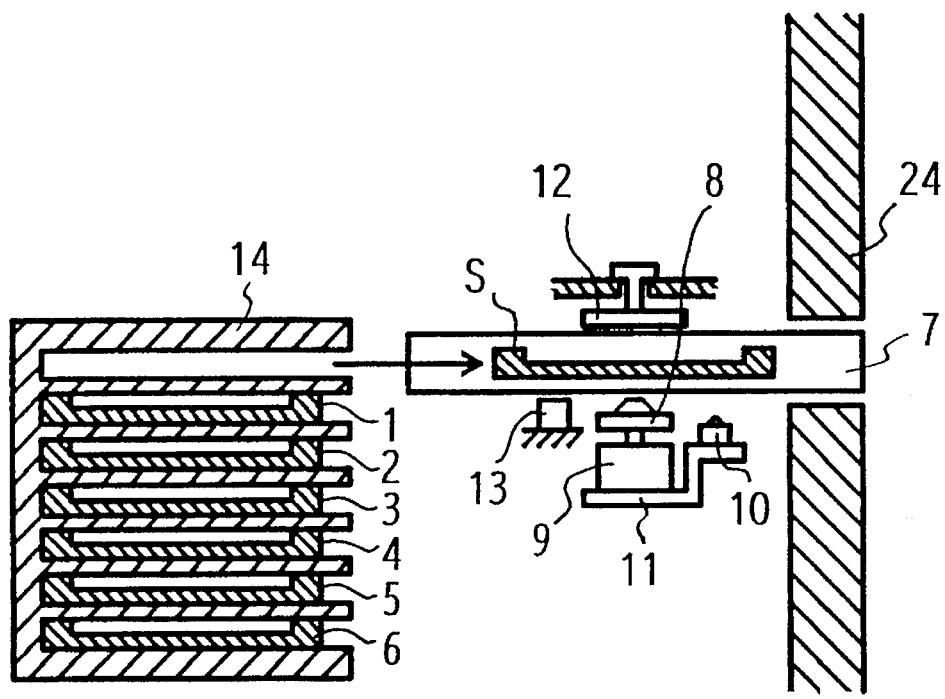
Figure 29R:
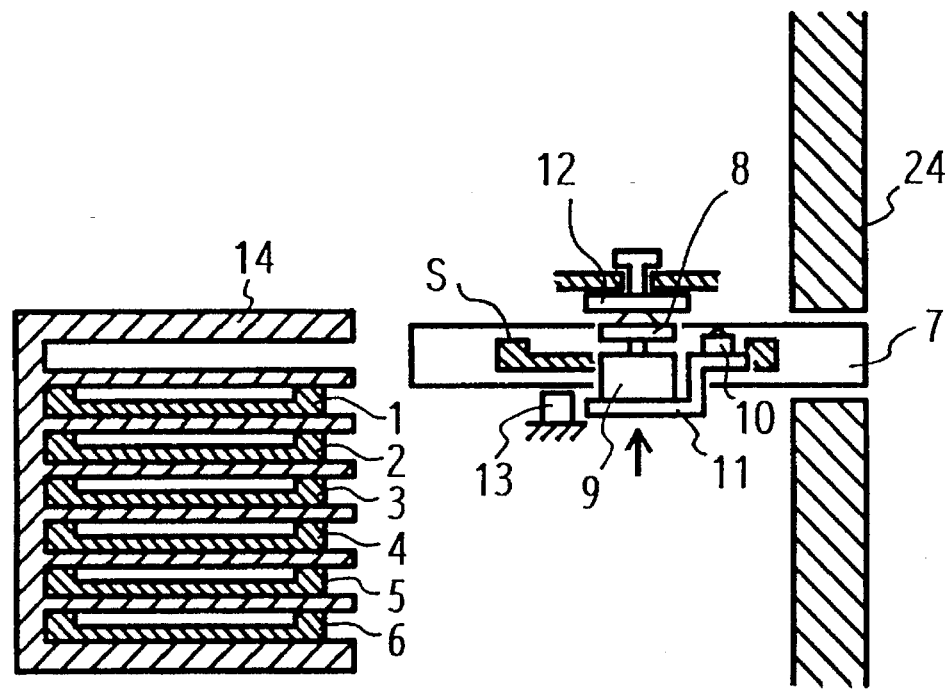

When microcomputer 40 reaches the loop of steps S214 to S216 through step S213, n is set to 7 and step S216 becomes YES. Stocker 14 is moved to position S by subroutine L8 as shown in FIG. 29P. Subroutine L14 then moves single play carriage S to the load position, as shown in FIG. 29(Q), and optical head base 11 is moved to the up position by subroutine L7 as shown in FIG. 29R.

Microcomputer 40 then moves to the stop mode (FIG. 9A through 9D) to monitor the operation of stock switch 41, eject/load switch 42, play switch 43, carriage S selection switch 45, and carriages 1–6 selection switch 46.

As discussed for examples 5 and 7, when single play carriage S is inserted in tray 7, microcomputer 40 responds to the operation of eject/load switch 42 as follows: When tray 7 is in the load position, microcomputer 40 moves it to the eject position. When tray 7 is in the eject position, microcomputer 40 moves it to the load position. Microcomputer 40 then determines whether or not a disc D is held in single play carriage S. In either case, optical head base 11 is moved to the up position.

When a carriage 1 through 6 is installed in tray 7, microcomputer 40 responds to the operation of eject/load switch 42 as follows: When tray 7 is in the load position microcomputer 40 moves it to the eject position. When tray 7 is in the eject position, microcomputer 40 moves it to the load position. Microcomputer 40 then determines whether or not a disc D is held in the carriage in tray 7. If a disc D is present, optical head use 11 is moved to the up position. If no disc D is present, the carriage in tray 7 is moved to its storage position in stocker 14, and the lowest number carriage, 1 through 6, holding a disc D is installed in tray 7. Optical head base 11 is then moved to the up position to hold disc D in the play position.

When no disc is mounted on any of carriages 1 through 6, single play carriage S is installed in tray 7 in the load position and optical head base 11 is moved to the up position.

When microcomputer 40 responds to eject/load switch 42 and tray 7 is in the load position, optical head base 11 is moves to the down position to allow tray 7 to move to the eject position.

OPERATING EXAMPLE 8

Operating example 8 is described with reference to FIGS. 1, 5, 9A, 9B, 21A through 21D and 30A through 30C.

In this example, tray 7 with single play carriage S installed, is in the load position and optical head base 11 is in the up position and no discs D are held in carriages 2, 4 and 6, as shown in FIG. 30A. When play switch 43 is operated, microcomputer 40 performs steps S3, S90 and S91 of the stop mode (FIG. 9B). After having instructed a play mode to a play-back signal processing circuit and a motor-servo circuit (not illustrated) playback begins, as shown in FIG. 30B. Microcomputer 40 goes to the play mode (FIG. 21A through 21D) to monitor the operation of stock switch 41, eject/load switch 42, play switch 43, carriage S selection switch 45, and carriages 1–6 selection switch 46 as well as to detect an end of music on disc D.

Figure 30C:
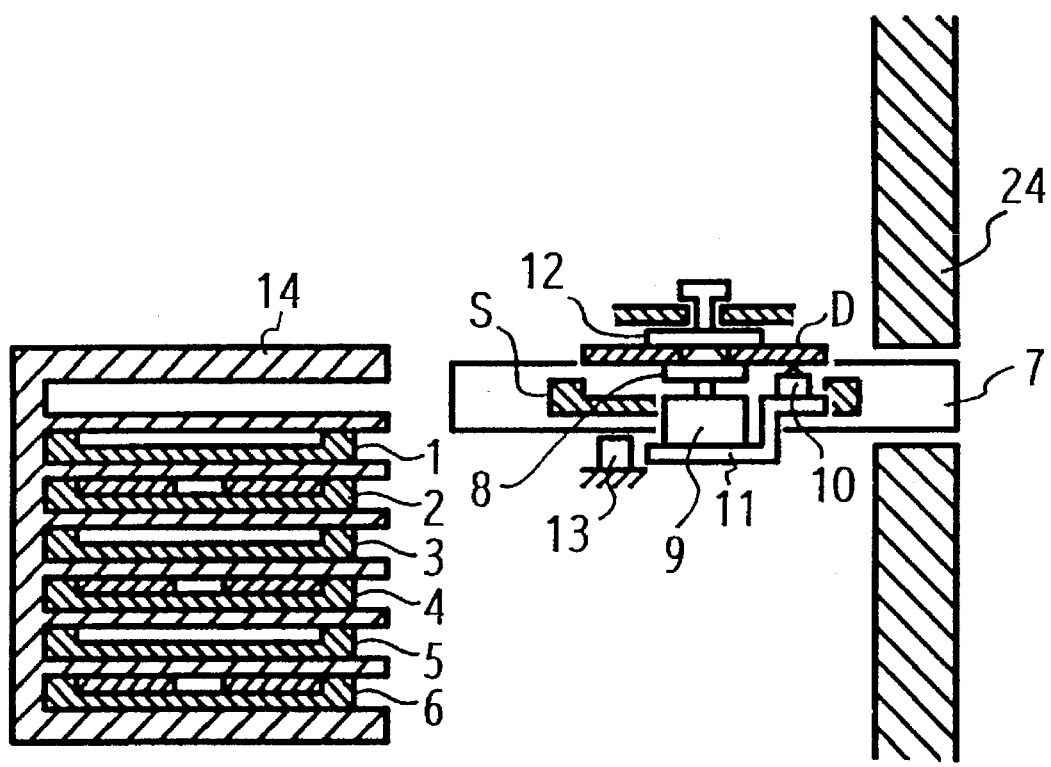

Once the end of the last music on disc D is detected, as indicated by a control signal from the play-back processing circuit (not illustrated), microcomputer 40 performs steps S235 and S290 of the play mode (FIG. 21D), and then a stop mode is entered as shown in FIG. 30(C). When microcomputer 40 performs step S291, S291 becomes YES, because single play carriage S is employed. Microcomputer 40 then goes to the stop mode (FIGS. 9A through 9D) to monitor the operation of stock switch 41, eject/load switch 42, play switch 43, carriage S selection switch 45, and carriages 1–6 selection switch 46.

OPERATING EXAMPLE 9

Operating example 9 is described with reference FIGS. 1, 5, 9B, 21A through 21D, 31A through 31X, 32A and 32B.

Figure 31A:
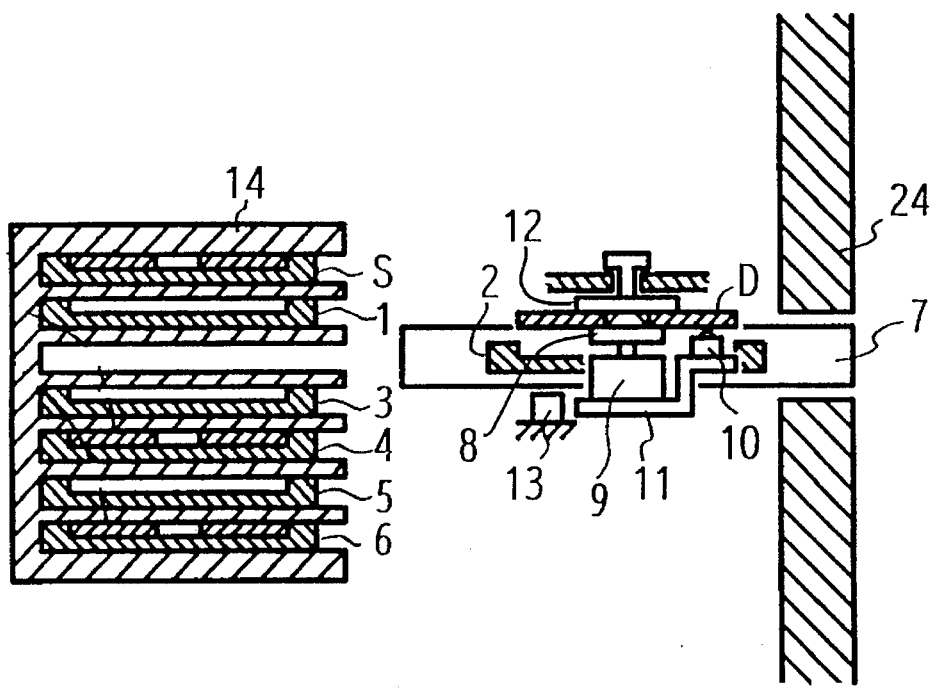
Figure 31B:
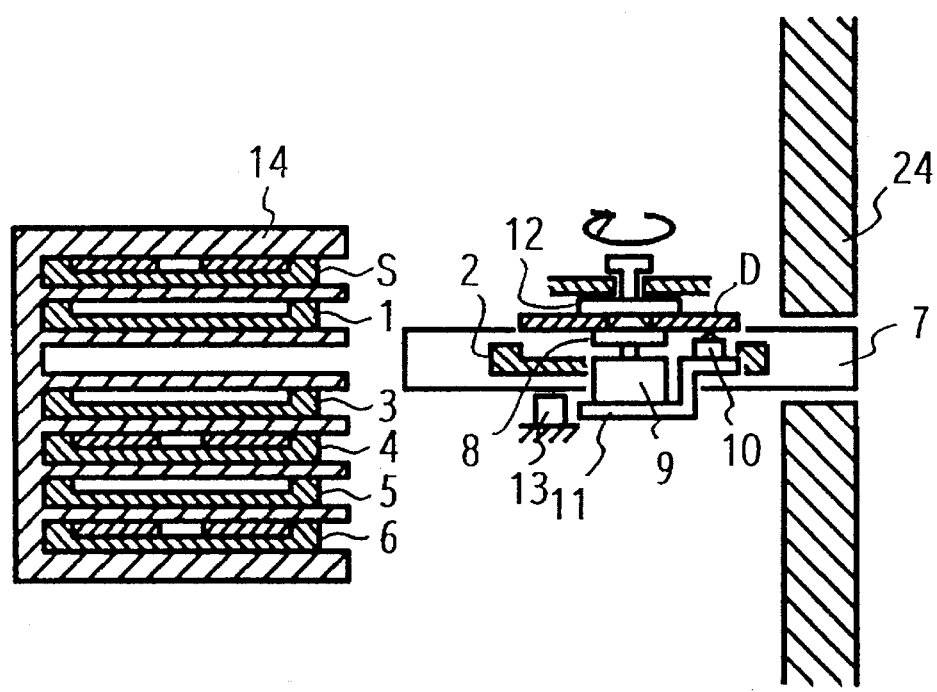

In this example, shown in FIG. 31A, tray 7 with carriage 2 installed, is in the load position in tray 7 and optical head base 11 is in the up position, holding disc D in a standby play position. Carriages S, 4, and 6 are holding discs in their storage positions in stocker 14. When play switch 43 is operated, microcomputer 40 performs steps S3, S90 and S91 of the stop mode (FIG. 9B) initiating the playback of disc D as shown in FIG. 31B.

Microcomputer 40 then goes to the play mode (FIG. 21A through 21D) to monitor the operation of stock switch 41, eject/load switch 42, stop switch 44, carriage S selection switch 45, and carriages 1–6 selection switch 46, as well as to detect the end of the music on disc D.

Figure 31C:
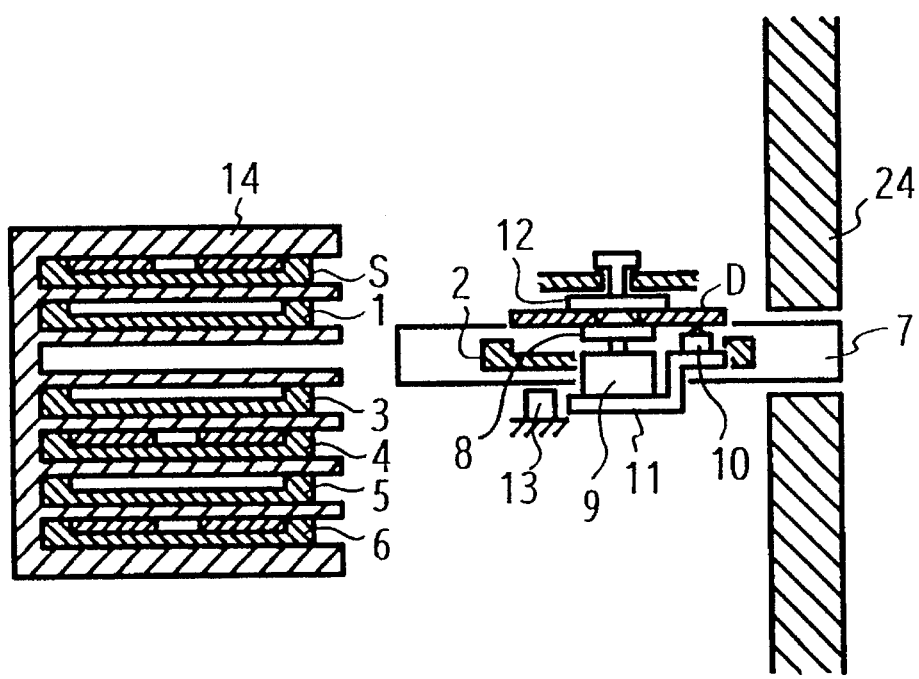

Once the end of the music on disc D is detected, microcomputer 40 performs steps S235 and S290 of play mode (FIG. 21D). After initiating the stop mode as shown in FIG. 31C, microcomputer 40 performs step S291, which becomes NO because carriage 2 is in tray 7, causing microcomputer 40 to go through step S292.

Figure 31D:
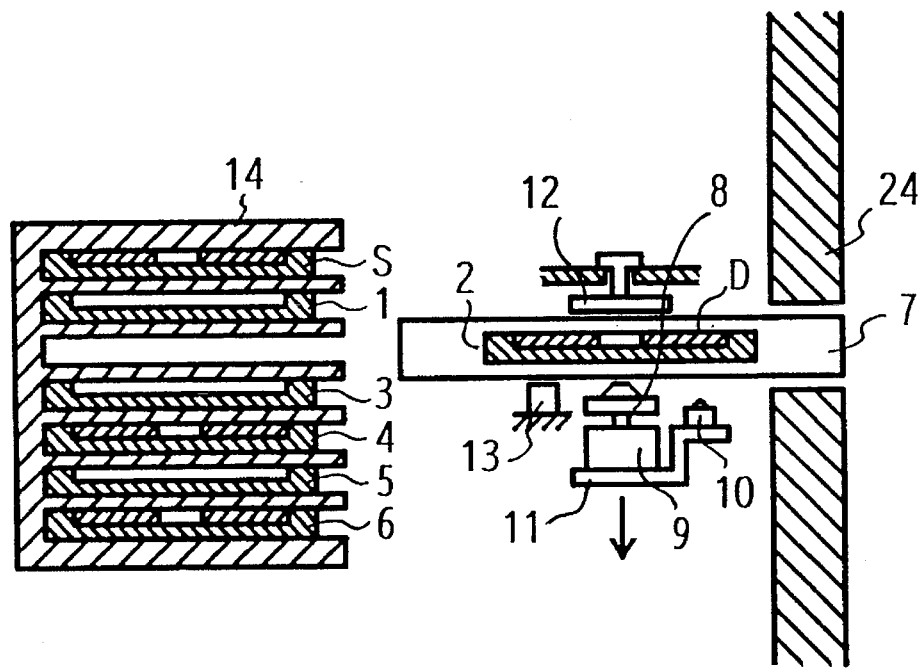
Figure 31E:
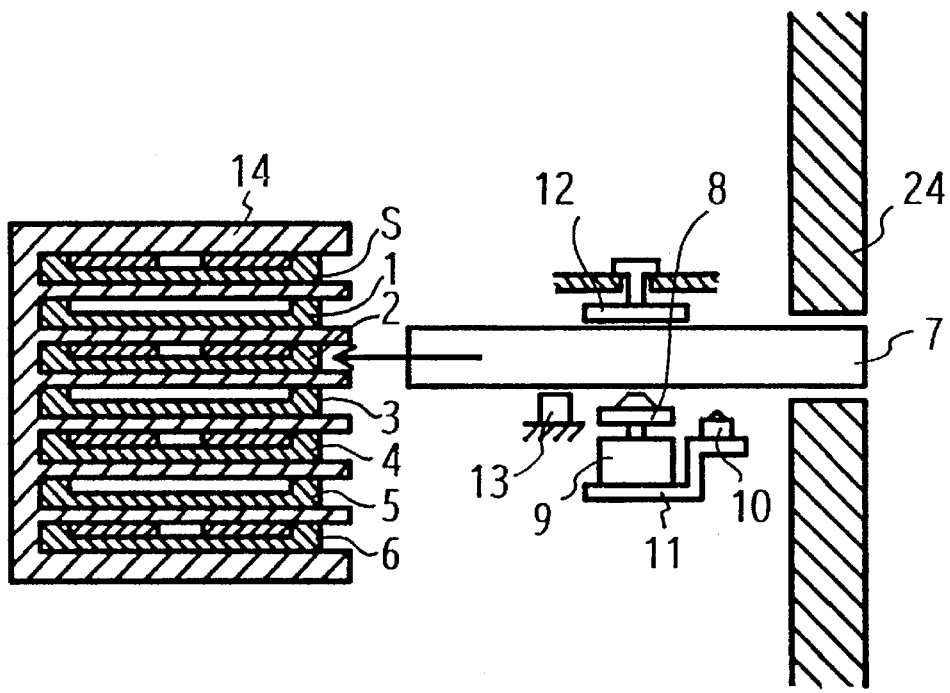

When microcomputer 40 performs the loop of steps S293 to S295, n is 4 and step S293 becomes YES. Optical head base 11 is moved to the down position by subroutine L1 as shown in FIG. 31D and carriage 2 is moved to its store position in stocker 14 from the load position in tray 7 by subroutine L2 as shown in FIG. 31E.

Figure 31F:
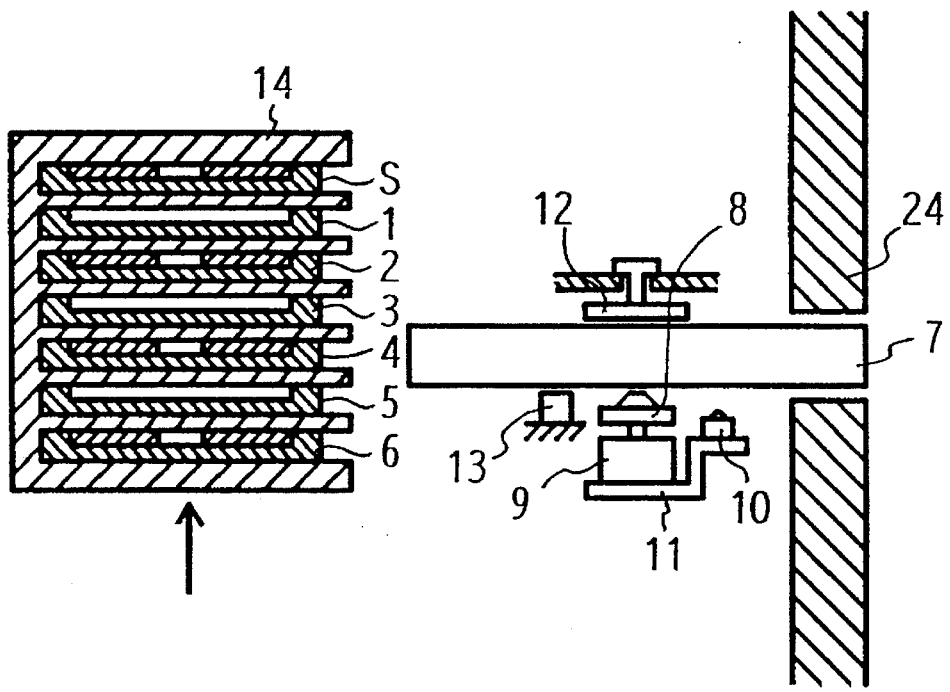
Figure 31G:
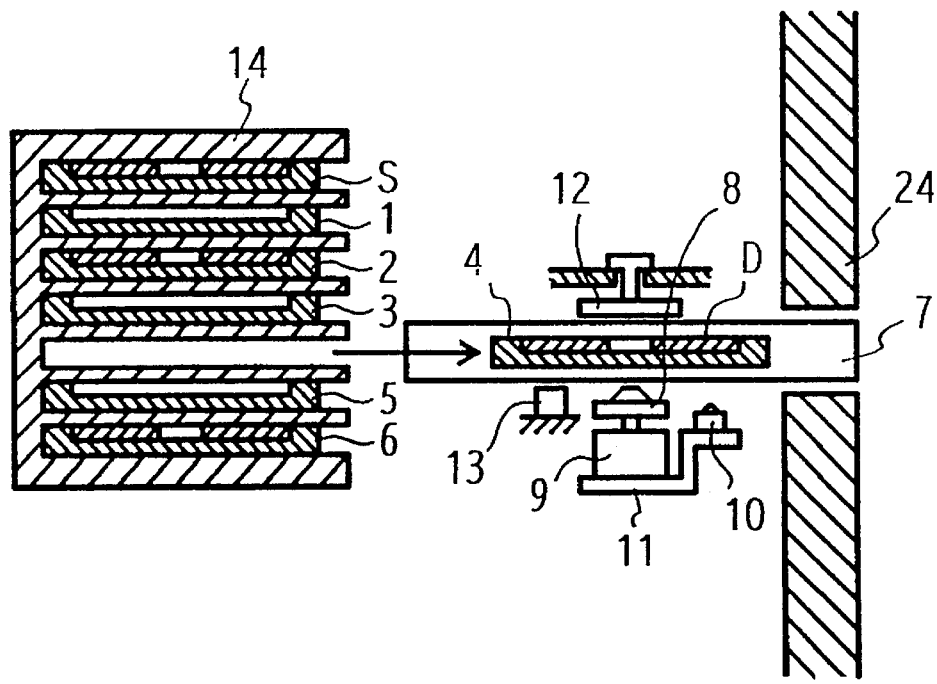
Figure 31H:
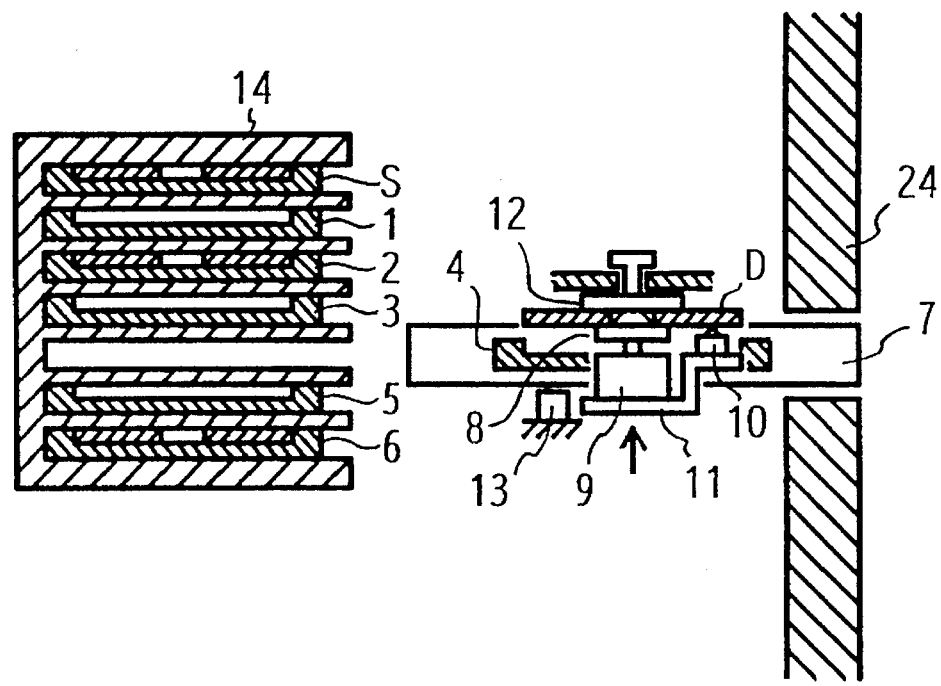

When microcomputer 40 performs subroutine L3, stocker 14 is moved to position 4 as shown in FIG. 31F. Microcomputer 40 then performs subroutine 4, moving carriage 4 from its store position in stocker 14 to the load position in tray 7, as shown in (FIG. 31G). Optical head base 11 is moved to the up position by subroutine L7 to clamp disc D to stand by for playback as shown in FIG. 31H.

Figure 31I:
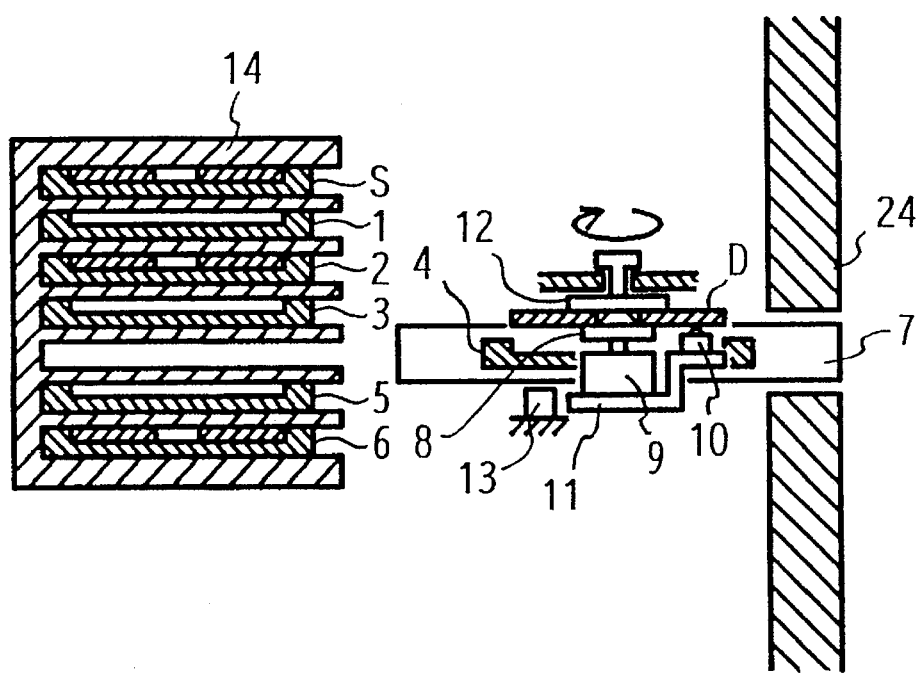

Microcomputer 40 then performs steps S296 and S297 to initiate the play mode for playback of disc D as shown in FIG. 31I. Microcomputer 40 then monitors the operation of stock switch 41, eject/load switch 42, stop switch 44, carriage S selection switch 45, and carriages 1–6 selection switch 46 again, as well as to detect the end of music on disc D.

Figure 31J:
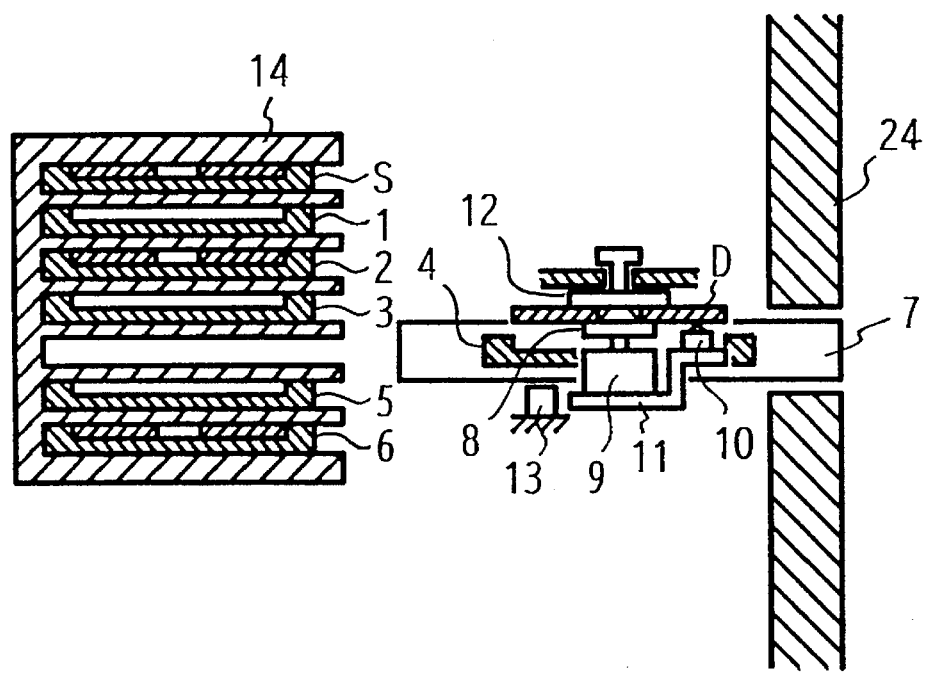
Figure 31K:
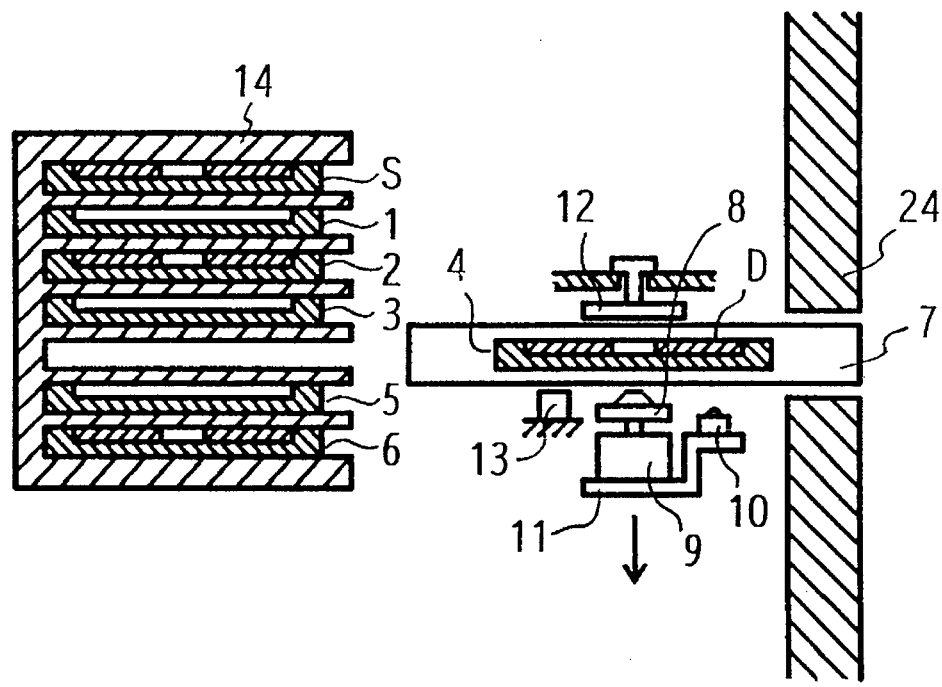
Figure 31L:
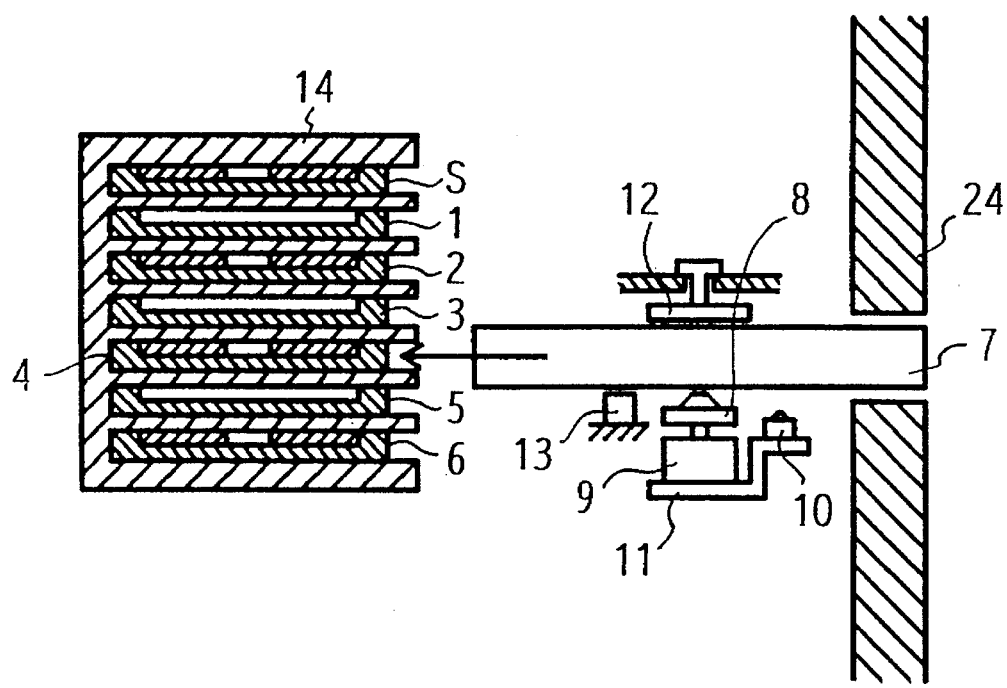

Once the end of the music is detected, microcomputer 40 repeats steps S291 and S292. After having initiated the stop mode to end the playback of disc D, as shown in FIG. 31J, microcomputer 40 performs steps S291 and S292 to enter the loop of steps 293 to 295. Because n is 6, step S293 becomes YES. Optical head base 11 is moved to the down position by subroutine L1, as shown in FIG. 31K, and carriage 4 is moved to its store position in stocker 14 from the load position in tray 7 by subroutine L2 as shown in FIG. 31(L).

Figure 31M:
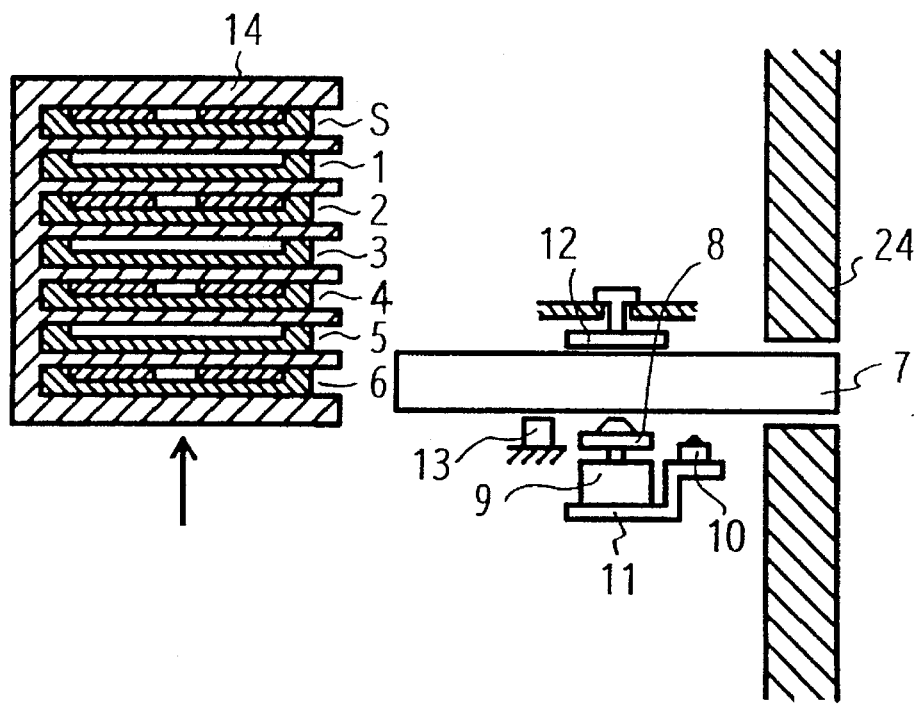
Figure 31N:
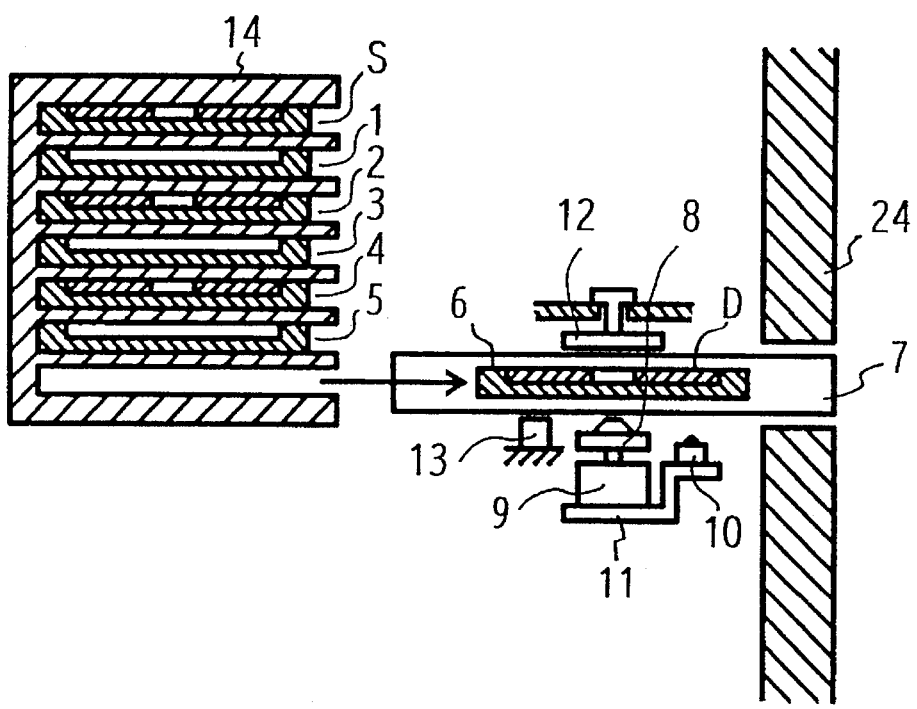
Figure 31O:
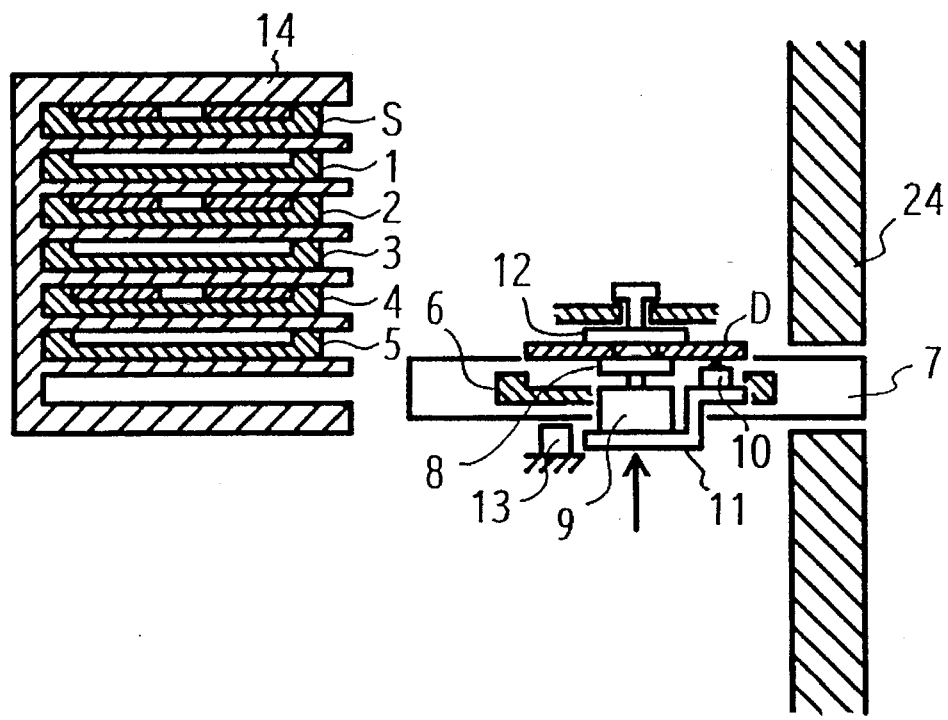

When microcomputer 40 reaches subroutine L3, stocker 14 is moved to store position 6, as shown in FIG. 31M, and carriage 6 is moved from its store position in stocker 14 to the load position in tray 7 by subroutine L4 as shown in FIG. 31N. Then, optical head base 11 is moved to the up position by subroutine L7 to clamp disc D to stand by for playback, as shown in FIG. 31O.

Figure 31P:
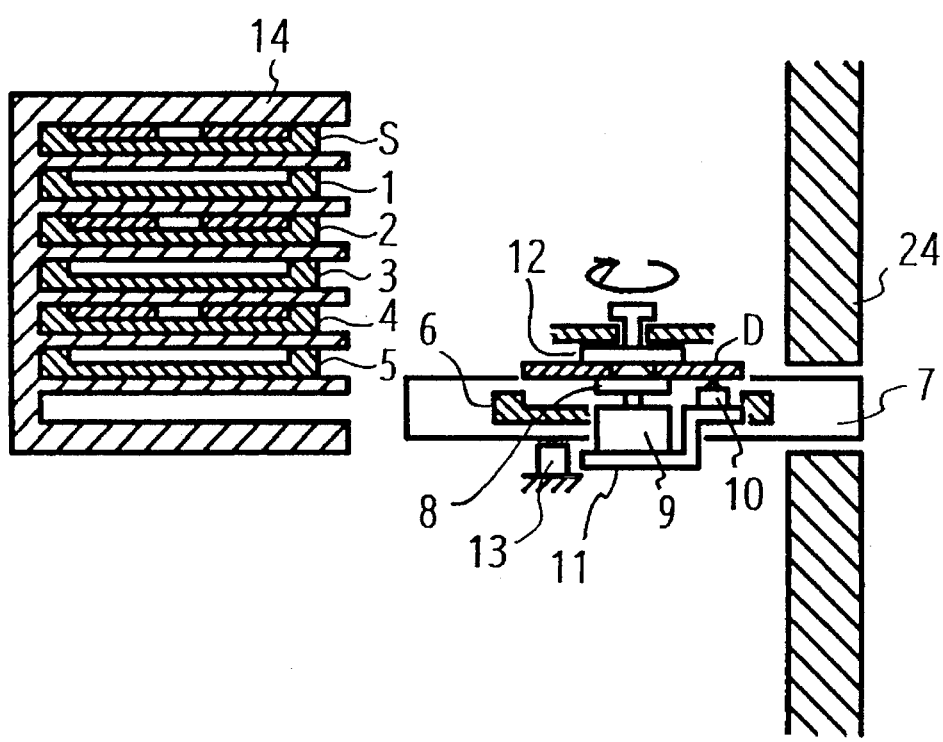

Microcomputer 40 then performs steps S296 and S297 to again initiate the play mode for playback of disc D, as shown in FIG. 31P. Microcomputer 40 then monitors the operation of stock switch 41, eject/load switch 42, stop switch 44, carriage S selection switch 45, and carriages 1–6 selection switch 46 again, as well as to detect the end of music on disc D.

Figure 31Q:
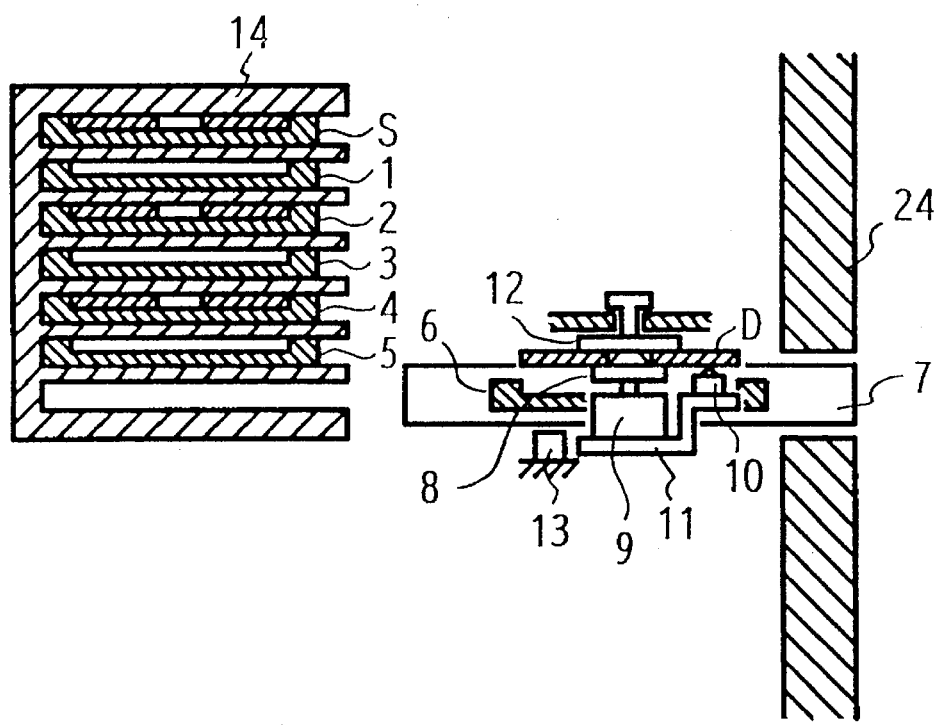
Figure 31R:
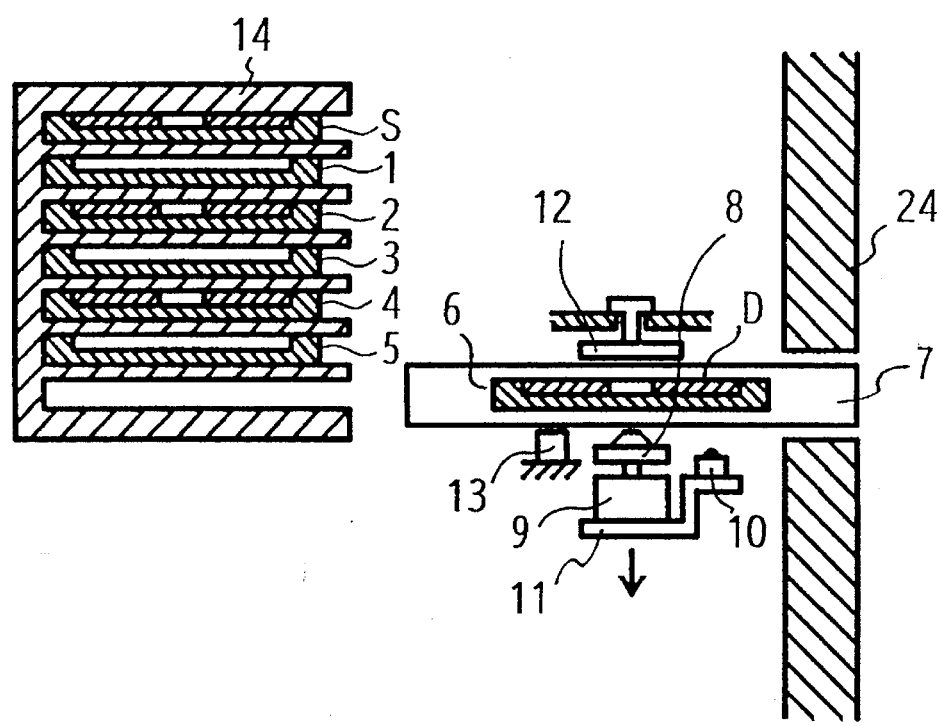
Figure 31S:
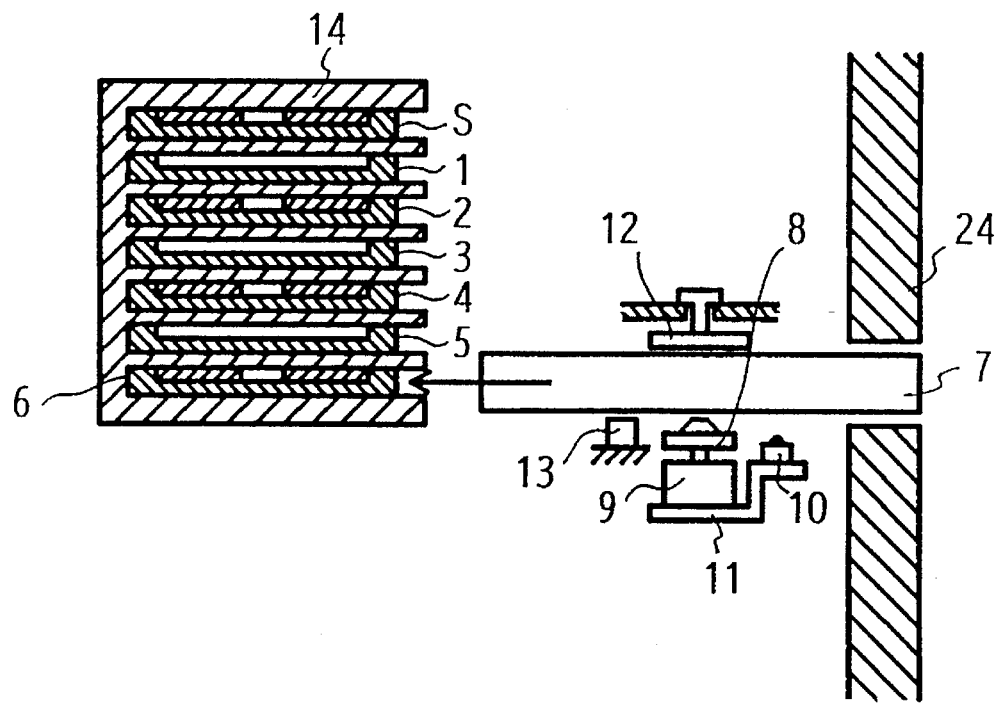

Once the end of the music is detected, microcomputer 40 repeats steps S291 and S292. After having initiated the stop mode to end the playback of disc D, as shown in FIG. 31Q, microcomputer 40 performs steps S291 and S292 to enter the loop of steps 293 to 295. Because n is 7, step S295 becomes YES. Optical head base 11 is moved to the down position by subroutine L1, as shown in FIG. 31R, and carriage 6 is moved from the load position in tray 7 to its store position in stocker 14 by subroutine L2 as shown in FIG. 31S.

Figure 31T:
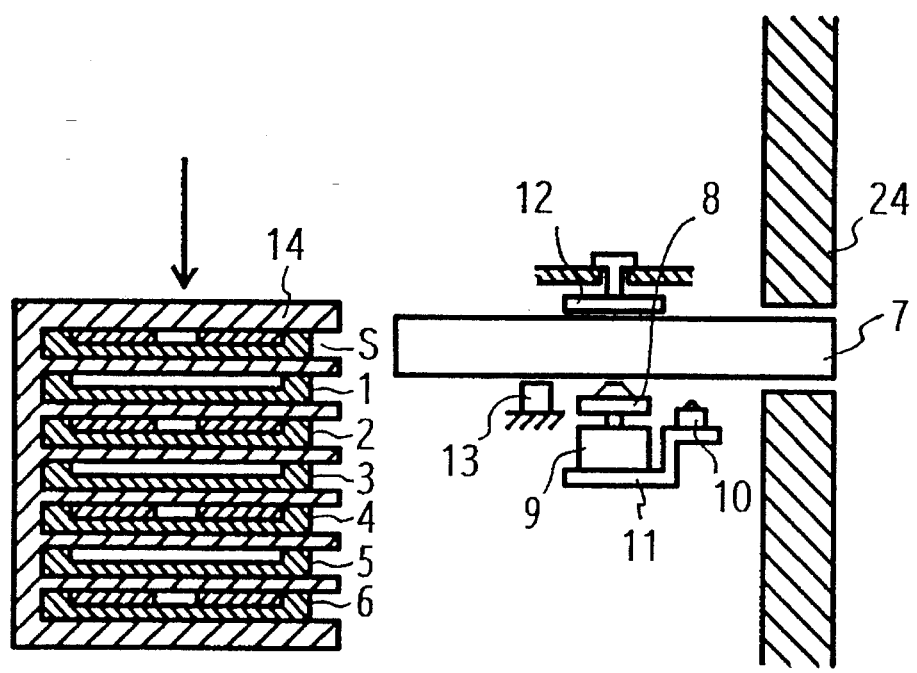
Figure 31U:
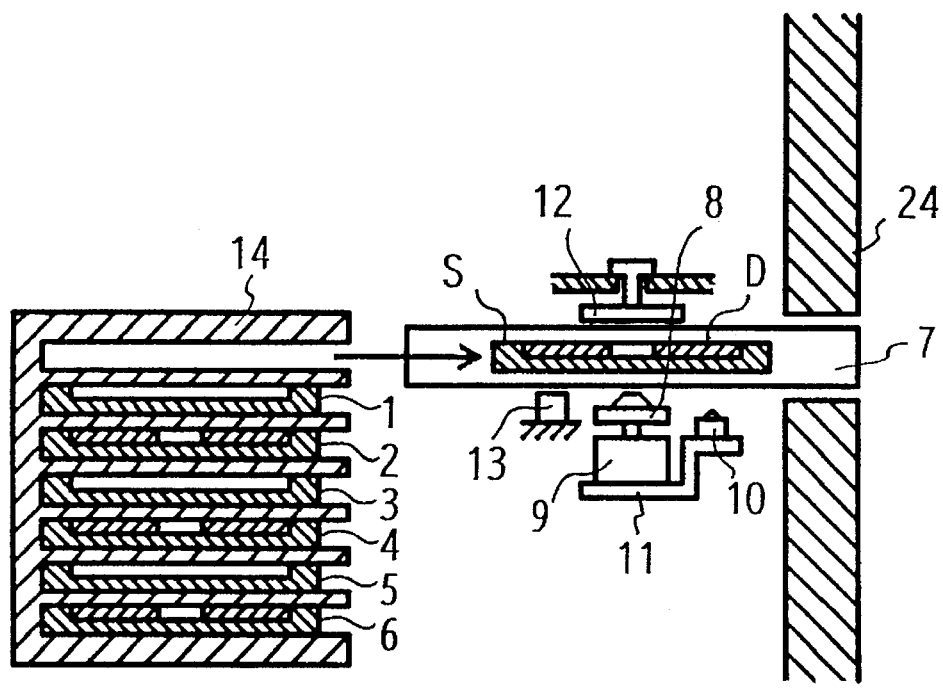
Figure 31V:
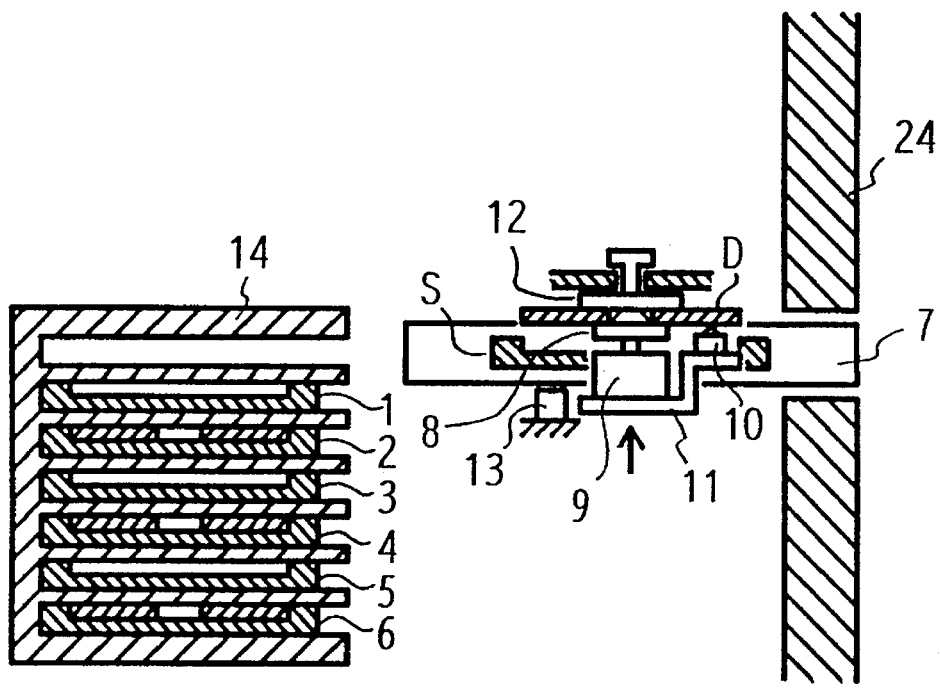

When microcomputer 40 performs subroutine L8, stocker 14 is moved to a storage position S, as shown in FIG. 31T, and single play carriage S is moved from stocker 14 to the load position in tray 7 by subroutine L4 as shown in FIG. 31U. Then, optical head base 11 is moved to the up position by subroutine L7 to clamp disc D to stand by for playback as shown in FIG. 31V.

Figure 31W:
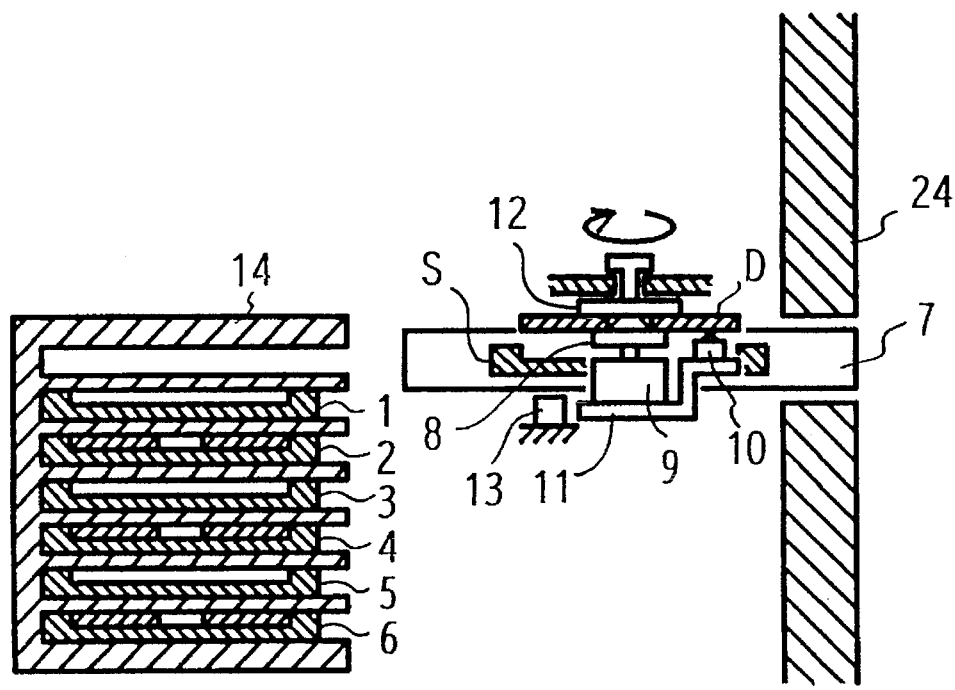

Microcomputer 40 then performs steps S296 and S297 to again initiate the play mode for playback of disc D, as shown in FIG. 31W. Microcomputer 40 then monitors the operation of stock switch 41, eject/load switch 42, stop switch 44, carriage S selection switch 45, and carriages 1–6 selection switch 46 again, as well as to detect the end of music on disc D.

Figure 31X:
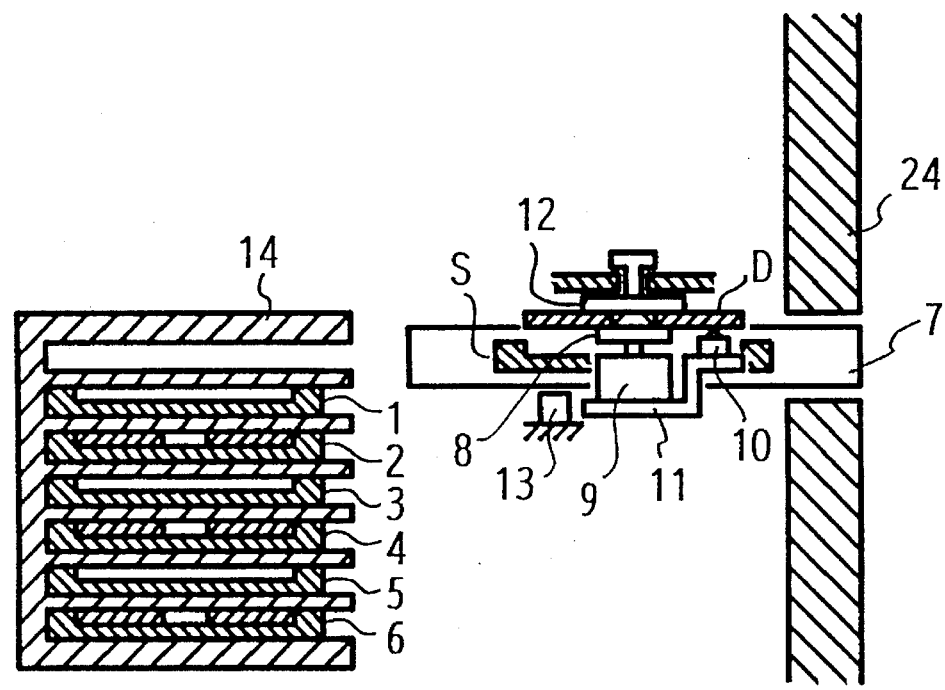

Once the end of music is detected, microcomputer 40 repeats steps S235 and S290. After having initiated the stop mode as shown in FIG. 31X, microcomputer 40 performs step S291. Because single play carriage S is in the load position in tray 7, S291 becomes YES, and microcomputer 40 goes to the stop mode (FIG. 9A through 9D) to monitor the operation of stock switch 41, eject/load switch 42, stop switch 44, carriage S selection switch 45 and carriages 1–6 selection switch 46.

Figure 32A:
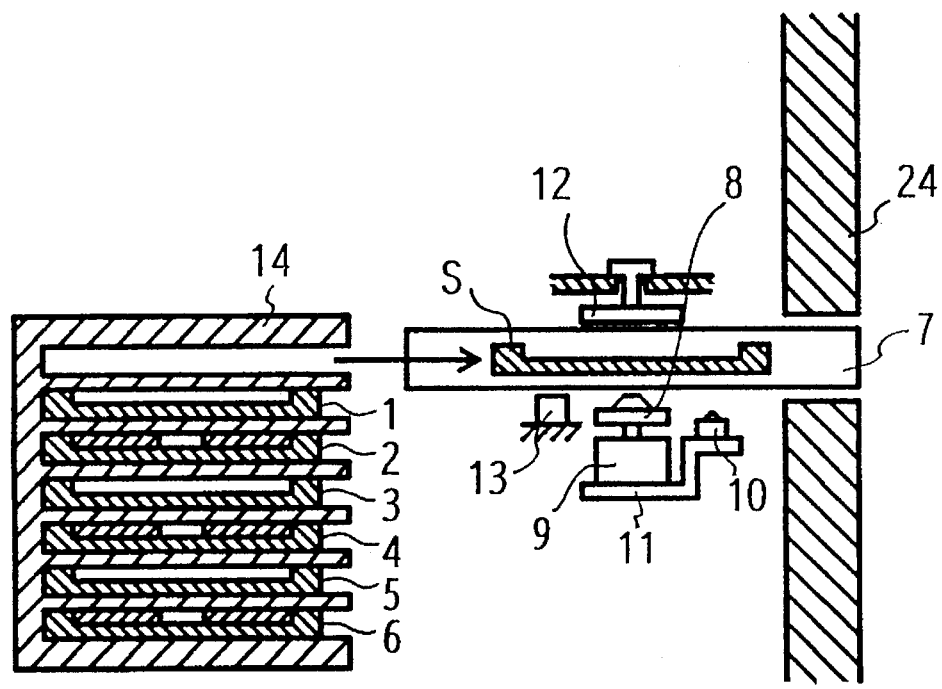
Figure 32B:
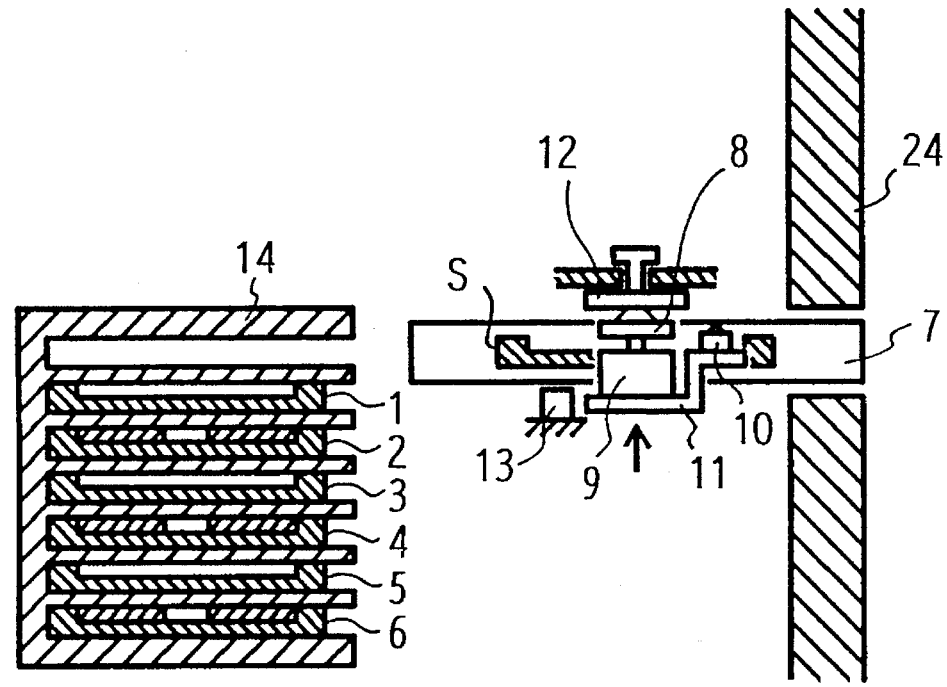

In the event that no disc is held in single play carriage S, single play carriage S is moved to the load position in tray 7 by subroutine L4 as shown in FIG. 32A. After optical head base 11 has been moved to the up position by subroutine L7, as shown in FIG. 32B, microcomputer 40 performs step S296 (FIG. 21D). Because no disc is mounted on single play carriage S, data (D(0)=0) is stored in microcomputer 40, S296 becomes NO, and microcomputer 40 goes to the stop mode (FIG. 9A through 9D) to monitor the operation of stock switch 41, eject/load switch 42, stop switch 44, carriage S selection switch 45, and carriages 1–6 selection switch 46.

OPERATING EXAMPLE 10

Operating example 10 is discussed with respect to FIGS. 1, 5, 9B, and 33A through 33M.

Figure 33A:
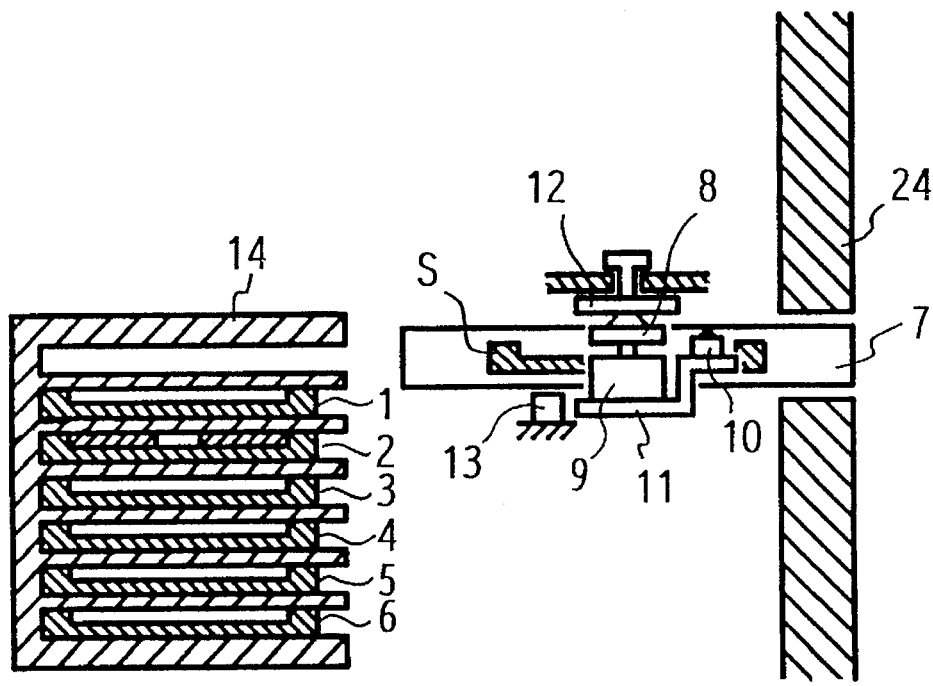
Figure 33B:
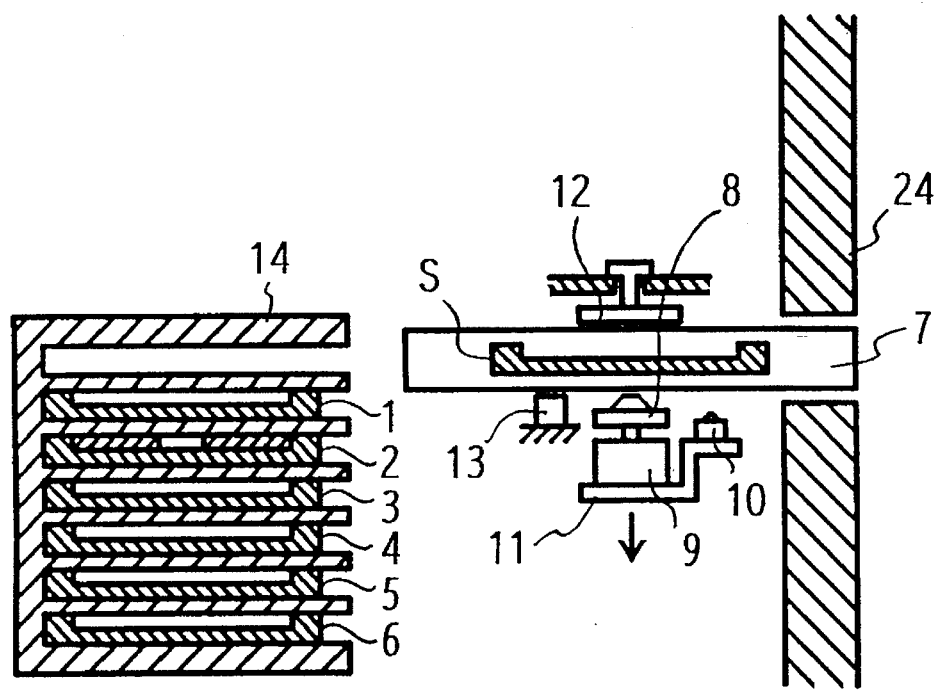
Figure 33C:
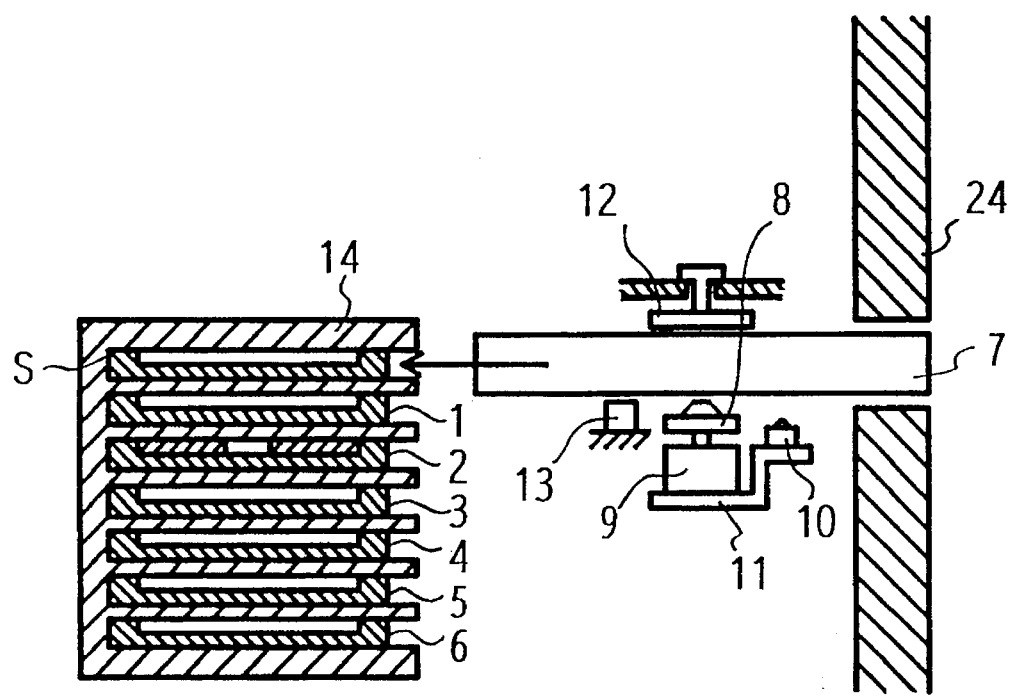

In this example (FIG. 33A), single play carriage S is in the load position in tray 7, optical head base 11 is in the up position, there is no disc held in single play carriage S, and only carriage 2 in stocker 14 is holding a disc. Play switch 43 is operated, and microcomputer 40 performs steps S3 and S90 of the stop mode (FIG. 9B). Because no disc is in single play carriage S, (D(0)=0) is stored in microcomputer 40, and steps S3 and S90 become NO. When microcomputer 40 performs the loop of steps S93 to S95, n is 2, causing step S93 to become YES. Then, optical head base 11 is moved to the down position by subroutine L1, as shown in FIG. 33B, and carriage S is moved to its store position in stocker 14 by subroutine L2, as shown in FIG. 33C.

Figure 33D:
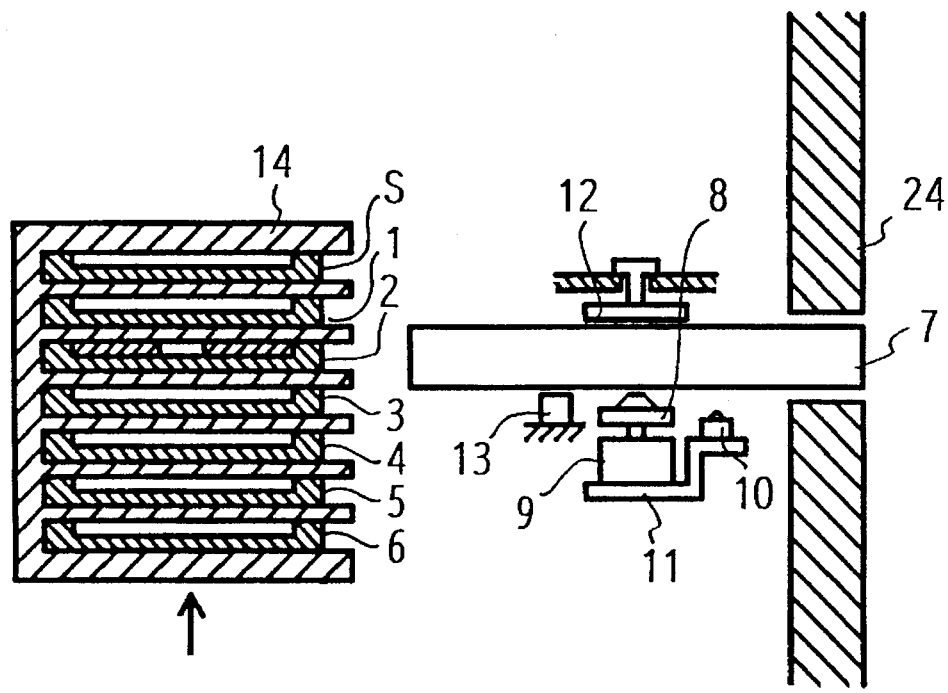
Figure 33E:
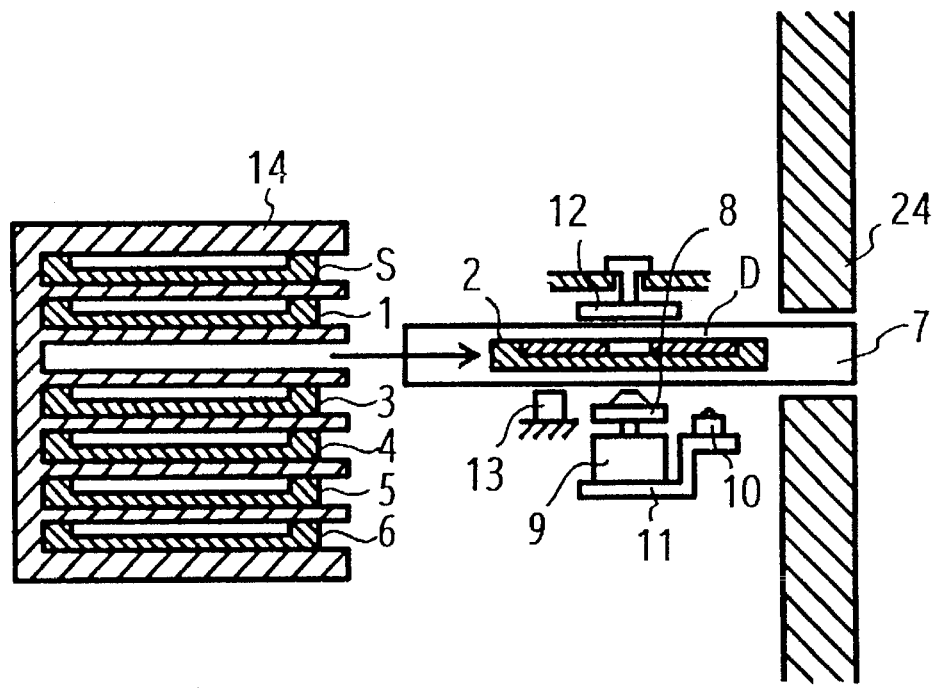
Figure 33F:
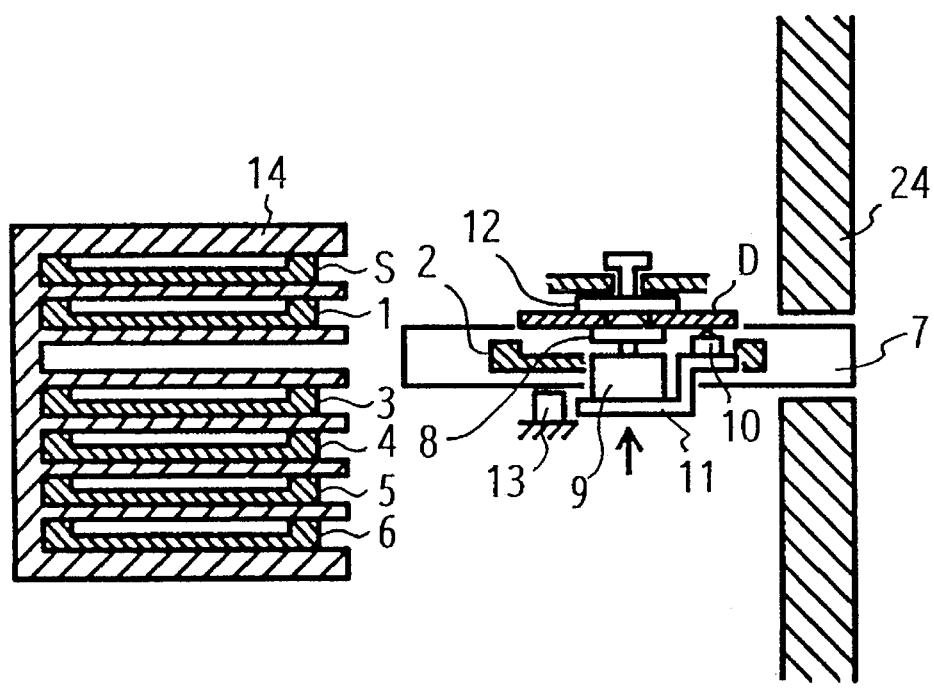

When microcomputer 40 performs subroutine L3, stocker 14 is moved to storage position 2 as shown in FIG. 33D, and carriage 2 is moved to the load position in tray 7 by subroutine L4, as shown in FIG. 33E. Then, optical head base 11 is moved to the up position to clamp disc D to stand by for playback.

Figure 33G:
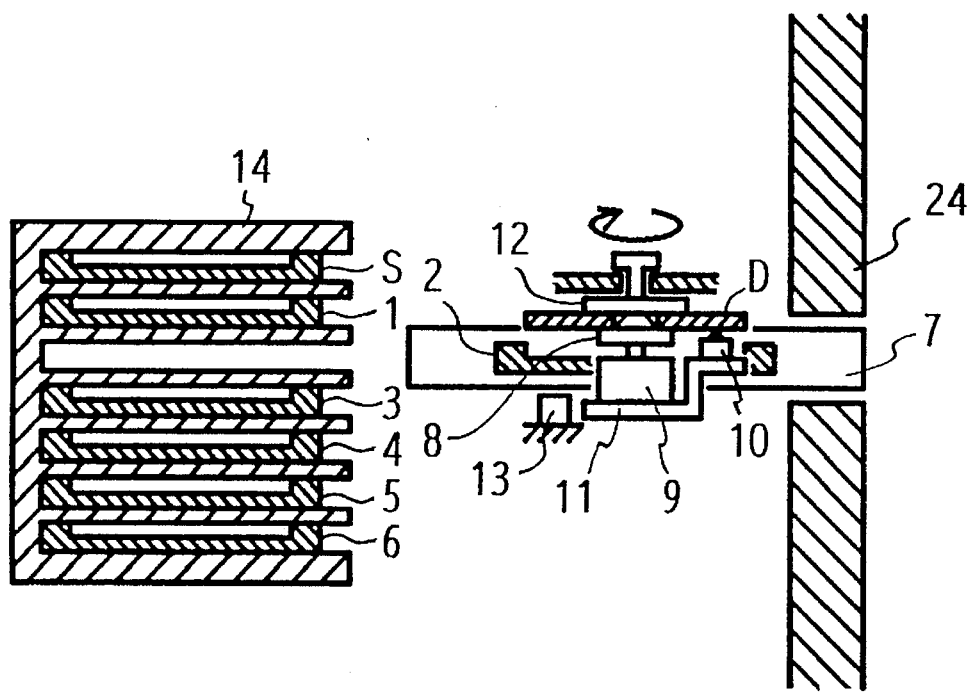

After having initiated the play mode in step S91, as shown in FIG. 33G, microcomputer 40 goes to the play mode in FIGS. 21A through 21D to monitor the operation of stock switch 41, eject/load switch 42, stop switch 44, carriage S selection switch 45, and carriages 1–6 selection switch 46 again, as well as to detect the end of music on disc D.

Figure 33H:
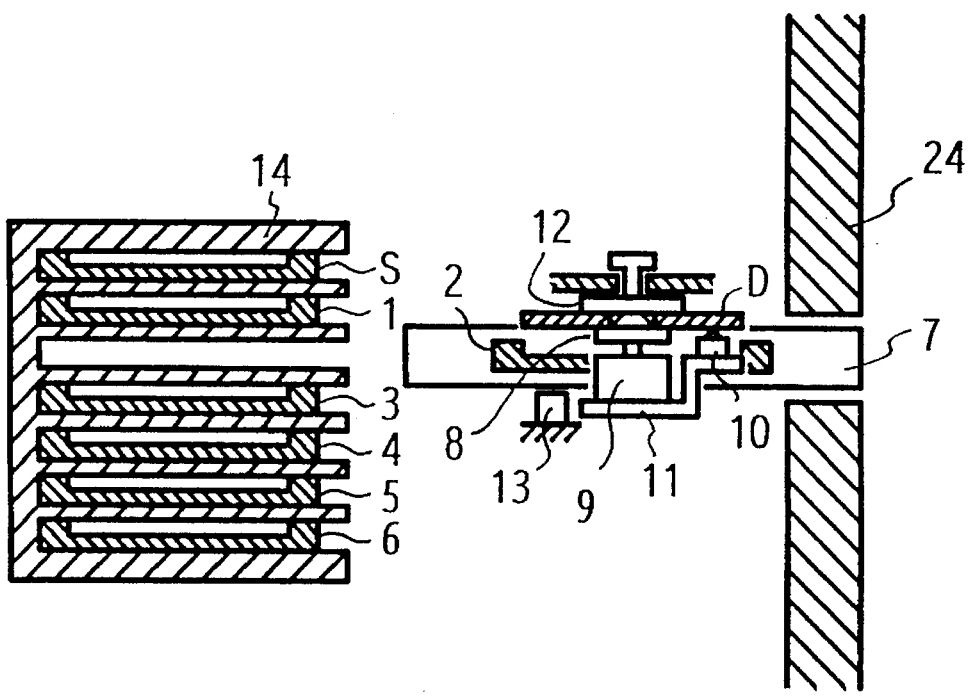
Figure 33I:
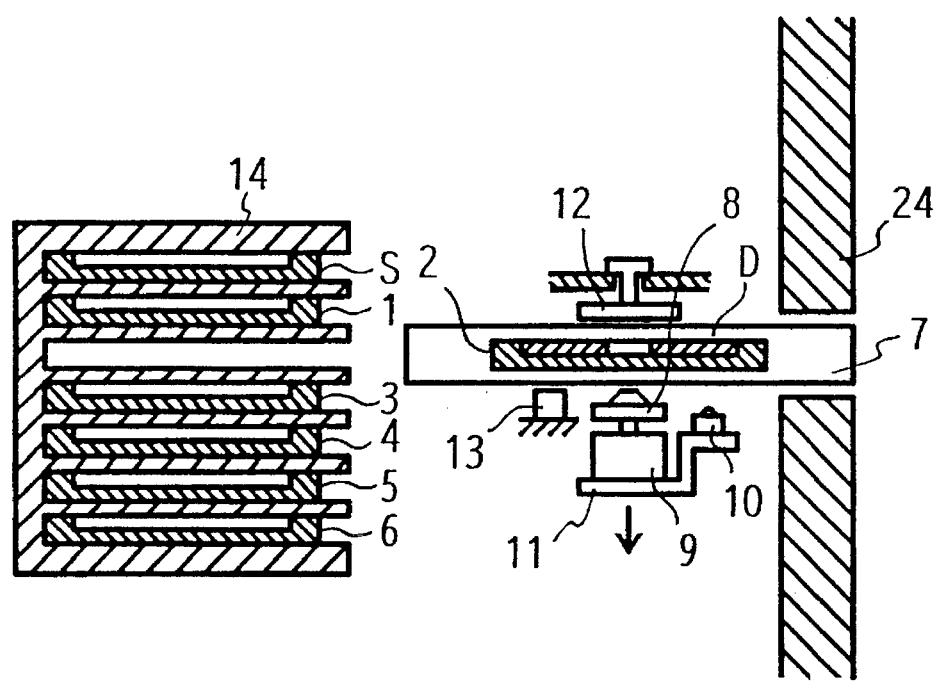
Figure 33J:
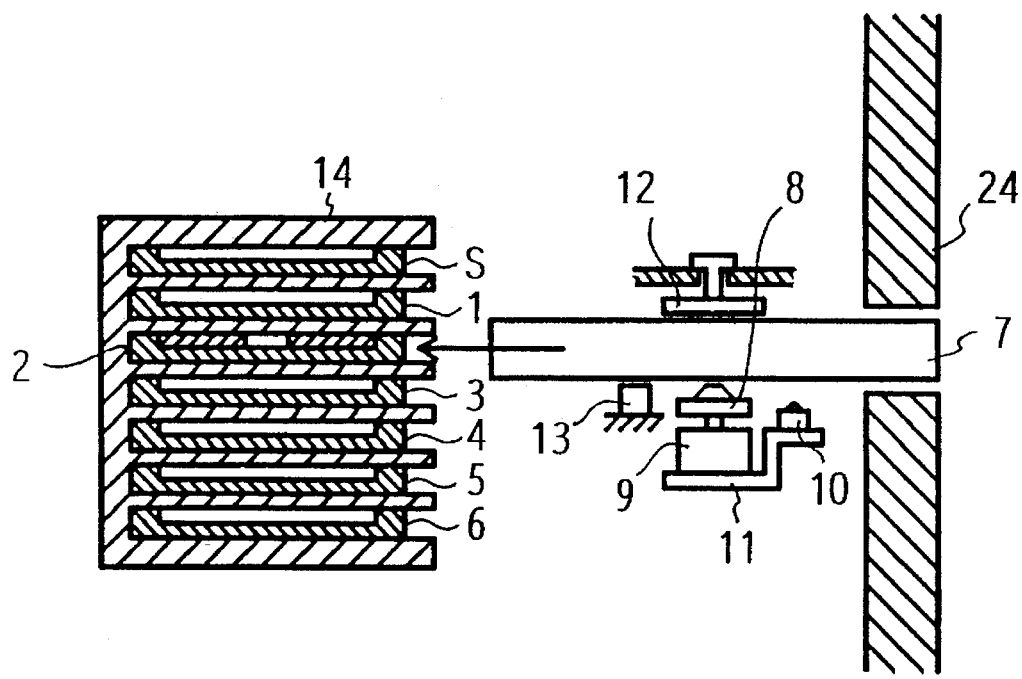

Once the end of the music is detected, microcomputer 40 performs steps S235 and S290. After microcomputer 40 initiates the stop mode as shown in FIG. 33H, it performs step S291. Because carriage 2 is in tray 7, step S291 becomes NO. When microcomputer 40 performs step S292 to enter the loop of steps 293 through 295, n is 7 and S295 becomes YES. Then, optical head base 11 is moved to the down position by subroutine L1, as shown in FIG. 33I. Carriage 2 is moved to its store position in stocker 14 by subroutine L2, as shown in FIG. 33J.

Figure 33K:
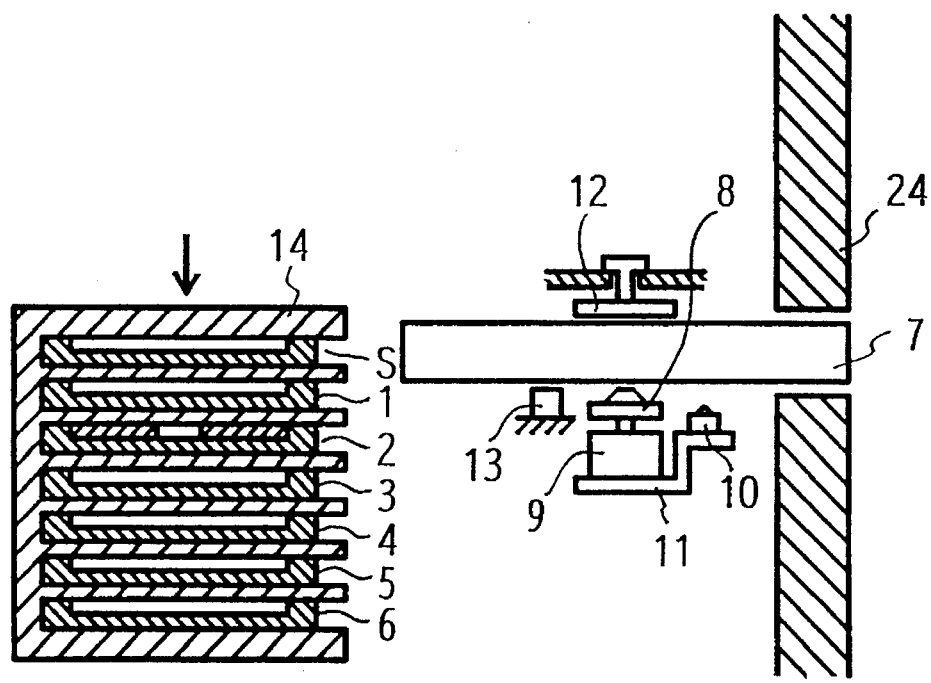
Figure 33L:
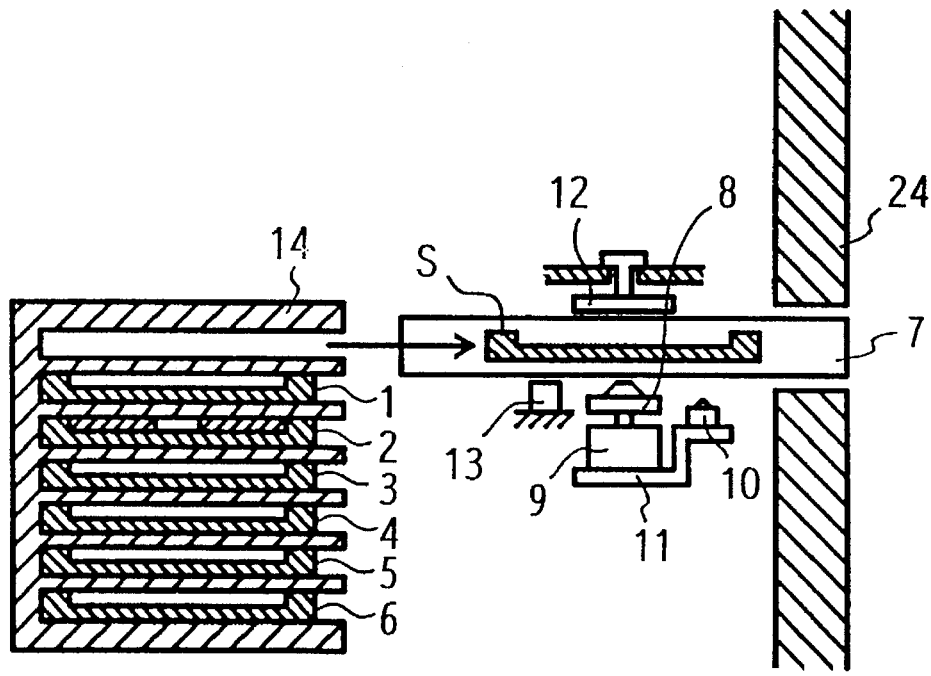
Figure 33M:
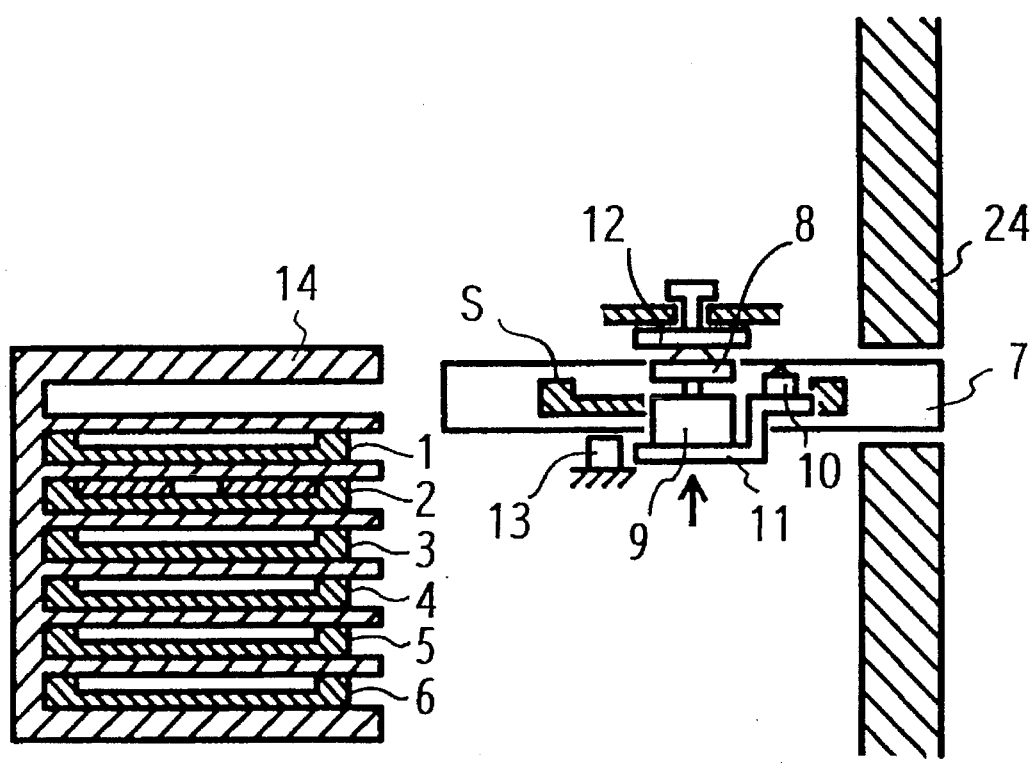

Microcomputer 40 then performs subroutine L8 moving stocker 14 to storage position S, as shown in FIG. 33K. Single play carriage S is moved to the load position by subroutine L4, as shown in FIG. 33L, and optical head base 11 is moved to the up position, as shown in FIG. 33M. When microcomputer 40 then performs step S296, S296 becomes NO because no disc is in single play carriage S, and (D(0)=0) is stored in microcomputer 40.

Microcomputer 40 then goes to the stop mode (FIG. 9A through 9D) to monitor the operation of stock switch 41, eject/load switch 42, stop switch 44, carriage S selection switch 45, and carriages 1–6 selection switch 46.

OPERATING EXAMPLE 11

Operating example 11 is described with reference to FIGS. 1, 5, 18C, 22 and 34A through 34E.

In this example (FIG. 34A), tray 7, with single play carriage S for single play operation, is positioned in the eject position, a disc is placed in single play carriage S, and there are no discs in carriages 1 to 6 in stocker 14.

When play switch 43 is operated, microcomputer 40 performs step S153 and subroutine L10 in the eject mode (FIG. 18C). Tray 7 decelerates in area S2 (FIG. 22) as it moved to the load position, as shown in FIG. 34B.

Figure 34C:
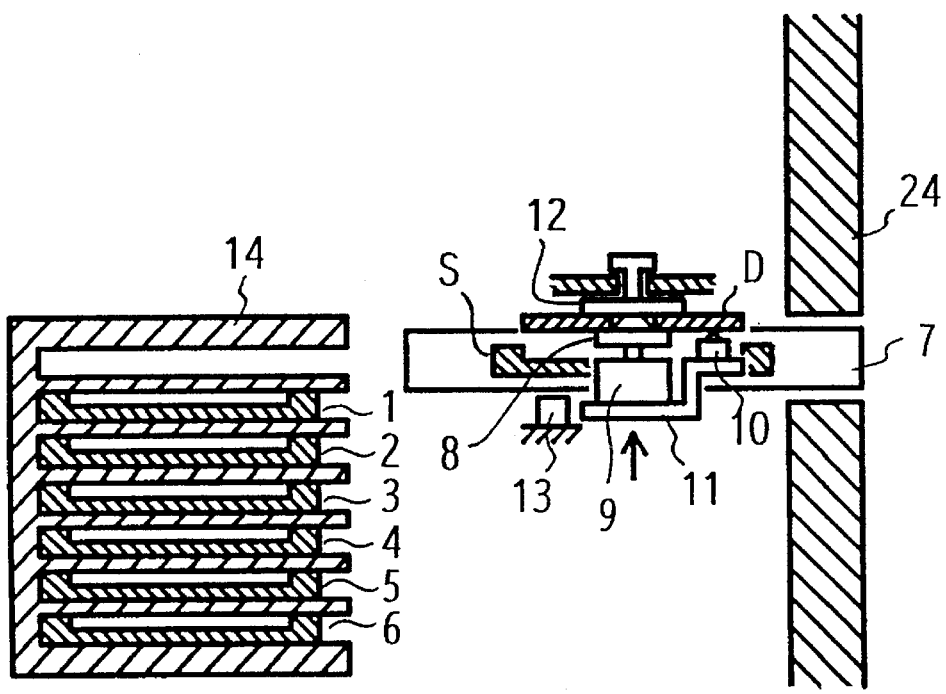
Figure 34D:
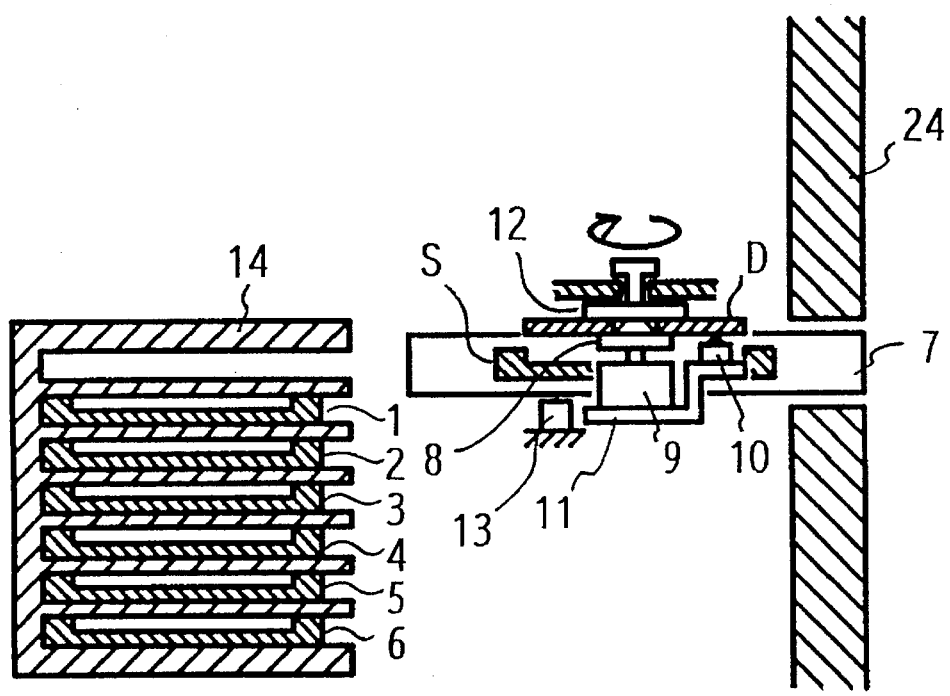

When microcomputer 40 reaches step S220 (FIG. 18C), the presence of disc on carriage S is detected, and stored as D(0)=1 in step S221. Then, optical head base 11 is moved to the up position by subroutine L7 to clamp disc D for stand by for playback, as shown in FIG. 34C. After performing step S222, as shown in FIG. 34D, microcomputer 40 goes to the play mode (FIG. 21) to monitor the operation of stock switch 41, eject/load switch 42, stop switch 44, carriage S selection switch 45 and carriages 1–6 selection switch 46, as well as to detect the end of the music on disc D.

Figure 34E:
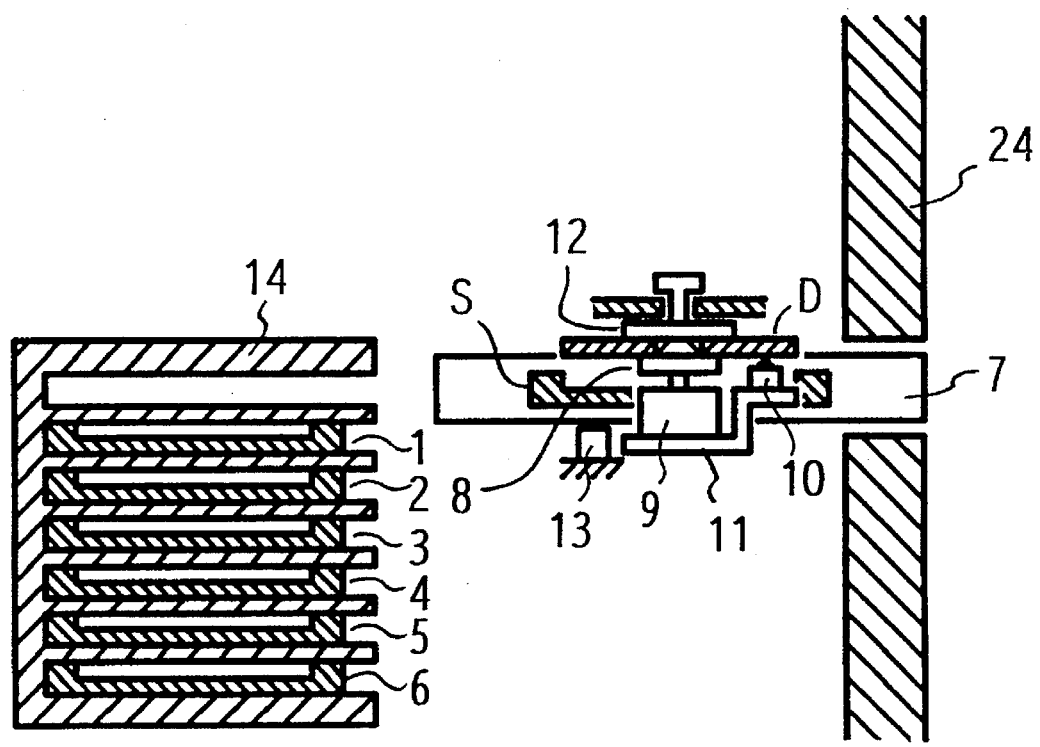

Once the end of the music is detected, microcomputer 40 performs steps S235 and S290 of the play mode (FIG. 21D). After having initiated the stop mode as shown in FIG. 34E, microcomputer 40 performs step S291, which becomes YES because single play carriage S is installed in tray 7. Microcomputer 40, then goes to the stop mode (FIGS. 9A through 9D) to monitor the operation of stock switch 41, eject/load switch 42, stop switch 44, carriage S selection switch 45 and carriages 1–6 selection switch 46 detect the mode switch operation.

OPERATING EXAMPLE 12

Operating example 12 is described with reference to FIGS. 1, 5, 18C, 21A through 21D, 22, 35A through 35L, 36A and 36B.

In this example FIG. 35A, tray 7 with carriage 2 installed for single play operation is positioned in the eject position, there is a disc held in carriage 2 as well as in single play carriage S and carriage 1 in stocker 14.

When play switch 43 is operated, microcomputer 40 performs steps S153 and subroutine L10 of the eject mode (FIG. 18C). Tray 7 decelerates in area S2 (FIG. 22) as it is moved to the load position, as shown in FIG. 35(B).

Figure 35C:
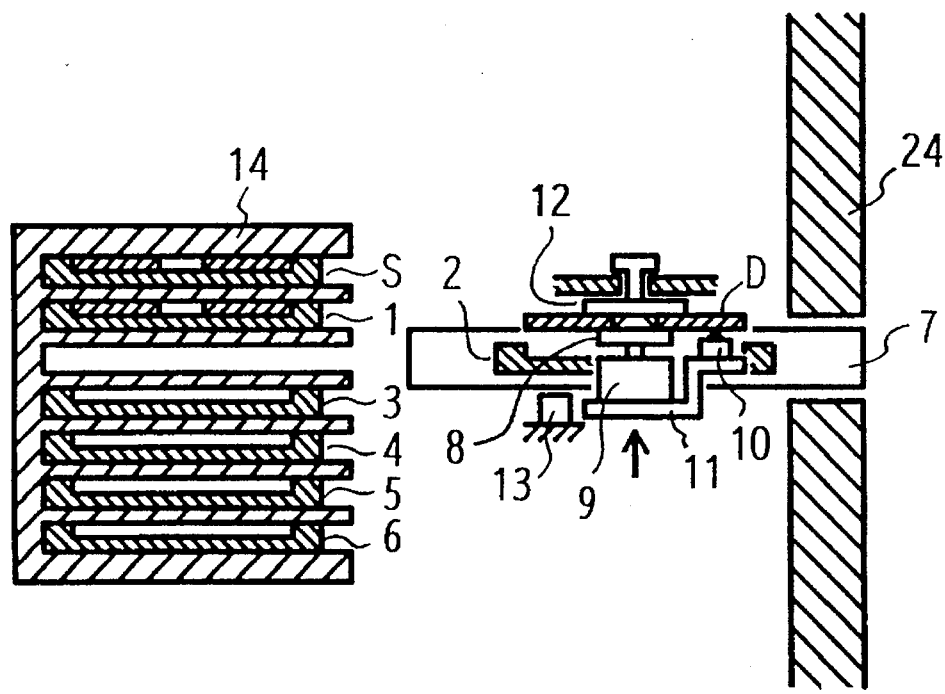
Figure 35D:
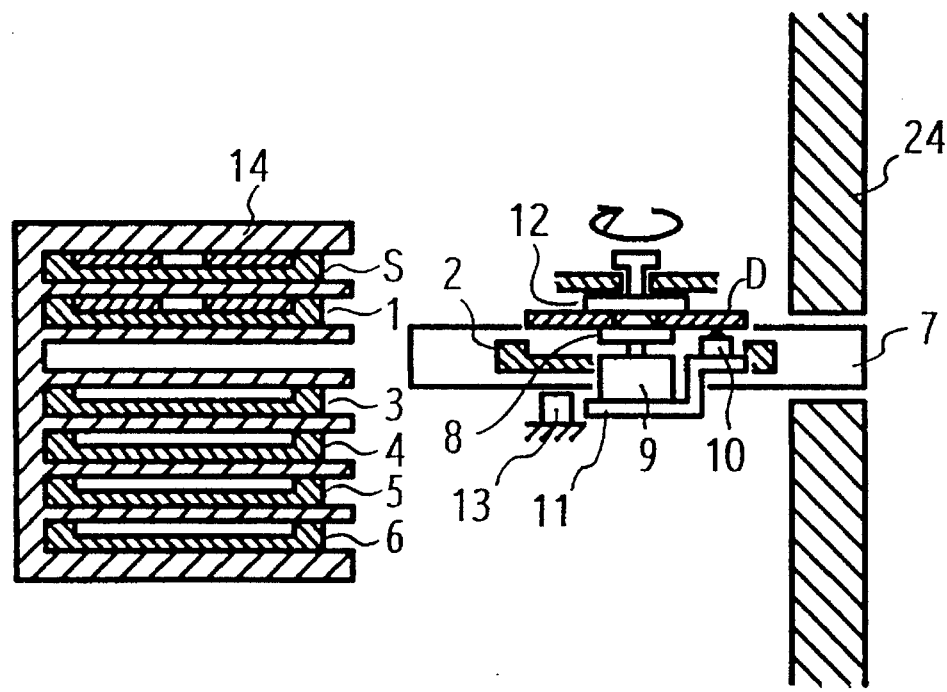

When microcomputer 40 performs step S220, whether or not a disc is held in carriage 2 is determined. If YES, the data is stored in microcomputer 40 as D(2)=1. Optical head base 11 is moved to the up position to clamp disc D to stand by for playback, as shown in FIG. 35C. After initiating the play mode by performing step S222, as shown in FIG. 35D, microcomputer 40 goes to the play mode (FIG. 21A through 21D) to monitor the operation of stock switch 41, eject/load switch 42, stop switch 44, carriage S selection switch 45, and carriages 1–6 selection switch 46, as well as detect the end of music on the disc D.

Figure 35E:
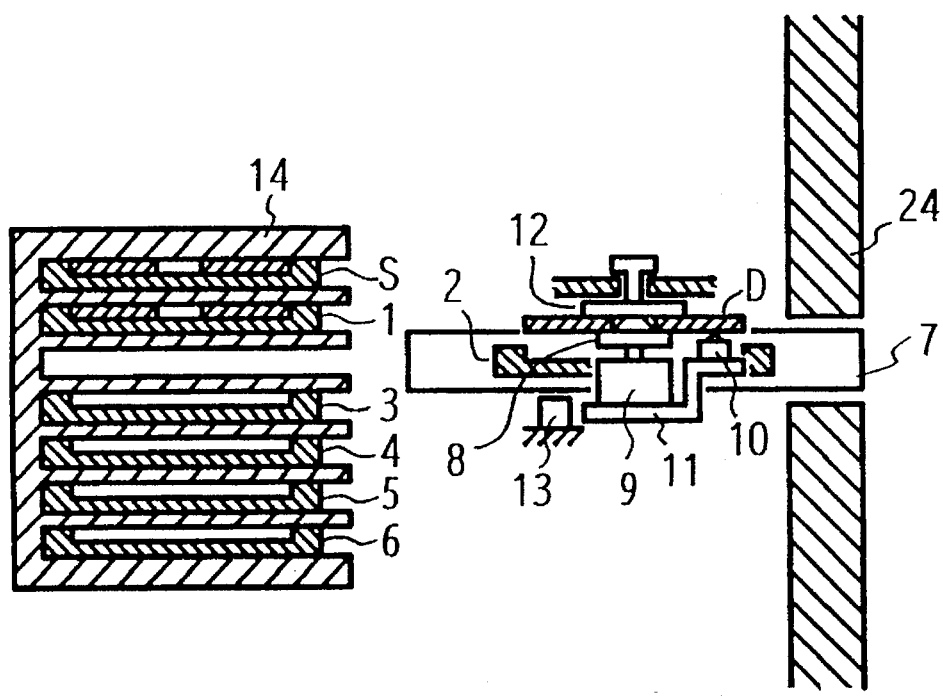
Figure 35F:
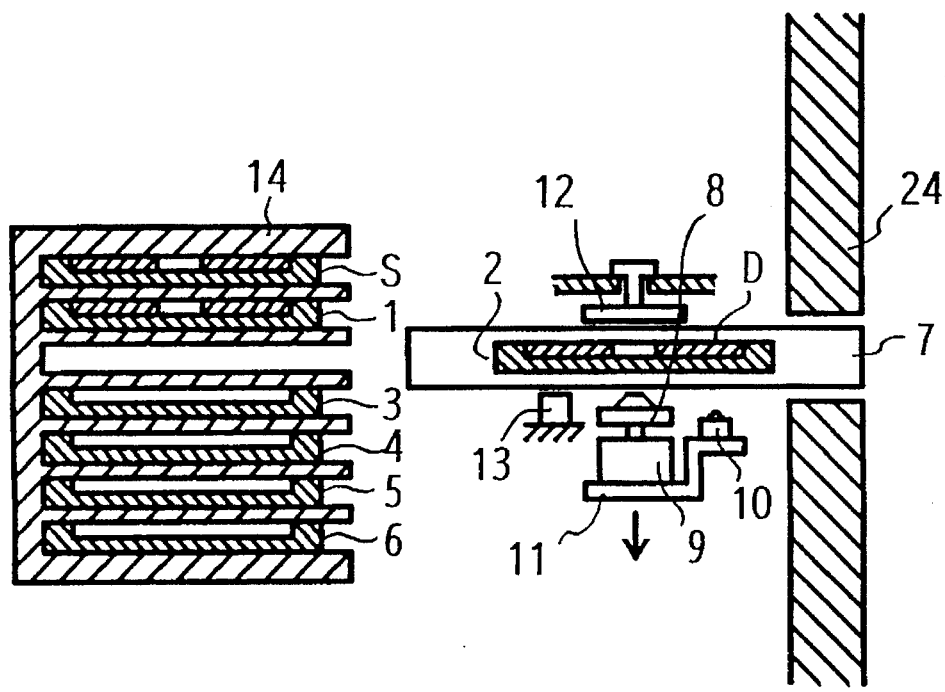
Figure 35G:
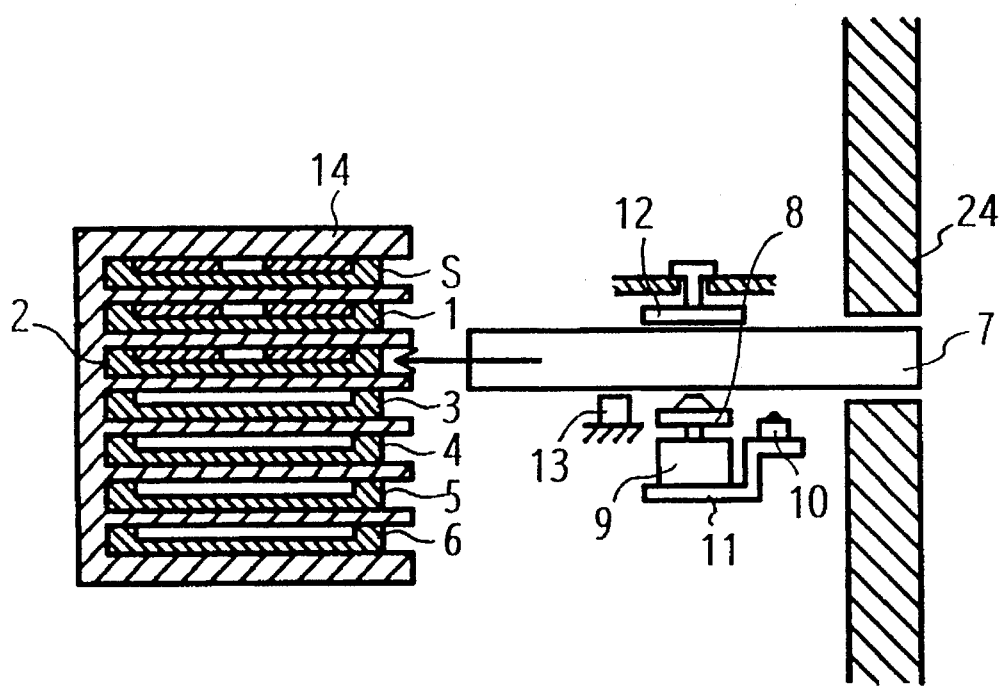

When the end of music on disc D is detected, microcomputer 40 performs steps S235 and S290 of the play mode (FIG. 21D). After initiating the stop mode, as shown in FIG. 35(E), microcomputer 40 performs S291. Because single play carriage S not installed in tray 7, step becomes NO. Microcomputer 40 then enters a loop of steps S293 to S295. Because n=7 step S295 becomes YES. Microcomputer 40 then performs subroutine L1 moving optical head base 11 down position, as shown in FIG. 35F and carriage 2 is moved to its store position in stocker 14 by subroutine L2, as shown in FIG. 35G.

Figure 35H:
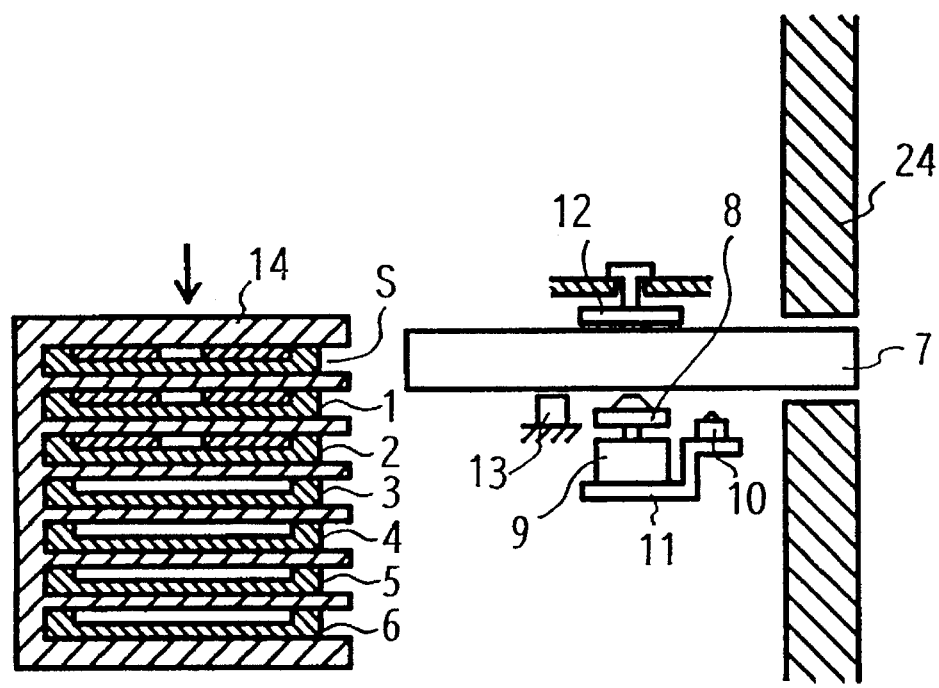
Figure 35I:
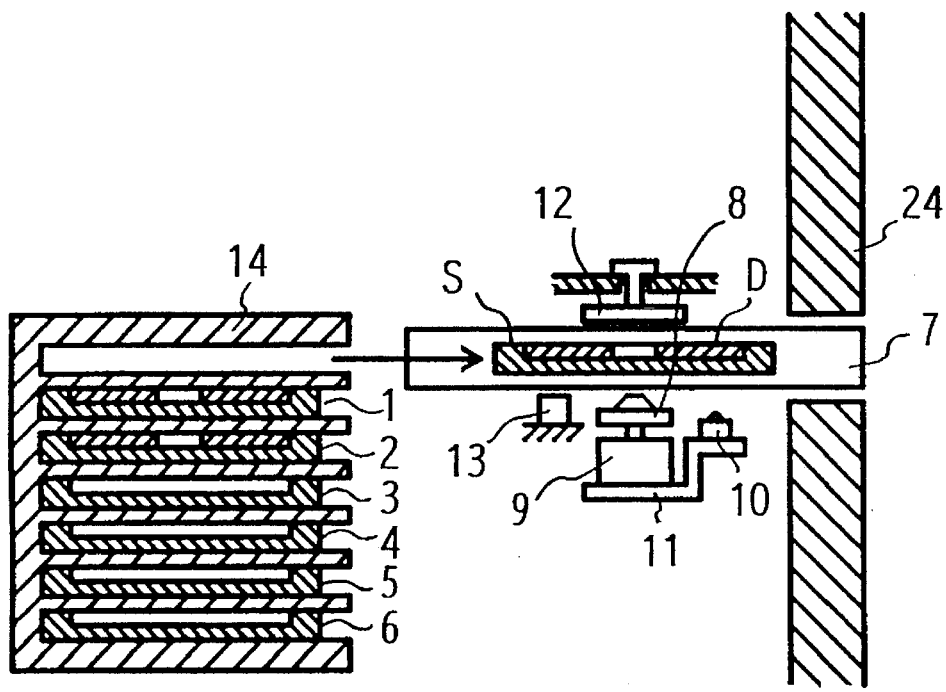
Figure 35J:
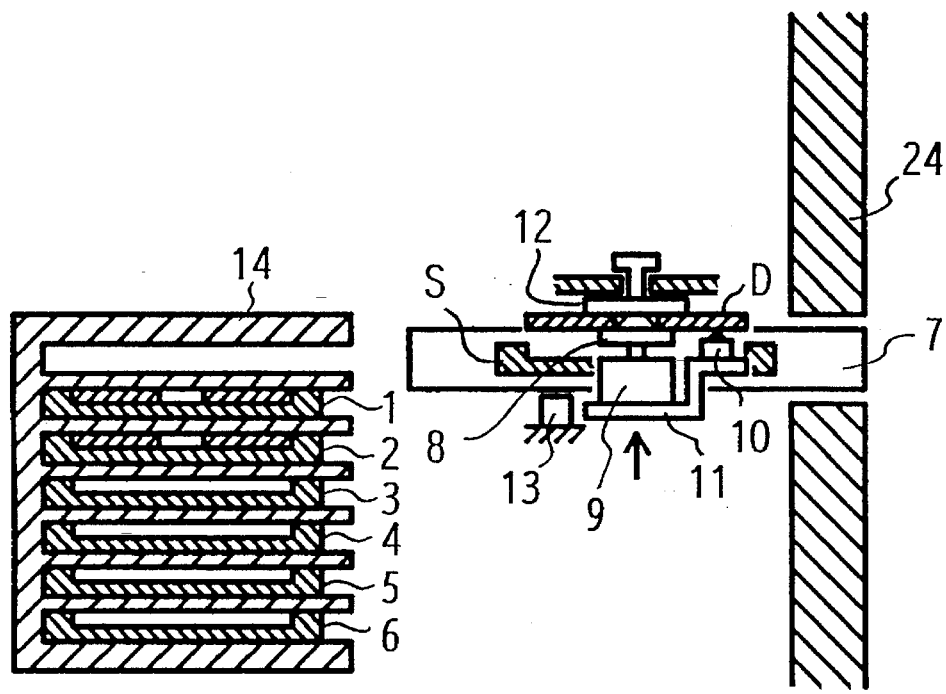
Figure 35K:
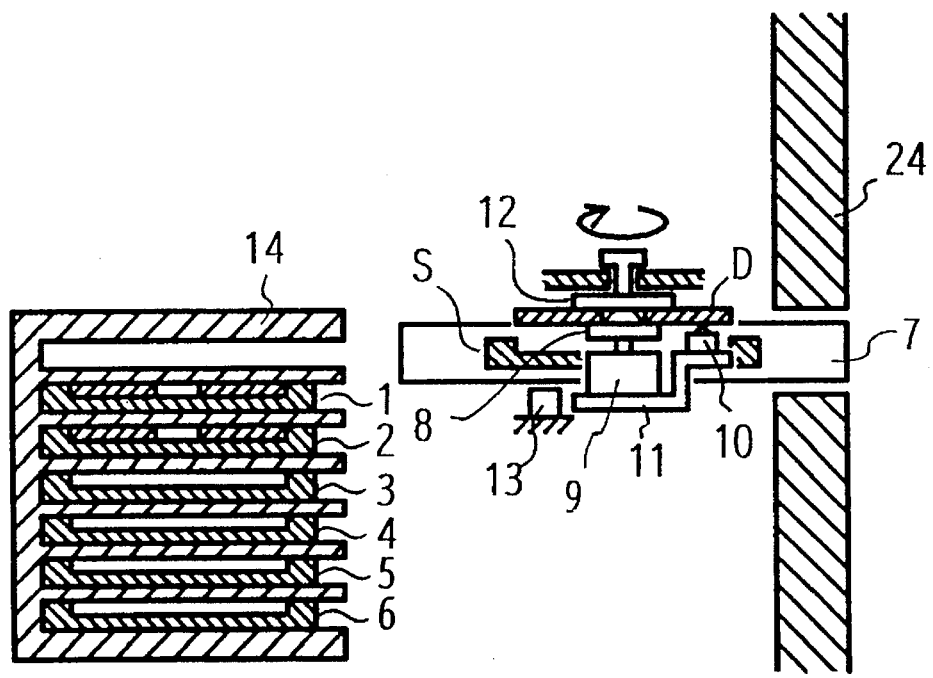

When microcomputer 40 performs subroutine L8, stocker 14 is moved to storage position S, as shown in FIG. 35H. Single play carriage S is moved to the load position in tray 7 by subroutine L4 as shown in FIG. 35I. Optical base head 11 then moves to the up position in subroutine L7 to clamp disc D to stand by for playback, as shown in FIG. 35J.

When microcomputer 40 performs S296 and S297 to initiate the play mode, as shown in FIG. 35K, it again monitors the operation of stock switch 41, eject/load switch 42, stop switch 44, carriage S selection switch 45 and carriage 1–6 selection switch 46, and detects the end of music on disc D.

Figure 35L:
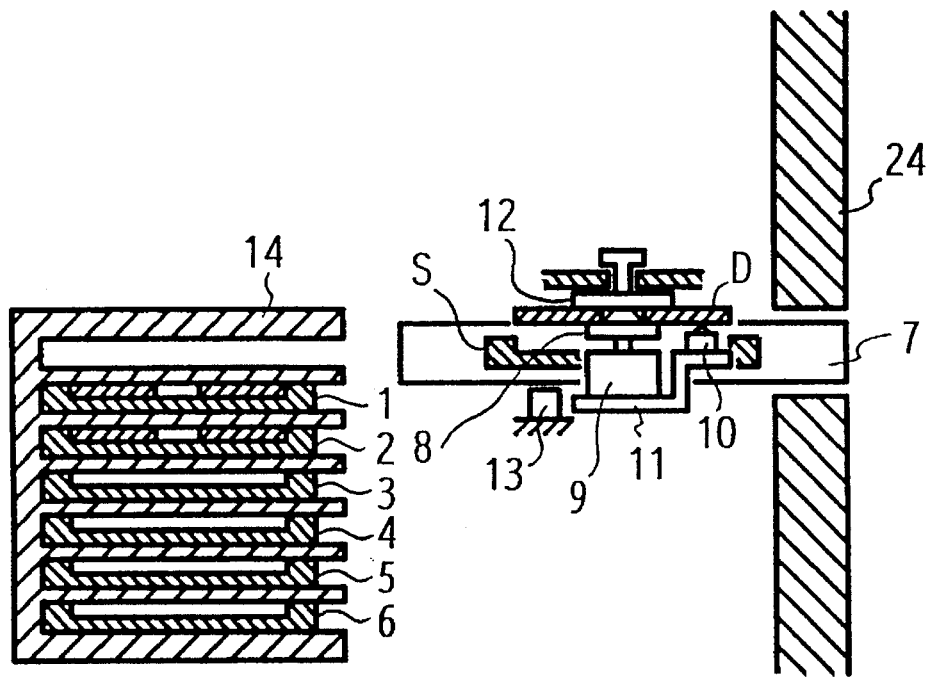

Once the end of music on disc D is detected, microcomputer 40 again performs steps S235 and S290. After having thus initiated the stop mode, as shown in FIG. 35L, microcomputer 40 performs step S291. Since carriage S is in tray 7, S291 becomes YES. Then, microcomputer 40 goes to the stop mode (FIGS. 9A through D) to monitor the operation of stock switch 41, eject/load switch 42, stop switch 44, carriage S selection switch 45 and carriages 1–6 selection switch 46.

Figure 36A:
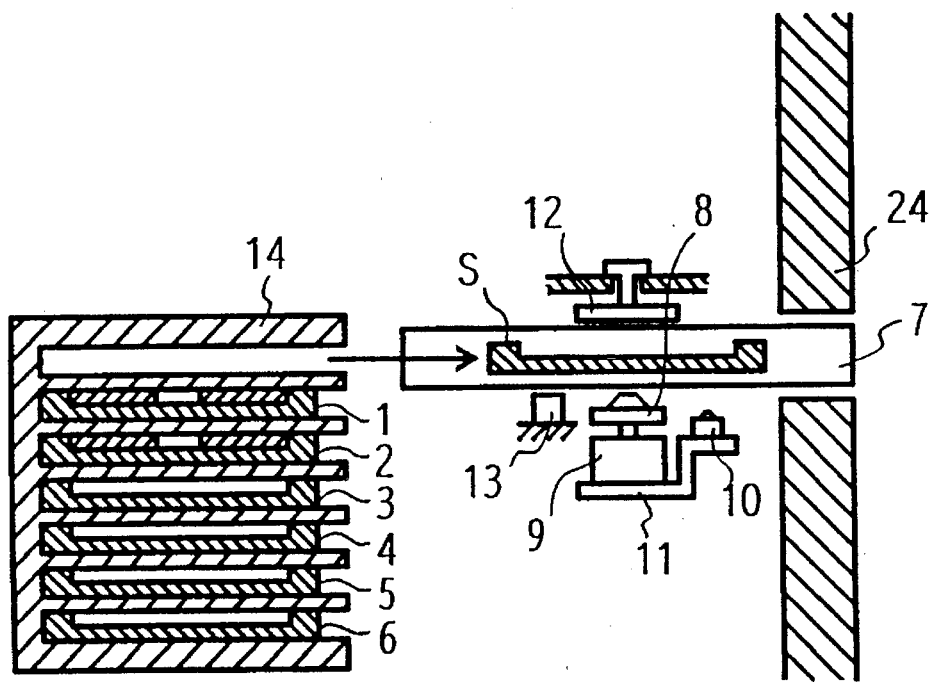
Figure 36B:
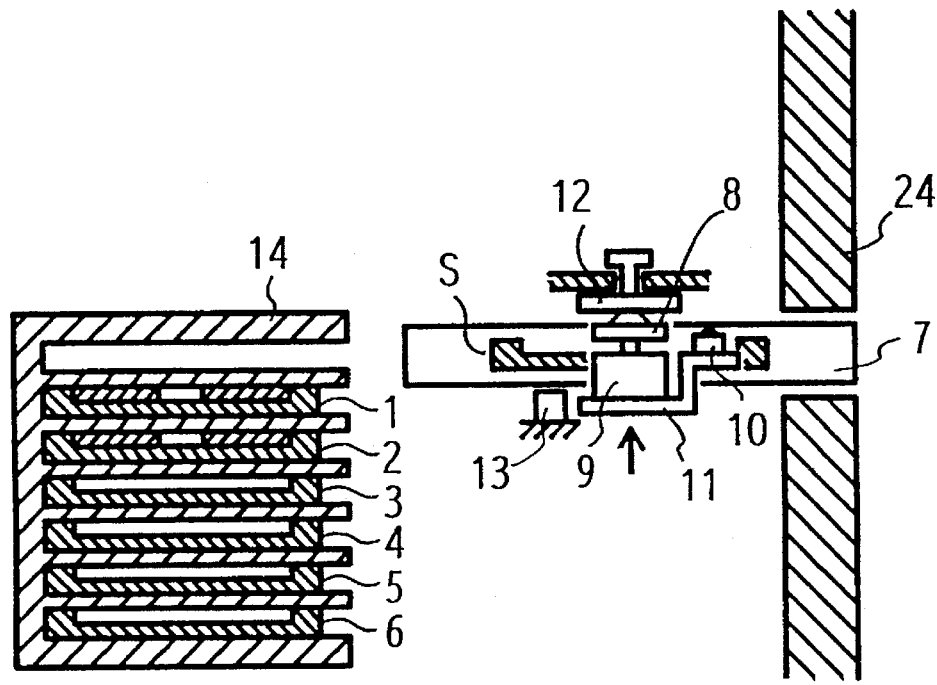

If no disc were mounted on single play carriage S, in this embodiment, carriage S is moved to the load position in tray 7 by subroutine L4, as shown in FIG. 36A and optical head base 11 is moved to the up position by subroutine L7, as shown in FIG. 36B. When microcomputer 40 performs step S296, S296 becomes no because the disc data stored for single play carriage S is that single play carriage S is empty, D(0)=0. Microcomputer 40 then goes to the stop mode (FIG. 9) to monitor the operation of stock switch 41, eject/load switch 42, stop switch 44, carriage S selection switch 45 and carriages 1–6 selection switch 46.

OPERATING EXAMPLE 13

Operating example 13 is described with reference to FIGS. 1, 5, 18C, 22B and 37A through 37G.

In this example, tray 7 with carriage 2 installed is in the eject position, and discs are stored in carriages S and 1, as shown in FIG. 37A. When play switch 43 is operated, microcomputer 40 performs step 153 and subroutine L10 of the eject mode (FIG. 18C), moving tray 7 to the load position through deceleration area S2 (FIG. 22B) where it slows as it approaches the load position, as shown in FIG. 37B.

Figure 37C:
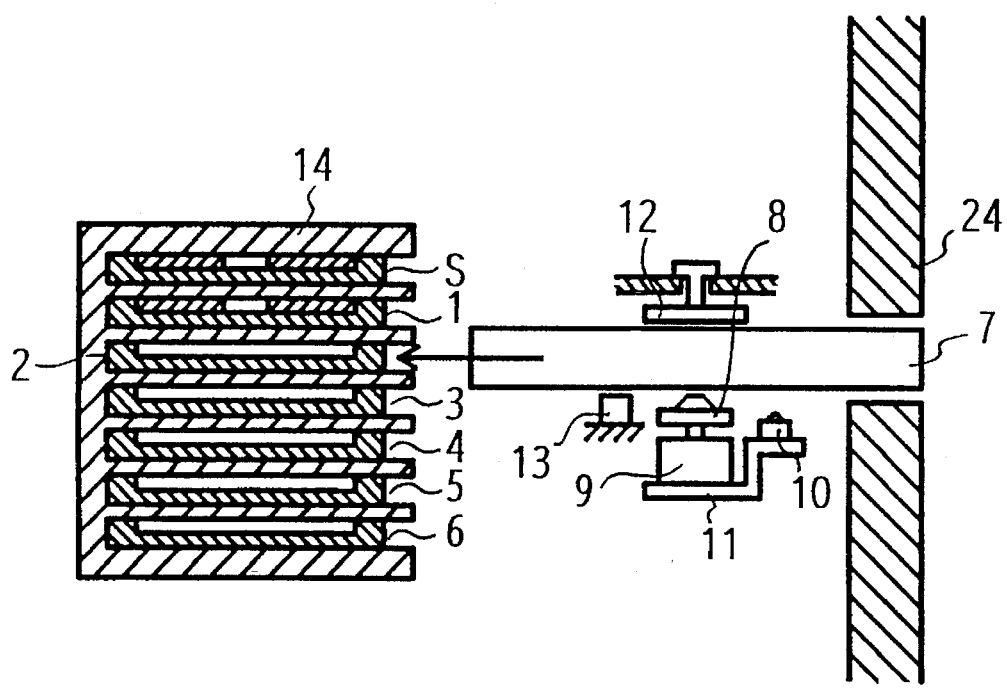
Figure 37D:
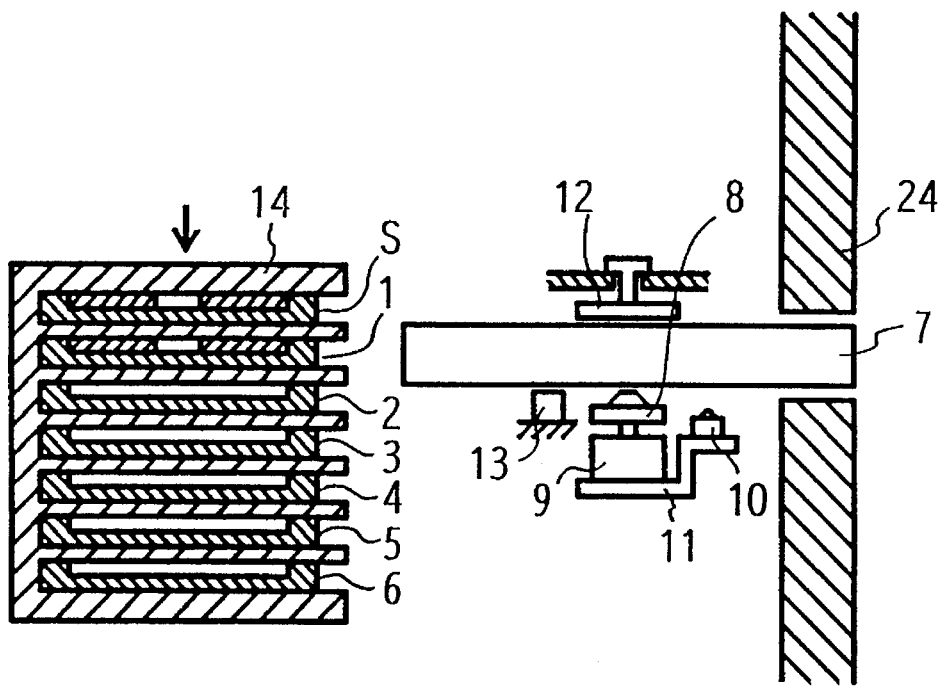

When microcomputer 40 performs step S220, it checks the carriage in tray 7, carriage 2 in the figure for the presence of a disc. Because carriage 2 is empty, microcomputer 40 stores D(2)=0 (carriage 2 empty) in step S223. Step S224 becomes NO because carriage 2 is in tray 7 in the load position. Microcomputer 40 then performs step 225 to enter the loop of steps S226 through S228. Step S226 becomes YES (n is 1) and a carriage 2 is moved to the store position by subroutine L2 (FIG. 37C).

Figure 37E:
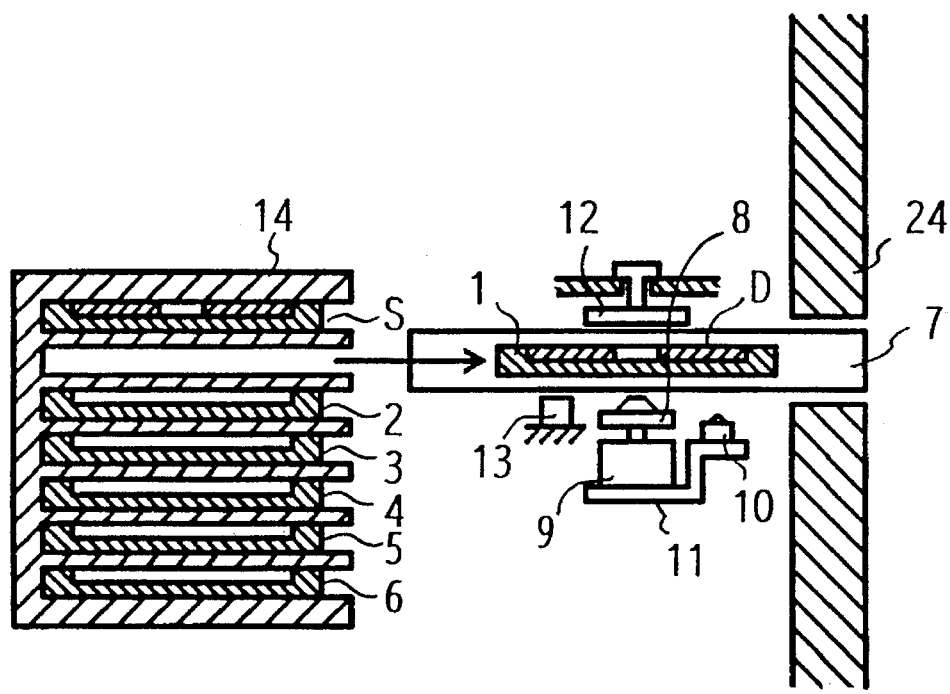
Figure 37F:
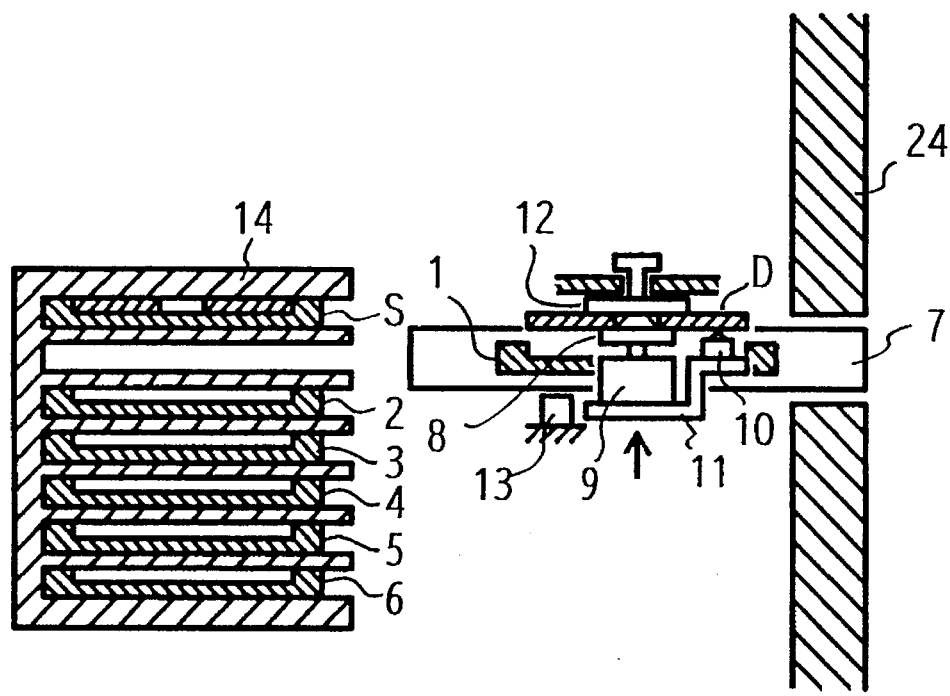
Figure 37G:
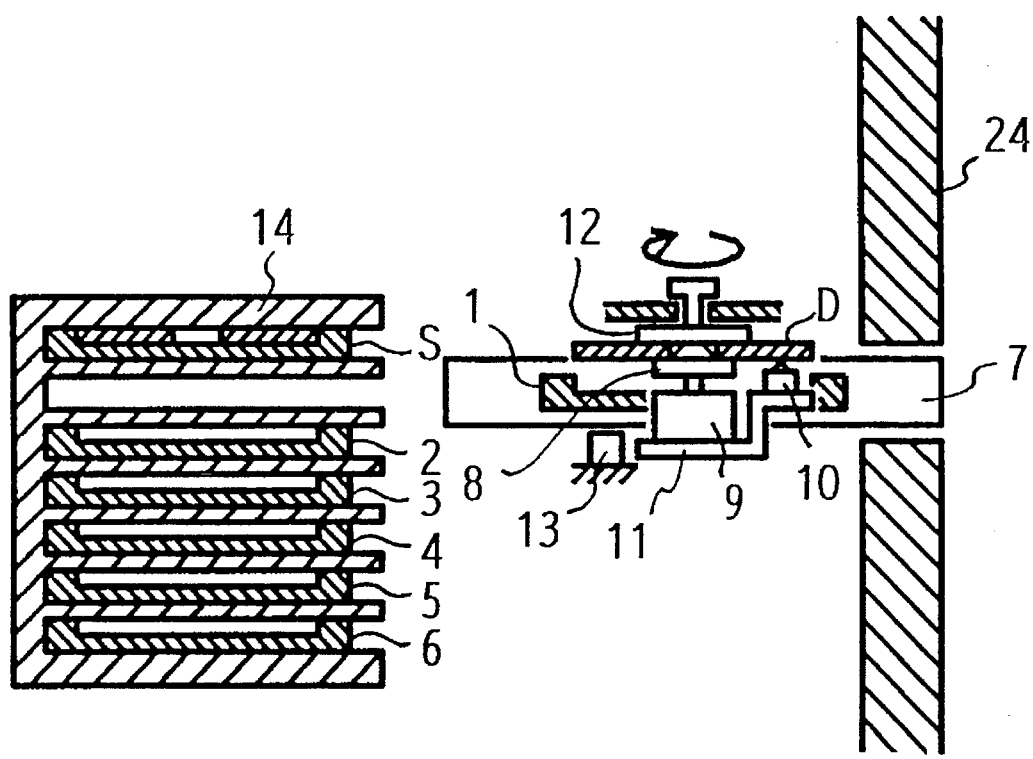

After performing subroutine L8, to move stocker 14 to the position 1 (FIG. 37D), microcomputer 40 moves carriage 1 to the load position by performing subroutine L4 (FIG. 37E). At this time, microcomputer 40 performs subroutine L7, moving optical head base 11 to the up position clamping disc D at stand-by for playback, as shown in FIG. 37F. Microcomputer 40 then proceeds to the stop mode (FIG. 9A through 9D) to monitor the operation of mode switches stock switch 41, eject/load switch 42, stop switch 44, carriage S selection switch 45 and carriages 1–6 selection switch 46 during playback, as shown in FIG. 37G.

OPERATING EXAMPLE 14

Operating example 14 is described with reference to FIGS. 1, 5, 18C and 38A through 38E.

Figure 38A:
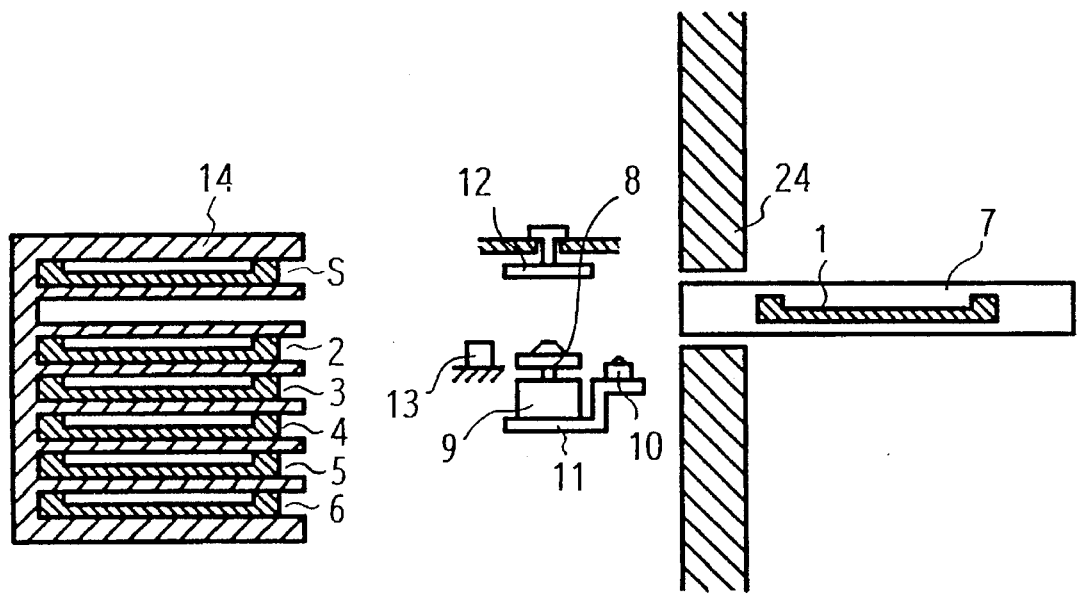
Figure 38B:
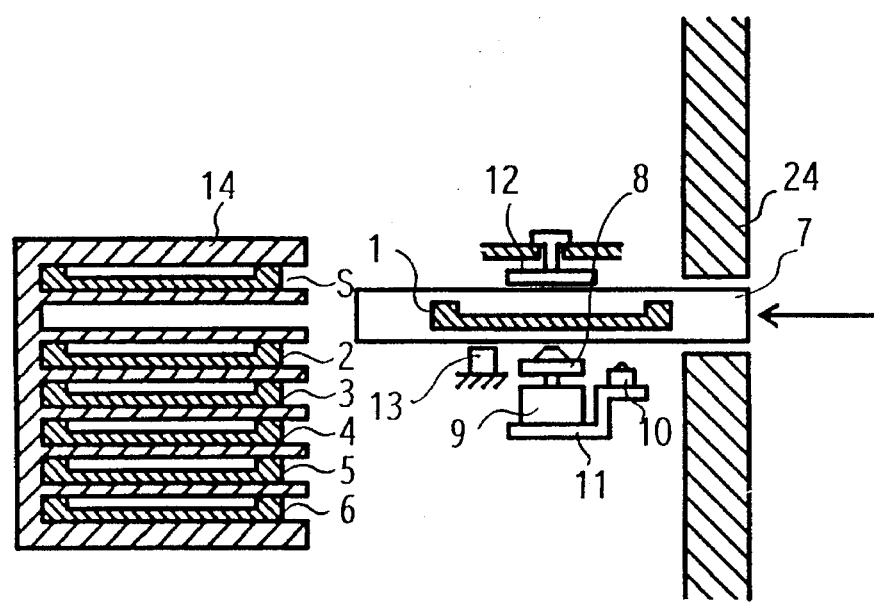

In this example, tray 7 with carriage 1 installed is in the eject position and all carriages are empty as shown in FIG. 38A. When play switch 43 is operated, microcomputer 40 performs step 153 and subroutine L10 of the eject mode (FIG. 18C), to move tray 7 through the deceleration area (FIG. 22B) to the load positioned shown in FIG. 38B.

Figure 38C:
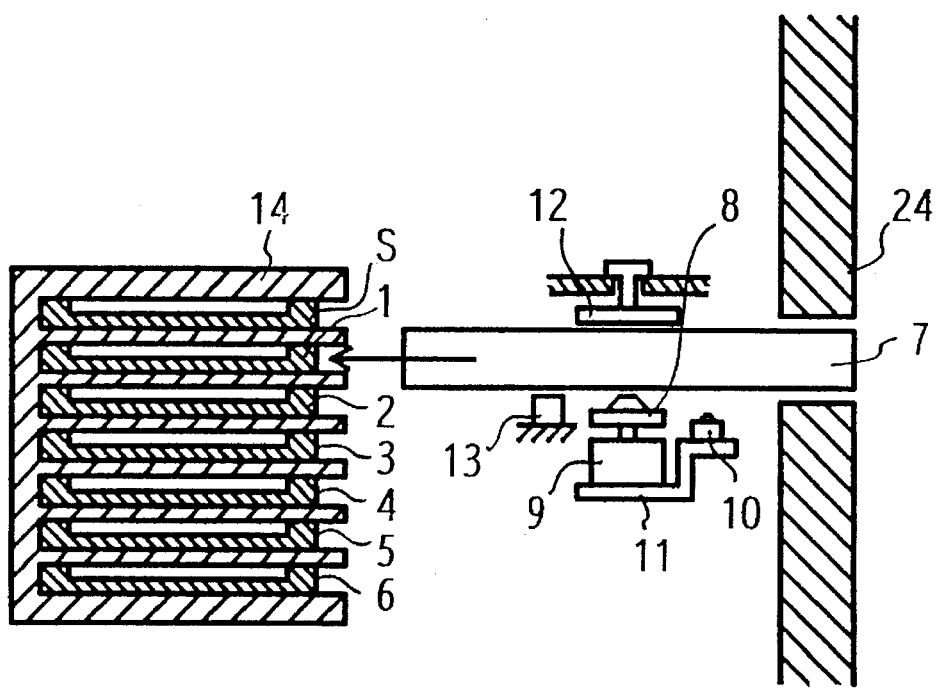

When a microcomputer 40 then performs step S220, to determine the presence of a disc on carriage 1. Because there is no disc in carriage 1, microcomputer 40 stores D(1)=0 (carriage 1 is empty) in step S221. Step S224 becomes NO since a carriage 1 is in tray 7 in the load position. Microcomputer 40 then performs step S225 to enter the loop of steps S226 through S228. Step S228 becomes YES at n equals 7 and carriage 1 is moved to the store position in subroutine L2 as shown in FIG. 38C.

Figure 38D:
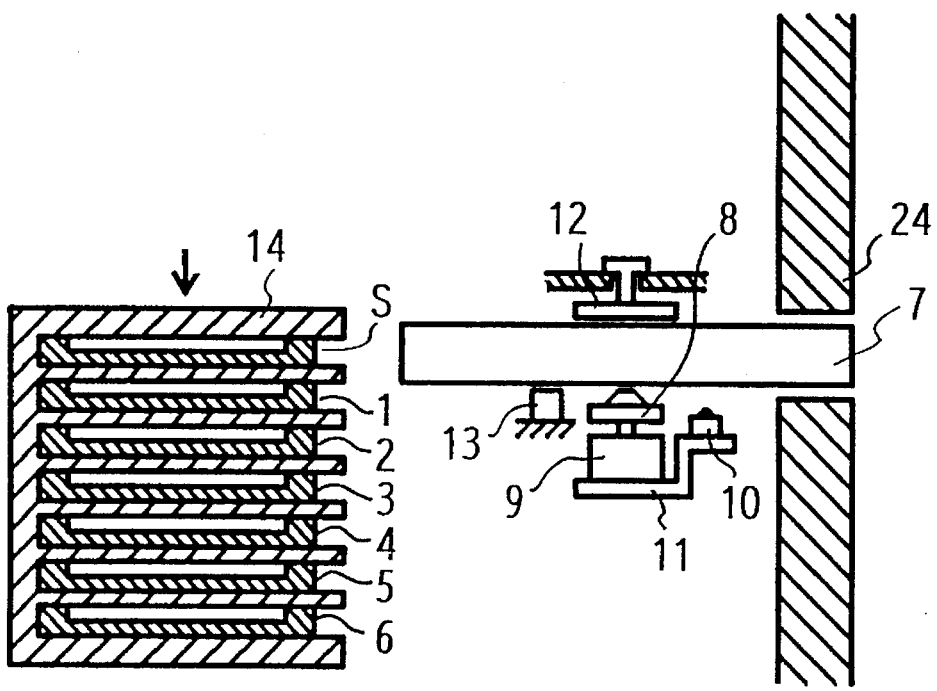
Figure 38E:
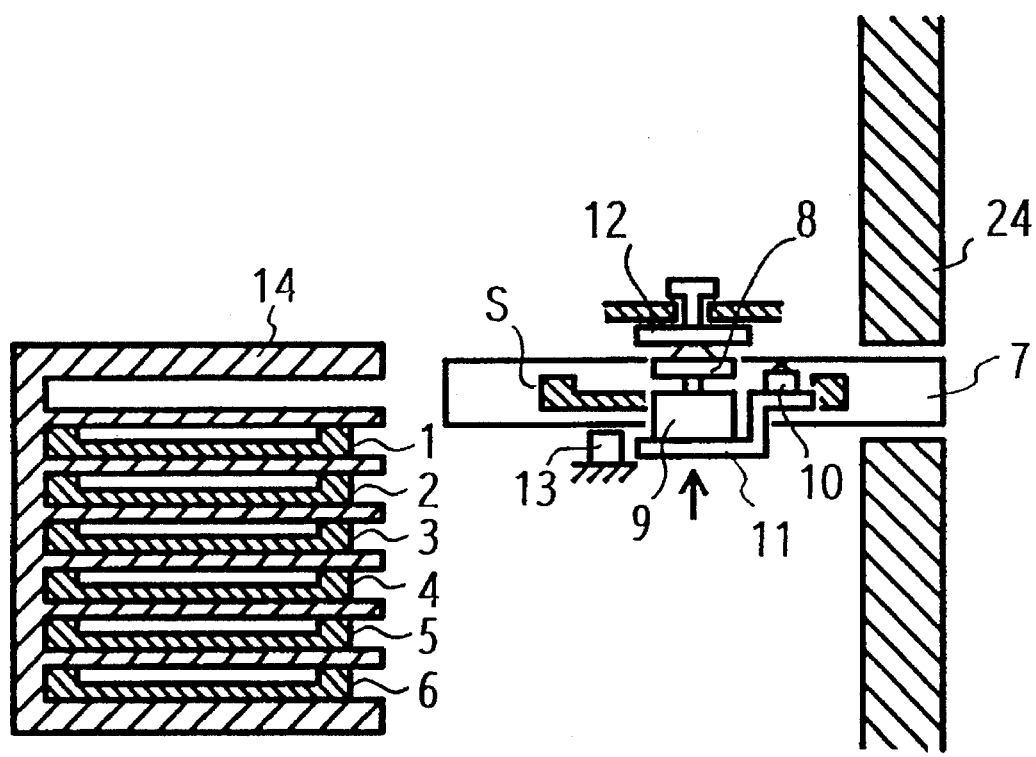

After reaching subroutine L8, microcomputer 40 moves a stocker 14 to the position S shown in FIG. 38D, and performs subroutine L4 to move single play carriage S to the load position in tray 7, as shown in FIG. 38E. Microcomputer 40 then moves optical head base 11 to the up position in subroutine L7 FIG. 38F, and proceeds to the stop mode (FIG. 9A through 9D to detect the operation of mode switches stock switch 41, eject/load switch 42, stop switch 44, carriage S selection switch 45 and carriages 1–6 selection switch 46.

As described in examples 8 through 14, if play switch 43 is operated during a single-play operation, single play carriage S is inserted in tray 7, microcomputer 40 directs player 100 to play only the disc in tray 7.

If play switch 43 is operated when a changer-play operation carriage m(1≦m≦6) is in tray 7, microcomputer 7 directs player 100 into a changer-play mode for playing discs on carriages m through 6 in order and a disc, if present, on carriage S afterwards. Even when there is no disc on single play carriage S, single play carriage S is inserted in tray 7, prepare for single-play mode operation.

OPERATING EXAMPLE 15

Operating example 15 is described with reference to FIGS. 1, 5, 9C and 39A through 39F.

Figure 39A:
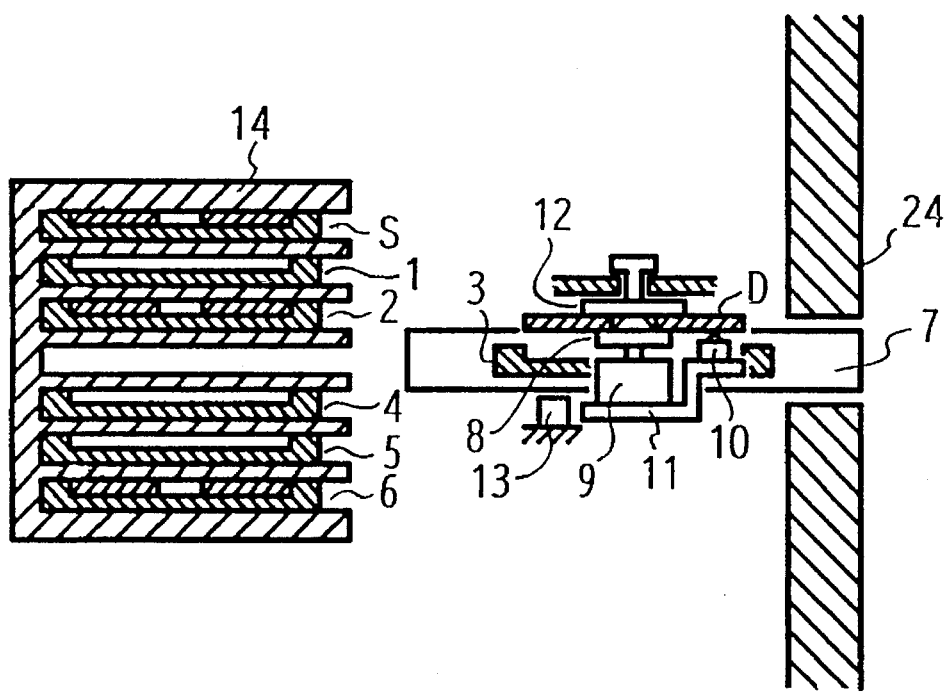
Figure 39B:
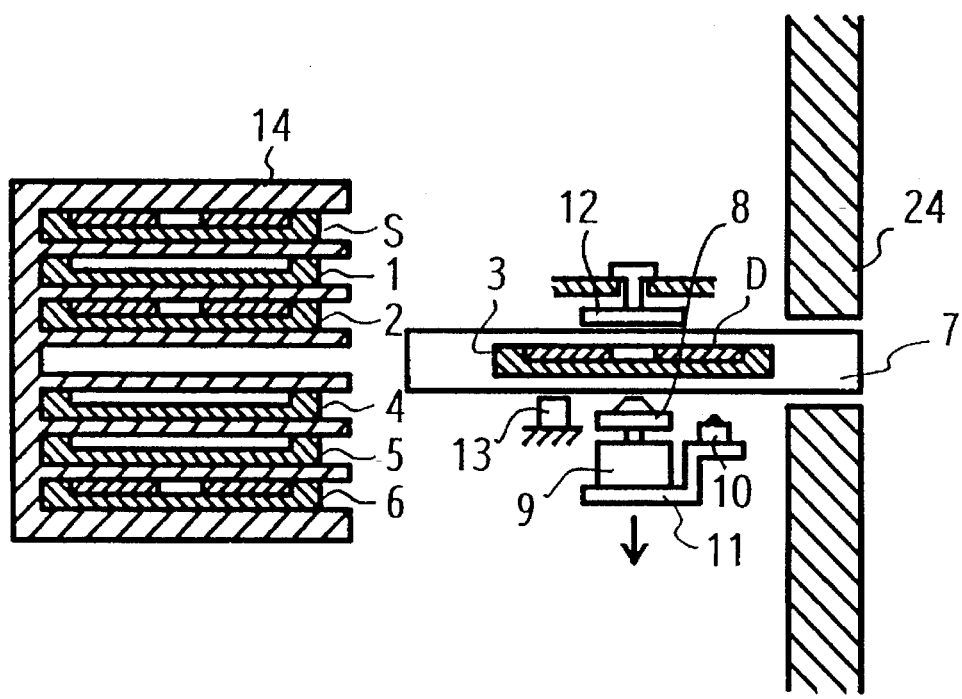
Figure 39C:
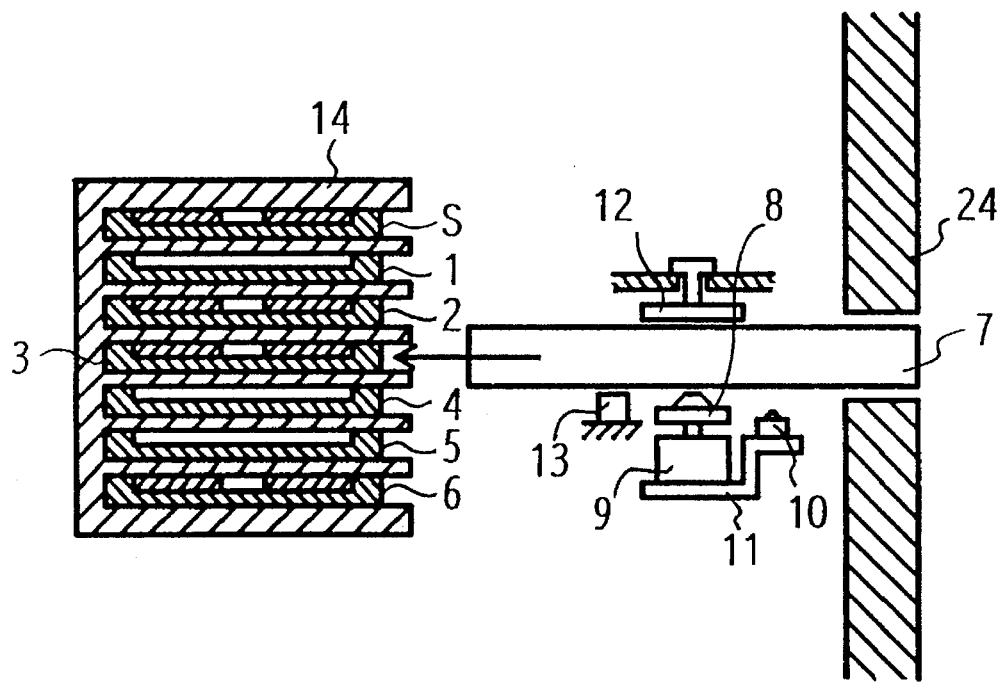

In this example, tray 7 with carriage 3 installed is in the load position, and there are discs present on single play carriage S and carriages 2, and 3 and 6, as shown in FIG. 39A. When carriage S selection switch 45 is operated, microcomputer 40 goes to the stop mode (FIG. 9C) and performs steps S4, S110, and subroutine L1 that moves optical head base 11 to the down position, as shown in FIG. 39B. Microcomputer 40 then performs subroutine L2 to move carriage 3 to its store position in stocker 14, as shown in FIG. 39C.

Figure 39D:
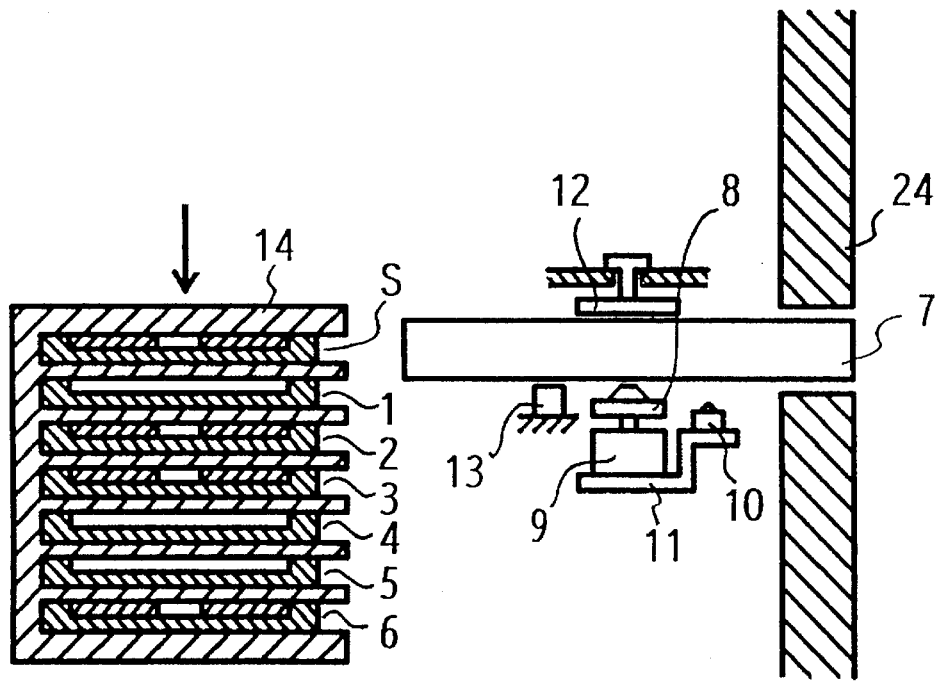
Figure 39E:
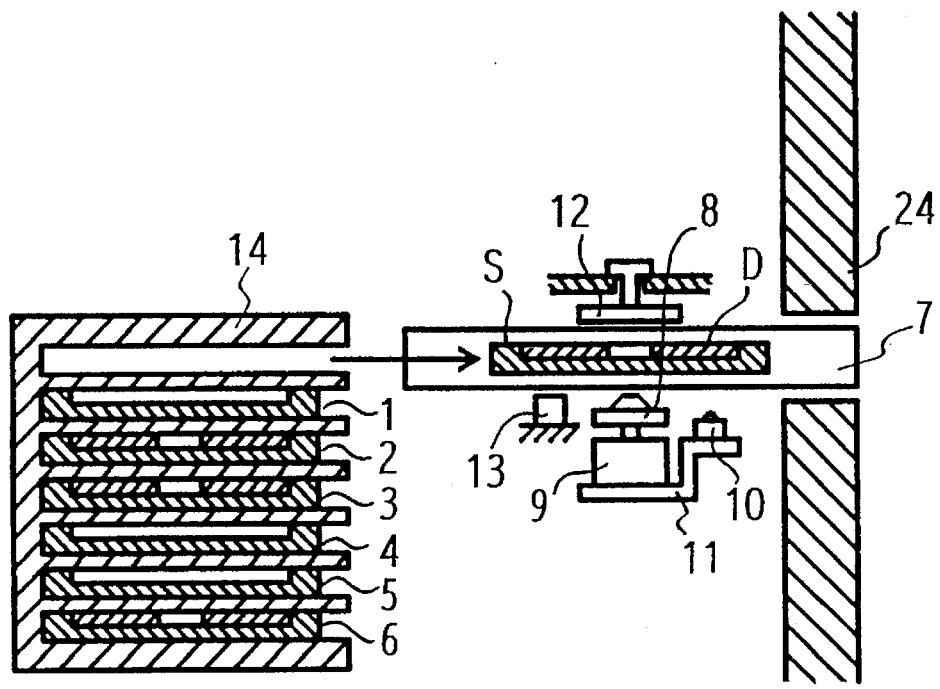
Figure 39F:
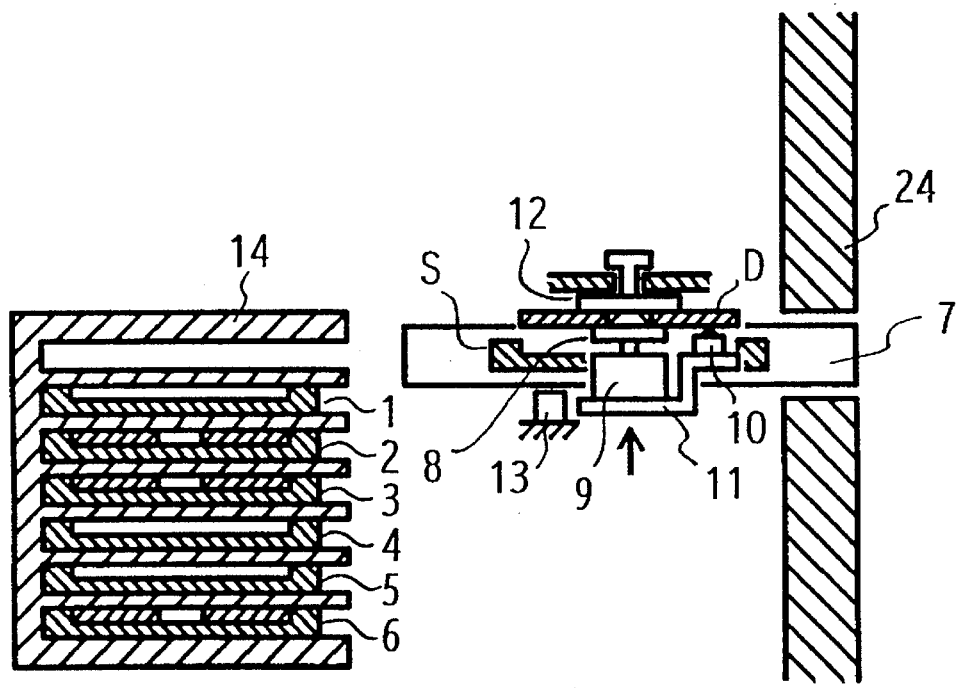

When microcomputer 40 performs subroutine L8, stocker 14 moves to position S, as shown in FIG. 39D, and carriage S is moved from its store position in stocker 14 to the load position in tray 7 by subroutine L4, as shown in FIG. 39E. Subroutine L7 moves optical head base 11 to the up position and clamps disc D at stand-by for playback, as shown in FIG. 39F. Microcomputer 40 then monitors the operation of stock switch 41, eject/load switch 42, stop switch 44, carriage S selection switch 45, and carriages 1–6 selection switch 46.

OPERATING EXAMPLE 16

Operating example 16 is described with reference to FIGS. 1, 5, 9D and 40A through 40P.

Figure 40A:
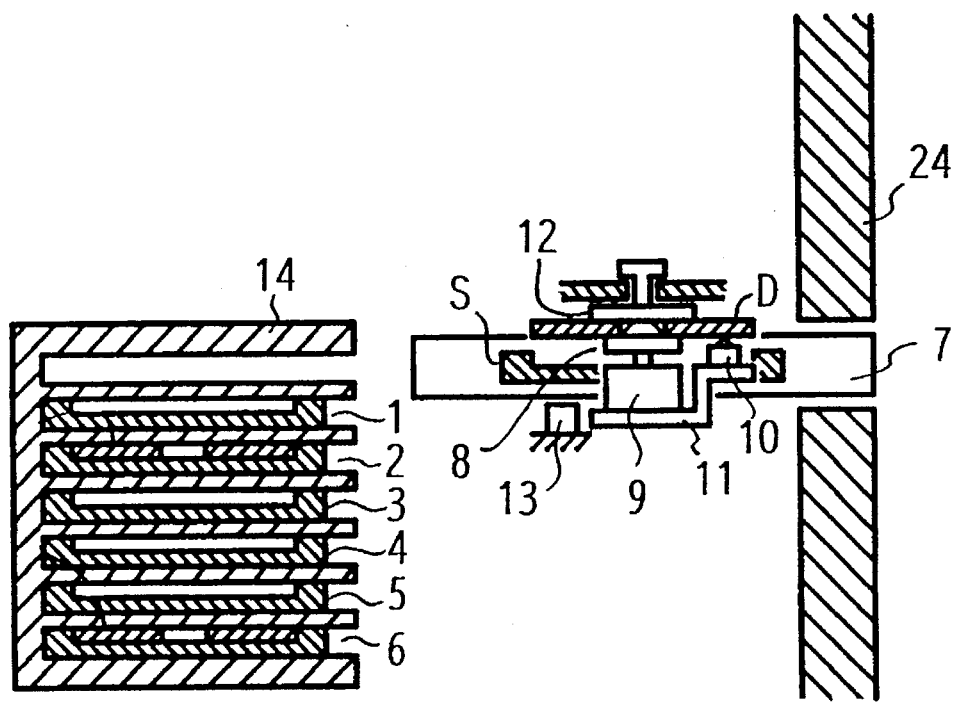

In this example, tray 7 with single play carriage S installed is in the load position, there is a disc in single play carriage S and carriage 2, 6 but carriages 1 and 3 through 5 are empty, as shown in FIG. 40A.

Figure 40B:
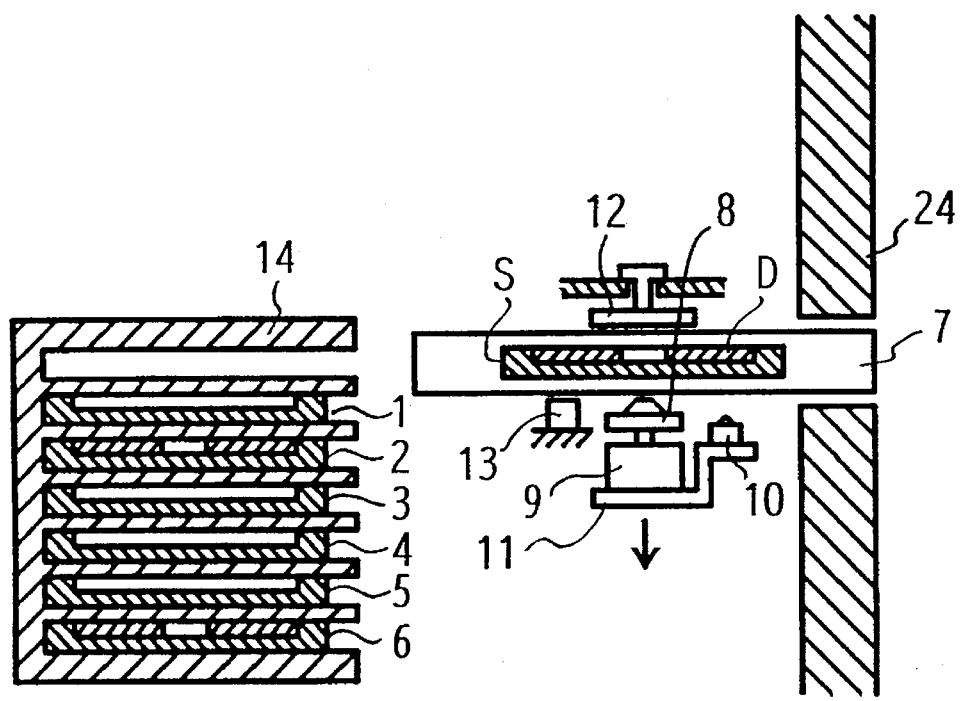
Figure 40C:
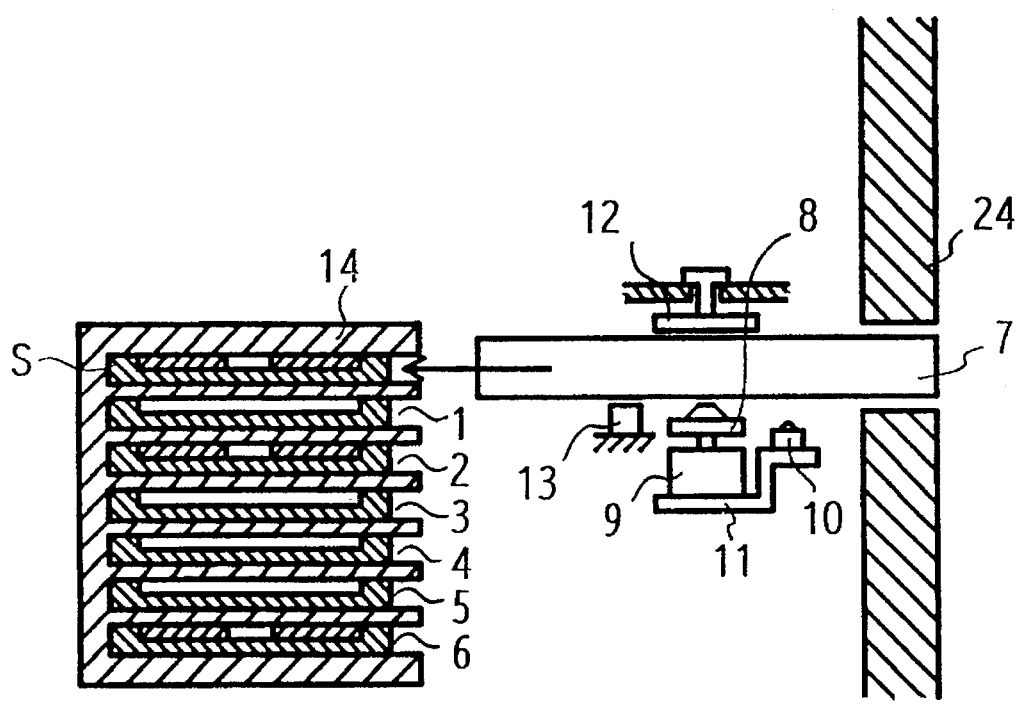

When carriages 1–6 selection switch 46 is operated, microcomputer 40 goes to the stop mode (FIG. 9D), and performs steps S5 and S130 which become YES because a carriage S is installed in tray 7. Microcomputer 40 then performs step S131, and the loop of steps S132 through S134. Step S132 becomes YES because n is equal to 2. Subroutine L1 moves optical head base 11 to the down position, as shown in FIG. 40B. Subroutine L2 moves single play carriage S to the store position FIG. 40C.

Figure 40D:
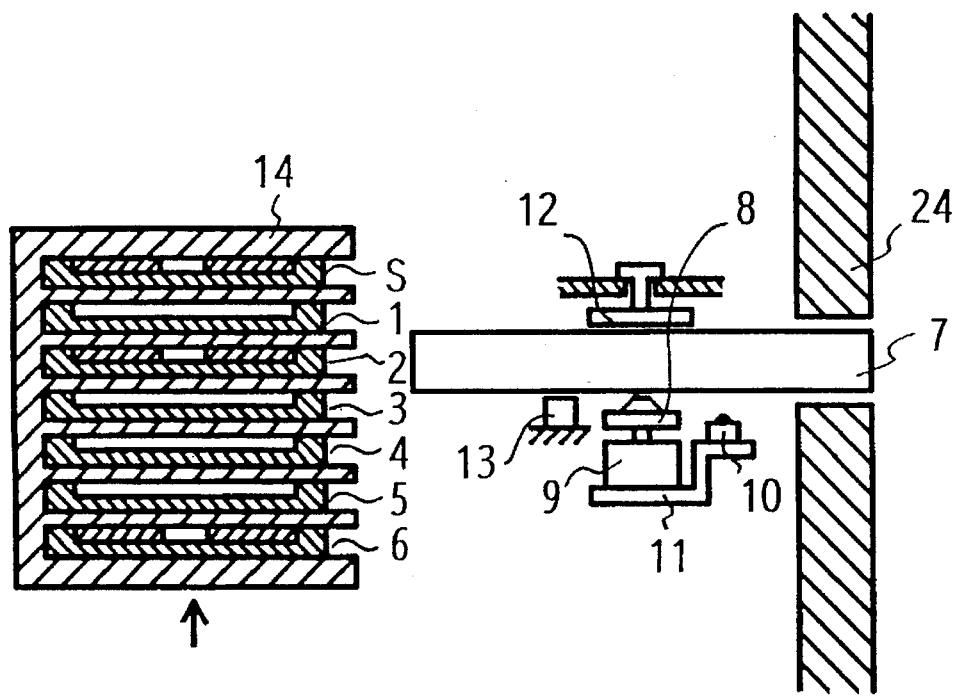
Figure 40E:
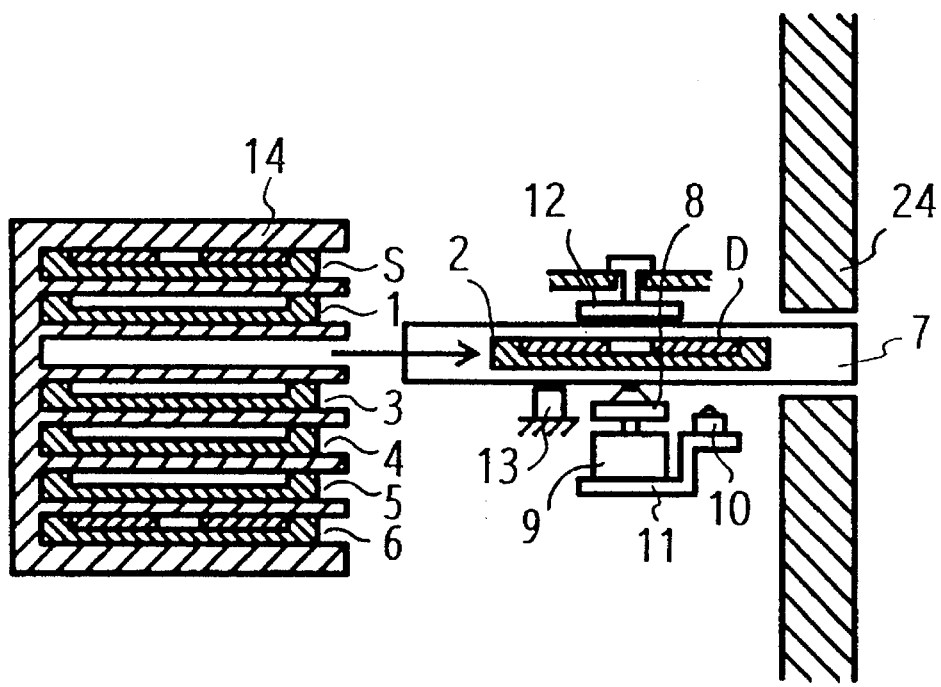
Figure 40F:
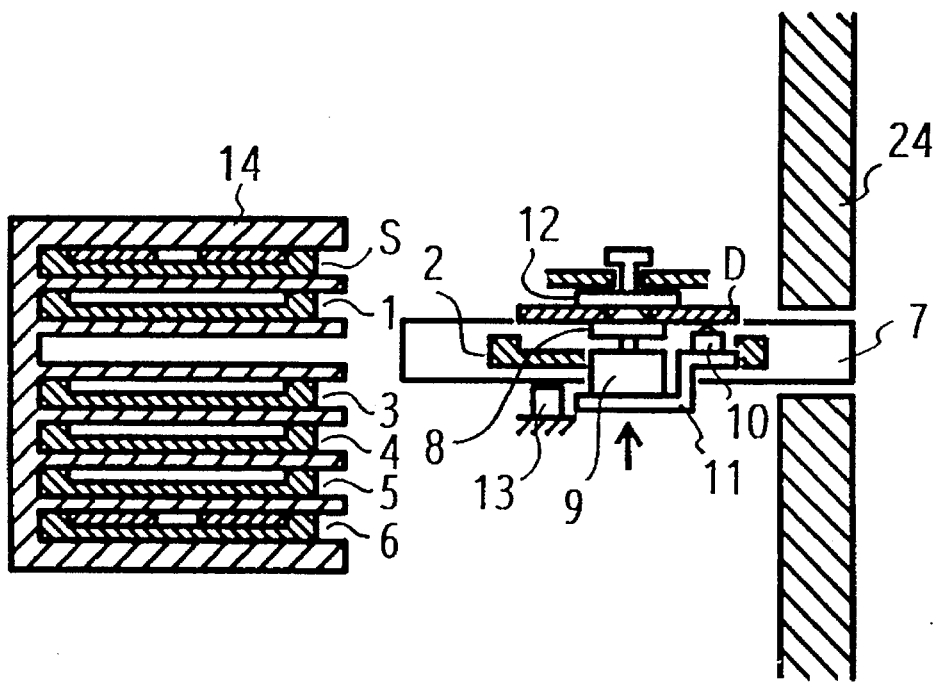

When microcomputer 40 performs subroutine L8, it moves stocker 14 to position 2, as shown in FIG. 40D. Subroutine L4 then moves carriage 2 to the load position in a subroutine L4, as shown in FIG. 40E. Subroutine L7 then moves optical head base 11 to the up position clamping disc D at stand-by for playback, as shown in FIG. 40F, and monitors the operation of stock switch 41, eject/load switch 42, stop switch 44, carriage S selection switch 45 and carriages 1–6 selection switch 46.

Figure 40G:
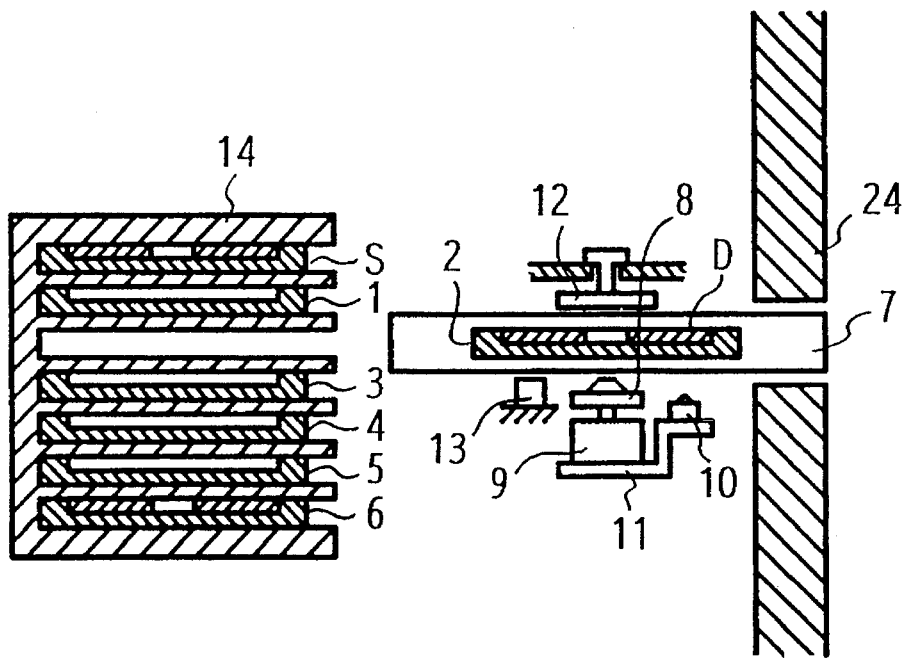
Figure 40H:
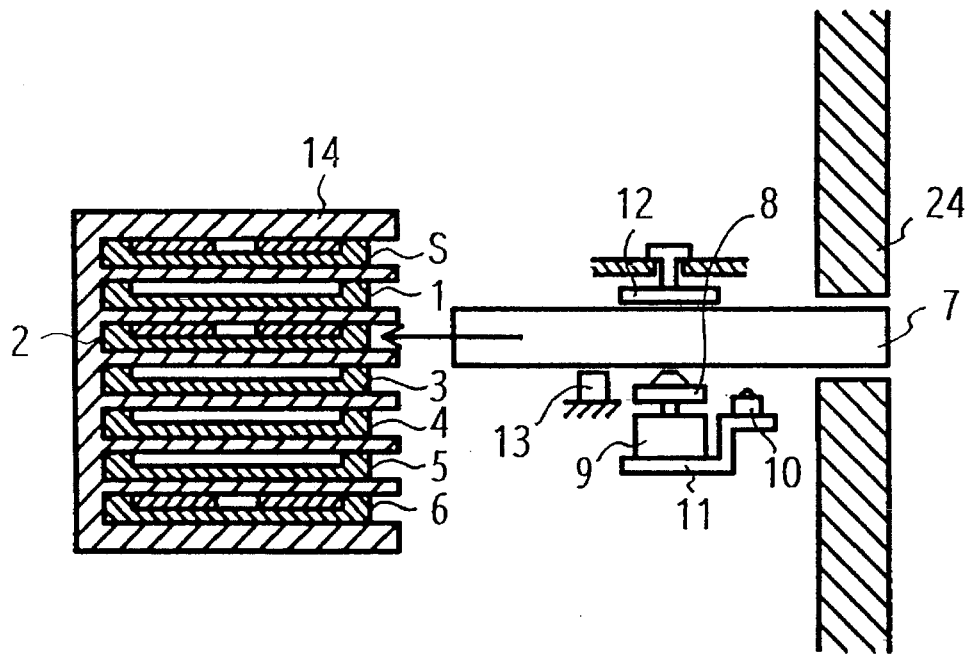

When carriages 1–6 selection switch 46 is operated again, microcomputer 40 performs step S5 and then step S130 which becomes NO because carriage 2 is in tray 7. Microcomputer 40 then performs the loop of steps S136 through S140, wherein step S137 becomes YES because n=6. Microcomputer 40 performs subroutine L1 to move optical head base 11 to the down position, as shown in FIG. 40G, and, in subroutine L2, moves carriage 2 to the store position, as shown in FIG. 40H.

Figure 40I:
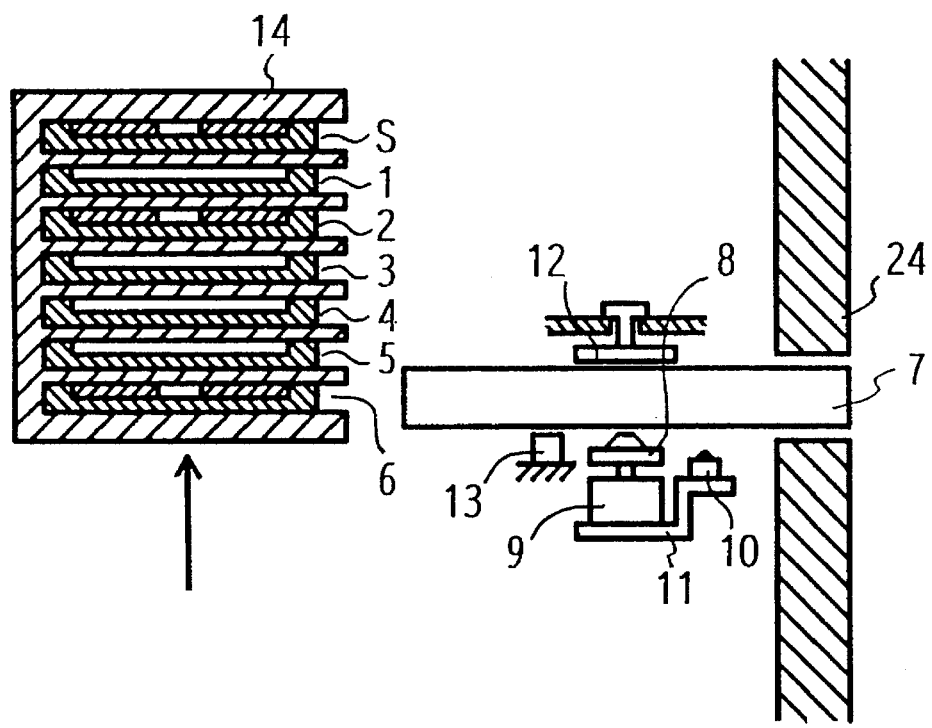
Figure 40J:
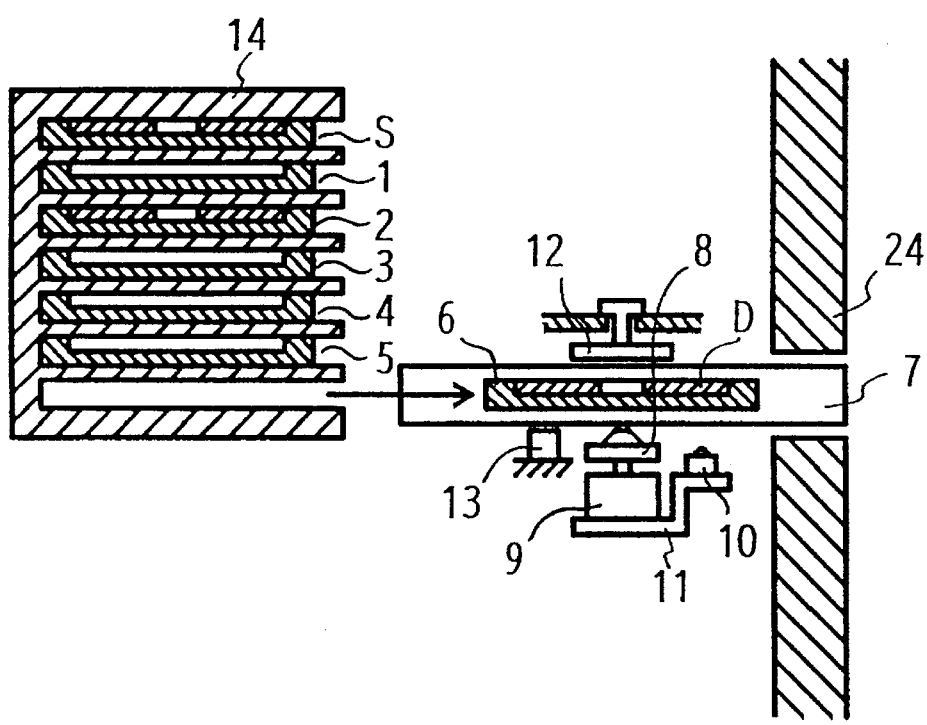
Figure 40K:
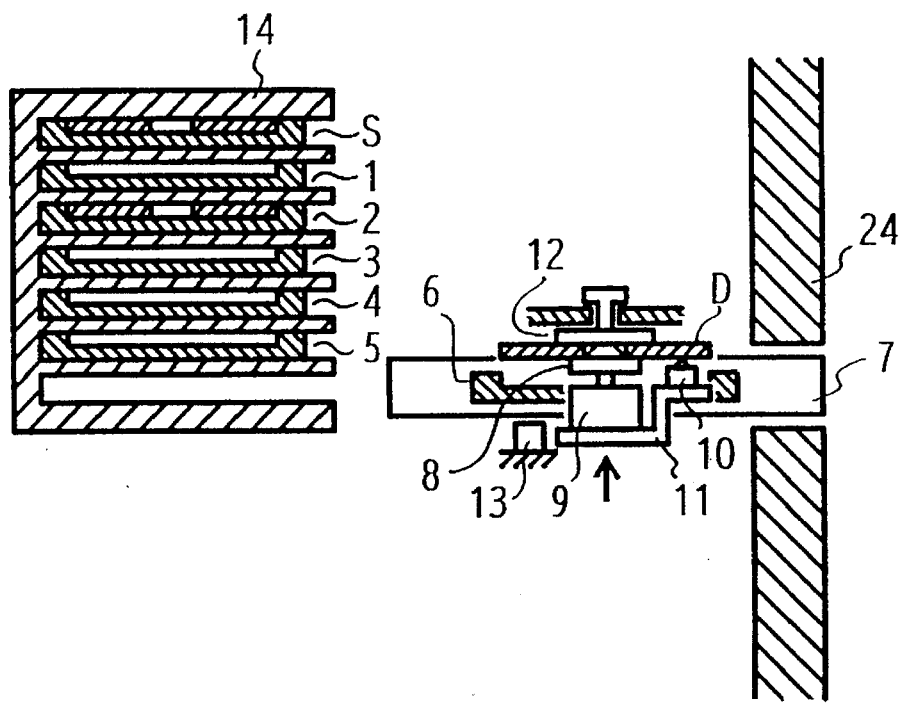

Microcomputer 40 then performs subroutine L8, moving stocker 14 to position 6, as shown in FIG. 40I. Then, carriage 6 is moved to the load position as microcomputer 40 performs subroutine L4 as shown in FIG. 40J. Microcomputer 40 then moves optical head base 11 to the up position in a subroutine L7 to clamp disc D at stand-by for playback, as shown in FIG. 40K, and then monitors the operation of stock switch 41, eject/load switch 42, stop switch 44, carriage S selection switch 45 and carriages 1–6 selection switch 46.

Figure 40L:
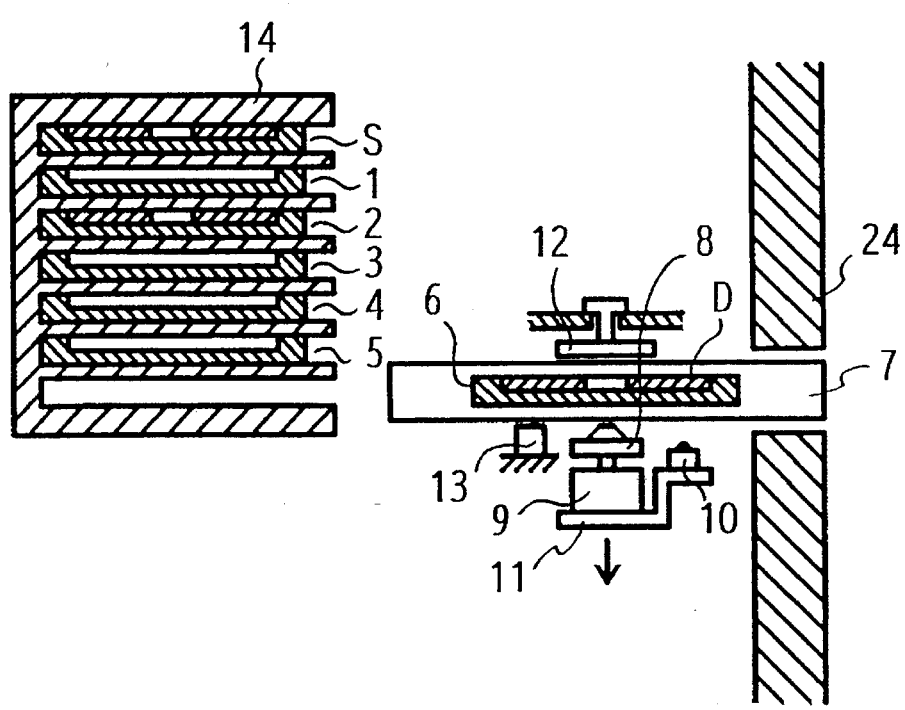
Figure 40M:
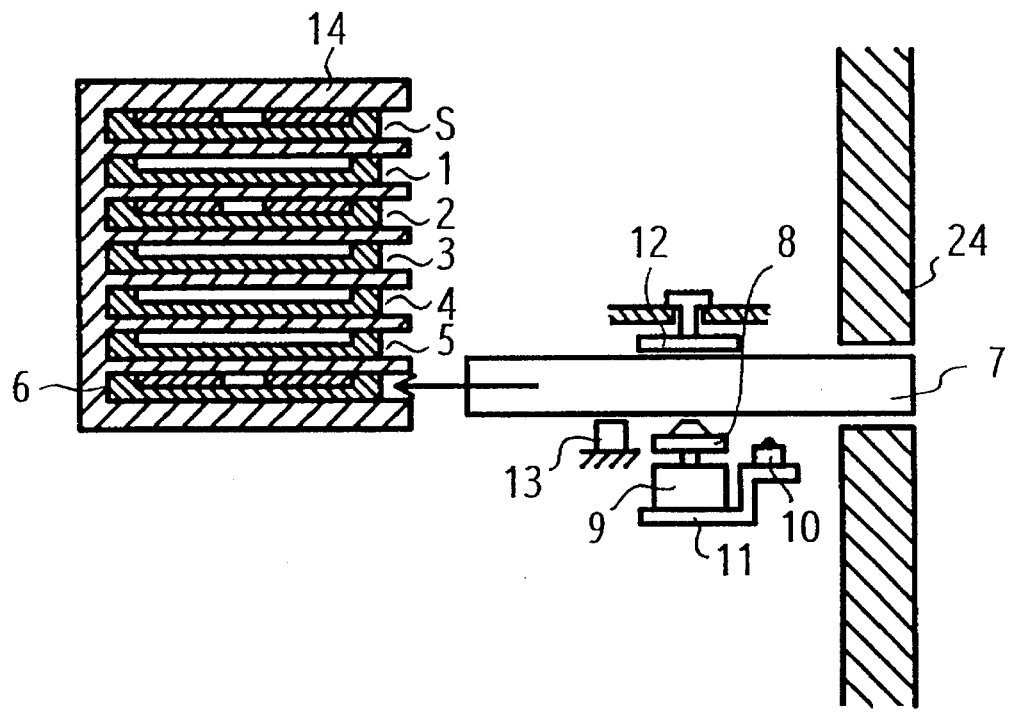

When carriages 1–6 selection switch 46 is manipulated again, microcomputer 40 proceeds from step S5 to step S130 which becomes NO since a carriage 6 is in tray 7. Tray 7 then performs the loop of steps S136 through S140, wherein step S137 becomes YES because n=2. Microcomputer 40 then performs subroutine L1 to move optical head base 11 to the down position, as shown in FIG. 40L. Carriage 6 is then moved to its store position in stocker 14 by subroutine L2, as shown in FIG. 40M.

Figure 40N:
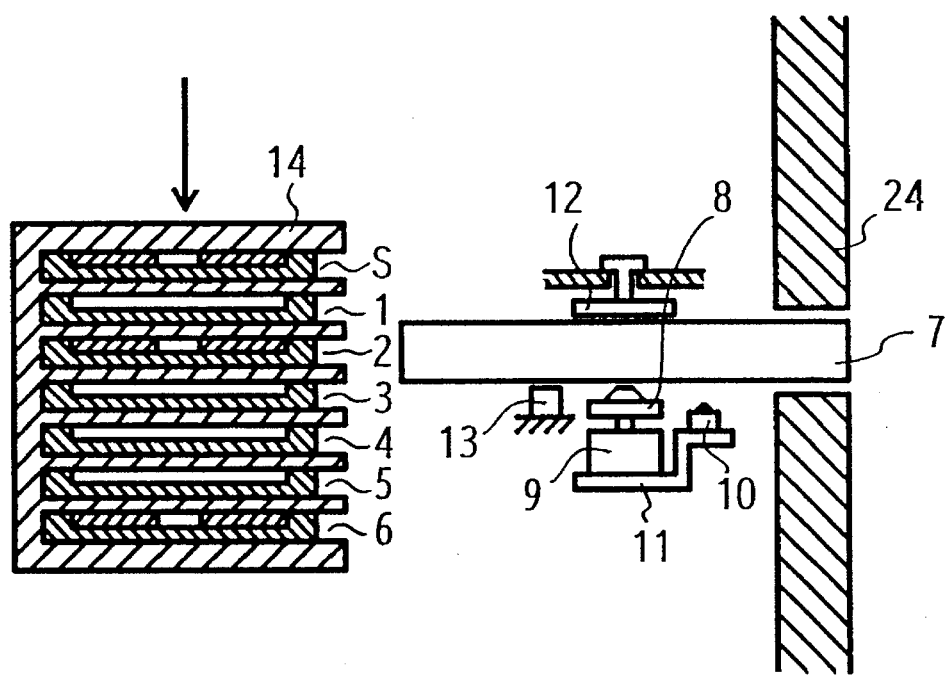
Figure 40O:
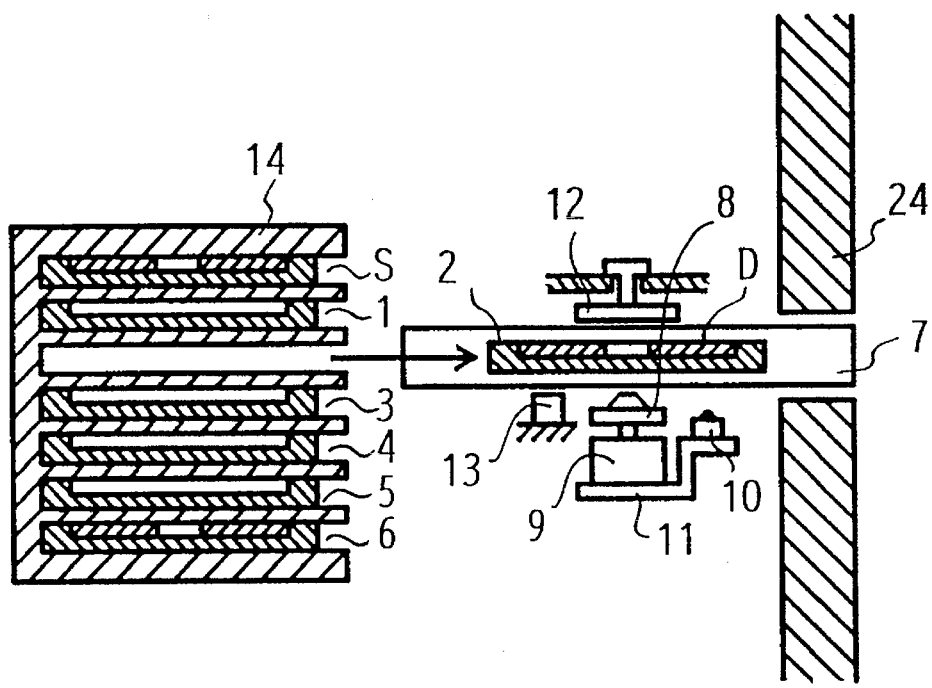
Figure 40P:
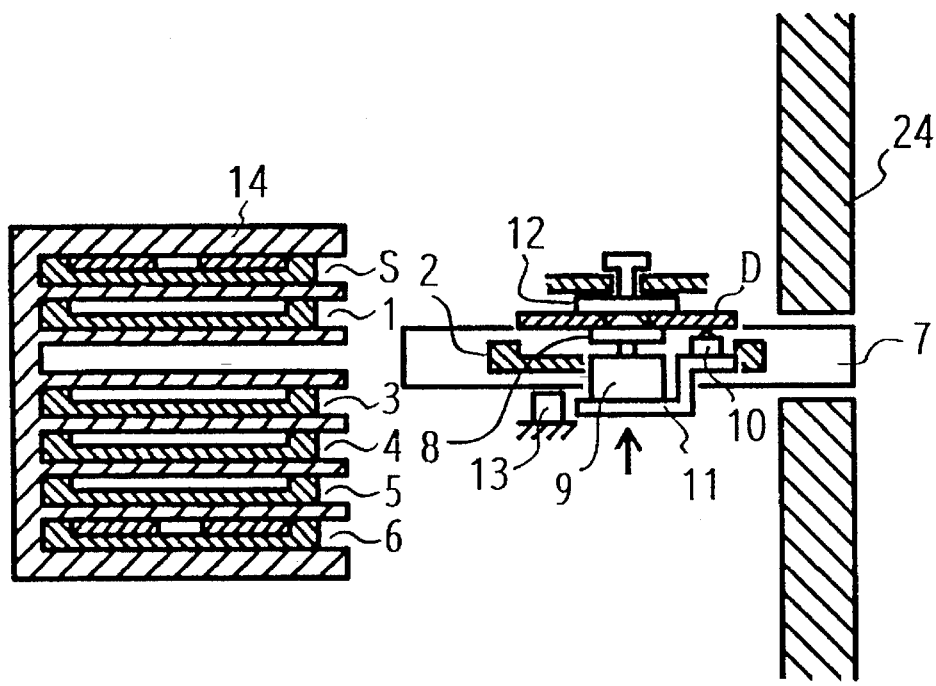

When microcomputer 40 performs subroutine L8, it moves stocker 14 to position 2, as shown in FIG. 40N. Microcomputer 40 then performs subroutine L4 to move carriage 6 to the load position, as shown in FIG. 40O. Optical head base 11 is moved to the up position in subroutine L7 and clamps disc D at stand-by for play, as shown in FIG. 40P. Microcomputer 40 then monitors the operation of stock switch 41, eject/load switch 42, stop switch 44, carriage S selection switch 45 and carriages 1–6 selection switch 46.

Similarly, the discs on carriages 2 and 6 are alternately set to stand-by for play every time a carriages 1–6 selection switch 46 is manipulated.

As described in examples 15 and 16, if carriage S selection switch 45 is operated when a changer-play operation carriage, 1 through 6 is inserted in tray 7, microcomputer 40 directs player 100 to move that carriage into its storage position in stocker 14 and insert single play carriage S into tray 7 to prepare for single-play mode.

If carriages 1–6 selection switch 46 is operated when single play carriage S is in tray 7, microcomputer 40 moves single play carriage S into its storage position in stocker 14 and inserts carriages 1 through 6 whereon discs are present into tray 7 in numerical order in a cyclic manner and prepares for operation in the changer-play mode.

The representative operational examples of the present invention are described in the examples 1 through 15 above. However, other operational routines are possible within the programs illustrated in flow charts 9A through 9D (stop mode), 18A through 18C (eject mode) and 21A through 21D (play mode).

The present invention is not restricted to the described embodiment and can have many other forms. For example, to simplify the description of the operation of the present invention, mode switches 41 through 46 in the described flow charts, once operated, cannot be used to change the operating sequence of player 100 until the routine shown in the applicable flow chart is completed. However, an interrupt may be provided to permit changing the routine in response to the operation of a switch, before a commanded routine is completed. For example, if carriage S selection switch 45 and carriages 1–6 selection switch 46 are operated consecutively, an interrupt may be generated.

In this example, although tray 7 is moved between the eject position and the load position and the carriages are moved between the load position and the store position by a single tray/carriage driver 22, player 100 can be constructed so that they are moved by separate mechanisms.

Although a disc on a carriage is set to standby by moving optical head base 11 to the up position, the same effect can be achieved by lowering a carriage or a clamp.

Although a total of seven carriages are used in the illustrative embodiment above, player 100 is not limited to that number. More or less carriages may be employed without departing from the spirit and scope of the invention.

Having described preferred embodiments of the present invention with reference to the accompanying drawings, it is to be understood that the invention is not limited to those precise embodiments, and that various changes and modifications may be affected therein by one skilled in the art without departing from the scope or spirit of the invention as defined in the appended claims.

What is claimed is:

1. A changer-type disk player comprising:

a tray having means for holding a first disk therein;

means for moving said tray, with said first disk held therein, in a first direction between a first position and a load position;

said first position being an eject position in which said tray extends externally from said changer-type disk player;

said load position being inside said changer-type disk player;

a stocker disposed in said changer-type disk player;

said stocker having therewithin n holding positions, each adapted for holding a one of said first disk and n−1 other disks;

means for transporting said stocker among an n number of postions for each of which a one of said holding positions is brought level with said tray in said load position;

means for shifting said first disk between said tray, in said load position, to a one of said n holding positions brought level with said tray in said load position;

means for playing said first disk when said first disk is attached to said means for playing;

means for attaching said first disk to said means for playing when said first disk is in said tray and said tray is in said load position;

a manually operated eject/load control;

means, responsive to operation of said eject/load control, for controlling said means for moving, said means for transporting, said means for shifting, and said means for attaching;

said means for controlling being operative to perform the following functions in response to operation of said eject/load control at a time when said tray is empty at said first position:

move said tray to said load position, transfer said stocker to bring an occupied one of said n holding positions level with said load position, shift a stored one of said of said first and n−1 other disks from said occupied one of said n holding positions into said tray at said load position, and attach said stored one of said first and n−1 other disks to said means for playing.

2. A changer-equipped disk player for storing and playing an n number of disks comprising:

means for moving one of said disks between a first position, a second position, and a third position;

disk playing means for playing said one of said disks when said one is loaded to said disk playing means;

means for attaching said one of said disks to said disk playing means;

said first position permitting ejection and insertion of said one of said disks from and into said means for moving;

said second position permitting loading and unloading of said one of said disks between said means for moving and said disk playing means;

a storage means for storing said disks within said charger-equipped disk player having an n number of holding means for holding said disks;

said n number of holding means including a first holding means through an $n^{th}$ holding means wherein said first holding means through said $n-1^{th}$ holding means permit storage of a first through an n−1$^{th}$ disks of said n number of disks, respectively, and an n$^{th}$ holding means, S, permits storage of an n$^{th}$ disk of said n number of disks;

transport means for moving said storage means to an n number of storage positions where a selected holding means of said first through n$^{th}$ holding means is positioned at said third position, which is aligned with said second position for purposes of moving contents of said selected holding means;

said means for moving including means for transferring contents of said selected holding means, at said third position, between said storage means and said first and second positions;

manual control means for operating said charger-equipped disk player including a stocking control;

system control means for storing and playing disks including an eject/load control for controlling said means for moving and said transport means;

said system control means being operative to perform the following functions in response to operation of said stocking control at a time when means for moving is in said first position:

move said means for moving to said second position, transport said storage means to place an occupied one of said n number of storage positions in said third position aligned with said second position, move a stored one of said n number of disks occupying said occupied one to said second position; and attach said stored one of said n number of disks to said means for playing.

3. A charger-equipped disk player in accordance with claim 2 wherein said eject/load control operates said means for moving for transference from said first position to said third position before transferring said disk to said second position when no disk has been inserted at said first position.

4. A charger-equipped disk player according to claim 2 wherein said system control means includes play control means for sequentially playing an m$^{th}$ disk, said at second position, through said n$^{th}$ disk, in said storage means, where $1 \leq m \leq n$, by exchanging disks between said storage means and said disk playing means.

5. A disk player, comprising:

means for playing a first disk when said first disk is loaded onto said means for playing;

storage means for storing said first disk and at least a second disk;

means for accepting said first disk from outside said disk player when said disk player is in an accept mode;

means for transporting said first disk accepted by said means for accepting to said storage means and storing said first disk in said storage means;

means for loading said first disk onto said means for playing when said disk player is in a load mode;

manual control means for operating said disk player including an eject/load control for controlling said means for loading, said means for accepting, and said means for storing;

means for loading said first disk from said storage means onto said means for playing, responsively to actuation of said eject/load control, responsively to said disk player being in said accept mode, said first disk being stored in said means for storing, and no disk being accepted from outside said disk player by said means for accepting; and means for loading said first disk from outside said disk player onto said means for playing, responsively to actuation of said eject/load control, responsively to said disk player being in said accept mode and said first disk being accepted from outside said disk player by said means for accepting.

6. Apparatus as in claim 5, wherein said disk player is switched between said accept mode and said load mode responsively to actuation of said eject/load control.

7. A charger-equipped disk player for storing and playing n disks, comprising:

means for moving one of said n disks between a first position and at least one second position;

disk playing means for playing said one of said n disks when said one of said n disks is loaded onto said disk playing means;

said first position permitting said one of said n disks to be placed into and withdrawn from said means for moving during an eject state of said means for moving;

said means for moving including means for loading said one of said n disks from said at least one second position onto said disk playing means;

a storage means for storing said n disks within said charger-equipped disk player having a respective holding means for holding each of said n disks;

said holding means including first holding means through n$^{th}$ holding means wherein said first holding means through said n−1$^{th}$ holding means permit storage of first through n−1$^{th}$ disks of said n number of disks, respectively, and an n$^{th}$ holding means, S, permits storage of an n$^{th}$ disk of said n number of disks;

means for aligning said at least one second position with a selected one of said first through n$^{th}$ holding means;

means for transferring a content of said selected one of said first through n$^{th}$ holding means to said at least one second position when said selected one of said first through n$^{th}$ holding means is aligned with at least one second position;

manual control means for operating said charger-equipped disk player including an eject/load control;

system control means for storing and playing disks including a main storage control means, responsive to operation of said eject/load control, for controlling said means for moving, said means for aligning, and said means for transferring;

said load control effecting transfer of said one of said n disks from said first position to said at least one second position for loading of said one of said n disks to said means for playing when said one of said n disks is inserted at said first position during said eject state of said means for moving; and said load control selecting one of said first through n$^{th}$ holding means containing said one of said n disks and transferring said one of said n disks to said at least one second position when said means for moving is in said eject state and no disk is in said first position.

8. A changer-equipped disk player according to claim 7 wherein said system control means includes play control means for sequentially playing an m$^{th}$ through said n$^{th}$, where said m$^{th}$ disk is a one of said first through n$^{th}$ disks that is in said at least one second position when said play control means is activated; said sequentially playing being accomplished by said means for transferring and said means for aligning exchanging disks between said storage means and said disk playing means.

9. A changer-equipped disk player as in claim 7, wherein:

said second position permits loading and unloading of said one of said n disks onto and from said disk playing means for playing said one of said n disks.

10. A disk player, comprising:

means for moving a disk between a first position and a second position;

disk playing means for playing said disk;

said first position permitting ejection of said disk from said means for moving to a position outside said disk player and insertion of said disk from said position outside into said means for moving;

means for loading said disk at said second position from said means for moving to said disk playing means;

control means for operating said disk player including an eject/load control;

disk sensing means for indicating to said control means whether a disk is present at, and/or moved from, said first position by said means for moving; and said control means including means for moving a detected disk, detected at or transported from said first position, to said second position and loading to load said detected disk onto said disk playing means.

11. Apparatus as in claim 10 wherein said means for moving includes a tray for carrying said disks moved by said means for moving.

12. Apparatus as in claim 10, wherein:

said means for loading includes a turntable and a clamper element; and said means for loading includes means for clamping a disk to be loaded between said clamper element and said turntable.

13. Apparatus as in claim 12, wherein said means for loading includes further means for moving one of said turntable and said clamper element toward the other of said turntable and said clamper element.

14. Apparatus as in claim 12, wherein said disk to be loaded moves with said one of said turntable and said clamper element toward the other of said turntable and said clamper element toward a clamped position of said disk to be loaded whereby said disk to be loaded is clamped.

15. A changer-type disk player comprising:

n carriages including a first carriage and n−1 other carriages;

a tray capable of holding any of said n carriages;

each of said n carriages having means for supporting any disk thereon;

means for moving said tray between an eject position and at least a second position;

said eject position being adapted for allowing a user to place said any disk onto any of said n carriages held in said tray at said eject position whereby said any disk is supported by said any of said n carriages;

means for playing back said any disk when said any disk is loaded onto said means for playing back;

means for loading onto said means for playing back said any disk supported in any of said n carriages held by said tray when said tray is in said at least a second position;

a stocker in said changer-type disk player;

said stocker having n holding positions, each for selectively receiving and dispensing a respective one of said n carriages;

means for aligning a selected one of said n holding positions with said tray by transporting at least one of said tray and said stocker while said tray is in said at least a second position, means for selectively shifting said any of said n carriages held in said tray at said at least a second position from said tray into an aligned one of said n holding positions and from said aligned one of said holding positions into said tray at said at least a second position;

means for detecting when all of said n carriages are empty;

control means including means for performing the following functions:

(a) selectively shifting said first carriage into said tray and for moving said tray to said at least a second position when said means for detecting detects that all of said n carriages are empty; and (b) not selectively shifting said first carriage from said tray in said at least a second position when said means for detecting detects that all of said n carriages are empty.

16. Apparatus as in claim 15, wherein said control means controls said means for selectively shifting, said means for moving and said means for aligning to retain one of said n−1 other carriages in said tray at said second position only when said one of said n−1 other carriages contains a disk.

17. Apparatus as in claim 16, further comprising:

a manually operated eject/load control connected to said control means;

said control means including means for moving said tray from said at least a second position to said eject position in response to an actuation of said eject/load control when said first carriage is in said at least a second position and said all of said n−1 other carriages are empty;

said control means including means for executing a single disk playback mode in response to actuation of said eject/load control when said first carriage is held in said tray at said eject position, said first carriage contains a single play-disk, and said all of said n−1 other carriages, are empty; and said single disk playback mode including moving said tray to said at least a second position, loading said disk on said first carriage onto said means for playing back, and playing back said disk on said first carriage.

18. Apparatus as in claim 15, further comprising:

a manually operated eject/load control connected to said control means;

said control means including means for moving said tray from said at least a second position to said eject position in response to an actuation of said eject/load control when said first carriage is in said at least a second position and said all of said n−1 other carriages are empty;

said control means including means for executing a single disk playback mode in response to actuation of said eject/load control when said first carriage is held in said tray at said eject position, said first carriage contains a single play-disk, and said all of said n−1 other carriages, are empty; and said single disk playback mode including moving said tray to said at least a second position, loading said disk on said first carriage onto said means for playing back, and playing back said disk on said first carriage.

19. Apparatus as in claim 18, wherein said means for playing back halts said playing back after a first completion of said playing back.

20. A changer-type disk player comprising:

a tray having means for holding a first disk therein;

means for moving said tray, with said first disk held therein, in a first direction between a first position and at least one second position;

said first position being an eject position in which said tray extends externally from said changer-type disk player;

said at least one second position being inside said changer-type disk player;

a stocker inside said changer-type disk player;

said stocker having therewithin n holding positions, each adapted for holding a one of said first disk and n−1 other disks;

means for aligning a one of said n holding positions of said stocker with said at least one second position;

means for shifting said first disk between said tray, in said at least one second position, to an aligned one of said n holding positions;

means for playing said first disk when said first disk is attached to said means for playing;

means for attaching said first disk to said means for playing when said first disk is in said tray and said tray is in said at least one second position;

a manually operated eject/load control;

means, responsive to operation of said eject/load control, for controlling said means for moving, said means for aligning, said means for shifting, and said means for attaching;

said means for controlling being operative to cause said means for moving to place said tray in said first position in response to a first operation of said eject/load control;

said means for controlling being operative to perform the following functions in response to a second operation of said eject/load control at a time when said tray is empty:
 move said tray to said at least one second position,
 align an occupied one of said n holding positions with said at least one second position,
 move a stored one of said first and n−1 other disks from said occupied one of said n holding positions into said tray at said at least one second position, and
 attach said stored one of said first and n−1 other disks to said means for playing.

21. A changer-type disk player comprising:

an n number of carriages, including a single-play mode carriage S and changer-play mode first to n−1$^{th}$ carriages;

a tray capable of holding each of said n number of carriages, one at a time;

each of said n number of carriages including means for supporting a corresponding disk thereon;

first means for moving said tray between a first and at least one second position;

said first position being an eject position external to said changer-type disk player;

said at least one second position being within said changer-type disk player;

a stocker in said changer-type disk player;

said stocker having therewithin an n numbers of slots;

each of said slots including means for storing therein and dispensing therefrom a one of said n number of carriages;

second means for moving one of said stocker and said tray among an n numbers of positions at each of which a one of said slots is aligned with said tray in said at least one second position;

third means for moving said one of said n number of carriages between said tray and said each of said slots when said each of said slots is aligned with said tray in said at least one second position;

disk playing means for playing an attached disk;

means for attaching to said disk playing means a one of said corresponding disks supported in a selected one of said n number of carriages when said selected one is in said tray at said at least one second position;

a manually operated eject/load control;

means, responsive to operation of said eject/load control, for controlling said means for moving said tray between said eject position and said at least one second position;

when said eject/load control is operated with one of said first to n−1$^{th}$ carriages in said tray at said eject position being empty, said means for controlling being effective for initiating the following functions:
 moving said tray from said eject position to said at least one second position;
 moving said one of said first to n−1$^{th}$ carriages from said tray in said at least one second position to a corresponding slot in said stocker;
 moving another of said first to n−1$^{th}$ carriages, whereon a disk is supported, from said stocker to said tray; and
 attaching said disk supported on said another of said first to n−1$^{th}$ carriages in said tray to said disk playing means.

22. Apparatus as in claim 21, wherein said means for attaching includes means for moving one of said disk playing means and said one of said corresponding disks supported in said selected one of said n number of carriages toward the other of said disk playing means and said one of said corresponding disks supported in said selected one of said n number of carriages.

23. A changer-type disk player according to claim 22, wherein said means for controlling controls each of said means to perform changer-play operation, where disks on at least an m$^{th}$ carriage to an n−1$^{th}$ carriage of said first to n−1$^{th}$ carriages are played sequentially according to a predetermined routine, by performing the following functions:
 moving said one of said stocker and said tray to a position one of said n numbers of positions to align said m$^{th}$ carriage (1≦m<n) supporting said disk of said first to said n−1$^{th}$ carriages said tray with said at least one second position;
 placing said m$^{th}$ carriage (1≦m<n) in said tray; and
 attaching said disk supported on said m$^{th}$ carriage to said disk playing means.

24. A changer-type disk player according to claim 21, wherein said means for controlling, when said tray contains an empty one of said first to n−1$^{th}$ carriages, said tray is in said eject position, and said eject/load control is operated, includes means for performing the following functions:
 moving said tray to said at least one second position;
 moving one of said n number of carriages from said tray to said corresponding slot in said stocker; and
 moving said carriage S into said tray when all of said first to n−1$^{th}$ carriages are empty.

25. A changer-equipped disk player for storing and playing n disks, comprising:

a respective carriage for supporting each of said n disks;

means for moving one of said n disks, supported on said respective carriage of said one of said n disks, between an eject position and a second area inside said disk player;

disk playing means for playing said one of said n disks when said one of said n disks is loaded onto said disk playing means;

said means for moving including means for accepting and rejecting said one of said n disks at said eject position when said means for moving is in a receptive state;

said second area permitting loading and unloading of said one of said n disks onto and from said disk playing means;

a storage means for storing said n disks within said changer-equipped disk player;

said storage means having a first through $n^{th}$ holding means for holding said n disks;

means for aligning said respective carriage of a selected one of said n disks in said second area with a selected one of said first through $n^{th}$ holding means;

means for transferring contents of said selected one of said first through $n^{th}$ holding means to said second area while said respective carriage of said selected one of said n disks is aligned with said selected one of said first through $n^{th}$ holding means;

manual control means for operating said changer-equipped disk player including an eject/load control;

system control means for storing and playing disks including load control means, responsive to operation of said eject/load control, for controlling said means for moving, said means for aligning, and said means for transferring;

said load control means effecting movement of said one of said n disks from said eject position to said second area for loading of said one of said n disks onto said means for playing when said one of said n disks is accepted at said eject position during said receptive state of said means for moving; and said load control means aligning a one of said first through $n^{th}$ holding means that contains a stored disk and transferring said stored disk from said one of said first through $n^{th}$ holding means to said second area when said means for moving is in said receptive state, and no disk is in said eject position.

26. Apparatus as in claim 25, wherein said means for aligning includes means for transporting one of said storage means and said respective carriage of said selected one of said n disks among n positions, in each of which, said respective carriage of said selected one of said n disks is aligned with a respective one of said first through $n^{th}$ holding means.

27. Apparatus as in claim 26, wherein said playback means includes:

a turntable aligned with said second area; and means for selectively loading said one of said n disks in said second area onto said turntable by transporting one of said one of said n disks to said turntable, said turntable to said one of said n disks, and said turntable and said one of said n disks toward the other of said turntable and said one of said n disks.

28. Apparatus as in claim 25, wherein said playback means includes:

a turntable aligned with said second area; and means for selectively loading said one of said n disks in said second area onto said turntable by transporting one of said one of said n disks to said turntable, said turntable to said one of said n disks, and said turntable and said one of said n disks toward the other of said turntable and said one of said n disks.

29. Apparatus as in claim 28, wherein said means for moving includes:

a tray for carrying a respective carriage of said one of said n disks;

means for moving said tray between said eject position and one of said second area and another area inside said changer-equipped disk player.

30. Apparatus as in claim 29 wherein each of said first through $n^{th}$ holding means, includes means for holding said respective carriage of a respective one of said n disks to be stored in said each of said first through $n^{th}$ holding means.

31. A changer-type disk player comprising:

n carriages;

means for accepting a first disk in a first of said n carriages held at an eject position outside said changer-type disk player when said changer-type disk player is in a disk-receptive state;

means for moving said first carriage with said first disk, in a first direction between said eject position and at least one second position;

said at least one second position being inside said changer-type disk player;

a stocker inside said changer-type disk player;

said stocker having therewithin n holding positions, each adapted for holding a one of said first disk and n−1 other disks;

means for aligning a one of said n holding positions of said stocker with said at least one second position;

means for shifting said first carriage, in said at least one second position, to an aligned one of said n holding positions;

means for playing said first disk when said first disk is attached to said means for playing;

means for attaching said first disk to said means for playing when said first carriage, with said first disk, is in said at least one second position;

a manually operated eject/load control;

means, responsive to operation of said eject/load control, for controlling said means for moving, said means for aligning, said means for shifting, and said means for attaching;

shift a stored one of said first and n−1 other carriages holding a stored disk from said occupied one of said n holding positions to said at least one second position, and attach said stored one of said first and n−1 other disks to said means for playing.

32. A disk player, comprising:

means for playing a first disk when said first disk is loaded onto said means for playing;

storage means for storing said first disk and at least a second disk;

means for accepting said first disk from outside said disk player when said disk player is in an accept mode;

means for transporting said first disk accepted by said means for accepting to said storage means and storing said first disk in said storage means;

means for loading said first disk onto said means for playing when said disk player is in a load mode;

manual control means for operating said disk player including an eject/load control for controlling said means for loading, said means for accepting, and said means for storing;

means for loading said first disk from said storage means onto said means for playing, responsively to actuation of said eject/load control, responsively to said disk player being in said accept mode, said first disk being stored in said means for storing, and no disk being accepted from outside said disk player by said means for accepting; and means for loading said first disk from outside said disk player onto said means for playing, responsively to actuation of said eject/load control, responsively to said disk player being in said accept mode and said first disk being accepted from outside said disk player by said means for accepting.

33. A disk player, comprising:

means for playing a first disk when said first disk is loaded onto said means for playing;

storage means for storing said first disk and at least a second disk;

said means for storing including first and second holding positions;

means for accepting said first disk from outside said disk player when said disk player is in an accept mode;

said means for accepting including means for supporting said disk in an eject position;

means for transporting each of said first disk and said at least a second disk to said means for storing by accepting said each of said first disk and said at least a second disk in said means for supporting and transporting said each of said first disk and said at least a second disk to a respective one of said first and second holding positions;

means for loading said first disk onto said means for playing when said disk player is in a load mode;

manual control means for operating said disk player including an eject/load control for controlling said means for loading, said means for accepting, and said means for storing;

means for loading said first disk from said storage means onto said means for playing, responsively to actuation of said eject/load control, when said disk player is in said accept mode, said first disk is stored in said means for storing, and no disk is accepted from outside said disk player; and means for loading said first disk from outside said disk player onto said means for playing, responsively to actuation of said eject/load control, when said disk player is in said accept mode and said first disk is accepted from outside said disk player.

34. A changer-type disk player comprising:

a tray having means for holding a first disk therein;

means for moving said tray, with said first disk held therein, in a first direction between a first position and at least one second position;

said first position being an eject position in which said tray extends externally from said changer-type disk player;

said at least one second position being inside said changer-type disk player;

a stocker inside said changer-type disk player;

said stocker having therewithin n holding positions, each adapted for holding a one of said first disk and n−1 other disks;

means for aligning a one of said n holding positions of said stocker with said at least one second position;

means for shifting said first disk between said tray, in said at least one second position, to an aligned one of said n holding positions;

means for playing said first disk when said first disk is attached to said means for playing;

means for attaching said first disk to said means for playing when said first disk is in said tray and said tray is in said at least one second position;

a manually operated eject/load control;

means, responsive to operation of said eject/load control, for controlling said means for moving, said means for aligning, said means for shifting, and said means for attaching;

said means for controlling being operative to perform the following functions in response to an operation of said eject/load control and in response to said tray being empty:

move said tray to said at least one second position, align an occupied one of said n holding positions with said at least one second position, move a stored one of said of said first and n−1 other disks from said occupied one of said n holding positions into said tray at said at least one second position, and attach said stored one of said first and n−1 other disks to said means for playing.

35. A disc player, comprising:

means for moving a disk between a first position and a second position;

disk playing means for playing said disk loaded thereonto;

means for loading said disk from said second position onto said disk playing means;

said first position permitting insertion of said disk from a position outside said disk player and insertion of said disk from said position outside into said means for moving;

said second position permitting loading and unloading of said disk between said means for moving and said disk playing means;

disk sensing means for sensing said disk on said means for moving;

manual control means;

system control means for controlling said means for moving and said means for loading responsively to said manual control means and said disk sensing means; and said system control means causing said means for moving to move said disk from said first position to said second position and loading said disk onto said disk playing means in response to said an actuation of said manual control means and in response to said disk sensing means sensing said disk and for causing said means for moving to move said disk from said first position to said second position without loading said disk onto said disk playing means in response to said actuation in response to said disk sensing means sensing an absence of said disk on said means for moving.

36. Apparatus as in claim 35, wherein:

said means for loading includes a turntable and a clamper element; and said means for loading includes means for clamping a disk to be loaded between said clamper element and said turntable.

* * * * *